(12) United States Patent
Sethi et al.

(10) Patent No.: US 12,435,066 B2
(45) Date of Patent: Oct. 7, 2025

(54) SUBSTITUTED TRICYCLIC COMPOUNDS

(71) Applicant: LUPIN LIMITED, Mumbai (IN)

(72) Inventors: Sachin Sethi, Pune (IN); Prathap Sreedharan Nair, Pune (IN); Manojkumar Ramprasad Shukla, Pune (IN); Milind Dattatraya Sindkhedkar, Pune (IN); Venkata P. Palle, Pune (IN); Rajender Kumar Kamboj, Pune (IN); Samiron Phukan, Pune (IN); Pradeep Rangrao Patil, Pune (IN); Ganesh Kakade, Pune (IN); Nilesh Raghunath Khedkar, Pune (IN); Dagadu Dube, Pune (IN); Vikas Sitaram Tambe, Pune (IN); Sudhakar Maruti Balgude, Pune (IN); Pradip Balu Wagh, Pune (IN)

(73) Assignee: LUPIN LIMITED (IN)

( * ) Notice: Subject to any disclaimer, the term of this patent is extended or adjusted under 35 U.S.C. 154(b) by 739 days.

(21) Appl. No.: 17/775,679

(22) PCT Filed: Nov. 28, 2020

(86) PCT No.: PCT/IB2020/061248
§ 371 (c)(1),
(2) Date: May 10, 2022

(87) PCT Pub. No.: WO2021/105960
PCT Pub. Date: Jun. 3, 2021

(65) Prior Publication Data
US 2023/0013778 A1 Jan. 19, 2023

(30) Foreign Application Priority Data

Nov. 29, 2019 (IN) .............................. 201921049157
Aug. 17, 2020 (IN) .............................. 202021035414

(51) Int. Cl.
*C07D 403/12* (2006.01)
*A61P 35/00* (2006.01)
*C07D 405/12* (2006.01)
*C07D 491/048* (2006.01)

(52) U.S. Cl.
CPC ............ *C07D 403/12* (2013.01); *A61P 35/00* (2018.01); *C07D 405/12* (2013.01); *C07D 491/048* (2013.01)

(58) Field of Classification Search
CPC .................................................. C07D 403/12
See application file for complete search history.

(56) References Cited

FOREIGN PATENT DOCUMENTS

| WO | WO-9943679 A1 * | 9/1999 | ........... C07D 487/04 |
|---|---|---|---|
| WO | 2018/115380 A1 | 6/2018 | |
| WO | 2018/172250 A1 | 9/2018 | |

OTHER PUBLICATIONS

International Search Report and Written Opinion mailed Mar. 2, 2021 for PCT/IB2020/061248, 8 pages.

* cited by examiner

*Primary Examiner* — David K O'Dell
(74) *Attorney, Agent, or Firm* — Fox Rothschild LLP

(57) ABSTRACT

Disclosed are compounds of the general formula (I), its tautomeric form, its stereoisomer, its pharmaceutically acceptable salt, its polymorph, or solvate thereof, Formula (I) wherein, ring A, $R^1$ to $R^5$, X, Y, m, and n are as defined herein, for use as SOS1 inhibitors in the treatment of proliferative, infectious and RASopathy diseases or disorders. Also disclosed are methods of synthesizing the compound of formula I, pharmaceutical compositions containing the compound of formula I, method of treatment of proliferative, infectious and RASopathy diseases or disorder, for example, a cancer, by administering the said compound and combinations of the compound of formula I with other active ingredients.

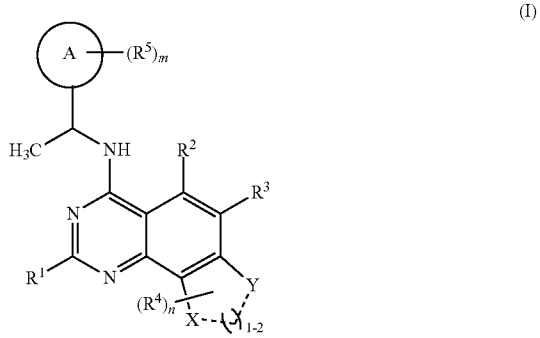

27 Claims, No Drawings

SUBSTITUTED TRICYCLIC COMPOUNDS

FIELD OF THE INVENTION

The present invention is related to a compound of the general formula (I),

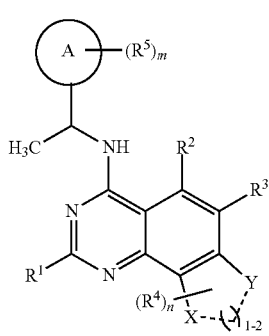

its tautomeric form, its stereoisomer, its pharmaceutically acceptable salt, its polymorph, its solvate, its combination with suitable medicament, its pharmaceutical composition, method of making of the compound, its use as SOS1 inhibitor, and its therapeutic utility in various pathological conditions.

CROSS-REFERENCE TO RELATED APPLICATIONS

The present application is a U.S. National Stage Application under 35 U.S.C. § 371 of International Application No. PCT/IB2020/061248 filed Nov. 28, 2020, which claims the benefit of Indian Provisional Patent Application Nos. IN 201921049157, filed on 29 Nov. 2019 and IN 202021035414, filed on 17 Aug. 2020, the disclosures of which are incorporated herein by reference in their entirety for all purposes.

BACKGROUND OF THE INVENTION

Multiple signaling pathways control the initiation, progression, spread, metastasis, immune evasion of cancer. Key signaling pathways include RTK/RAS pathway, PI3K pathway, Wnt pathway, Myc pathway and the cell cycle pathway (Francisco Sanchez-Vega et al., Cell, 2018, 173(2):321-337.e10). RAS-family proteins (KRAS, HRAS and NRAs and their respective mutants) are small GTPases that exist in cells in either GTP-bound (inactive) or GDP-bound (active) states (Sigi Li et al, Nat. Rev. Cancer, 2018, 18(12):767-777). The activity of RAS proteins is modulated by proteins known as GTPase Activating Proteins (GAPs) or Guanine Nucleotide Exchange Factors (GEFs). The GAP proteins belonging to the RAS family include members such as NF1, TSC2, IQGAP1, etc. which activate the GTPase function of the RAS proteins and thus terminate the signaling by catalyzing the hydrolysis of GTP to GDP. In contrast, the RAS family GEFs include proteins such as SOS1, SOS2, RAS-GRP, RASGRF2, etc. which activate the RAS proteins by exchanging GTP for GDP (Johannes L. Bos et al, Cell, 2007, 129(5):865-77).

Ras-GTP binds to effector proteins such as Raf and PI3K which in turn leads to activation of the RAF-MEK-ERK (MAPK) and PI3K-mTOR-AKT (PI3K) signaling pathways (Suzanne Schubbert et al., Nat. Rev. Cancer, 2007, 7(4): 295-308). Triggering of one or more of these cellular signaling pathways leads to the initiation and maintenance of the oncogenic phenotype involving enhanced cell proliferation, increased cell survival, altered metabolism, angiogenesis, migratory potential and immune evasion eventually leading to establishment and metastasis of cancers (Yousef Ahmed Fouad et al., Am. J. Cancer Res., 2017, 1; 7(5): 1016-1036; Douglas Hanahan et al., Cell, 2011, 4; 144(5): 646-74). RAS proteins undergo point mutations at several amino acid residues—the key hot spots being positions G12, G13 and Q61. These mutations render the RAS proteins constitutively active since the proteins are predominantly in the active GTP-bound form (Ian A. Prior et al., Cancer Res. 2012, 15; 72(10): 2457-2467; Adrienne D. Cox, et al., Nat. Rev. Drug. Discov., 2014, 13(11):828-51). Interaction of RAS proteins with GEFs such as Son of Sevenless 1 (SOS1) plays a crucial role in relaying the signals to downstream effectors. The SOS1 protein harbors several domains such as the Dbl homology domain (DH), a Pleckstrin homology domain (PH), RAS exchanger motif (REM), CDC25 homology domain and a C-terminal proline rich domain (PxxP) (Pradeep Bandaru et al., Cold Spring Harb Perspect Med., 2019, 1; 9(2). pii: a031534). SOS1 has been shown to have a catalytic site as well as an allosteric site. The catalytic site is preferentially bound by RAS-GDP whereas RAS-GTP binds with the allosteric site with better affinity than RAS-GDP (S. Mariana Margarit et al., Cell, 2003, 7; 112(5):685-95; Hao-Hsuan Jeng et al., Nat. Commun., 2012; 3:1168). Furthermore, binding of oncogenic KRAS to SOS1 promotes the activation of wild type HRAS and NRAS (Hao-Hsuan Jeng et al., Nat. Commun., 2012; 3:1168). The catalytic (guanine nucleotide exchange) function of SOS1 is critical for KRAS oncogenic activity in cancer cells (You X et al., Blood. 2018, 13; 132(24):2575-2579; Erin Sheffels et al., Sci Signal. 2018, 4; 11(546). pii: eaar8371). SOS1 plays a key role in signal transmission following cellular activation by Receptor Tyrosine Kinases (RTKs) (Frank McCormick et al., Nature, 1993, 6; 363(6424):45-51; Stephane Pierre et al., Biochem Pharmacol. 2011, 1; 82(9):1049-56). Additionally, receptors on lymphocytes (B cell and T cell receptor) (Mateusz Poltorak et al., Eur J Immunol. 2014, 44(5):1535-40; Stephen R. Brooks et al., J Immunol. 2000, 15; 164(6):3123-31) and hematopoietic cells (Mario N. Lioubin et al., Mol Cell Biol., 1994, 14(9):5682-91).

The role of SOS1 in the RAS-mediated signaling pathways make it an attractive target for cancer therapy. Pharmacological intervention with SOS1 inhibitors has been shown to attenuate or eliminate the downstream effector events of the RAS-mediated pathways (Roman C. Hillig et al., Proc. Natl. Acad. Sci. USA. 2019, 12; 116(7):2551-2560; Chris R. Evelyn et al., J Biol Chem., 2015, 15; 290(20): 12879-98).

In addition to cancer, hereditary SOS1 mutations are implicated in the pathogenesis of RASopathies like e.g. Noonan syndrome (NS), cardio-facio-cutaneous syndrome (CFC) and hereditary gingival fibromatosis type 1 (Pierre et al., Biochem. Pharmacol., 2011, 82(9):1049-56).

In addition, the other diseases associated with hSOS1 expression is significantly upregulated in whole blood cell extracts of pediatric patients with acute community-acquired *Staphylococcus aureus* infection and in patients with Acute Respiratory Distress Syndrome (ARDS)/Acute Lung Injury (ALI) and Sepsis (F. C. Baltanás, et al. BBA—Reviews on Cancer 1874 (2020) 188445).

In addition, several patent applications related to SOS1 are published which are as follows: WO2004003152, WO2014144148, WO2016077793, WO2018115380, WO2018172250, WO2019122129, WO2019201848, WO2020180768, and WO2020180770.

The foregoing shows that there exists an unmet need for SOS1 inhibitory compounds for treating diseases or disorders involving SOS1, particularly cancer that are dependent on the SOS1.

BRIEF SUMMARY OF THE INVENTION

The present invention provides compounds of the general formula (I), their pharmaceutically acceptable salts, tautomeric forms, stereoisomers, polymorphs, solvates, combinations with suitable other medicament or medicaments and pharmaceutical compositions thereof and use thereof in treating various diseases or disorders including cancers,

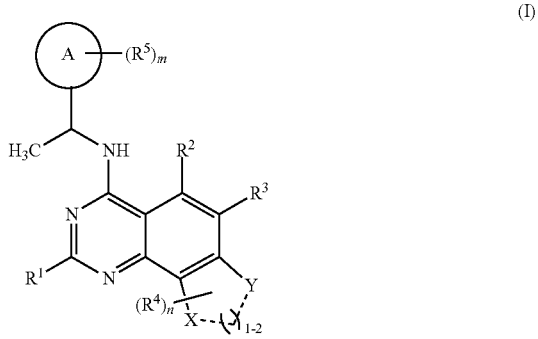

wherein, ring A, $R^1$ to $R^5$, X, Y, m, and n are described in detail below. The compounds of the present invention are potent inhibitors of SOS1.

According to one aspect of the present invention, there is provided a compound represented by the general formula (I), its tautomeric form, its stereoisomer, its polymorph, its solvate, its pharmaceutically acceptable salt, its combinations with suitable medicament and its pharmaceutical compositions, wherein, ring A, $R^1$ to $R^5$, X, Y, m, and n are described in detail below.

In other aspect the present invention provides a pharmaceutical composition, containing the compound of the general formula (I) as defined herein, its tautomeric form, and its stereoisomer, its polymorph, its solvate, or its pharmaceutically acceptable salt in combination with the usual pharmaceutically employed carriers, diluents, and the like are useful for the treatment of a disease or disorder mediated through SOS1.

In another aspect the present invention provides a pharmaceutical composition, containing the compound of the general formula (I) as defined herein, its tautomeric form, its stereoisomer, its polymorph, its solvate, or its pharmaceutically acceptable salt in combination with the usual pharmaceutically employed carriers, diluents, and the like are useful for the treatment of a disease or disorder such as cancer, infectious disease or disorder, or RASopathy disease or disorder.

In yet other aspect the present invention provides the compound of formula I, its tautomeric form, its stereoisomer, its pharmaceutically acceptable salt, its polymorph, its solvate, its combination with suitable medicament, or its pharmaceutical composition for treating disease characterized by excessive or abnormal cell proliferation such as cancer.

In another aspect the present invention provides the compound of formula I, its tautomeric form, its stereoisomer, its pharmaceutically acceptable salt, its polymorph, its solvate, its combination with suitable medicament, or its pharmaceutical composition for treating diseases like pancreatic cancer, lung cancer, colorectal cancer, class 3 BRAF-mutant cancers, hematological cancer, cholangiocarcinoma, multiple myeloma, melanoma, uterine cancer, endometrial cancer, thyroid cancer, acute myeloid leukaemia, bladder cancer, urothelial cancer, gastric cancer, cervical cancer, head and neck squamous cell carcinoma, diffuse large B cell lymphoma, esophageal cancer, chronic lymphocytic leukaemia, hepatocellular cancer, breast cancer, ovarian cancer, prostate cancer, glioblastoma, renal cancer, Pure mucosal neuroma syndrome, Fibrous Epulis, and sarcomas.

In another aspect the present invention provides the compound of formula I, its tautomeric form, its stereoisomer, its pharmaceutically acceptable salt, its polymorph, its solvate, its combination with suitable medicament, or its pharmaceutical composition for treating diseases such as Neurofibromatosis type 1 (NF1), Noonan Syndrome with Multiple Lentigines (NSML), Noonan-like/multiple giant cell lesion syndrome, Hereditary Gingival Fibromatosis (HGF), Capillary Malformation-Arteriovenous Malformation Syndrome (CM-AVM), Legius Syndrome, Acute *Staphylococcus aureus* infection (Pediatric Patients), Pure mucosal neuroma syndrome, Fibrous Epulis, Acute Respiratory Distress syndrome/Acute Lung injury and Sepsis, Costello Syndrome (CS), and Cardio-Facio-cutaneous Syndrome (CFC Syndrome).

In another aspect the present invention provides the compound of formula I, its tautomeric form, its stereoisomer, its pharmaceutically acceptable salt, its polymorph, its solvate, its combination with suitable medicament, or its pharmaceutical composition for use in therapeutic regimens in the context of first line, second line, or any further line of treatments.

In another aspect the present invention provides the compound of formula I, its tautomeric form, its stereoisomer, its pharmaceutically acceptable salt, its polymorph, its solvate, its combination with suitable medicament, or its pharmaceutical composition for use in the prevention, short-term or long term treatment of the above-mentioned diseases optionally in combination with radiotherapy and/or surgery.

In yet another aspect the present invention provides the compound of formula I, its tautomeric form, its stereoisomer, its pharmaceutically acceptable salt, its polymorph, its solvate, its combination with suitable medicament, or its pharmaceutical composition for treating various cancers mentioned above which harbor hyperactive or aberrantly activated signaling pathways involving RAS and or SOS1 proteins.

In another aspect the present invention provides use of the compound of formula I, its tautomeric form, its stereoisomer, its pharmaceutically acceptable salt, its polymorph, or its solvate in combination with other agents such as radiation, chemotherapeutic agents and/or targeted agents in multiple cancers and their subtypes as mentioned above. The agents that can be used for combination therapy include targeted agents such as inhibitors of RTKs, cyclin-dependent kinase (CDK) inhibitors, Ser-Thr kinase inhibitors, non-receptor tyrosine kinase inhibitors, inhibitors of epigenetic mechanism such as histone methyltransferases (HMTs), DNA methyltransferases (DNMTs), protein arginine methyltransferases (PRMTs), RAS inhibitors, KRAS inhibitors, MEK inhibitors, ERK1/2 inhibitors, Focal Adhesion Kinase (FAK) inhibitors, PI3K inhibitors, AKT inhibitors, and mTOR inhibitors.

DETAIL DESCRIPTION OF THE INVENTION

The present invention is related to a compound of the general formula (I), its tautomeric form, its stereoisomer, its pharmaceutically acceptable salt, its polymorph, its solvate, its combination with suitable one or more other medicaments, its pharmaceutical composition, method of making of the compound, its use as SOS1 inhibitor, and its therapeutic utility in treating, or ameliorating various pathological conditions. The compound of formula (I) is as shown below:

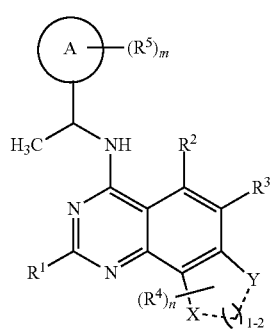

(I)

Wherein,
Ring A is selected from aryl, heteroaryl, and heterocyclyl;
'----' is either a single bond or double bond;
X and Y are independently selected from C, O, and $NR^c$, provided that both X and Y cannot be O at the same time;
$R^1$ is selected from hydrogen and substituted or unsubstituted alkyl;
$R^2$ is selected from hydrogen, halogen, alkyl, and cycloalkyl;
$R^3$ is selected from $-OR^6$, $-NR^aR^b$, substituted or unsubstituted alkyl, substituted or unsubstituted cycloalkyl, alkyl substituted with substituted or unsubstituted heterocyclyl, substituted or unsubstituted heteroaryl, and substituted or unsubstituted heterocyclyl;
$R^4$ is selected from oxo and substituted or unsubstituted alkyl;
$R^5$ is selected from halo, cyano, $-NR^cR^d$, substituted or unsubstituted alkyl, $-C(=O)$ substituted or unsubstituted alkyl, substituted or unsubstituted cycloalkyl, substituted or unsubstituted aryl, and substituted or unsubstituted heteroaryl; optionally two $R^5$ groups attached to the adjacent carbon atoms forming a substituted or unsubstituted heterocycle;
$R^6$ is selected from substituted or unsubstituted alkyl, substituted or unsubstituted heterocyclyl, and alkyl substituted with substituted heterocyclyl;
$R^a$ and $R^b$ are independently selected from hydrogen, substituted or unsubstituted alkyl, and substituted or unsubstituted heterocyclyl;
$R^c$ and $R^d$ are independently selected from hydrogen and alkyl;
m is an integer selected from 0, 1, 2, and 3;
n is an integer selected from 0, 1, 2, 3, and 4;
when an alkyl group is substituted, it is substituted with 1 to 5 substituents independently selected from oxo (=O), halogen, cyano, cycloalkyl, aryl, heteroaryl, heterocyclyl, $-OR^7$, $-C(=O)OH$, $-C(=O)O(alkyl)$, $-NR^8R^{8a}$, $-NR^8C(=O)R^9$, and $-C(=O)NR^8R^{8a}$;

when an cycloalkyl group is substituted, it is substituted with 1 to 4 substituents independently selected from oxo (=O), halogen, alkyl, hydroxyalkyl, cyano, aryl, heteroaryl, heterocyclyl, $-OR^7$, $-C(=O)OH$, $-C(=O)O(alkyl)$, $-NR^8R^{8a}$, $-NR^8C(=O)R^9$, and $-C(=O)NR^8R^{8a}$;

when the aryl group is substituted, it is substituted with 1 to 4 substituents independently selected from halogen, nitro, cyano, alkyl, haloalkyl, perhaloalkyl, cycloalkyl, heterocyclyl, heteroaryl, $-OR^7$, $-NR^8R^{8a}$, $-NR^8C(=O)R^9$, $-C(=O)R^9$, $-C(=O)NR^8R^{8a}$, $-SO_2$-alkyl, $-C(=O)OH$, and $-C(=O)O$-alkyl;

when the heteroaryl group is substituted, it is substituted with 1 to 4 substituents independently selected from halogen, nitro, cyano, alkyl, haloalkyl, perhaloalkyl, cycloalkyl, heterocyclyl, aryl, heteroaryl, $-OR^7$, $-NR^8R^{8a}$, $-NR^7C(=O)R^9$, $-C(=O)R^9$, $-C(=O)NR^8R^{8a}$, $-SO_2$-alkyl, $-C(=O)OH$, and $-C(=O)O$-alkyl;

when the heterocycle group is substituted, it is substituted either on a ring carbon atom or on a ring hetero atom, and when it is substituted on a ring carbon atom, it is substituted with 1 to 4 substituents independently selected from oxo (=O), halogen, cyano, alkyl, haloalkyl, alkoxyalkyl, hydroxyalkyl, cycloalkyl, perhaloalkyl, $-OR^7$, $-C(=O)NR^8R^{8a}$, $-C(=O)OH$, $-C(=O)O$-alkyl, $-N(H)C(=O)(alkyl)$, $-N(H)R^8$, and $-N(alkyl)_2$; and when the heterocycle group is substituted on a ring nitrogen, it is substituted with substituents independently selected from alkyl, haloalkyl, cycloalkyl, aryl, heteroaryl, $-SO_2(alkyl)$, $-C(=O)R^9$, and $-C(=O)O(alkyl)$; when the heterocycle group is substituted on a ring sulfur, it is substituted with 1 or 2 oxo (=O) group(s);

$R^7$ is selected from hydrogen, alkyl, perhaloalkyl, and cycloalkyl;
$R^8$ and $R^{8a}$ are each independently selected from hydrogen, alkyl, and cycloalkyl; and
$R^9$ is selected from alkyl and cycloalkyl.

In accordance with an embodiment of the invention, A is selected from aryl and heteroaryl.

In certain embodiments, A is selected from phenyl and pyridyl.

In any of the above embodiments, $R^1$ is substituted or unsubstituted alkyl.

In certain embodiments, $R^1$ is methyl.

In any of the above embodiments, $R^2$ is hydrogen.

In any of the above embodiments, $R^3$ is selected from the group consisting of $-OR^6$, $-NR^aR^b$, substituted or unsubstituted cycloalkyl, alkyl substituted with substituted or unsubstituted heterocyclyl, substituted or unsubstituted heteroaryl, and substituted or unsubstituted heterocyclyl.

In certain embodiments, $R^3$ is selected from the group consisting of $-OCH_3$,

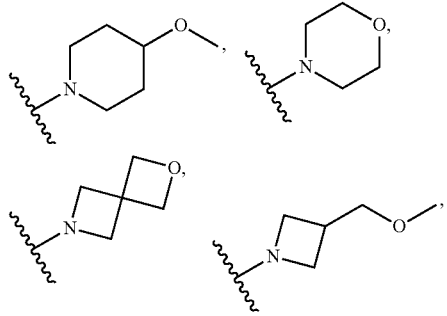

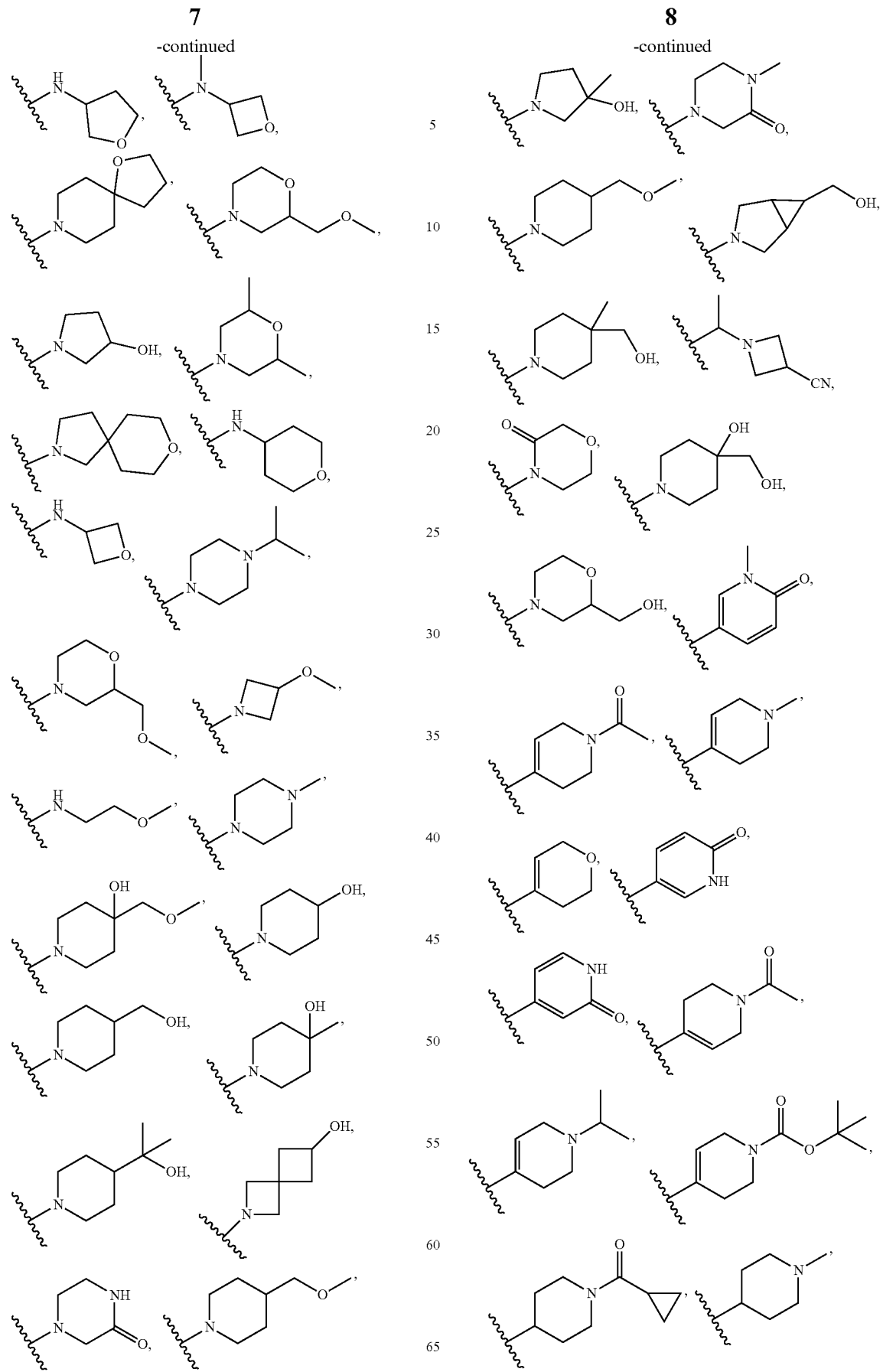

-continued

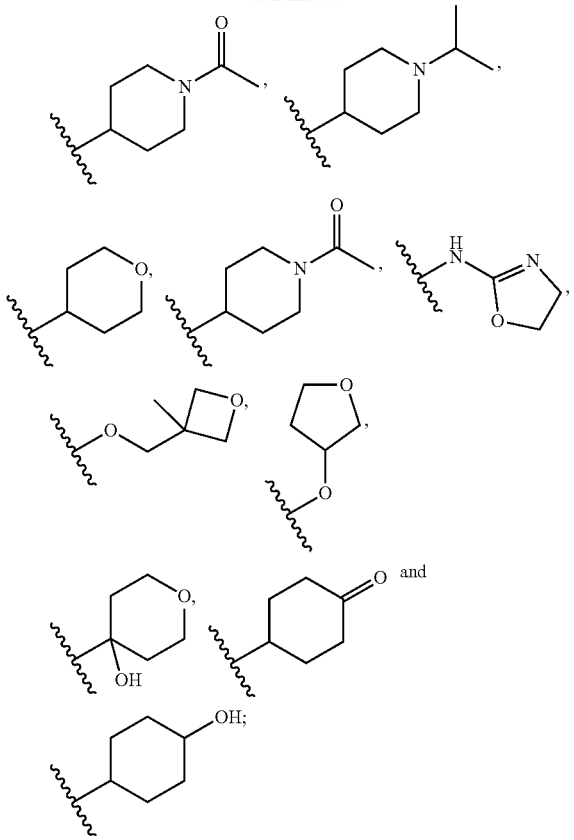

In any of the above embodiments, $R^4$ is selected from oxo and methyl.

In any of the above embodiments, $R^5$ is selected from the group consisting of halogen, cyano, —$NR^cR^d$, substituted or unsubstituted alkyl, and —C(=O) substituted or unsubstituted alkyl; two $R^5$ groups adjacent to the carbon atom to which they are attached form substituted or unsubstituted heterocyclyl.

In certain embodiments, $R^5$ is selected from the group consisting of fluorine, —$CH_3$, —$CF_3$, —$NH_2$, —$CHF_2$, —CN, —$COCF_3$,

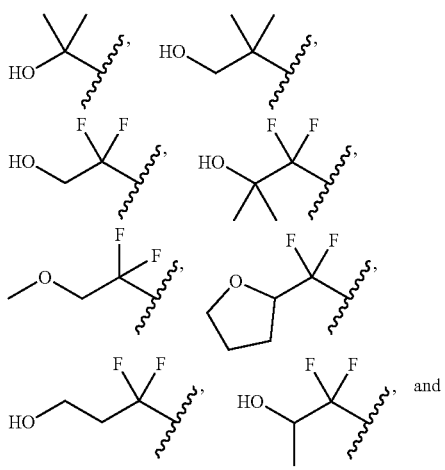

-continued

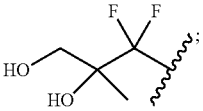

two $R^5$ groups adjacent to the carbon atom to which they are attached form

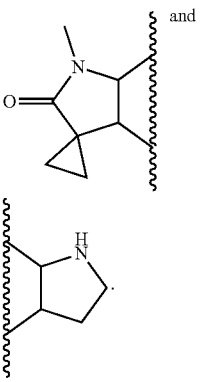

In any of the above embodiments, $R^6$ is selected from the group consisting of methyl, tetrahydrofuran-3-yl, and

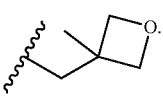

In any of the above embodiments, $R^a$ and $R^b$ are independently selected from the group consisting of hydrogen, methyl,

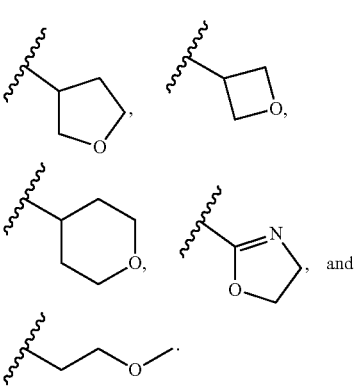

In any of the above embodiments, $R^c$ and $R^d$ are independently selected from hydrogen and methyl.

Whenever a range of the number of atoms in a structure is indicated (e.g., a $C_1$ to $C_{20}$ alkyl etc.), it is specifically contemplated that any sub-range or individual number of carbon atoms falling within the indicated range also can be used. Thus, for instance, the recitation of a range of 1-6 carbon atoms (e.g., $C_1$ to $C_6$), 2-6 carbon atoms (e.g., $C_2$ to $C_6$), 3-6 carbon atoms (e.g., $C_3$ to $C_6$), as used with respect to any chemical group (e.g., alkyl etc.) referenced herein encompasses and specifically describes 1, 2, 3, 4, 5, and/or 6 carbon atoms, as appropriate, as well as any sub-range thereof (e.g., 1-2 carbon atoms, 1-3 carbon atoms, 1-4 carbon atoms, 1-5 carbon atoms, 1-6 carbon atoms, 2-3 carbon atoms, 2-4 carbon atoms, 2-5 carbon atoms, 2-6 carbon atoms, 3-4 carbon atoms, 3-5 carbon atoms, 3-6 carbon atoms, 4-5 carbon atoms, 4-6 carbon atoms, as appropriate).

General terms used in formula can be defined as follows; however, the meaning stated should not be interpreted as limiting the scope of the term per se.

The term 'alkyl', as used herein, means a straight chain or branched hydrocarbon containing from 1 to 20 carbon atoms. Preferably, the alkyl chain may contain 1 to 10 carbon atoms. More preferably, alkyl chain may contain up to 6 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, and n-hexyl.

The term 'haloalkyl', as used herein means an alkyl group as defined hereinabove wherein at least one of the hydrogen atoms of the said alkyl group is substituted with halogen. The haloalkyl group is exemplified by chloromethyl, 1-chloroethyl, and the like.

The term 'perhaloalkyl', as used herein, means an alkyl group as defined hereinabove wherein all the hydrogen atoms of the said alkyl group are substituted with halogen. The perhaloalkyl group is exemplified by trifluoromethyl, pentafluoroethyl, and the like.

The term 'cycloalkyl' as used herein, means a monocyclic, bicyclic, or tricyclic non-aromatic ring system containing from 3 to 14 carbon atoms, preferably monocyclic cycloalkyl ring containing 3 to 6 carbon atoms. Examples of monocyclic ring systems include cyclopropyl, cyclobutyl, cyclopentyl, cyclohexyl, cycloheptyl, and cyclooctyl. Bicyclic ring systems include monocyclic ring system fused across a bond with another cyclic system which may be an alicyclic ring or an aromatic ring. Bicyclic rings also include spirocyclic systems wherein the second ring gets annulated on a single carbon atom. Bicyclic ring systems are also exemplified by a bridged monocyclic ring system in which two non-adjacent carbon atoms of the monocyclic ring are linked by an alkylene bridge. Representative examples of bicyclic ring systems include, but are not limited to, bicyclo[3.1.1]heptane, bicyclo[2.2.1]heptane, bicyclo[2.2.2]octane, bicyclo[3.2.2]nonane, bicyclo[3.3.1]nonane, and bicyclo[4.2.1]nonane, bicyclo[3.3.2]decane, bicyclo[3.1.0]hexane, bicyclo[4.1.0]heptane, bicyclo[3.2.0]heptanes, octahydro-1H-indene, spiro[2.5]octane, spiro[4.5]decane, spiro[bicyclo[4.1.0]heptane-2,1'-cyclopentane], hexahydro-2'H-spiro[cyclopropane-1,1'-pentalene]. Tricyclic ring systems are the systems wherein the bicyclic systems as described above are further annulated with third ring, which may be an alicyclic ring or aromatic ring. Tricyclic ring systems are also exemplified by a bicyclic ring system in which two non-adjacent carbon atoms of the bicyclic ring are linked by a bond or an alkylene bridge. Representative examples of tricyclic-ring systems include, but are not limited to, tricyclo[3.3.1.0$^{3,7}$]nonane, and tricyclo[3.3.1.1$^{3,7}$]decane (adamantane).

The term 'cycloalkenyl' as used herein, means a cycloalkyl group as defined above containing at least one double bond.

The term 'aryl', as used herein, refers to a monovalent monocyclic, bicyclic or tricyclic aromatic hydrocarbon ring system. Examples of aryl groups include phenyl, naphthyl, anthracenyl, fluorenyl, indenyl, azulenyl, and the like. Aryl group also include partially saturated bicyclic and tricyclic aromatic hydrocarbons, e.g. tetrahydro-naphthalene. Aryl group also include bicyclic systems like 2,3-dihydro-indene-5-yl, and 2,3-dihydro-1-indenone-5-yl.

The term 'heteroaryl', as used herein, refers to a 5-14 membered monocyclic, bicyclic, or tricyclic ring system having 1-4 ring heteroatoms selected from O, N, or S, and the remainder ring atoms being carbon (with appropriate hydrogen atoms unless otherwise indicated), wherein at least one ring in the ring system is aromatic. The term 'heteroaryl' as used herein, also include partially saturated bicyclic and tricyclic aromatic ring system, e.g. 2,3-dihydro-isobenzofuran-5-yl, 2,3-dihydro-1-isobenzofuranone-5-yl, 2,3-dihydro-1H-indol-4-yl, 2,3-dihydro-1H-indol-6-yl, and 2,3-dihydro-1-isoindolinone-5-yl. Heteroaryl groups may be optionally substituted with one or more substituents. In one embodiment, 0, 1, 2, 3, or 4 atoms of each ring of a heteroaryl group may be substituted by a substituent. Examples of heteroaryl groups include, but not limited to, 1H-1,2,3-triazolyl, 2H-1,2,3-triazolyl, pyridyl, 1-oxopyridyl, furanyl, thienyl, pyrrolyl, oxazolyl, oxadiazolyl, imidazolyl, thiazolyl, isoxazolyl, quinolinyl, pyrazolyl, isothiazolyl, pyridazinyl, pyrimidinyl, pyrazinyl, triazinyl, triazolyl, thiadiazolyl, isoquinolinyl, benzoxazolyl, benzofuranyl, indolizinyl, imidazopyridyl, imidazolyl, tetrazolyl, benzimidazolyl, benzothiazolyl, benzothiadiazolyl, benzoxadiazolyl, indolyl, azaindolyl, imidazopyridyl, quinazolinyl, purinyl, pyrrolo[2,3]pyrimidinyl, pyrazolo[3,4]pyrimidinyl, and benzo(b)thienyl, 2,3-thiadiazolyl, 1H-pyrazolo[5,1-c]-1,2,4-triazolyl, pyrrolo[3,4-d]-1,2,3-triazolyl, cyclopentatriazolyl, 3H-pyrrolo[3,4-c]isoxazolyl, 2,3-dihydro-benzo[1,4]dioxin-6-yl, 2,3-dihydro-benzo[1,4]dioxin-5-yl, 2,3-dihydro-benzofuran-5-yl, 2,3-dihydro-benzoxin-5-yl, 2,3-dihydro-benzofuran-5-yl, 2,3-dihydro-benzofuran-4-yl, 2,3-dihydro-benzofuran-6-yl, 2,3-dihydrobenzofuran-6-yl, 2,3-dihydro-isobenzofuran-5-yl, 2,3-dihydro-1-isobenzofuranone-5-yl, 2,3-dihydro-1H-indol-5-yl, 2,3-dihydro-1H-indol-4-yl, 2,3-dihydro-1H-indol-6-yl, 2,3-dihydro-1H-indol-7-yl, 2,3-dihydro-1-isoindolinone-5-yl, benzo[1,3]dioxol-4-yl, benzo[1,3]dioxol-5-yl, 1,2,3,4-tetrahydroquinolinyl, 1,2,3,4-tetrahydroisoquinolinyl, 2,3-dihydrobenzothien-4-yl, 2-oxoindolin-5-yl and the like.

The term 'heterocycle' or 'heterocyclic' or 'heterocyclyl' as used herein, means a 'cycloalkyl' or 'cycloalkenyl' group wherein one or more of the carbon atoms are replaced by heteroatoms/groups selected from N, S, SO$_2$, and O. The heterocycle may be connected to the parent molecular moiety through any carbon atom or any nitrogen atom contained within the heterocycle. Representative examples of monocyclic heterocycle include, but are not limited to, azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, piperazinyl, piperidinyl, pyranyl, pyrazolinyl, pyrazolidinyl, pyrrolinyl, pyrrolidinyl, tetrahydrofuranyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, and trithianyl. Representative examples of bicyclic heterocycle include, but are not limited to, 1,2,3,4-tetrahydroisoquinolin-2-yl, 1,2,3,4-tetrahydroquinolin-1-yl, 1,3-benzodioxolyl, 1,3-benzodithiolyl, 2,3-dihydro-1,4-benzodioxinyl, 2,3-dihydro-1-benzofuranyl, 2,3-dihydro-1-benzothienyl, 2,3-dihydro-1H-indolyl, and 1,2,3,4-tetrahydroquinolinyl. The term heterocycle also includes bridged and spiro heterocyclic systems such as azabicyclo[3.2.1]octane, azabicyclo[3.3.1]nonane, 8-oxa-3-azabicyclo[3.2.1]octan-3-yl, 3-oxa-8-azabicyclo[3.2.1]octan-8-yl, 6-oxa-3-azabicyclo[3.1.1]heptan-3-yl, 8-azabicyclo[3.2.1]octan-8-yl, 3-azabicyclo

[3.2.1]octan-3-yl, 3-azabicyclo[3.1.0]hexan-3-yl, 6-azaspiro [2.5]octan-6-yl, 5-azaspiro[2.5]octan-5-yl, 4-azaspiro[2.4] heptan-4-yl, 2-oxa-6-azaspiro[3.3]heptan-6-yl, tetrahydrofuran-3-yl, oxetan-3-yl, 1-oxa-8-azaspiro[4.5]decan-8-yl, 8-oxa-2-azaspiro[4.5]decan-2-yl, tetrahydro-2H-pyran-4-yl, 2-azaspiro[3.3]heptan-6-ol-2-yl, morpholin-3-one-4-yl, 1-methylpyridin-2(1H)-one-5-yl, 1-methyl-1,2,3,6-tetrahydropyridin-4-yl, 3,6-dihydro-2H-pyran-4-yl, pyridin-2(1H)-one-5-yl, pyridin-2(1H)-one-4-yl, and the like.

The 'halogen' means fluorine, chlorine, bromine, or iodine.

The term 'oxo' means a divalent oxygen (=O) attached to the parent group. For example, oxo attached to carbon forms a carbonyl, oxo substituted on cyclohexane forms a cyclohexanone, and the like.

The term 'annulated' means the ring system under consideration is either annulated with another ring at a carbon atom of the cyclic system or across a bond of the cyclic system as in the case of fused or spiro ring systems.

The term 'bridged' means the ring system under consideration contain an alkylene bridge having 1 to 4 methylene units joining two non-adjacent ring atoms.

A compound, its tautomeric form, its stereoisomer, its pharmaceutically acceptable salt, its polymorph, its solvate, its combination with suitable medicament, its pharmaceutical composition thereof as described hereinabove wherein the compound of general formula (I), is selected from the group consisting of:

(R)—N-(1-(3-amino-5-(trifluoromethyl)phenyl)ethyl)-6-(4-methoxypiperidin-1-yl)-2-methyl-8,9-dihydro-7H-cyclopenta[h]quinazolin-4-amine (Compound-1);

(R)—N-(1-(3-amino-5-(trifluoromethyl)phenyl)ethyl)-2-methyl-6-morpholino-8,9-dihydro-7H-cyclopenta[h]quinazolin-4-amine (Compound-2);

2-(2-fluoro-3-(1-((2-methyl-6-(2-oxa-6-azaspiro[3.3]heptan-6-yl)-8,9-dihydro-7H-cyclopenta[h]quinazolin-4-yl) amino)ethyl)phenyl)propan-2-ol (Compound-3);

2-(2-fluoro-3-(1-((2-methyl-6-morpholino-8,9-dihydro-7H-cyclopenta[h]quinazolin-4-yl)amino)ethyl)phenyl)propan-2-ol (Compound-4);

N-(1-(5-amino-2-fluoro-3-methylphenyl)ethyl)-2-methyl-6-morpholino-8,9-dihydro-7H-cyclopenta[h]quinazolin-4-amine (Compound-5);

2-methyl-2-(3-(1-((2-methyl-6-(2-oxa-6-azaspiro[3.3]heptan-6-yl)-8,9-dihydro-7H-cyclopenta[h]quinazolin-4-yl) amino)ethyl)phenyl)propan-1-ol (Compound-6);

1,1-difluoro-2-methyl-1-(3-(1-((2-methyl-6-morpholino-8,9-dihydro-7H-cyclopenta[h]quinazolin-4-yl)amino)ethyl) phenyl) propan-2-ol-(Compound-7);

N-(1-(2-amino-6-(trifluoromethyl)pyridin-4-yl)ethyl)-2-methyl-6-(2-oxa-6-azaspiro[3.3]heptan-6-yl)-8,9-dihydro-7H-cyclopenta[h]quinazolin-4-amine (Compound-8);

(R)-2,2-difluoro-2-(2-fluoro-3-(1-((6-(3-(methoxymethyl) azetidin-1-yl)-2-methyl-8,9-dihydro-7H-cyclopenta[h] quinazolin-4-yl)amino)ethyl)phenyl)ethan-1-ol (Compound-9);

(R)-1,1-difluoro-1-(2-fluoro-3-(1-((2-methyl-6-(2-oxa-6-azaspiro[3.3]heptan-6-yl)-8,9-dihydro-7H-cyclopenta[h] quinazolin-4-yl)amino)ethyl)phenyl)-2-methylpropan-2-ol (Compound-10);

2,2-difluoro-2-(2-fluoro-3-((R)-1-((2-methyl-6-(((S)-tetrahydrofuran-3-yl)amino)-8,9-dihydro-7H-cyclopenta[h] quinazolin-4-yl)amino)ethyl)phenyl)ethan-1-ol (Compound-11);

(R)—N$^4$-(1-(3-amino-5-(trifluoromethyl)phenyl)ethyl)-N$^6$, 2-dimethyl-N$^6$-(oxetan-3-yl)-8,9-dihydro-7H-cyclopenta [h]quinazoline-4,6-diamine (Compound-12);

(R)—N-(1-(3-amino-5-(trifluoromethyl)phenyl)ethyl)-2-methyl-6-(1-oxa-8-azaspiro[4.5]decan-8-yl)-8,9-dihydro-7H-cyclopenta[h]quinazolin-4-amine (Compound-13);

N-(1-(2-fluoro-3-(trifluoromethyl)phenyl)ethyl)-6-((R)-2-(methoxymethyl)morpholino)-2-methyl-8,9-dihydro-7H-cyclopenta[h]quinazolin-4-amine (Compound-14);

(S)-1-(4-((1-(2-fluoro-3-(trifluoromethyl)phenyl)ethyl) amino)-2-methyl-8,9-dihydro-7H-cyclopenta[h]quinazolin-6-yl)pyrrolidin-3-ol (Compound-15);

(R)-1-(4-((1-(2-fluoro-3-(trifluoromethyl)phenyl)ethyl) amino)-2-methyl-8,9-dihydro-7H-cyclopenta[h]quinazolin-6-yl)pyrrolidin-3-ol (Compound-16);

N—((R)-1-(3-amino-5-(trifluoromethyl)phenyl)ethyl)-6-((2S,6R)-2,6-dimethylmorpholino)-2-methyl-8,9-dihydro-7H-cyclopenta[h]quinazolin-4-amine (Compound-17);

(R)—N-(1-(3-amino-5-(trifluoromethyl)phenyl)ethyl)-2-methyl-6-(8-oxa-2-azaspiro[4.5]decan-2-yl)-8,9-dihydro-7H-cyclopenta[h]quinazolin-4-amine (Compound-18);

N$^4$—((R)-1-(3-amino-5-(trifluoromethyl)phenyl)ethyl)-2-methyl-N$^6$—((S)-tetrahydrofuran-3-yl)-8,9-dihydro-7H-cyclopenta[h]quinazoline-4,6-diamine (Compound-19);

N-(1-(3-amino-5-methylphenyl)ethyl)-2-methyl-6-(2-oxa-6-azaspiro[3.3]heptan-6-yl)-8,9-dihydro-7H-cyclopenta [h]quinazolin-4-amine (Compound-20);

(R)—N$^4$-(1-(3-amino-5-(trifluoromethyl)phenyl)ethyl)-2-methyl-N$^6$-(tetrahydro-2H-pyran-4-yl)-8,9-dihydro-7H-cyclopenta[h]quinazoline-4,6-diamine (Compound-21);

(S)-1-(4-(((R)-1-(3-(1,1-difluoro-2-hydroxyethyl)-2-fluorophenyl)ethyl)amino)-2-methyl-8,9-dihydro-7H-cyclopenta[h]quinazolin-6-yl)pyrrolidin-3-ol (Compound-22);

(R)-2,2-difluoro-2-(2-fluoro-3-(1-((2-methyl-6-(2-oxa-6-azaspiro[3.3]heptan-6-yl)-8,9-dihydro-7H-cyclopenta[h] quinazolin-4-yl)amino)ethyl)phenyl)ethan-1-ol (Compound-23);

(R)—N-(1-(3-(1,1-difluoro-2-methoxyethyl)-2-fluorophenyl)ethyl)-2-methyl-6-(2-oxa-6-azaspiro[3.3]heptan-6-yl)-8,9-dihydro-7H-cyclopenta[h]quinazolin-4-amine (Compound-24);

(S)-1-(4-(((R)-1-(3-(1,1-difluoro-2-methoxyethyl)-2-fluorophenyl)ethyl)amino)-2-methyl-8,9-dihydro-7H-cyclopenta[h]quinazolin-6-yl)pyrrolidin-3-ol (Compound-25);

(R)—N-(1-(3-amino-5-(trifluoromethyl)phenyl)ethyl)-6-(3-(methoxymethyl)azetidin-1-yl)-2-methyl-8,9-dihydro-7H-cyclopenta[h]quinazolin-4-amine (Compound-26);

N—((R)-1-(3-amino-5-(trifluoromethyl)phenyl)ethyl)-6-((R)-2-(methoxymethyl)morpholino)-2-methyl-8,9-dihydro-7H-cyclopenta[h]quinazolin-4-amine (Compound-27);

(R)—N$^4$-(1-(3-amino-5-(trifluoromethyl)phenyl)ethyl)-2-methyl-N$^6$-(oxetan-3-yl)-8,9-dihydro-7H-cyclopenta[h] quinazoline-4,6-diamine (Compound-28);

(R)-2,2-difluoro-2-(2-fluoro-3-(1-((2-methyl-6-(oxetan-3-ylamino)-8,9-dihydro-7H-cyclopenta[h]quinazolin-4-yl) amino)ethyl)phenyl)ethan-1-ol (Compound-29);

(R)-1-(4-(((R)-1-(3-(1,1-difluoro-2-hydroxyethyl)-2-fluorophenyl)ethyl)amino)-2-methyl-8,9-dihydro-7H-cyclopenta[h]quinazolin-6-yl)pyrrolidin-3-ol (Compound-30);

(R)—N-(1-(3-amino-5-(trifluoromethyl)phenyl)ethyl)-6-(4-isopropylpiperazin-1-yl)-2-methyl-8,9-dihydro-7H-cyclopenta[h]quinazolin-4-amine (Compound-31);

N—((R)-1-(3-amino-5-(trifluoromethyl)phenyl)ethyl)-6-((S)-2-(methoxymethyl)morpholino)-2-methyl-8,9-dihydro-7H-cyclopenta[h]quinazolin-4-amine (Compound-32);

(R)—N-(1-(3-amino-5-(trifluoromethyl)phenyl)ethyl)-2-methyl-6-(2-oxa-6-azaspiro[3.3]heptan-6-yl)-8,9-dihydro-7H-cyclopenta[h]quinazolin-4-amine (Compound-33);

N-(1-(2-fluoro-3-(trifluoromethyl)phenyl)ethyl)-2-methyl-6-(2-oxa-6-azaspiro[3.3]heptan-6-yl)-8,9-dihydro-7H-cyclopenta[h]quinazolin-4-amine (Compound-34);

2,2-difluoro-2-(2-fluoro-3-((R)-1-((6-((R)-2-(methoxymethyl)morpholino)-2-methyl-8,9-dihydro-7H-cyclopenta[h]quinazolin-4-yl)amino)ethyl)phenyl)ethan-1-ol (Compound-35);

(R)—N-(1-(3-amino-5-(trifluoromethyl)phenyl)ethyl)-6-(3-methoxyazetidin-1-yl)-2-methyl-8,9-dihydro-7H-cyclopenta[h]quinazolin-4-amine (Compound-36);

1'-methyl-4'-(1-((2-methyl-6-(2-oxa-6-azaspiro[3.3]heptan-6-yl)-8,9-dihydro-7H-cyclopenta[h]quinazolin-4-yl)amino)ethyl)spiro[cyclopropane-1,3'-indolin]-2'-one (Compound-37);

N-(1-(3-(difluoro(tetrahydrofuran-2-yl)methyl)phenyl)ethyl)-2-methyl-6-(2-oxa-6-azaspiro[3.3]heptan-6-yl)-8,9-dihydro-7H-cyclopenta[h]quinazolin-4-amine (Compound-38);

N—((S/R)1-(3-(difluoro((S/R)-tetrahydrofuran-2-yl)methyl)phenyl)ethyl)-2-methyl-6-(2-oxa-6-azaspiro[3.3]heptan-6-yl)-8,9-dihydro-7H-cyclopenta[h]quinazolin-4-amine (Compound-39);

2,2-difluoro-2-(2-fluoro-5-(1-((2-methyl-6-(2-oxa-6-azaspiro[3.3]heptan-6-yl)-8,9-dihydro-7H-cyclopenta[h]quinazolin-4-yl)amino)ethyl)phenyl)ethan-1-ol (Compound-40);

2,2-difluoro-2-(2-methyl-3-(1-((2-methyl-6-(2-oxa-6-azaspiro[3.3]heptan-6-yl)-8,9-dihydro-7H-cyclopenta[h]quinazolin-4-yl)amino)ethyl)phenyl)ethan-1-ol (Compound-41);

2,2-difluoro-2-(3-(1-((6-((R)-2-(methoxymethyl)morpholino)-2-methyl-8,9-dihydro-7H-cyclopenta[h]quinazolin-4-yl)amino)ethyl)-2-methylphenyl)ethan-1-ol (Compound-42);

(R)—N$^4$-(1-(3-amino-5-(trifluoromethyl)phenyl)ethyl)-N$^6$-(2-methoxyethyl)-2-methyl-8,9-dihydro-7H-cyclopenta[h]quinazoline-4,6-diamine (Compound-43);

(R)-1-(4-(((R)-1-(3-amino-5-(trifluoromethyl)phenyl)ethyl)amino)-2-methyl-8,9-dihydro-7H-cyclopenta[h]quinazolin-6-yl)pyrrolidin-3-ol (Compound-44);

2,2-difluoro-2-(2-methyl-3-(1-((2-methyl-6-morpholino-8,9-dihydro-7H-cyclopenta[h]quinazolin-4-yl)amino)ethyl)phenyl)ethan-1-ol (Compound-45);

(R)—N-(1-(3-amino-5-(trifluoromethyl)phenyl)ethyl)-2-methyl-6-(4-methylpiperazin-1-yl)-8,9-dihydro-7H-cyclopenta[h]quinazolin-4-amine (Compound-46);

(R)-1-(4-((1-(3-amino-5-(trifluoromethyl)phenyl)ethyl)amino)-2-methyl-8,9-dihydro-7H-cyclopenta[h]quinazolin-6-yl)-4-(methoxymethyl)piperidin-4-ol (Compound-47);

(R)-1-(4-((1-(3-amino-5-(trifluoromethyl)phenyl)ethyl)amino)-2-methyl-8,9-dihydro-7H-cyclopenta[h]quinazolin-6-yl)piperidin-4-ol (Compound-48);

(R)-(1-(4-((1-(3-amino-5-(trifluoromethyl)phenyl)ethyl)amino)-2-methyl-8,9-dihydro-7H-cyclopenta[h]quinazolin-6-yl)piperidin-4-yl)methanol (Compound-49);

(R)-1-(4-((1-(3-amino-5-(trifluoromethyl)phenyl)ethyl)amino)-2-methyl-8,9-dihydro-7H-cyclopenta[h]quinazolin-6-yl)-4-methylpiperidin-4-ol (Compound-50);

(R)-2-(1-(4-((1-(3-amino-5-(trifluoromethyl)phenyl)ethyl)amino)-2-methyl-8,9-dihydro-7H-cyclopenta[h]quinazolin-6-yl)piperidin-4-yl)propan-2-ol (Compound-51);

(R)-2-(4-((1-(3-amino-5-(trifluoromethyl)phenyl)ethyl)amino)-2-methyl-8,9-dihydro-7H-cyclopenta[h]quinazolin-6-yl)-2-azaspiro[3.3]heptan-6-ol (Compound-52);

(R)-4-(4-((1-(3-amino-5-(trifluoromethyl)phenyl)ethyl)amino)-2-methyl-8,9-dihydro-7H-cyclopenta[h]quinazolin-6-yl)piperazin-2-one (Compound-53);

(R)—N-(1-(3-amino-5-(trifluoromethyl)phenyl)ethyl)-6-(4-(methoxymethyl)piperidin-1-yl)-2-methyl-8,9-dihydro-7H-cyclopenta[h]quinazolin-4-amine (Compound-54);

1-(4-(((R)-1-(3-amino-5-(trifluoromethyl)phenyl)ethyl)amino)-2-methyl-8,9-dihydro-7H-cyclopenta[h]quinazolin-6-yl)-3-methylpyrrolidin-3-ol (Compound-55);

(R)-4-(4-((1-(3-amino-5-(trifluoromethyl)phenyl)ethyl)amino)-2-methyl-8,9-dihydro-7H-cyclopenta[h]quinazolin-6-yl)-1-methylpiperazin-2-one (Compound-56);

(R)-1,1-difluoro-1-(2-fluoro-3-(1-((6-(4-(methoxymethyl)piperidin-1-yl)-2-methyl-8,9-dihydro-7H-cyclopenta[h]quinazolin-4-yl)amino)ethyl)phenyl)-2-methylpropan-2-ol (Compound-57);

1,1-difluoro-1-(2-fluoro-3-((R)-1-((6-((1R,5S,6R)-6-(hydroxymethyl)-3-azabicyclo[3.1.0]hexan-3-yl)-2-methyl-8,9-dihydro-7H-cyclopenta[h]quinazolin-4-yl)amino)ethyl)phenyl)-2-methylpropan-2-ol (Compound-58);

(R)-1,1-difluoro-1-(2-fluoro-3-(1-((2-methyl-6-morpholino-8,9-dihydro-7H-cyclopenta[h]quinazolin-4-yl)amino)ethyl)phenyl)-2-methylpropan-2-ol (Compound-59);

(R)-1,1-difluoro-1-(2-fluoro-3-(1-((6-(4-(hydroxymethyl)-4-methylpiperidin-1-yl)-2-methyl-8,9-dihydro-7H-cyclopenta[h]quinazolin-4-yl)amino)ethyl)phenyl)-2-methylpropan-2-ol (Compound-60);

1-(4-(((R)-1-(3-(1,1-difluoro-2-hydroxy-2-methylpropyl)-2-fluorophenyl)ethyl)amino)-2-methyl-8,9-dihydro-7H-cyclopenta[h]quinazoline-6-yl)-3-methylpyrrolidin-3-ol (Compound-61);

1,1-difluoro-1-(2-fluoro-3-((R)-1-((6-((R)-2-(methoxymethyl)morpholino)-2-methyl-8,9-dihydro-7H-cyclopenta[h]quinazolin-4-yl)amino)ethyl)phenyl)-2-methylpropan-2-ol (Compound-62);

(R)-1-(4-((1-(3-(1,1-difluoro-2-hydroxy-2-methylpropyl)-2-fluorophenyl)ethyl)amino)-2-methyl-8,9-dihydro-7H-cyclopenta[h]quinazolin-6-yl)-4-(methoxymethyl)piperidin-4-ol (Compound-63);

(R)-1,1-difluoro-1-(2-fluoro-3-(1-((6-(4-(hydroxymethyl)piperidin-1-yl)-2-methyl-8,9-dihydro-7H-cyclopenta[h]quinazolin-4-yl)amino)ethyl)phenyl)-2-methylpropan-2-ol (Compound-64);

(R)-1-(4-((1-(3-(1,1-difluoro-2-hydroxy-2-methylpropyl)-2-fluorophenyl)ethyl)amino)-2-methyl-8,9-dihydro-7H-cyclopenta[h]quinazolin-6-yl)piperidin-4-ol (Compound-65);

(R)-4-(4-((1-(3-(1,1-difluoro-2-hydroxy-2-methylpropyl)-2-fluorophenyl)ethyl)amino)-2-methyl-8,9-dihydro-7H-cyclopenta[h]quinazolin-6-yl)piperazin-2-one (Compound-66);

1-(4-(((R)-1-(3-(1,1-difluoro-2-hydroxyethyl)-2-fluorophenyl)ethyl)amino)-2-methyl-8,9-dihydro-7H-cyclopenta[h]quinazoline-6-yl)-3-methylpyrrolidin-3-ol (Compound-67);

(R)-1-(4-((1-(3-(1,1-difluoro-2-hydroxyethyl)-2-fluorophenyl)ethyl)amino)-2-methyl-8,9-dihydro-7H-cyclopenta[h]quinazolin-6-yl)-4-(methoxymethyl)piperidin-4-ol (Compound-68);

(R)-1-(4-((1-(3-(1,1-difluoro-2-methoxyethyl)-2-fluorophenyl)ethyl)amino)-2-methyl-8,9-dihydro-7H-cyclopenta[h]quinazolin-6-yl)-4-(methoxy methyl) piperidin-4-ol (Compound-69);

(R)-3,3-difluoro-3-(2-fluoro-3-(1-((2-methyl-6-(2-oxa-6-azaspiro[3.3]heptan-6-yl)-8,9-dihydro-7H-cyclopenta[h]quinazolin-4-yl)amino)ethyl)phenyl) propan-1-ol (Compound-70);

(R)-1-(4-((1-(3-(1,1-difluoro-3-hydroxypropyl)-2-fluorophenyl)ethyl)amino)-2-methyl-8,9-dihydro-7H-cyclopenta[h]quinazolin-6-yl)-4-(methoxymethyl) piperidin-4-ol (Compound-71);

1-(4-(((R)-1-(3-(1,1-difluoro-2-hydroxypropyl)-2-fluorophenyl)ethyl)amino)-2-methyl-8,9-dihydro-7H-cyclopenta[h]quinazolin-6-yl)-4-(methoxymethyl)piperidin-4-ol (Compound-72);

1,1-difluoro-1-(2-fluoro-3-((R)-1-((2-methyl-6-(2-oxa-6-azaspiro[3.3]heptan-6-yl)-8,9-dihydro-7H-cyclopenta[h]quinazolin-4-yl)amino)ethyl)phenyl)propan-2-ol (Compound-73);

1-(1-(4-(((R)-1-(3-amino-5-(trifluoromethyl)phenyl)ethyl)amino)-2-methyl-8,9-dihydro-7H-cyclopenta[h]quinazolin-6-yl)ethyl)azetidine-3-carbonitrile (Compound-74);

(R)-2,2-difluoro-2-(2-fluoro-3-(1-((2-methyl-6-morpholino-8,9-dihydro-7H-cyclopenta[h]quinazolin-4-yl)amino)ethyl)phenyl)ethan-1-ol (Compound-75);

N-(1-(3-amino-5-fluorophenyl)ethyl)-2-methyl-6-morpholino-8,9-dihydro-7H-cyclopenta[h]quinazolin-4-amine (Compound-76);

N-(1-(3-amino-5-(difluoromethyl)phenyl)ethyl)-2-methyl-6-morpholino-8,9-dihydro-7H-cyclopenta[h]quinazolin-4-amine (Compound-77);

N-(1-(3-amino-5-(difluoromethyl)phenyl)ethyl)-2-methyl-6-(2-oxa-6-azaspiro[3.3]heptan-6-yl)-8,9-dihydro-7H-cyclopenta[h]quinazolin-4-amine (Compound-78);

3-(1-((2-methyl-6-morpholino-8,9-dihydro-7H-cyclopenta[h]quinazolin-4-yl)amino)ethyl)benzonitrile (Compound-79);

N-(1-(3-amino-5-methylphenyl)ethyl)-2-methyl-6-morpholino-8,9-dihydro-7H-cyclopenta[h]quinazolin-4-amine (Compound-80);

N-(1-(indolin-4-yl)ethyl)-2-methyl-6-morpholino-8,9-dihydro-7H-cyclopenta[h]quinazolin-4-amine (Compound-81);

3,3-difluoro-3-(2-fluoro-3-(1-((2-methyl-6-morpholino-8,9-dihydro-7H-cyclopenta[h]quinazolin-4-yl)amino)ethyl)phenyl)-2-methylpropane-1,2-diol (Compound-82);

(R)-4-(4-((1-(3-amino-5-(trifluoromethyl)phenyl)ethyl)amino)-2-methyl-8,9-dihydro-7H-cyclopenta[h]quinazolin-6-yl) morpholin-3-one (Compound-83);

(R)-1-(4-((1-(3-amino-5-(trifluoromethyl)phenyl)ethyl)amino)-2-methyl-8,9-dihydro-7H-cyclopenta[h]quinazolin-6-yl)-4-(hydroxymethyl) piperidin-4-ol (Compound-84);

(R)-1-(4-((1-(3-(1,1-difluoro-2-hydroxy-2-methylpropyl)-2-fluorophenyl)ethyl)amino)-2-methyl-8,9-dihydro-7H-cyclopenta[h]quinazolin-6-yl)-4-(hydroxymethyl) piperidin-4-ol (Compound-85);

2,2-difluoro-2-(2-fluoro-3-((R)-1-((6-((R)-2-(hydroxymethyl)morpholino)-2-methyl-8,9-dihydro-7H-cyclopenta[h]quinazolin-4-yl)amino)ethyl)phenyl)ethan-1-ol (Compound-86);

(R)-5-(4-((1-(3-amino-5-(trifluoromethyl)phenyl)ethyl)amino)-2-methyl-8,9-dihydro-7H-cyclopenta[h]quinazolin-6-yl)-1-methylpyridin-2(1H)-one (Compound-87);

(R)-5-(4-((1-(3-(1,1-difluoro-2-hydroxyethyl)-2-fluorophenyl)ethyl)amino)-2-methyl-8,9-dihydro-7H-cyclopenta[h]quinazolin-6-yl)-1-methylpyridin-2(1H)-one (Compound-88);

1-methyl-5-(2-methyl-4-((1-(3-(trifluoromethyl)phenyl)ethyl)amino)-8,9-dihydro-7H-cyclopenta[h]quinazolin-6-yl)pyridin-2(1H)-one (Compound-89);

(R)-1-(4-(4-((1-(3-amino-5-(trifluoromethyl)phenyl)ethyl)amino)-2-methyl-8,9-dihydro-7H-cyclopenta[h]quinazolin-6-yl)-3,6-dihydropyridin-1(2H)-yl)ethan-1-one (Compound-90);

(R)—N-(1-(3-amino-5-(trifluoromethyl)phenyl)ethyl)-2-methyl-6-(1-methyl-1,2,3,6-tetrahydropyridin-4-yl)-8,9-dihydro-7H-cyclopenta[h]quinazolin-4-amine (Compound-91);

1-(4-(2-methyl-4-((1-(3-(trifluoromethyl)phenyl)ethyl)amino)-8,9-dihydro-7H-cyclopenta[h]quinazolin-6-yl)-3,6-dihydropyridin-1(2H)-yl)ethan-1-one (Compound-92);

(R)—N-(1-(3-amino-5-(trifluoromethyl)phenyl)ethyl)-6-(3,6-dihydro-2H-pyran-4-yl)-2-methyl-8,9-dihydro-7H-cyclopenta[h]quinazolin-4-amine (Compound-93);

(R)-5-(4-((1-(3-amino-5-(trifluoromethyl)phenyl)ethyl)amino)-2-methyl-8,9-dihydro-7H-cyclopenta[h]quinazolin-6-yl)pyridin-2(1H)-one (Compound-94);

(R)-4-(4-((1-(3-amino-5-(trifluoromethyl)phenyl)ethyl)amino)-2-methyl-8,9-dihydro-7H-cyclopenta[h]quinazolin-6-yl)pyridin-2(1H)-one (Compound-95);

(R)-1-(4-(4-((1-(3-amino-5-(trifluoromethyl)phenyl)ethyl)amino)-2-methyl-7,8,9,10-tetrahydrobenzo[h]quinazolin-6-yl)-3,6-dihydropyridin-1(2H)-yl)ethan-1-one (Compound-96);

(R)-5-(4-((1-(3-amino-5-(trifluoromethyl)phenyl)ethyl)amino)-2-methyl-7,8,9,10-tetrahydrobenzo[h]quinazolin-6-yl)-1-methylpyridin-2(1H)-one (Compound-97);

(R)—N-(1-(3-amino-5-(trifluoromethyl)phenyl)ethyl)-6-(1-isopropyl-1,2,3,6-tetrahydropyridin-4-yl)-2-methyl-8,9-dihydro-7H-cyclopenta[h]quinazolin-4-amine (Compound-98);

tert-butyl-(R)-4-(4-((1-(3-amino-5-(trifluoromethyl)phenyl)ethyl)amino)-2-methyl-8,9-dihydro-7H-cyclopenta[h]quinazolin-6-yl)-3,6-dihydropyridine-1(2H)-carboxylate (Compound-99);

(R)-(4-(4-((1-(3-amino-5-(trifluoromethyl)phenyl)ethyl)amino)-2-methyl-8,9-dihydro-7H-cyclopenta[h]quinazolin-6-yl)piperidin-1-yl)(cyclopropyl)methanone (Compound-100);

(R)—N-(1-(3-amino-5-(trifluoromethyl)phenyl)ethyl)-2-methyl-6-(1-methylpiperidin-4-yl)-8,9-dihydro-7H-cyclopenta[h]quinazolin-4-amine (Compound-101);

(R)-1-(4-(4-((1-(3-amino-5-(trifluoromethyl)phenyl)ethyl)amino)-2-methyl-8,9-dihydro-7H-cyclopenta[h]quinazolin-6-yl)piperidin-1-yl)ethan-1-one (Compound-102);

(R)—N-(1-(3-amino-5-(trifluoromethyl)phenyl)ethyl)-6-(1-isopropylpiperidin-4-yl)-2-methyl-8,9-dihydro-7H-cyclopenta[h]quinazolin-4-amine (Compound-103);

(R)—N-(1-(3-amino-5-(trifluoromethyl)phenyl)ethyl)-2-methyl-6-(tetrahydro-2H-pyran-4-yl)-8,9-dihydro-7H-cyclopenta[h]quinazolin-4-amine (Compound-104);

(R)-1-(4-(4-((1-(3-amino-5-(trifluoromethyl)phenyl)ethyl)amino)-2-methyl-7,8,9,10-tetrahydrobenzo[h]quinazolin-6-yl)piperidin-1-yl)ethan-1-one (Compound-105);

(R)—N$^4$-(1-(3-amino-5-(trifluoromethyl)phenyl)ethyl)-N$^6$-(4,5-dihydrooxazol-2-yl)-2-methyl-8,9-dihydro-7H-cyclopenta[h]quinazoline-4,6-diamine (Compound-106);

(R)—N-(1-(3-amino-5-(trifluoromethyl)phenyl)ethyl)-2-methyl-6-((3-methyloxetan-3-yl)methoxy)-8,9-dihydro-7H-cyclopenta[h]quinazolin-4-amine (Compound-107);

(R)—N-(1-(3-amino-5-(trifluoromethyl)phenyl)ethyl)-6-methoxy-2-methyl-8,9-dihydro-7H-cyclopenta[h]quinazolin-4-amine (Compound-108);
N—((R)-1-(3-amino-5-(trifluoromethyl)phenyl)ethyl)-2-methyl-6-(((S)-tetrahydrofuran-3-yl)oxy)-8,9-dihydro-7H-cyclopenta[h]quinazolin-4-amine (Compound-109);
(R)—N-(1-(3-amino-5-(trifluoromethyl)phenyl)ethyl)-6-methoxy-2,8-dimethylfuro[2,3-h]quinazolin-4-amine (Compound-110);
N—((R)-1-(3-amino-5-(trifluoromethyl)phenyl)ethyl)-2,8-dimethyl-6-(((S)-tetrahydrofuran-3-yl)oxy)furo[2,3-h]quinazolin-4-amine (Compound-111);
N—((R)-1-(3-amino-5-(trifluoromethyl)phenyl)ethyl)-2,8,8-trimethyl-6-(((S)-tetrahydrofuran-3-yl)oxy)-8,9-dihydrofuro[2,3-h]quinazolin-4-amine (Compound-112);
(R)—N-(1-(3-amino-5-(trifluoromethyl)phenyl)ethyl)-2,8,8-trimethyl-6-morpholino-8,9-dihydrofuro[2,3-h]quinazolin-4-amine (Compound-113);
(R)—N-(1-(3-amino-5-(trifluoromethyl)phenyl)ethyl)-2,8,8-trimethyl-6-(2-oxa-6-azaspiro[3.3]heptan-6-yl)-8,9-dihydrofuro[2,3-h]quinazolin-4-amine (Compound-114);
(R)—N-(1-(3-amino-5-(difluoromethyl)phenyl)ethyl)-2,8,8-trimethyl-6-morpholino-8,9-dihydrofuro[2,3-h]quinazolin-4-amine (Compound-115);
N-(1-(3-amino-5-(difluoromethyl)phenyl)ethyl)-2,8,8-trimethyl-6-(2-oxa-6-azaspiro[3.3]heptan-6-yl)-8,9-dihydrofuro[2,3-h]quinazolin-4-amine (Compound-116);
N—((R)-1-(3-amino-5-(trifluoromethyl)phenyl)ethyl)-2,8-dimethyl-6-morpholino-8,9-dihydrofuro[2,3-h]quinazolin-4-amine (Compound-117);
N—((R)-1-(3-amino-5-(trifluoromethyl)phenyl)ethyl)-2,8-dimethyl-6-(((S)-tetrahydrofuran-3-yl)oxy)-8,9-dihydrofuro[2,3-h]quinazolin-4-amine (Compound-118);
(R)-4-(4-((1-(3-(1,1-difluoro-2-hydroxy-2-methylpropyl)-2-fluorophenyl)ethyl)amino)-2-methyl-8,9-dihydro-7H-cyclopenta[h]quinazolin-6-yl)tetrahydro-2H-pyran-4-ol (Compound-119);
2,2,2-trifluoro-1-(3-(1-((2-methyl-6-morpholino-8,9-dihydro-7H-cyclopenta[h]quinazolin-4-yl)amino)ethyl)phenyl)ethan-1-one (Compound-120);
(R)-2,2-difluoro-2-(2-fluoro-3-(1-(((6-methoxy-2,7-dimethyl-8,9-dihydro-7H-[1,4]oxazino[3,2-h]quinazolin-4-yl)amino)ethyl)phenyl)ethan-1-ol (Compound-121);
(R)-4-((1-(3-(1,1-difluoro-2-hydroxy-2-methylpropyl)-2-fluorophenyl)ethyl)amino)-2,8,8,10-tetramethyl-6-(1-methyl-6-oxo-1,6-dihydropyridin-3-yl)-8H-[1,4]oxazino[2,3-h]quinazolin-9 (10H)-one (Compound-122);
(R)-4-(4-((1-(3-(1,1-difluoro-2-hydroxy-2-methylpropyl)-2-fluorophenyl)ethyl)amino)-2-methyl-8,9-dihydro-7H-cyclopenta[h]quinazolin-6-yl)morpholin-3-one (Compound-123);
(R)-4-(4-((1-(3-amino-5-(trifluoromethyl)phenyl)ethyl)amino)-2-methyl-8,9-dihydro-7H-cyclopenta[h]quinazolin-6-yl)cyclohexan-1-one (Compound-124); and
(R)-4-(4-((1-(3-amino-5-(trifluoromethyl)phenyl)ethyl)amino)-2-methyl-8,9-dihydro-7H-cyclopenta[h]quinazolin-6-yl)cyclohexan-1-ol (Compound-125).

According to a feature re of the present invention, the compounds of general formula (I) where all the symbols are as defined earlier, can be prepared by methods illustrated in the schemes and examples provided herein below. However, the disclosure should not be construed to limit the scope of the invention arriving at compound of formula (I) as disclosed herein above.

Scheme - A illustrates the synthesis of compound of formula (A5)

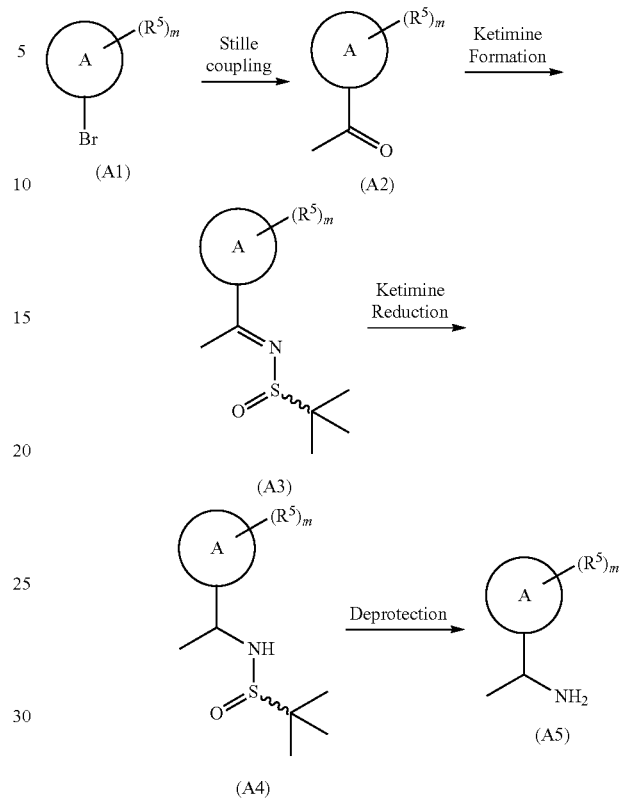

The compound of formula (A1) undergoes a metal catalyzed cross coupling with alkoxy vinyl stannane, e.g. tributyl(1-ethoxyvinyl)tin in presence of palladium catalysts such as Pd(Ph$_3$P)$_2$Cl$_2$, Pd$_2$(dba)$_3$, and the like; optionally using bases such as triethylamine, N,N-Diisopropylethylamine, and the like, in hydrocarbon solvents like toluene or ether solvents like 1,4-dioxane to furnish the alkoxy vinyl intermediate which in turn provide compound of formula (A2) in acidic condition by employing aqueous mineral acids such as hydrochloric acid in ether solvent such as THF, 1,4-dioxane and the like.

The compound of formula (A2) was then reacted with corresponding chirally pure tert-butanesulfinamide in presence of Lewis acid such as titanium alkoxides e.g. titanium tetraethoxide, titanium isopropoxide, and the like, in ether solvents such as 1,4-dioxane, THF, and the like, to obtain the compound of formula (A3).

The compound of formula (A3) reacted with reducing agent such as metal hydrides e.g. sodium borohydride, L-selectride, and the like in solvents such as THF, 1,4-dioxane, methanol, and the like, optionally in presence of water to provide compound of formula (A4). Major diastereoisomer in the compound of formula (A4) after reduction was separated or taken ahead as such.

The compound of formula (A4) under acidic condition undergoes cleavage of sulfinyl derivative to generate amine of formula (A5) as a free base or salt. The acids employed for the transformation may involve mineral acids such as hydrochloric acid or organic acids such as trifluoroacetic acid.

Scheme - B illustrates the synthesis of compound of formula (I) and (I-A)

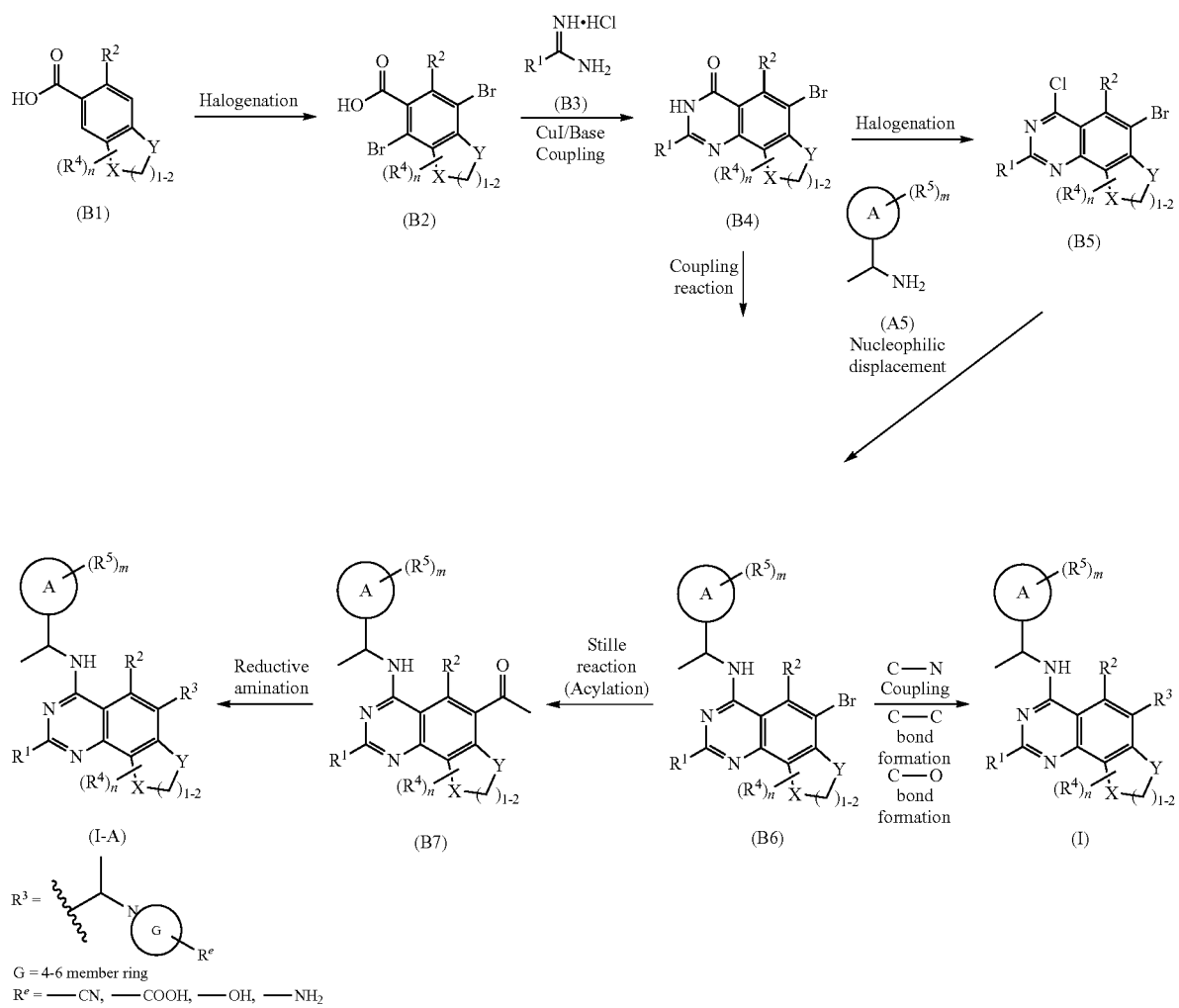

Compound of formula (B1) was either commercially purchased or prepared by following a procedure reported in Russian Journal of Organic Chemistry, 2002, vol. 38, #12, p. 1764-1768. Halogenation of carboxylic acid (B1) using N-halosuccinimide reagent such as but not limited to NBS, NIS, and NCS gives corresponding dihalo compound of formula (B2), which on coupling with different amidines of formula (B3) gives compound of formula (B4) (where $R^1$=alkyl).

The compound of formula (B4) could be either directly converted to compound of formula (B6) using different benzylic amines (A5) and coupling reagents such as but not limited to BOP, etc in polar solvents such as but not limited to ACN, DMF, and DMSO, or compound of formula (B4) could be further halogenated by using reagents such as but not limited to chlorinating agents like $POCl_3$, $POBr_3$, Oxalyl chloride, or $SOCl_2$ and bases such as but not limited to DIPEA, TEA, and N,N-dimethyl aniline in solvents such as but not limited to chloroform, dichloroethane, and chlorobenzene to give compound of formula (B5).

Compound of formula (B5) undergoes a nucleophilic substitution reaction with different benzylic amines (A5) leading to compound of formula (B6). The compound of formula (B6) could be further acylated using Stille reaction condition to compound of formula (B7) which could be further converted into compound of formula (I-A) through reductive amination using appropriate substituted amine. The compound of formula (B6) could be further functionalized e.g. transition metal catalyzed C—C coupling, C—N bond formation or C—O bond formation reactions like Suzuki or Buchwald reaction utilizing corresponding counterpart, i.e. substituted amine or substituted boronate to get compound of formula (I).

Scheme - C illustrates the synthesis of compound of formula (B4)

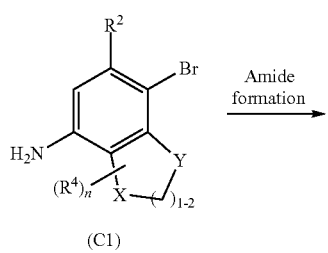

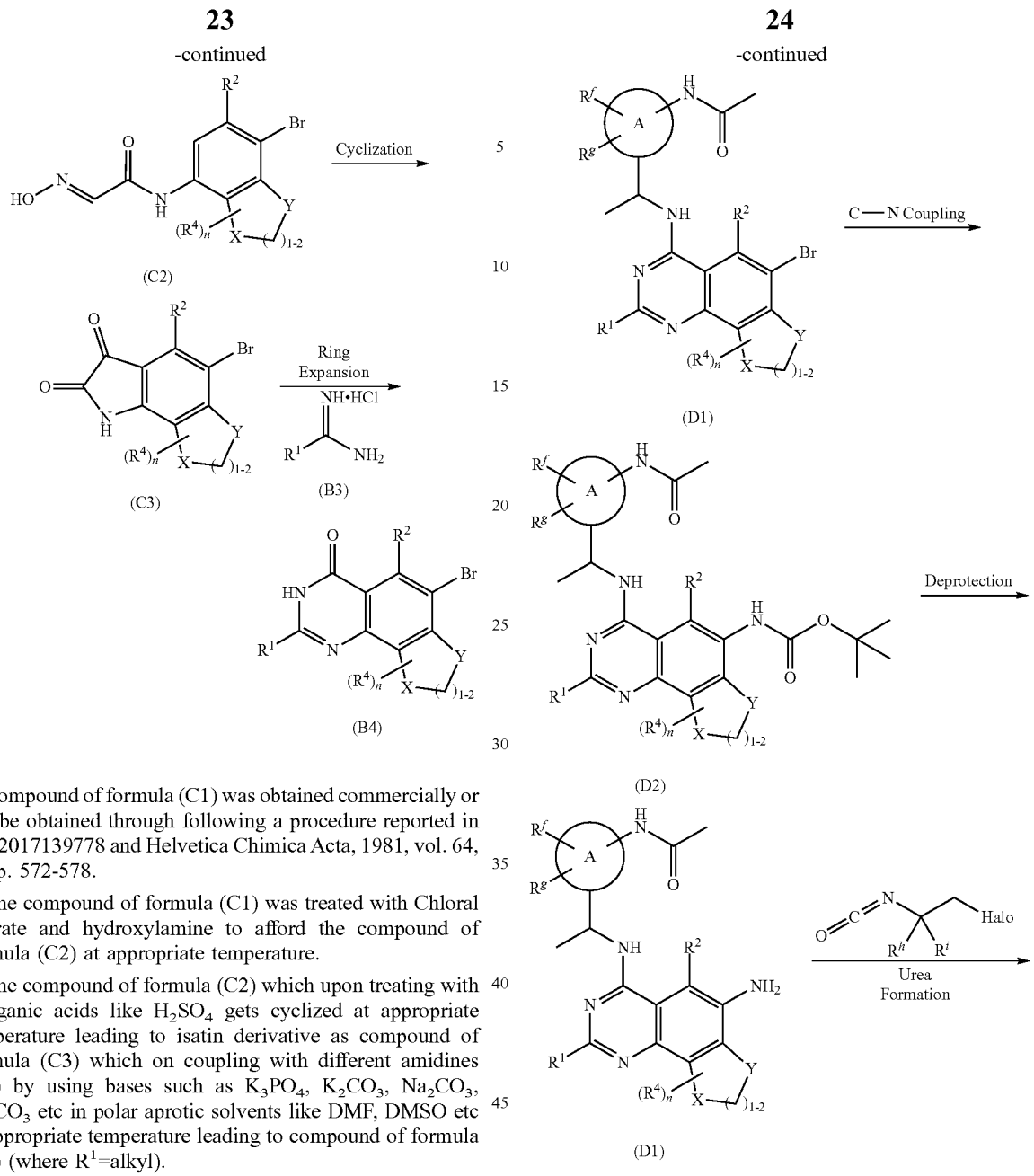

Compound of formula (C1) was obtained commercially or can be obtained through following a procedure reported in WO2017139778 and Helvetica Chimica Acta, 1981, vol. 64, #2, p. 572-578.

The compound of formula (C1) was treated with Chloral hydrate and hydroxylamine to afford the compound of formula (C2) at appropriate temperature.

The compound of formula (C2) which upon treating with inorganic acids like $H_2SO_4$ gets cyclized at appropriate temperature leading to isatin derivative as compound of formula (C3) which on coupling with different amidines (B3) by using bases such as $K_3PO_4$, $K_2CO_3$, $Na_2CO_3$, $Cs_2CO_3$ etc in polar aprotic solvents like DMF, DMSO etc at appropriate temperature leading to compound of formula (B4) (where $R^1$=alkyl).

Scheme - D illustrates the synthesis of compound of formula (I-B)

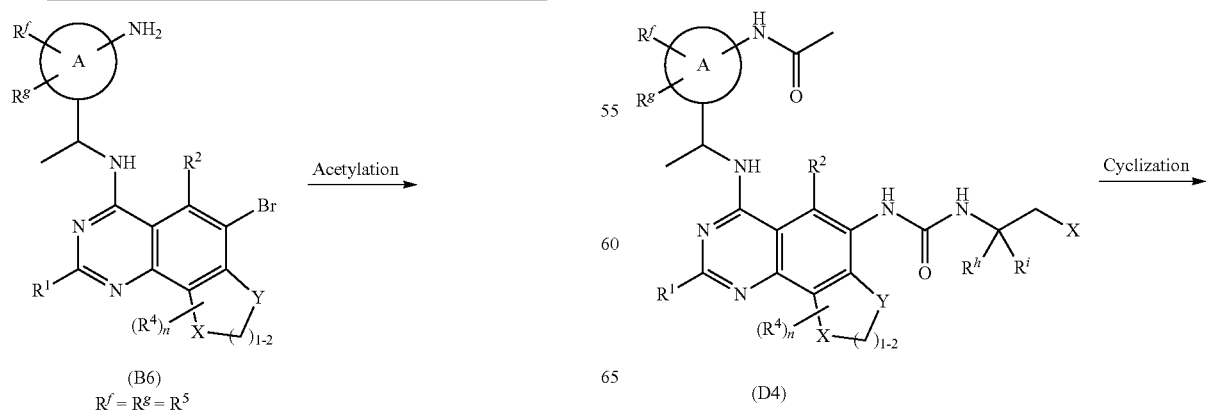

-continued

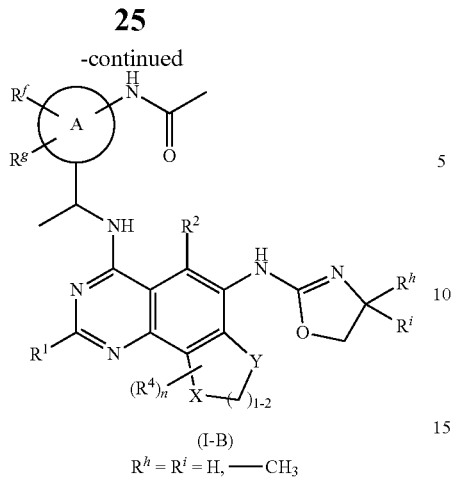

(I-B)
$R^h = R^i = H, —CH_3$

The compound of formula (D1) can be synthesized via acetylation of corresponding aniline compound of formula (B6) as mentioned in above Scheme-B.

The compound of formula (D1) was converted to corresponding carbamate compound of formula (D2) using transition metal catalyzed cross coupling such as via Buchwald Hartwig coupling, which further upon deprotection lead to intermediate compound of formula (D3).

The compound of formula (D3) could be further functionalized to urea compound of formula (D4) by treating with corresponding isocyanates (where $R^h=R^i=H, CH_3$).

The compound of formula (D4) could be further cyclized leading to final compound of formula (I-B) using bases such as KOtBu, NaH etc in a polar aprotic solvent like DMF, DMSO etc at appropriate temperature.

Scheme - E illustrates the synthesis of compound of formula (I-C)

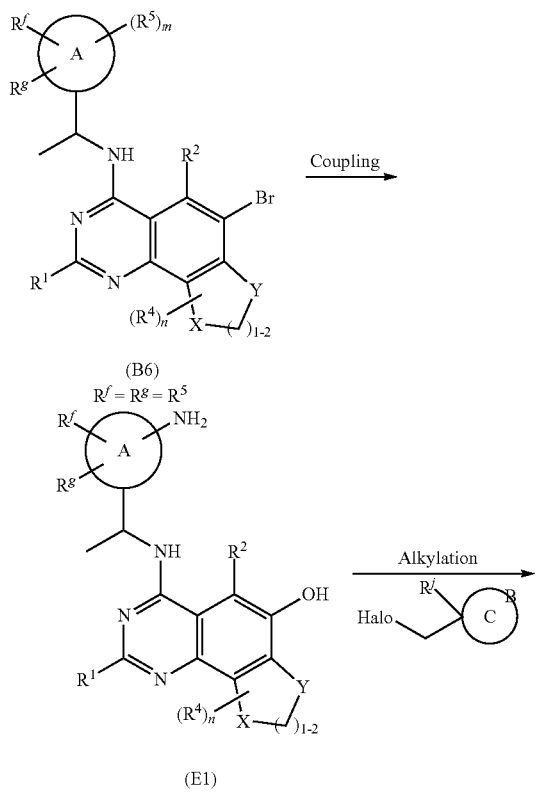

-continued

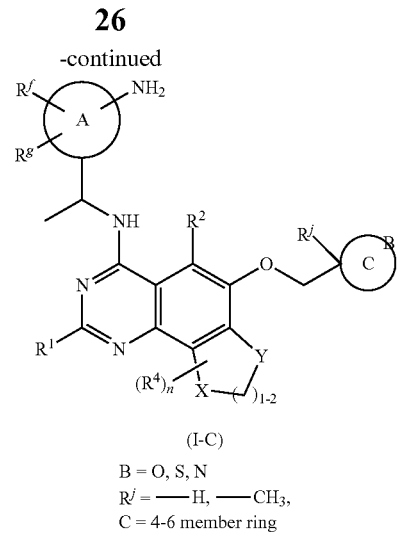

(I-C)
B = O, S, N
$R^j =$ —H, —$CH_3$,
C = 4-6 member ring

The compound of formula (B6) as prepared following Scheme-B, could be converted to corresponding hydroxy derivative of compound of formula (E1) via e.g. transition metal catalyzed cross coupling.

Compound of formula (E1) could be further alkylated by using bases such as $K_2CO_3$, $Na_2CO_3$, to the compound of formula (I-C).

Scheme - F illustrates formation of compound of formula (I-D) starting from commercially available compound of formula (F1)

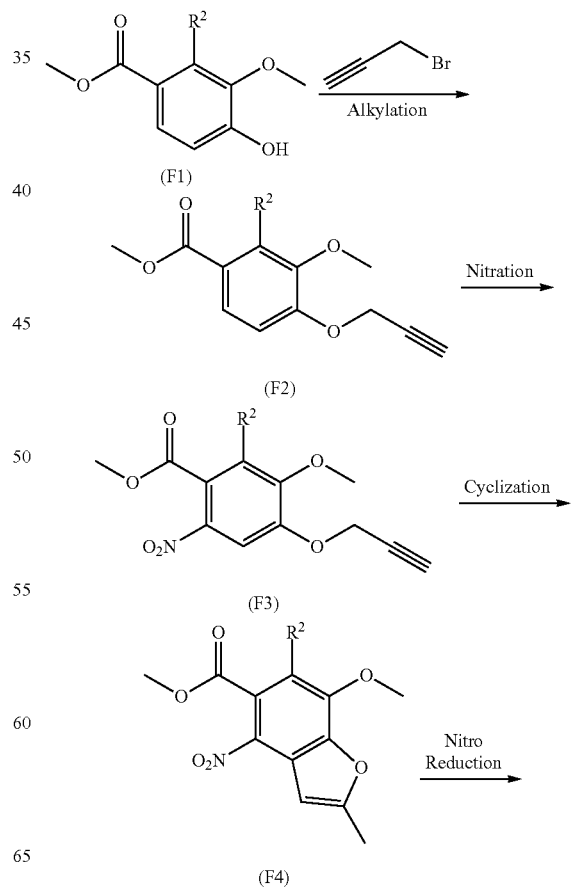

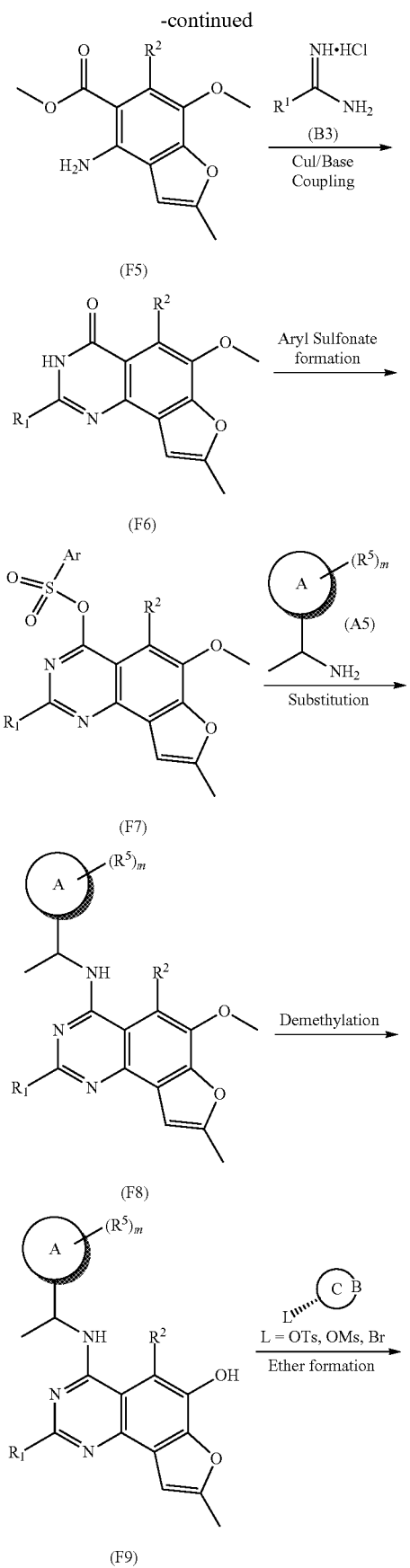

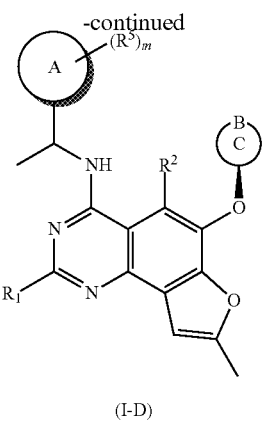

B = O, S, N
C = 4-6 member ring (I-D)

Compound of formula (F1) upon alkylation using propargyl bromide affords corresponding compound of formula (F2).

Nitration of compound of formula (F2) with nitrating reagents such as, although not limited to nitric acid, potassium nitrate, and the like, in acids such as, although not limited to tin (IV) chloride, sulphuric acid, trifluroacetic acid, acetic acid, and the like, anhydrides like acetic anhydride, trifluroacetic anhydride, and the like, or mixture(s) thereof to provides compound of formula (F3), which upon Claisen rearrangement and in situ cyclization at appropriate temperature, to affords compound of formula (F4). Such reactions can be carried out in either neat or in presence of high boiling solvents such as, although not limited to NMP, diphenyl ether, xylene, N,N-diethyl aniline, and the like or mixtures thereof and also in combination with bases such as, although not limited to cesium fluoride and high boiling solvents such as, although not limited to N,N-diethyl aniline, NMP, diphenyl ether, xylene, and the like or mixtures thereof.

Compound of formula (F4) was converted to corresponding aniline derivative of compound of formula (F5) through selective reduction of nitro group by using reducing agents, although not limited to, such reducing agents include hydrogenation with palladium on carbon, metal reductions like iron, tin or tin chloride and the like. Such reduction could be carried out in one or more solvents, e.g., ethers such as THF, 1,4-dioxane, and the like; alcohol such as methanol, ethanol and, the like; under acidic conditions involving ammonium chloride, acetic acid, hydrochloric acid, and the like or mixtures thereof.

Compound of formula (F5) could be further cyclized to give compound of formula (F6) as tricyclic building block. Such reaction can be carried out in polar solvent like acetonitrile using acids such as, but not limited to methane sulfonic acid or hydrochloric acid at appropriate temperature.

The compound of formula (F6) is treated with tri-isopropyl benzene sulfonyl chloride to afford corresponding sulfonate derivative of compound of formula (F7) in solvents such as ethers like THF or 1,4-Dioxane at appropriate temperature.

Compound of formula (F7) undergoes a nucleophilic substitution reaction with appropriate chiral benzylic amines leading to the compound of formula (F8) using organic basic reagents such as, but not limited to DIPEA or TEA in a polar aprotic solvent like dioxane or THF at appropriate temperature.

The compound of formula (F8) demethylated to corresponding hydroxy derivative of compound of formula (F9) by using reagents like Lewis acids such as, but not limited to $BBr_3$, $AlCl_3$, etc and basic reagents such as, but not limited to NaSEt, etc in polar solvents such as, although not limited to DMF, can, and the like or mixtures thereof, and halogenated solvents such as, although not limited chloroform, dichloromethane, and the like or mixtures thereof.

The compound of formula (F9) can be further alkylated by using inorganic bases such as, but not limited to $K_2CO_3$, $Na_2CO_3$, and $Cs_2CO_3$ etc in polar aprotic solvents like DMF, DMSO etc at appropriate temperature leading to final compound of formula (I-D).

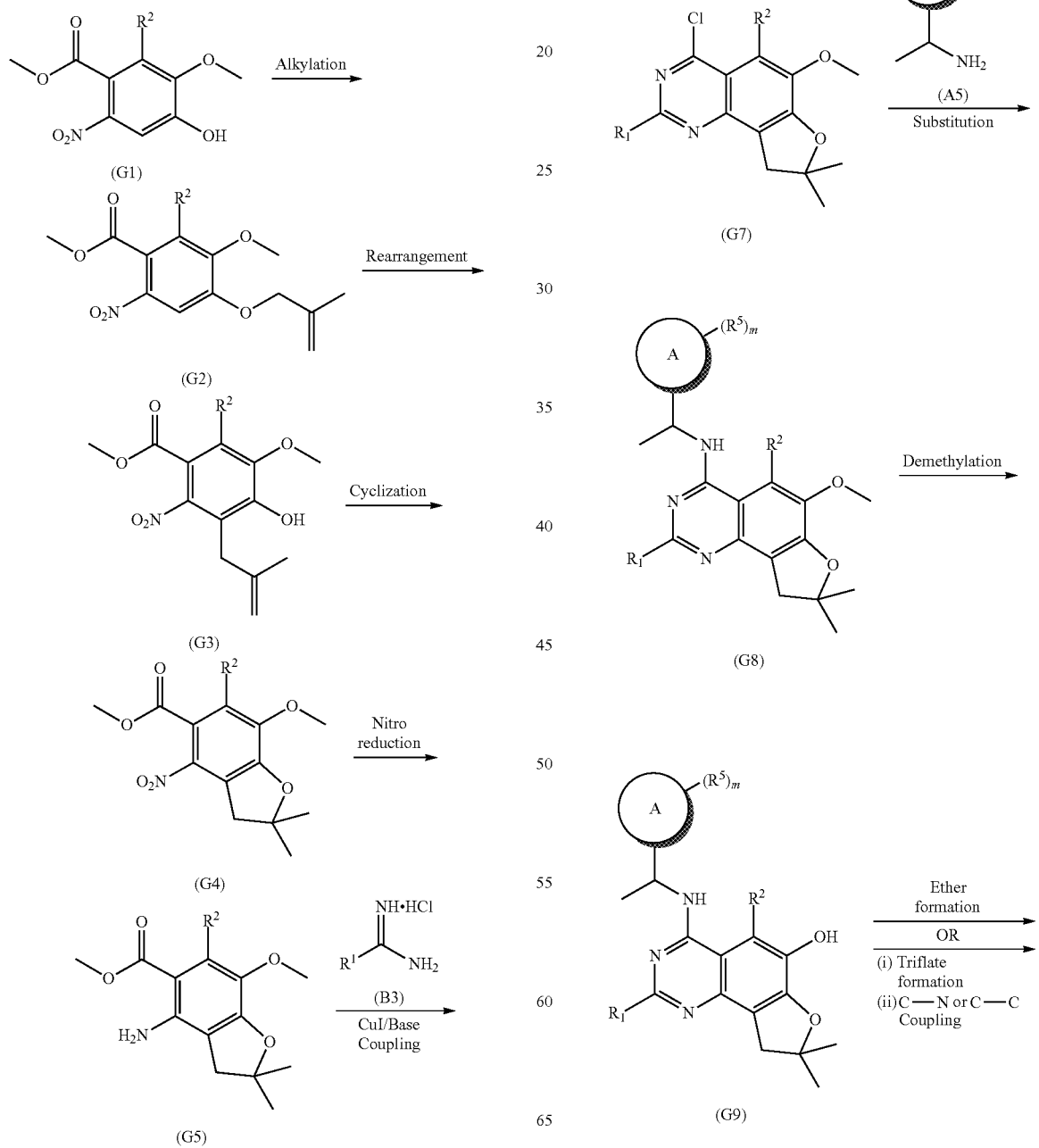

-continued

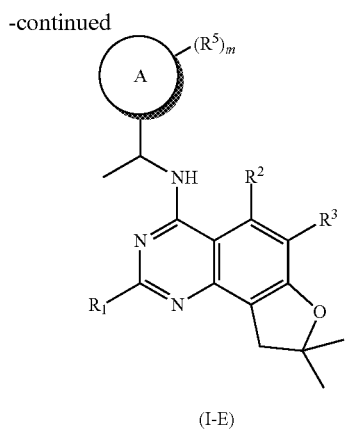

(I-E)

Compound of formula (G1) upon alkylation using 3-chloro-2-methylprop-1-ene afford compound of formula (G2). Such reaction could be carried out by using inorganic bases such as, although not limited to $K_2CO_3$, $Cs_3CO_3$, $Na_2CO_3$ and organic bases such as, although not limited to DIPEA, TEA, diisopropyl amine, and the like etc., and the polar aprotic solvents such as, although not limited to acetone, acetonitrile, and DMF or mixture(s) thereof.

The compound of formula (G2) upon Claisen rearrangement at appropriate temperature to affords hydroxyl derivative of compound of formula (G3). Such reactions can be carried out in either neat or in presence of high boiling solvents such as, but not limited to NMP, diphenyl Ether, xylene, N,N-diethyl aniline, and the like or mixtures thereof.

Compound of formula (G3) upon cyclization in solvents such as, although not limited to THF, Diethyl ether, dioxane, and ACN under acidic conditions such as, but not limited to formic acid, acetic acid, hydrochloric acid, and the like mixture(s) thereof at appropriate temperature to afford compound of formula (G4).

The compound of formula (G4) further converted to corresponding aniline derivatives of compound of formula (G5) through selective reduction of nitro group by using reducing agents such as, although not limited to, such reducing agents include hydrogenation with palladium on carbon, metal reductions like iron, tin or tin chloride, and the like. Such reduction reaction can be carried out in one or more solvents, e.g. ethers such as THF, 1,4-dioxane, and the like; alcohol such as methanol, ethanol, and the like; under acidic conditions involving ammonium chloride, acetic acid, hydrochloric acid, and the like or mixture(s) thereof.

The compound of formula (G5) could be further cyclized to give compound of formula (G6) as tricyclic building block. Such reaction can be carried out in polar solvent like acetonitrile using acids such as, but not limited to methane sulphonic acid, hydrochloric acid etc at appropriate temperature.

The compound of formula (G6) could be halogenated by using reagents such as, although not limited to, $POCl_3$ or $POBr_3$ in combination with organic bases such as, although not limited to DIPEA, TEA in halogenated solvents such as, although not limited to chlorobenzene, chloroform, DCM etc at appropriate temperature to give compound of formula (G7).

The compound of formula (G7) undergoes a nucleophilic substitution reaction with different chiral benzylic amines (A5) leading to the compound of formula (G8) using organic basic reagents such as, but not limited to DIPEA, TEA etc in a polar aprotic solvents like dioxane, THF etc at appropriate temperature.

The compound of formula (G8) demethylated to corresponding hydroxy derivative of compound of formula (G9) by using reagent such as, but not limited to $BBr_3$, NaSEt etc in polar solvents such as DMF, ACN, and the like; halogenated solvents such as chloroform, dichloromethane, etc.

The compound of formula (G9) can be further alkylated to form ether compound of general formula (I-E) by using organic bases such as, but not limited, DIPEA, TEA at appropriate temperature or the said alkylation can be carried out by using bases such as $K_2CO_3$, $Na_2CO_3$, $Cs_2CO_3$, etc in polar aprotic solvents like DMF, DMSO etc at appropriate temperature. The compound of formula (G9) could be converted to ether compound of general formula (I-E) via Mitsunobu reaction also.

However, the compound of formula (G9) could also be converted to corresponding triflate with triflic anhydride in halogenated solvents such as, but not limited to DCM, $CHCl_3$, etc and further reacting this triflate intermediate with appropriate aliphatic amines or boronic acid to afford compound of general formula (I-E). This reaction could be mediated by a suitable catalyst such as, e.g., $Pd(PPh_3)_2Cl_2$, $Pd_2dba_3$, $Pd(PPh_3)_4$, $Pd(OAc)_2$, or mixture(s) thereof; a suitable ligand such as, although not limited to Xanthophos, BINAP, Ru-Phos, or mixture(s) thereof; in the presence of suitable base, preferably inorganic bases such as, although not limited to e.g., $K_2CO_3$, $Na_2CO_3$, $Cs_2CO_3$, NaOtBu, Potassium phosphate, or mixture(s) thereof.

Such reactions can be carried out in solvents like, e.g., ethers such as THF, dioxane, and the like; hydrocarbons, e.g., toluene; amides such as DMF, DMA, or mixture(s) thereof.

Scheme - H illustrates formation of compound of formula (I-F) starting from compound of formula (F4)

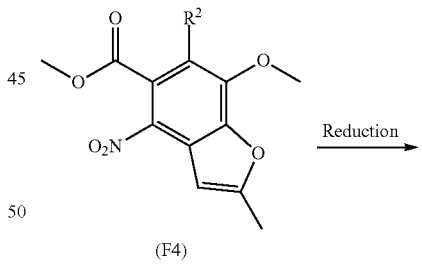

(F4)

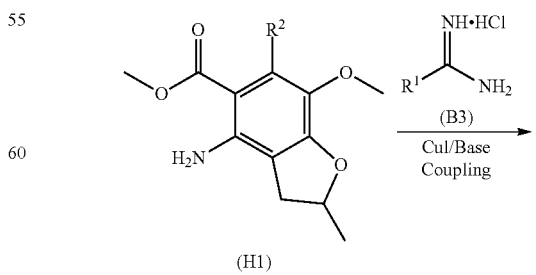

(H1)

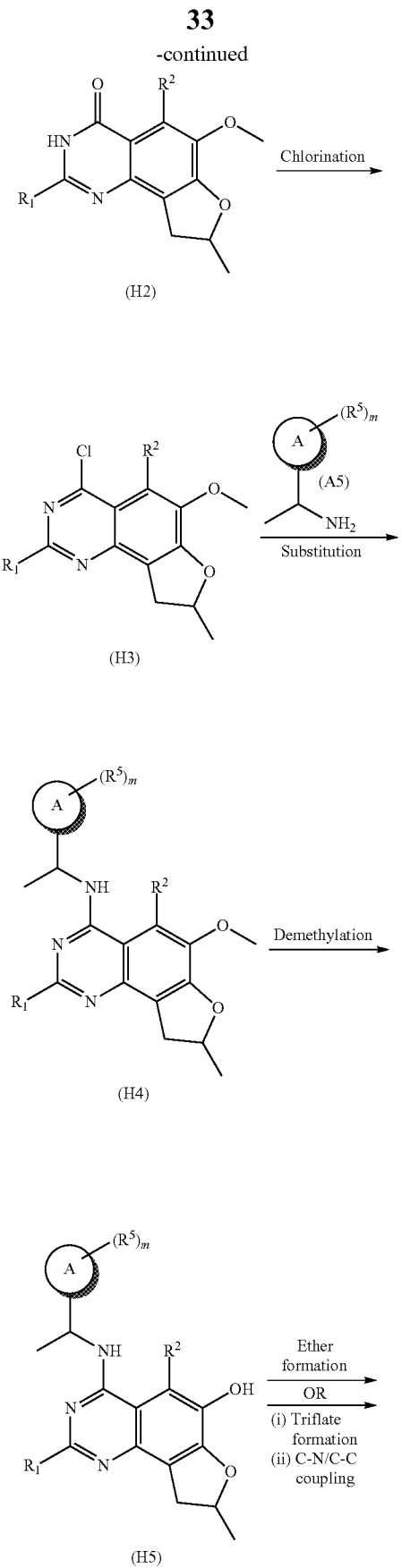

(H2)

(H3)

(H4)

(H5)

(I-F)

The compound of formula (F4) can be reduced to corresponding aniline derivative (H1) through selective reduction of nitro group and aromatic double bond by using reducing agents, such as, although not limited to, such reducing agents include hydrogenation with palladium on carbon, metal reductions like iron, tin or tin chloride, and the like. Such reduction reaction can be carried out in one or more solvents, although not limited to, e.g., ethers such as THF, 1,4-dioxane, and the like; alcohol such as methanol, ethanol, and the like; under either neutral or acidic conditions involving ammonium chloride, acetic acid, hydrochloric acid, and the like, or mixture(s) thereof.

The compound of formula (H1) can be further cyclized to give compound of formula (H2) as tricyclic building block. Such reaction can be carried out in polar solvent like acetonitrile using acids such as, but not limited to methane sulphonic acid, hydrochloric acid etc at appropriate temperature.

The compound of formula (H2) can be halogenated by using reagents such as, although not limited, $POCl_3$ or $POBr_3$ in combination with organic bases such as, although not limited to, DIPEA, TEA in halogenated solvents such as chlorobenzene, chloroform, DCM etc at appropriate temperature to give the compound of formula (H3).

The compound of formula (H3) undergoes a nucleophilic substitution reaction with different chiral benzylic amines of compound of formula (A5) leading to the compound of formula (H4) using organic basic reagents such as, but not limited to DIPEA, TEA etc in a polar aprotic solvents like dioxane, THF etc at appropriate temperature.

The compound of formula (H4) demethylated to corresponding hydroxy derivative of compound of formula (H5) by using Lewis Acids reagent such as, but not limited to $BBr_3$, $AlCl_3$ etc and basic reagents such as, but not limited to NaSEt, etc in polar solvents such as, although not limited to DMF, can, and the like; halogenated solvents such as, although not limited to chloroform, dichloromethane, etc.

The compound of formula (H5) could be further alkylated to form ether compound of general formula (I-F) by using organic bases such as, but not limited to DIPEA, TEA etc at appropriate temperature, the said alkylation can be carried out by using bases such as $K_2CO_3$, $Na_2CO_3$, $Cs_2CO_3$, etc in polar aprotic solvents like DMF, DMSO etc at appropriate temperature. The compound of formula (H5) could be converted to ether compound of general formula (I-F) via Mitsunobu reaction also.

However, the compound of formula (H5) could also be converted to corresponding triflate with triflic anhydride in halogenated solvents such as, but not limited to, DCM, $CHCl_3$, etc and further reacting this triflate intermediate with appropriate aliphatic amines or boronic acid to afford compound of general formula (I-F). This reaction could be mediated by a suitable catalyst such as, e.g., Pd(PPh$_3$)$_2$Cl$_2$, Pd$_2$dba$_3$, Pd(PPh$_3$)$_4$, Pd(OAc)$_2$, or mixture(s) thereof; a suitable ligand such as, although not limited to Xanthophos, BINAP, Ru-Phos or mixture(s) thereof; in the presence of suitable base, preferably inorganic bases such as, although not limited to e.g. K$_2$CO$_3$, Na$_2$CO$_3$, Cs$_2$CO$_3$, NaOtBu, Potassium phosphate, or mixture(s) thereof. Such reactions can be carried out in solvents like ethers such as THF, dioxane, and the like; hydrocarbons, e.g., toluene; amides such as DMF, DMA, or mixture(s) thereof.

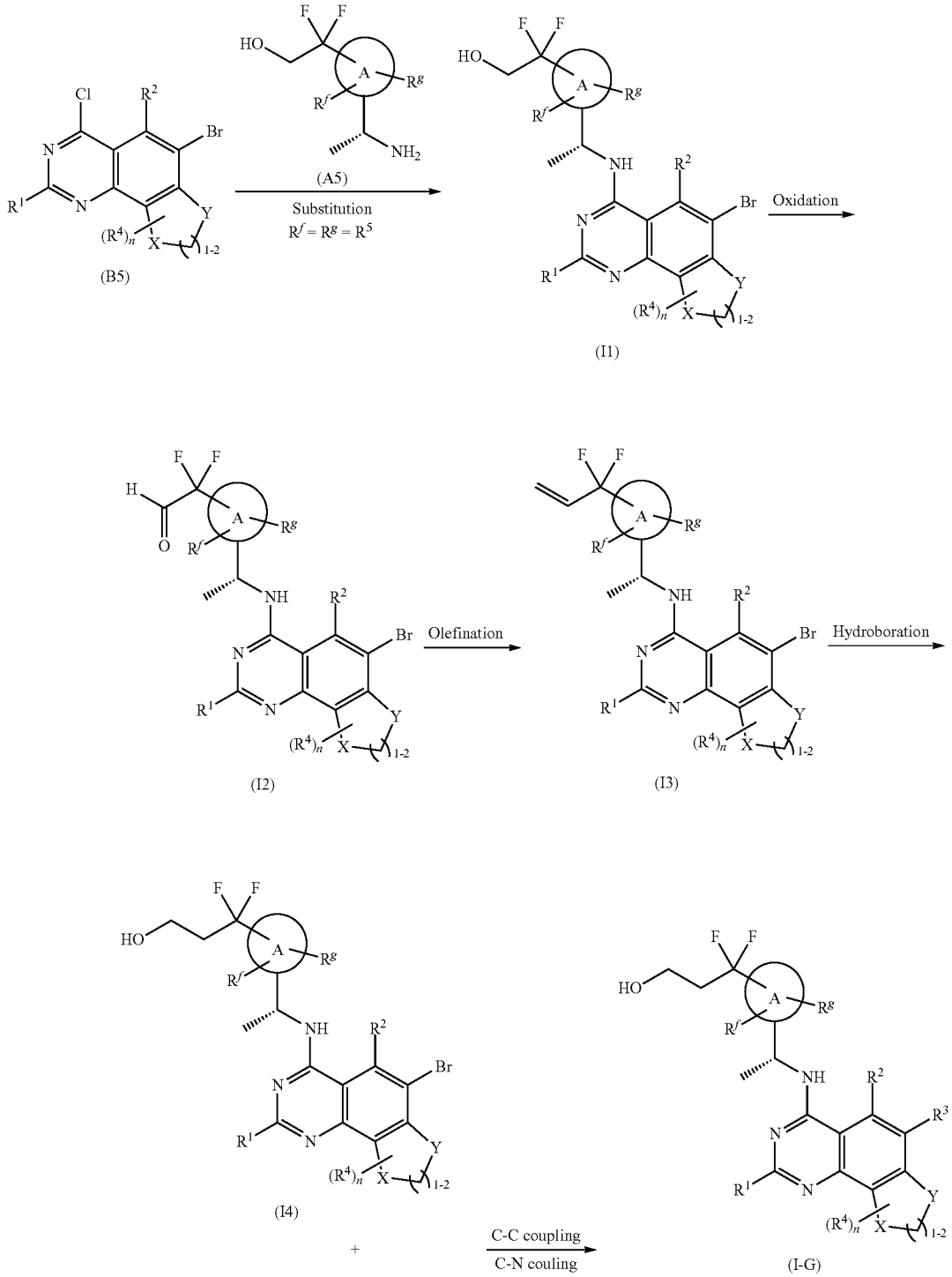

Scheme - I illustrates the synthesis of compounds of formula (I-G) and (I-H)

-continued

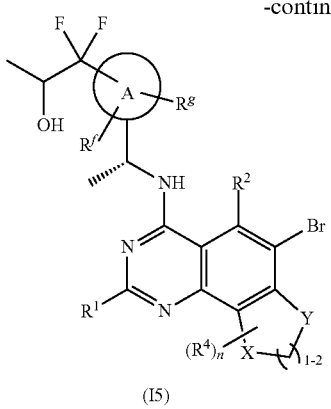

(I5)

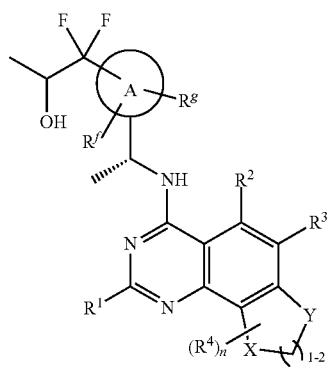

(I-H)

The compound of formula (B5) undergoes a nucleophilic substitution reaction with compound of formula (A5) in the presence of organic base such as, although not limited to TEA, pyridine, DIPEA, or DMAP leading to compound of formula (I1). Such reactions can be carried out in polar protic solvents such as MeOH, EtOH, IPA, and the like; amides such as DMF, DMA, and the like; ethers such as THF or 1,4-Dioxane and the like; halogenated solvents such as $CHCl_3$, DCE, chlorobenzene, and the like; polar aprotic solvents such as DMSO, can, and the like.

The compound of formula (I1) subjected to a controlled oxidation by using reagents such as, but not limited to, the said reagent is the combination oxalyl chloride and DMSO in organic solvents such as DCM, $CHCl_3$, DCE, and the like; in presence of organic base such as, but not limited to, triethylamine, N,N-diisopropylethylamine to give aldehyde compound of formula (I2).

The compound of formula (I2) was then subjected to the olefination reaction by using reagents such as, but not limited to, alkyltriphenyl phosphonium halide in presence of base such as, but not limited to, KHMDS, LDA in presence of ether solvent such as, but not limited to, THF, 1,4-dioxane, and like to obtain the compound of formula (I3).

The compound of formula (I3) undergoes hydroboration reaction by using a regents such as, but not limited to, Borane-THF complex, Borane-DMS complex or Per-acids like hydrogen peroxide in ether solvents such as, but not limited to, THF, 1,4-dioxane to gives the two regioisomers of compound of formula (I4) and racemic mixture (I5).

The compound of formula (I-G) and racemic mixture (I-H) could be prepared by the Buchwald coupling of compound of formula (I4) and racemic mixture (I5) respectively with appropriate aliphatic amines. This reaction could be mediated by a suitable catalyst such as, but not limited to, $Pd(PPh_3)_2Cl_2$, $Pd_2dba_3$, $Pd(PPh_3)_4$, $Pd(OAc)_2$, or mixture(s) thereof; a suitable ligand such as, but not limited to, 2-di-t-butylphosphino-2'-(N,N-dimethylamino)biphenyl, xanthophos, BINAP, Ru-Phos, or mixture(s) thereof; in the presence of suitable base, preferably inorganic bases such as, but not limited to, alkali metal carbonates, e.g., $Na_2CO_3$, $K_2CO_3$, $Cs_2CO_3$, sodium tert-butoxide, potassium phosphate, or mixture(s) thereof. Such reactions could be carried out in solvents like ethers such as THF, dioxane, and the like; hydrocarbons, e.g., toluene and the like; amides such as DMF, DMA, and the like or mixture(s) thereof. The final separation through chiral chromatography would provide pure diastereomers of compound of formula (I-G).

Scheme - J illustrates formation of compound of formula (I-I) starting from compound of formula (L1) (Reference: CN105884699)

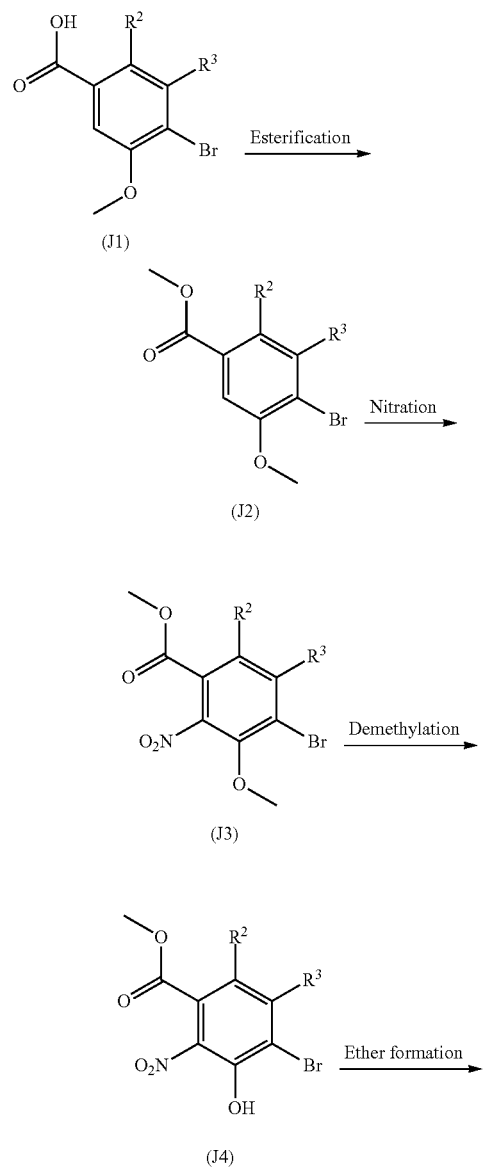

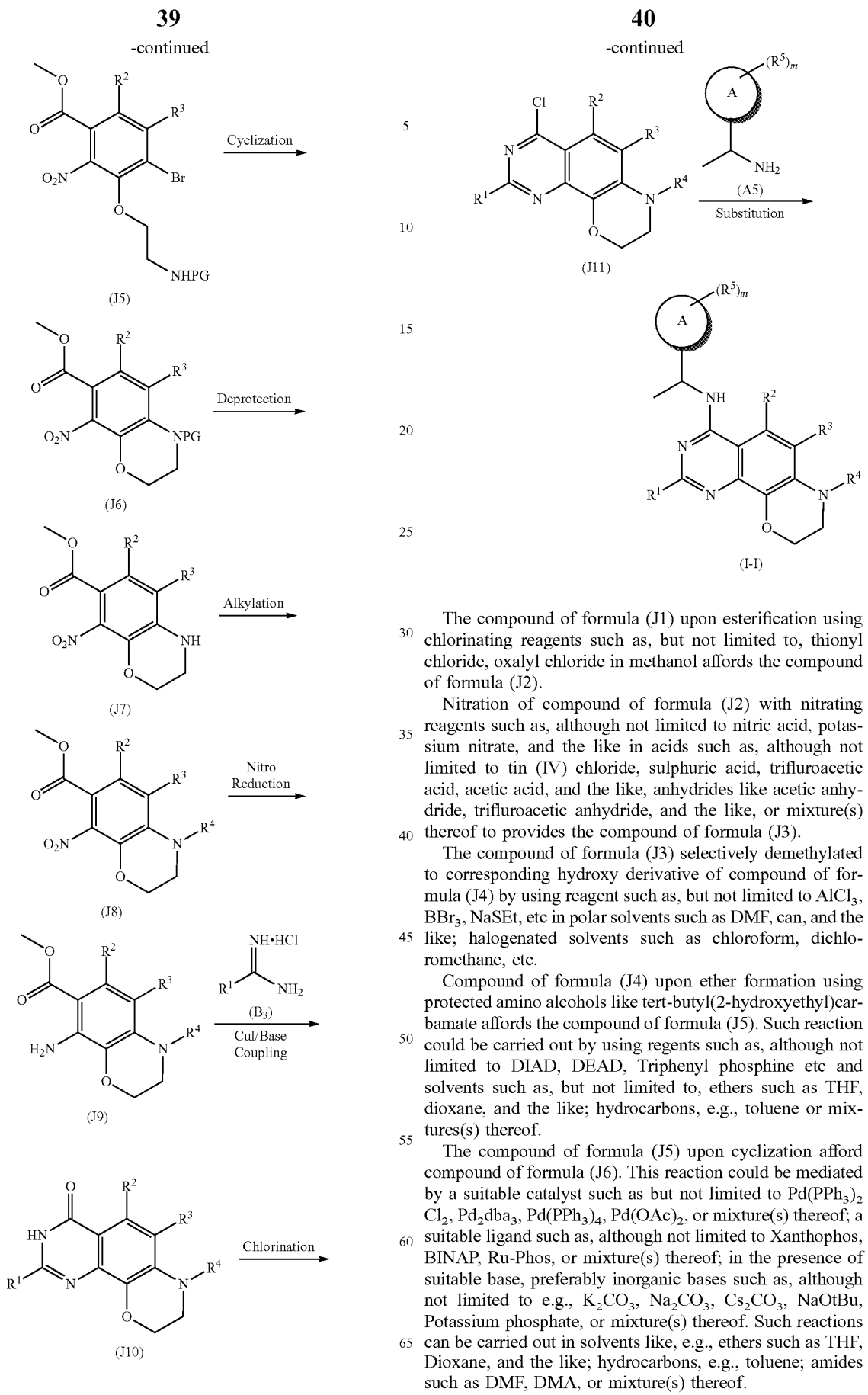

The compound of formula (J1) upon esterification using chlorinating reagents such as, but not limited to, thionyl chloride, oxalyl chloride in methanol affords the compound of formula (J2).

Nitration of compound of formula (J2) with nitrating reagents such as, although not limited to nitric acid, potassium nitrate, and the like in acids such as, although not limited to tin (IV) chloride, sulphuric acid, trifluroacetic acid, acetic acid, and the like, anhydrides like acetic anhydride, trifluroacetic anhydride, and the like, or mixture(s) thereof to provides the compound of formula (J3).

The compound of formula (J3) selectively demethylated to corresponding hydroxy derivative of compound of formula (J4) by using reagent such as, but not limited to $AlCl_3$, $BBr_3$, NaSEt, etc in polar solvents such as DMF, can, and the like; halogenated solvents such as chloroform, dichloromethane, etc.

Compound of formula (J4) upon ether formation using protected amino alcohols like tert-butyl(2-hydroxyethyl)carbamate affords the compound of formula (J5). Such reaction could be carried out by using regents such as, although not limited to DIAD, DEAD, Triphenyl phosphine etc and solvents such as, but not limited to, ethers such as THF, dioxane, and the like; hydrocarbons, e.g., toluene or mixtures(s) thereof.

The compound of formula (J5) upon cyclization afford compound of formula (J6). This reaction could be mediated by a suitable catalyst such as but not limited to $Pd(PPh_3)_2Cl_2$, $Pd_2dba_3$, $Pd(PPh_3)_4$, $Pd(OAc)_2$, or mixture(s) thereof; a suitable ligand such as, although not limited to Xanthophos, BINAP, Ru-Phos, or mixture(s) thereof; in the presence of suitable base, preferably inorganic bases such as, although not limited to e.g., $K_2CO_3$, $Na_2CO_3$, $Cs_2CO_3$, NaOtBu, Potassium phosphate, or mixture(s) thereof. Such reactions can be carried out in solvents like, e.g., ethers such as THF, Dioxane, and the like; hydrocarbons, e.g., toluene; amides such as DMF, DMA, or mixture(s) thereof.

The compound of formula (J6) under acidic condition undergoes deprotection to generate compound of formula (J7). The acids employed for the transformation may involve mineral acids such as hydrochloric acid or organic acids like trifluoroacetic acid.

The compound of formula (J7) upon alkylation or reductive amination using alkyl halides or aldehydes respectively afford compound of formula (J8). Such reaction could be carried out by using inorganic bases such as, although not limited to $K_2CO_3$, $Cs_2CO_3$, and $Na_2CO_3$, and the polar aprotic solvents such as, although not limited to acetone, acetonitrile, and DMF, or mixture(s) thereof, for alkylation and reducing agents like $NaCNBH_4$, $Na(CH_3COO)_3BH$ etc in solvents like polar protic solvents such as but not limited to methanol, ethanol, acetic acid, and DME.

The compound of formula (J8) further converted to corresponding aniline derivatives of compound of formula (J9) through selective reduction of nitro group by using reducing agents, although not limited to, such reducing agents include hydrogenation with palladium on carbon, metal reductions like iron, tin or tin chloride, and the like. Such reduction reaction can be carried out in one or more solvents, e.g. ethers such as THF, 1,4-dioxane, and the like; alcohol such as methanol, ethanol, and the like; under acidic conditions involving ammonium chloride, acetic acid, hydrochloric acid, and the like, or mixture(s) thereof.

The compound of formula (J9) which on coupling with different amidines of compound of formula (B3) gives the compound of formula (J10) as tricyclic building block.

The compound of formula (J10) could be halogenated by using reagents such as, although not limited to, $POCl_3$ and $POBr_3$ or combination with organic bases such as, although not limited to DIPEA and TEA in halogenated solvents such as, although not limited to chlorobenzene, chloroform, and DCM at appropriate temperature to give the compound of formula (J11).

The compound of formula (J11) undergoes a nucleophilic substitution reaction with different chiral benzylic amines of compound of formula (A5) leading to the compound of formula (I-I) using organic basic reagents such as but not limited to DIPEA and TEA in a polar aprotic solvents like dioxane and THF at appropriate temperature.

Scheme - K illustrates formation of compound of formula (I-J) starting from compound of formula (M1) (Refereence: CN105884699)

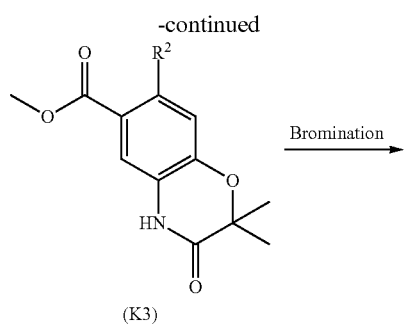

(K3)

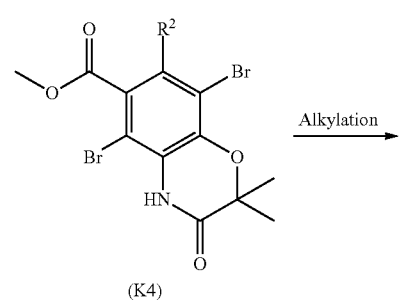

(K4)

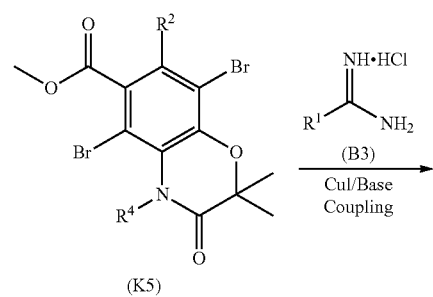

(K5)

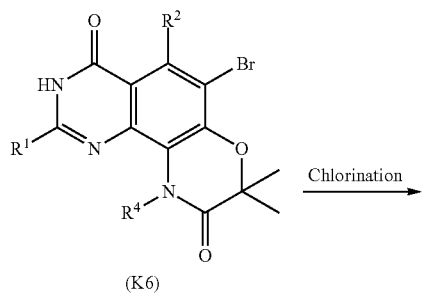

(K6)

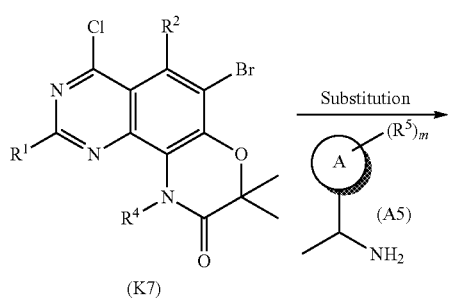

(K7)

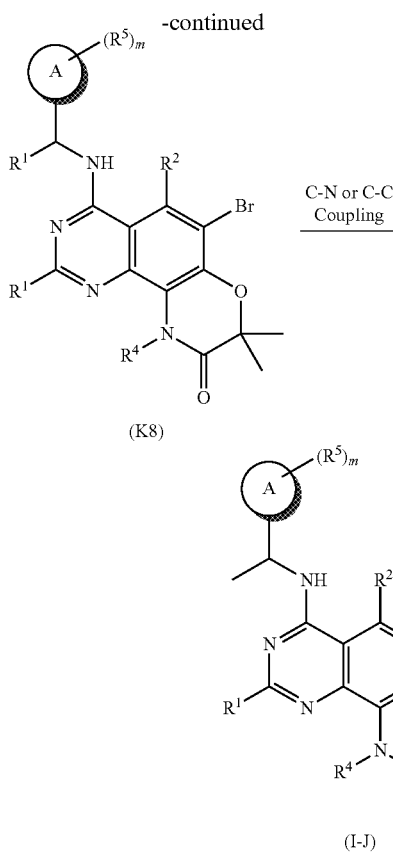

(K8)

C—N or C—C Coupling →

(I-J)

The compound of formula (K1) upon alkylation using ethyl 2-bromo-2-methylpropanoate afford the compound of formula (K2). Such reaction could be carried out by using inorganic bases such as, although not limited to $K_2CO_3$, $Cs_3CO_3$, and $Na_2CO_3$ and organic bases such as, although not limited to DIPEA, TEA, diisopropyl amine, and the like, and the polar aprotic solvents such as, although not limited to acetone, acetonitrile, and DMF, or mixture(s) thereof.

The compound of formula (K2) further converted to corresponding cyclized derivatives of compound of formula (K3) through selective reduction of nitro group by using reducing agents, although not limited to, such reducing agents include hydrogenation with palladium on carbon, metal reductions like iron, tin or tin chloride, and the like. Such reduction reaction can be carried out in one or more solvents, e.g. ethers such as THF, 1,4-dioxane, and the like; alcohol such as methanol, ethanol, and the like; under acidic conditions involving ammonium chloride, acetic acid, hydrochloric acid, and the like, or mixture(s) thereof.

The compound of formula (K3) undergoes halogenation using N-halosuccinimide reagent such as, but not limited to NBS, NIS, and NCS gives corresponding dihalo compound of formula (K4), which on alkylation using alkyl halides afford compound of formula (K5). Such reaction could be carried out by using inorganic bases such as, although not limited to $K_2CO_3$, $Cs_2CO_3$, and $Na_2CO_3$, and the polar aprotic solvents such as, although not limited to acetone, acetonitrile, and DMF, or mixture(s) thereof.

The compound of formula (K5), which on coupling with different amidines of compound of formula (B3) gives compound of formula (K6) (where $R^1$=alkyl) which could be halogenated by using reagents such as, although not limited to $POCl_3$ and $POBr_3$ in combination with organic bases such as, although not limited to DIPEA and TEA in halogenated solvents such as, although not limited to chlorobenzene, chloroform, and DCM at appropriate temperature to give compound of formula (K7).

The compound of formula (K7) undergoes a nucleophilic substitution reaction with different chiral benzylic amines (A5) leading to the compound of formula (K8) using organic basic reagents such as but not limited to DIPEA and TEA in a polar aprotic solvents like dioxane and THF at appropriate temperature.

The compound of formula (K8) could be further functionalized e.g. transition metal catalyzed C—C or C—N coupling reactions like Suzuki or Buchwald reaction utilizing corresponding counterpart, i.e. substituted amine or substituted boronate to gives the compound of formula (I-J).

All intermediates used for the preparation of the compounds of the present invention, were prepared by approaches reported in the literature or by methods known to people skilled in the art of organic synthesis. Detailed experimental procedures for the synthesis of intermediates are given below.

The intermediates and the compounds of the present invention can be obtained in a pure form by any suitable method, for example, by distilling off the solvent in vacuum and/or re-crystallizing the residue obtained from a suitable solvent, such as pentane, diethyl ether, isopropyl ether, chloroform, dichloromethane, ethyl acetate, acetone or their combinations or subjecting it to one of the purification methods, such as column chromatography (e.g., flash chromatography) on a suitable support material such as alumina or silica gel using an eluent such as dichloromethane, ethyl acetate, hexane, methanol, acetone and/or their combinations. Preparative LC-MS method can also be used for the purification of the molecules described herein.

Unless otherwise stated, work-up includes distribution of the reaction mixture between the organic and aqueous phase indicated within parentheses, separation of the layers and drying of the organic layer over sodium sulphate, filtration, and evaporation of the solvent. Purification, unless otherwise mentioned, includes purification by silica gel chromatographic techniques, generally by using a mobile phase with suitable polarity, and purification using selective crystallization.

Salts of compound of formula (I) can be obtained by dissolving the compound in a suitable solvent, for example in a chlorinated hydrocarbon, such as methyl chloride or chloroform or a low molecular weight aliphatic alcohol, for example, ethanol or isopropanol, which is then treated with the desired acid or base as described in Berge S. M. et al., "Pharmaceutical Salts, a review article in Journal of Pharmaceutical sciences volume 66, page 1-19 (1977)" and in "*Handbook of Pharmaceutical Salts—Properties, Selection, and Use,*" by P. Heinrich Stahland Camille G. Wermuth, Wiley-VCH (2002). Lists of suitable salts can also be found in *Remington's Pharmaceutical Sciences,* 18th ed., Mack Publishing Company, Easton, PA, 1990, p. 1445, and *Journal of Pharmaceutical Science,* 66, 2-19 (1977). For example, the salt can be of an alkali metal (e.g., sodium or potassium), alkaline earth metal (e.g., calcium), or ammonium.

The compound of the invention or a composition thereof can potentially be administered as a pharmaceutically acceptable acid-addition, base neutralized or addition salt, formed by reaction with an inorganic acid, such as hydrochloric acid, hydrobromic acid, perchloric acid, nitric acid, thiocyanic acid, sulfuric acid, and phosphoric acid, and organic acids such as formic acid, acetic acid, propionic acid, glycolic acid, lactic acid, pyruvic acid, oxalic acid, malonic acid, succinic acid, maleic acid, and fumaric acid, or by reaction with an inorganic base, such as sodium hydroxide or potassium hydroxide. The conversion to a salt is accomplished by treatment of the base compound with at least a stoichiometric amount of an appropriate acid. Typically, the free base is dissolved in an inert organic solvent such as diethyl ether, ethyl acetate, chloroform, ethanol, methanol, and the like, and the acid is added in a similar solvent. The mixture is maintained at a suitable temperature (e.g., between 0° C. and 50° C.). The resulting salt precipitates spontaneously or can be brought out of solution with a less polar solvent.

The stereoisomers of the compounds of formula (I) of the present invention can be prepared by stereospecific synthesis or resolution of racemic compound mixture by using an optically active amine, acid or complex forming agent, and separating the diastereomeric salt/complex by fractional crystallization or by column chromatography.

Prodrugs of the compounds of the invention can be prepared in situ during the isolation and purification of the compounds, or by separately reacting the purified compound with a suitable derivatizing agent. For example, hydroxy groups can be converted to ester groups via treatment with a carboxylic acid in the presence of a catalyst. Examples of cleavable alcohol prodrug moieties include substituted or unsubstituted, branched or unbranched lower alkyl ester moieties, e.g., ethyl esters, lower alkenyl esters, di-lower alkylamino lower-alkyl esters, e.g., dimethylaminoethyl ester, acylamino lower alkyl esters, acyloxy lower alkyl esters (e.g., pivaloyloxymethyl ester), aryl esters, e.g., phenyl ester, aryl-lower alkyl esters, e.g., benzyl ester, optionally substituted, e.g., with methyl, halo, or methoxy substituents aryl and aryl-lower alkyl esters, amides, lower-alkyl amides, di-lower alkyl amides, and hydroxy amides.

The compounds of formula (I) of the present invention can exist in tautomeric forms, such as keto-enol tautomers. Such tautomeric forms are contemplated as an aspect of the present invention and such tautomers may be in equilibrium or predominant in one of the forms.

The present invention also embraces isotopically-labelled compounds of the present invention which are identical to those recited herein, but for the fact that one or more atoms are replaced by an atom having an atomic mass or mass number different from the atomic mass or mass number usually found in abundance in nature. Examples of isotopes that can be incorporated into compounds of the invention include isotopes of hydrogen, carbon, nitrogen, oxygen, phosphorus, fluorine and chlorine and iodine, such as $^{2}H$, $^{3}H$, $^{11}C$, $^{13}C$, $^{14}C$, $^{15}N$, $^{18}O$, $^{17}O$, $^{31}P$, $^{32}P$, $^{35}S$, $^{18}F$, $^{36}Cl$, and $^{123}I$ respectively.

Thus the present invention further provides a pharmaceutical composition, containing the compounds of the general formula (I) as defined above, its tautomeric form, its stereoisomer, its polymorph, its solvate, its pharmaceutically acceptable salts in combination with pharmaceutically acceptable carriers, diluents, excipients, and the like.

The pharmaceutically acceptable carrier or excipient is preferably one that is chemically inert to the compound of the invention and one that has no detrimental side effects or toxicity under the conditions of use. Such pharmaceutically acceptable carriers or excipients include saline (e.g., 0.9% saline), Cremophor EL® (which is a derivative of castor oil and ethylene oxide available from Sigma Chemical Co., St. Louis, MO) (e.g., 5% Cremophor EL/5% ethanol/90% saline, 10% Cremophor EL/90% saline, or 50% Cremophor EL/50% ethanol), propylene glycol (e.g., 40% propylene glycol/10% ethanol/50% water), polyethylene glycol (e.g., 40% PEG 400/60% saline), and alcohol (e.g., 40% ethanol/60% water). A preferred pharmaceutical carrier is polyethylene glycol, such as PEG 400, and particularly a composition comprising 40% PEG 400 and 60% water or saline. The choice of carrier will be determined in part by the particular compound chosen, as well as by the particular method used to administer the composition. Accordingly, there is a wide variety of suitable formulations of the pharmaceutical composition of the present invention.

Formulations for oral, aerosol, parenteral, subcutaneous, intravenous, intraarterial, intramuscular, intrathecal, intraperitoneal, rectal, and vaginal administration can be developed for the compound of formula (I), its tautomeric form, its stereoisomer, its polymorph, its solvate, and its pharmaceutically acceptable salt.

The pharmaceutical compositions can be administered parenterally, e.g., intravenously, intraarterially, subcutaneously, intradermally, intrathecally, or intramuscularly. Thus, the invention provides compositions for parenteral administration that comprise a solution of the compound of the invention dissolved or suspended in an acceptable carrier suitable for parenteral administration, including aqueous and non-aqueous, isotonic sterile injection solutions.

Overall, the requirements for effective pharmaceutical carriers for parenteral compositions are well known to those of ordinary skill in the art. See *Pharmaceutics and Pharmacy Practice*, J.B. Lippincott Company, Philadelphia, PA, Banker and Chalmers, eds., pages 238-250 (1982), and *ASHP Handbook on Injectable Drugs*, Toissel, 4th ed., pages 622-630 (1986). Such compositions include solutions containing anti-oxidants, buffers, bacteriostats, and solutes that render the formulation isotonic with the blood of the intended recipient, and aqueous and non-aqueous sterile suspensions that can include suspending agents, solubilizers, thickening agents, stabilizers, and preservatives. The compound can be administered in a physiologically acceptable diluent in a pharmaceutical carrier, such as a sterile liquid or mixture of liquids, including water, saline, aqueous dextrose and related sugar solutions, an alcohol, such as ethanol, isopropanol (for example in topical applications), or hexadecyl alcohol, glycols, such as propylene glycol or polyethylene glycol, dimethylsulfoxide, glycerol ketals, such as 2,2-dimethyl-1,3-dioxolane-4-methanol, ethers, such as poly(ethyleneglycol) 400, an oil, a fatty acid, a fatty acid ester or glyceride, or an acetylated fatty acid glyceride, with or without the addition of a pharmaceutically acceptable surfactant, such as a soap or a detergent, suspending agent, such as pectin, carbomers, methylcellulose, hydroxypropylmethylcellulose, or carboxymethylcellulose, or emulsifying agents and other pharmaceutical adjuvants.

Oils useful in parenteral formulations include petroleum, animal, vegetable, and synthetic oils. Specific examples of oils useful in such formulations include peanut, soybean, sesame, cottonseed, corn, olive, petrolatum, and mineral oil. Suitable fatty acids for use in parenteral formulations include oleic acid, stearic acid, and isostearic acid. Ethyl oleate and isopropyl myristate are examples of suitable fatty acid esters.

Suitable soaps for use in parenteral formulations include fatty alkali metal, ammonium, and triethanolamine salts, and suitable detergents include (a) cationic detergents such as, for example, dimethyl dialkyl ammonium halides, and alkyl pyridinium halides, (b) anionic detergents such as, for example, alkyl, aryl, and olefin sulfonates, alkyl, olefin, ether, and monoglyceride sulfates, and sulfosuccinates, (c) nonionic detergents such as, for example, fatty amine oxides, fatty acid alkanolamides, and polyoxyethylene polypropylene copolymers, (d) amphoteric detergents such as, for example, alkyl-β-aminopropionates, and 2-alkyl-imidazoline quaternary ammonium salts, and (e) mixtures thereof.

The parenteral formulations typically will contain from about 0.5% or less to about 25% or more by weight of a compound of the invention in solution. Preservatives and buffers can be used. In order to minimize or eliminate irritation at the site of injection, such compositions can contain one or more nonionic surfactants having a hydrophile-lipophile balance (HLB) of from about 12 to about 17. The quantity of surfactant in such formulations will typically range from about 5% to about 15% by weight. Suitable surfactants include polyethylene sorbitan fatty acid esters, such as sorbitan monooleate and the high molecular weight adducts of ethylene oxide with a hydrophobic base, formed by the condensation of propylene oxide with propylene glycol. The parenteral formulations can be presented in unit-dose or multi-dose sealed containers, such as ampoules and vials, and can be stored in a freeze-dried (lyophilized) condition requiring only the addition of the sterile liquid excipient, for example, water, for injections, immediately prior to use. Extemporaneous injection solutions and suspensions can be prepared from sterile powders, granules, and tablets.

Topical formulations, including those that are useful for transdermal drug release, are well known to those of skill in the art and are suitable in the context of the present invention for application to skin.

Formulations suitable for oral administration can consist of (a) liquid solutions, such as an effective amount of a compound of the invention dissolved in diluents, such as water, saline, or orange juice; (b) capsules, sachets, tablets, lozenges, and troches, each containing a pre-determined amount of the compound of the invention, as solids or granules; (c) powders; (d) suspensions in an appropriate liquid; and (e) suitable emulsions. Liquid formulations can include diluents, such as water and alcohols, for example, ethanol, benzyl alcohol, and the polyethylene alcohols, either with or without the addition of a pharmaceutically acceptable surfactant, suspending agent, or emulsifying agent. Capsule forms can be of the ordinary hard- or soft-shelled gelatin type containing, for example, surfactants, lubricants, and inert fillers, such as lactose, sucrose, calcium phosphate, and cornstarch. Tablet forms can include one or more of lactose, sucrose, mannitol, corn starch, potato starch, alginic acid, microcrystalline cellulose, acacia, gelatin, guar gum, colloidal silicon dioxide, croscarmellose sodium, talc, magnesium stearate, calcium stearate, zinc stearate, stearic acid, and other excipients, colorants, diluents, buffering agents, disintegrating agents, moistening agents, preservatives, flavoring agents, and pharmacologically compatible excipients. Lozenge forms can comprise the compound ingredient in a flavor, usually sucrose and acacia or tragacanth, as well as pastilles comprising a compound of the invention in an inert base, such as gelatin and glycerin, or sucrose and acacia, emulsions, gels, and the like containing, in addition to the compound of the invention, such excipients as are known in the art.

A compound of the present invention, alone or in combination with other suitable components, can be made into aerosol formulations to be administered via inhalation. A compound of the invention is preferably supplied in finely divided form along with a surfactant and propellant. Typical percentages of the compounds of the invention can be about 0.01% to about 20% by weight, preferably about 1% to about 10% by weight. The surfactant must, of course, be nontoxic, and preferably soluble in the propellant. Representative of such surfactants are the esters or partial esters of fatty acids containing from 6 to 22 carbon atoms, such as caproic, octanoic, lauric, palmitic, stearic, linoleic, linolenic, olesteric and oleic acids with an aliphatic polyhydric alcohol or its cyclic anhydride. Mixed esters, such as mixed or natural glycerides can be employed. The surfactant can constitute from about 0.1% to about 20% by weight of the composition, preferably from about 0.25% to about 5%. The balance of the composition is ordinarily propellant. A carrier can also be included as desired, e.g., lecithin, for intranasal delivery. These aerosol formulations can be placed into acceptable pressurized propellants, such as dichlorodifluoromethane, propane, nitrogen, and the like. They also can be formulated as pharmaceuticals for non-pressured preparations, such as in a nebulizer or an atomizer. Such spray formulations can be used to spray mucosa.

Additionally, the compound of the invention can be made into suppositories by mixing with a variety of bases, such as emulsifying bases or water-soluble bases. Formulations suitable for vaginal administration can be presented as pessaries, tampons, creams, gels, pastes, foams, or spray formulas containing, in addition to the compound ingredient, such carriers as are known in the art to be appropriate.

The concentration of the compound in the pharmaceutical formulations can vary, e.g., from less than about 1% to about 10%, to as much as about 20% to about 50% or more by weight, and can be selected primarily by fluid volumes, and viscosities, in accordance with the particular mode of administration selected.

For example, a typical pharmaceutical composition for intravenous infusion could be made up to contain 250 ml of sterile Ringer's solution, and 100 mg of at least one compound of the invention. Actual methods for preparing parenterally administrable compounds of the invention will be known or apparent to those skilled in the art and are described in more detail in, for example, *Remington's Pharmaceutical Science* ($17^{th}$ ed., Mack Publishing Company, Easton, PA, 1985).

It will be appreciated by one of ordinary skill in the art that, in addition to the aforesaid described pharmaceutical compositions, the compound of the invention can be formulated as inclusion complexes, such as cyclodextrin inclusion complexes, or liposomes. Liposomes can serve to target a compound of the invention to a particular tissue, such as lymphoid tissue or cancerous hepatic cells. Liposomes can also be used to increase the half-life of a compound of the invention. Many methods are available for preparing liposomes, as described in, for example, Szoka et al., *Ann. Rev. Biophys. Bioeng.*, 9, 467 (1980) and U.S. Pat. Nos. 4,235,871, 4,501,728, 4,837,028, and 5,019,369.

The compounds of the invention can be administered in a dose sufficient to treat the disease, condition or disorder. Such doses are known in the art (see, for example, the *Physicians' Desk Reference* (2004)). The compounds can be administered using techniques such as those described in, for example, Wasserman et al., Cancer, 36, pp. 1258-1268 (1975) and *Physicians' Desk Reference,* 58th ed., Thomson PDR (2004).

Suitable doses and dosage regimens can be determined by conventional range-finding techniques known to those of ordinary skill in the art. Generally, treatment is initiated with smaller dosages that are less than the optimum dose of the compound of the present invention. Thereafter, the dosage is increased by small increments until the optimum effect under the circumstances is reached. The present method can involve the administration of about 0.1 µg to about 50 mg of at least one compound of the invention per kg body weight of the individual. For a 70 kg patient, dosages of from about 10 μg to about 200 mg of the compound of the invention would be more commonly used, depending on a patient's physiological response.

By way of example and not intending to limit the invention, the dose of the pharmaceutically active agent(s) described herein for methods of treating a disease or condition as described above can be about 0.001 to about 1 mg/kg body weight of the subject per day, for example, about 0.001 mg, 0.002 mg, 0.005 mg, 0.010 mg, 0.015 mg, 0.020 mg, 0.025 mg, 0.050 mg, 0.075 mg, 0.1 mg, 0.15 mg, 0.2 mg, 0.25 mg, 0.5 mg, 0.75 mg, or 1 mg/kg body weight per day. The dose of the pharmaceutically active agent(s) described herein for the described methods can be about 1 to about 1000 mg/kg body weight of the subject being treated per day, for example, about 1 mg, 2 mg, 5 mg, 10 mg, 15 mg, 20 mg, 25 mg, 50 mg, 75 mg, 100 mg, 150 mg, 200 mg, 250 mg, 500 mg, 750 mg, or 1000 mg/kg body weight per day.

The terms "treat," "ameliorate," and "inhibit," as well as words stemming therefrom, as used herein, do not necessarily imply 100% or complete treatment, amelioration, or inhibition. Rather, there are varying degrees of treatment, amelioration, and inhibition of which one of ordinary skill in the art recognizes as having a potential benefit or therapeutic effect. In this respect, the disclosed methods can provide any amount of any level of treatment, amelioration, or inhibition of the disorder in a mammal. For example, a disorder, including symptoms or conditions thereof, may be reduced by, for example, 100%, 90%, 80%, 70%, 60%, 50%, 40%, 30%, 20%, or 10%. Furthermore, the treatment, amelioration, or inhibition provided by the inventive method can include treatment, amelioration, or inhibition of one or more conditions or symptoms of the disorder, e.g., cancer. Also, for purposes herein, "treatment," "amelioration," or "inhibition" can encompass delaying the onset of the disorder, or a symptom or condition thereof.

In accordance with the invention, the term subject includes an "animal" which in turn includes a mammal such as, without limitation, the order Rodentia, such as mice, and the order Lagomorpha, such as rabbits. In one aspect, the mammals are from the order Carnivora, including Felines (cats) and Canines (dogs). In another aspect, the mammals are from the order Artiodactyla, including Bovines (cows) and Swine (pigs) or of the order Perssodactyla, including Equines (horses). In a further aspect, the mammals are of the order Primates, Ceboids, or Simoids (monkeys) or of the order Anthropoids (humans and apes). In yet another aspect, the mammal is human.

Compounds belonging to this invention can be used for the treatment of the various cancers mentioned below which harbor hyperactive or aberrantly activated signaling pathways involving SOS1 proteins.

Compounds belonging to this invention can be used for the treatment of the various cancers mentioned below which harbor hyperactive or aberrantly activated signaling pathways involving RAS and or SOS1 proteins.

The compounds, its tautomeric form, its stereoisomer, its pharmaceutically acceptable salt, its polymorph, or its solvate its combination with suitable medicament, its pharmaceutical composition thereof as described hereinbelow can be suitable for treating diseases characterized by excessive or abnormal cell proliferation such as cancer.

The cancer, tumor, and other proliferative diseases can be treated with the compounds of the present invention is but not limited to:

1. Cancers of the head and neck, e.g. cancers of nasal cavity, paranasal sinuses, nasopharynx, oral cavity (including lip, gum, alveolar ridge, retromolar trigone, floor of mouth, tongue, hard palate, buccal mucosa), oropharynx (including base of tongue, tonsil, tonsillar pillar, soft palate, tonsillar fossa, pharyngeal wall), middle ear, larynx (including supraglottis, glottis, subglottis, vocal cords, hypopharynx, salivary glands (including minor salivary glands).
2. Cancers of the lung, e.g. non-small cell lung cancer (NSCLC) (squamous cell carcinoma, spindle cell carcinoma, adenocarcinoma, large cell carcinoma, clear cell carcinoma, bronchioalveolar), small cell lung cancer (SCLC) (oat cell cancer, intermediate cell cancer, combined oat cell cancer), class 3 BRAF-mutant lung cancer.
3. Neoplasms of the mediastinum, e.g. neurogenic tumors (including neurofibroma, neurilemoma, malignant schwannoma, neurosarcoma, ganglioneuroblastoma, ganglioneuroma, neuroblastoma, pheochromocytoma, paraganglioma), germ cell tumors (including seminoma, teratoma, non-seminoma), thymic tumors (including thymoma, thymolipoma, thymic carcinoma, thymic carcinoid), mesenchymal tumors (including fibroma, fibrosarcoma, lipoma, liposarcoma, myxoma, mesothelioma, leiomyoma, leiomyosarcoma, rhabdomyosarcoma, xanthogranuloma, mesenchymoma, hemangioma, hemangioendothelioma, hemangiopericytoma, lymphangioma, lymphangiopericytoma, lymphangiomyoma).
4. Cancers of the gastrointestinal (GI) tract, e.g. cancers of the esophagus, stomach (gastric cancer), esophagiogastric adenocarcinoma pancreas, liver and biliary tree (including hepatocellular carcinoma (HCC), e.g. childhood HCC, fibrolamellar HCC, combined HCC, spindle cell HCC, clear cell HCC, giant cell HCC, carcinosarcoma HCC, sclerosing HCC; hepatoblastoma; cholangiocarcinoma.
5. Cholangiocellular carcinoma; hepatic cystadenocarcinoma; angiosarcoma, hemangioendothelioma, leiomyosarcoma, malignant schwannoma, fibrosarcoma, Klatskin tumor), gall bladder, extrahepatic bile ducts, small intestine (including duodenum, jejunum, ileum), large intestine (including cecum, colon, rectum, anus; colorectal cancer, gastrointestinal stroma tumor (GIST)), genitourinary system (including kidney, e.g. renal pelvis, renal cell carcinoma (RCC), nephroblastoma (Wilms' tumor), hypernephroma, Grawitz tumor; ureter; urinary bladder, e.g. urachal cancer, urothelial cancer; urethra, e.g. distal, bulbomembranous, prostatic; prostate (androgen dependent, androgen independent, castration resistant, hormone independent, hormone refractory), penis).
6. Cancers of the testis, e.g. seminomas, non-seminomas.
7. Gynecologic cancers e.g. cancers of the ovary, fallopian tube, peritoneum, cervix, vulva, vagina, uterine body (including endometrium, fundus).
8. Cancers of the breast, e.g. mammary carcinoma (infiltrating ductal, colloid, lobular invasive, tubular, adenocystic, papillary, medullary, mucinous), hormone receptor positive breast cancer (estrogen receptor positive breast cancer, progesterone receptor positive breast cancer), Her2 positive breast cancer, triple negative breast cancer, Paget's disease of the breast.
9. Cancers of the endocrine system, e.g. cancers of the endocrine glands, thyroid gland (thyroid carcinomas/ tumors; papillary, follicular, anaplastic, medullary), parathyroid gland (parathyroid carcinoma/tumor), adrenal cortex (adrenal cortical carcinoma/tumors), pituitary gland (including prolactinoma, craniopharyngioma), thymus, adrenal glands, pineal gland, carotid body, islet cell tumors, paraganglion, pancreatic endocrine tumors (PET; non-functional PET, PPoma, gastrinoma, insulinoma, VIPoma, glucagonoma, somatostatinoma, GRFoma, ACTHoma), carcinoid tumors.

10. Sarcomas of the soft tissues, e.g. fibrosarcoma, fibrous histiocytoma, liposarcoma, leiomyosarcoma, rhabdomyosarcoma, angiosarcoma, lymphangiosarcoma, Kaposi's sarcoma, glomus tumor, hemangiopericytoma, synovial sarcoma, giant cell tumor of tendon sheath, solitary fibrous tumor of pleura and peritoneum, diffuse mesothelioma, malignant peripheral nerve sheath tumor (MPNST), granular cell tumor, clear cell sarcoma, melanocytic schwannoma, plexosarcoma, neuroblastoma, ganglioneuroblastoma, neuroepithelioma, extraskeletal Ewing's sarcoma, paraganglioma, extraskeletal chondrosarcoma, extraskeletal osteosarcoma, mesenchymoma, alveolar soft part sarcoma, epithelioid sarcoma, extrarenal rhabdoid tumor, desmoplastic small cell tumor.

11. Sarcomas of the bone, e.g. myeloma, reticulum cell sarcoma, chondrosarcoma (including central, peripheral, clear cell, mesenchymal chondrosarcoma), osteosarcoma (including parosteal, periosteal, high-grade surface, small cell, radiation-induced osteosarcoma, Paget's sarcoma), Ewing's tumor, malignant giant cell tumor, adamantinoma, (fibrous) histiocytoma, fibrosarcoma, chordoma, small round cell sarcoma, hemangioendothelioma, hemangiopericytoma, osteochondroma, osteoid osteoma, osteoblastoma, eosinophilic granuloma, chondroblastoma;

12. Mesothelioma, e.g. pleural mesothelioma, peritoneal mesothelioma.

13. Cancers of the skin, e.g. basal cell carcinoma, squamous cell carcinoma, Merkel's cell carcinoma, melanoma (including cutaneous, superficial spreading, lentigo maligna, acral lentiginous, nodular, intraocular melanoma), actinic keratosis, eyelid cancer, class 3 BRAF-mutant melanoma.

14. Neoplasms of the central nervous system and brain, e.g. astrocytoma (cerebral, cerebellar, diffuse, fibrillary, anaplastic, pilocytic, protoplasmic, gemistocytary), glioblastoma, gliomas, oligodendrogliomas, oligoastrocytomas, ependymomas, ependymoblastomas, choroid plexus tumors, medulloblastomas, meningiomas, schwannomas, hemangioblastomas, hemangiomas, hemangiopericytomas, neuromas, ganglioneuromas, neuroblastomas, retinoblastomas, neurinomas (e.g. acoustic), spinal axis tumors.

15. Lymphomas and Leukemias, e.g. B-cell non-Hodgkin lymphomas (NHL) (including small lymphocytic lymphoma (SLL), lymphoplasmacytoid lymphoma (LPL), mantle cell lymphoma (MCL), follicular lymphoma (FL), diffuse large cell lymphoma (DLCL), Burkitt's lymphoma (BL)), T-cell non-Hodgkin lymphomas (including anaplastic large cell lymphoma (ALCL), adult T-cell leukemia/lymphoma (ATLL), cutaneous T-cell lymphoma (CTCL), peripheral T-cell lymphoma (PTCL)), lymphoblastic T-cell lymphoma (T-LBL), adult T-cell lymphoma, lymphoblastic B-cell lymphoma (B-LBL), immunocytoma, chronic B-cell lymphocytic leukemia (B-CLL), chronic T-cell lymphocytic leukemia (T-CLL) B-cell small lymphocytic lymphoma (B-SLL), cutaneous T-cell lymphoma (CTLC), primary central nervous system lymphoma (PCNSL), immunoblastoma, Hodgkin's disease (HD) (including nodular lymphocyte predominance HD (NL-PHD), nodular sclerosis HD (NSHD), mixed-cellularity HD (MCHD), lymphocyte-rich classic HD, lymphocyte-depleted HD (LDHD)), large granular lymphocyte leukemia (LGL), chronic myelogenous leukemia (CML), acute myelogenous/myeloid leukemia (AML), acute lymphatic/lymphoblastic leukemia (ALL), acute promyelocytic leukemia (APL), chronic lymphocytic/lymphatic leukemia (CLL), prolymphocytic leukemia (PLL), hairy cell leukemia, chronic myelogenous/myeloid leukemia (CML), myeloma, plasmacytoma, multiple myeloma (MM), plasmacytoma, myelodysplastic syndromes (MDS), chronic myelomonocytic leukemia (CMML).

16. Cancers of unknown primary site (CUP).

17. Epithelial cancers, e.g. squamous cell carcinoma (SCC) (carcinoma in situ, superficially invasive, verrucous carcinoma, pseudosarcoma, anaplastic, transitional cell, lymphoepithelial), adenocarcinoma (AC) (well-differentiated, mucinous, papillary, pleomorphic giant cell, ductal, small cell, signet-ring cell, spindle cell, clear cell, oat cell, colloid, adenosquamous, mucoepidermoid, adenoid cystic), mucinous cystadenocarcinoma, acinar cell carcinoma, large cell carcinoma, small cell carcinoma, neuroendocrine tumors (small cell carcinoma, paraganglioma, carcinoid), oncocytic carcinoma. and 18. Nonepithelial cancers, e.g. sarcomas (fibrosarcoma, chondrosarcoma, rhabdomyosarcoma, leiomyosarcoma, hemangiosarcoma, giant cell sarcoma, lymphosarcoma, fibrous histiocytoma, liposarcoma, angiosarcoma, lymphangiosarcoma, neurofibrosarcoma), lymphoma, melanoma, germ cell tumors, hematological neoplasms, mixed and undifferentiated carcinomas.

All cancers mentioned above which are characterized by their specific location or origin in the body are meant to include both the primary tumors and the metastatic tumors derived therefrom.

All cancers mentioned above may be further differentiated by their histopathological classification.

The compound of formula I, its tautomeric form, its stereoisomer, its pharmaceutically acceptable salt, its polymorph, its solvate, its combination with suitable medicament, or its pharmaceutical composition as described herein above can be suitable for treating diseases such as Neurofibromatosis type 1 (NF1), Noonan Syndrome with Multiple Lentigines (NSML), Noonan-like/multiple giant cell lesion syndrome, Hereditary Gingival Fibromatosis (HGF), Capillary Malformation-Arteriovenous Malformation Syndrome (CM-AVM), Legius Syndrome, Acute *Staphylococcus aureus* infection (Pediatric Patients), Pure mucosal neuroma syndrome, Fibrous Epulis, Acute Respiratory Distress syndrome/Acute Lung injury and Sepsis, Costello Syndrome (CS), and Cardio-Facio-cutaneous Syndrome (CFC Syndrome).

The compound of formula I, its tautomeric form, its stereoisomer, its pharmaceutically acceptable salt, its polymorph, its solvate, its combination with suitable medicament, or its pharmaceutical composition as described hereinabove may be used in therapeutic regimens in the context of first line, second line, or any further line of treatments.

The compound of formula I, its tautomeric form, its stereoisomer, its pharmaceutically acceptable salt, its polymorph, its solvate, its combination with suitable medicament, or its pharmaceutical composition as described hereinabove may be used for the prevention, short-term or long term treatment of the above-mentioned diseases, optionally also in combination with radiotherapy and/or surgery.

The compound of formula I, its tautomeric form, its stereoisomer, its pharmaceutically acceptable salt, its polymorph, its solvate, belonging to the present invention can be combined with other agents such as radiation, chemotherapeutic agents and/or targeted agents in multiple cancers and their subtypes as mentioned above. The agents that can be used for combination therapy include targeted agents such as inhibitors of RTKs, cyclin-dependent kinase (CDK) inhibitors, Ser-Thr kinase inhibitors, non-receptor tyrosine kinase inhibitors, inhibitors of epigenetic mechanism such as histone methyl transferases (HMTs), DNA methyl transferases (DNMTs), protein arginine methyl transferases (PRMTs), RAS inhibitors, KRAS inhibitors, MEK inhibitors, ERK1/2 inhibitors, Focal Adhesion Kinase (FAK) inhibitors, PI3K inhibitors, AKT inhibitors, and mTOR inhibitors.

The following examples are provided to further illustrate the present invention and should not be constructed in any way to limit the scope of the present invention.

All $^1$HNHR spectra were determined in the solvent indicated and chemical shifts are reported in δ units downfield from the internal standard tetramethylsilane (TMS) and interproton coupling constants are reported in Hertz (Hz).

Some of the representative examples of the present invention were prepared by following one or more reaction schemes as described above.

The invention is further illustrated by the following examples which are provided merely to be exemplary of the invention and do not limit the scope of the invention. The examples set forth below demonstrate the synthetic procedures for the preparation of the relative compounds. Certain modifications and equivalents will be apparent to those skilled in the art and are intended to be included within the scope of the invention. The patents and patent applications mentioned in the description are incorporated herein by reference.

The notation "or1" "or2" and "or3" in structural formulae denote that chiral center is ascertained to be either R or S, herein absolute configuration is not determined.

Intermediate Synthesis:

Intermediate-1: (R/S)-4'-(1-aminoethyl)-1'-methyl-spiro[cyclopropane-1,3'-indolin]-2'-one hydrochloride

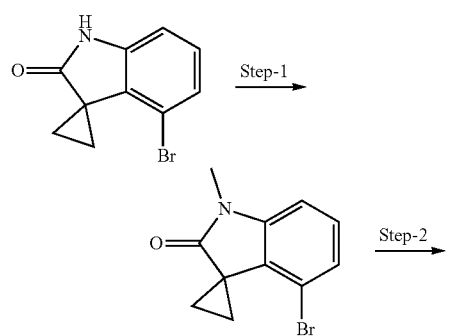

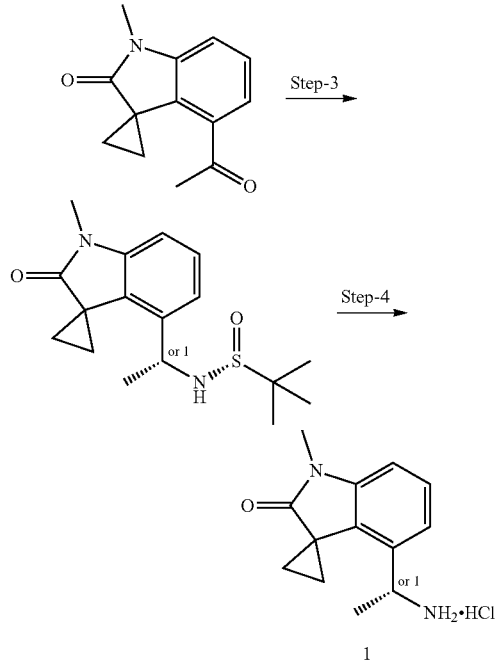

Step-1: 4'-bromo-1'-methylspiro[cyclopropane-1,3'-indolin]-2'-one

To a stirred solution of 4'-bromospiro[cyclopropane-1,3'-indolin]-2'-one (10 g, 42.0 mmol) (commercially available) in dry DMF (100 ml), NaH (1.210 g, 50.4 mmol) was added at 0° C. and stirred for 15 min, followed by addition of MeI (3.94 ml, 63.0 mmol) at 0° C., reaction mixture was stirred at room temperature for 3 h. After completion of reaction, the reaction mixture was quenched with ice water solution. The formed solid filtered and dried under vacuo to afford 4'-bromo-1'-methylspiro[cyclopropane-1,3'-indolin]-2'-one (9.0 g, 85% yield) as brown solid.

MS (ES+) m/z=254.21 (M+2).

$^1$H NMR (400 MHz, DMSO-$d_6$) δ 7.25-7.10 (m, 3H), 3.21 (s, 3H), 2.17 (q, J=3.9 Hz, 2H), 1.40 (q, J=3.9 Hz, 2H).

Step-2: 4'-acetyl-1'-methyl spiro[cyclopropane-1,3'-indolin]-2'-one

A mixture of 4'-bromo-1'-methylspiro[cyclopropane-1,3'-indolin]-2'-one (9.0 g, 35.7 mmol), tributyl(1-ethoxyvinyl)stannane (16.76 g, 46.4 mmol), PdCl$_2$(PPh$_3$)$_2$(2.506 g, 3.57 mmol) and triethylamine (9.95 ml, 71.4 mmol) in 1,4-Dioxane (50 ml) was stirred at 100° C. for 16 h. After completion of reaction, mixture was cooled to room temperature and filtered through celite bed. Filtrate was concentrated and the residue was suspended in 2N HCl (20 ml) and THF (50 ml) and stirred for 30 min and then extracted with ethyl acetate (500 ml×2). The combined organic layer was washed with brine (100 ml), dried over sodium sulfate, filtered and concentrated in vacuo to get crude (7.3 g). The crude residue was purified by column chromatography using eluent (0-30%) ethyl acetate in hexane to obtain 4'-acetyl-1'-methylspiro[cyclopropane-1,3'-indolin]-2'-one (5.1 g, 66.4% yield) as light brown solid.

MS (ES+) m/z=216.45 (M+).

¹H NMR (400 MHz, DMSO-d₆) δ 7.57 (dd, J=7.9, 1.1 Hz, 1H), 7.42 (t, J=7.9 Hz, 1H), 7.31 (dd, J=7.8, 1.1 Hz, 1H), 3.23 (s, 3H), 2.56 (s, 3H), 2.17-2.05 (m, 2H), 1.35-1.38 (m, 2H).

Step-3: (R)-2-methyl-N—((R/S)-1-(1'-methyl-2'-oxospiro[cyclopropane-1,3'-indolin]-4'-yl)ethyl)propane-2-sulfinamide To a stirred solution of 4'-acetyl-1'-methylspiro[cyclopropane-1,3'-indolin]-2'-one (5.0 g, 23.23 mmol) and (R)-2-methylpropane-2-sulfinamide (3.38 g, 27.9 mmol) in THF (50 ml) was added Titanium (IV) isopropoxide (17.02 ml, 58.1 mmol) under nitrogen atmosphere. The resulting reaction mass was heated to 80° C. for 16 h. After completion of reaction, reaction mixture was allowed to cooled −78° C., followed by addition of sodium borohydride (3.08 g, 81 mmol) then temperature of the mixture was gradually raised to room temperature and stirred for 2 h. Then reaction mass was poured into ice cold water (50 ml), then added ethyl acetate (500 ml) and stirred for 30 min. Filtered the residue and washed with ethyl acetate, organic layer was separated and dried with anhydrous Na₂SO₄ and concentrated under reduced pressure to get the crude product. The crude product was purified by column chromatography by using eluent 60% ethyl acetate in hexane to obtain (R)-2-methyl-N—((R/S)-1-(1'-methyl-2'-oxospiro[cyclopropane-1,3'-indolin]-4'-yl)ethyl)propane-2-sulfinamide (1.9 g, 25.5% yield) as sticky liquid.

MS (ES+) m/z=320.53 (M+).

¹H NMR (400 MHz, DMSO-d₆) δ 7.31-7.26 (m, 1H), 7.20 (dd, J=8.1, 1.1 Hz, 1H), 6.97 (dd, J=7.6, 1.1 Hz, 1H), 5.53 (d, J=5.9 Hz, 1H), 4.07-4.01 (m, 1H), 3.20 (s, 3H), 2.11-2.04 (m, 1H), 1.69-1.74 (m, 1H), 1.55-1.46 (m, 2H), 1.36 (d, J=6.7 Hz, 3H), 1.09 (s, 9H).

Step-4: (R/S)-4'-(1-aminoethyl)-1'-methylspiro[cyclopropane-1,3'-indolin]-2'-one hydrochloride To a stirred solution of (R)-2-methyl-N—((R/S)-1-(1'-methyl-2'-oxospiro[cyclopropane-1,3'-indolin]-4'-yl)ethyl) propane-2-sulfinamide (1.9 g, 5.93 mmol) in DCM (20 ml) was added a dropwise solution of 4M HCl in Dioxane (7.41 ml, 29.6 mmol) at 0° C., under nitrogen atm and continued the stirring for 3 h. After completion of reaction distilled the solvent under reduced pressure at 35° C., resulting residue was triturated with diethyl ether (15 ml), filtered and solid was dried in vacuo to obtain (R/S)-4'-(1-aminoethyl)-1'-methylspiro[cyclopropane-1,3'-indolin]-2'-one hydrochloride (0.5 g, 33.4% yield) as yellow solid.

¹H NMR (400 MHz, DMSO-d₆) δ 8.54 (s, 2H), 7.39 (d, J=1.8 Hz, 1H), 7.38 (s, 1H), 7.13-7.08 (m, 1H), 3.84-3.88 (m, 1H), 3.22 (s, 3H), 2.10-2.05 (m, 1H), 1.71-1.73 (m, 1H), 1.50-1.56 (m, 2H), 1.48 (d, J=6.7 Hz, 3H).

Intermediate-2: (R/S)-2-(3-(1-aminoethyl)-2-fluorophenyl) propan-2-ol hydrochloride

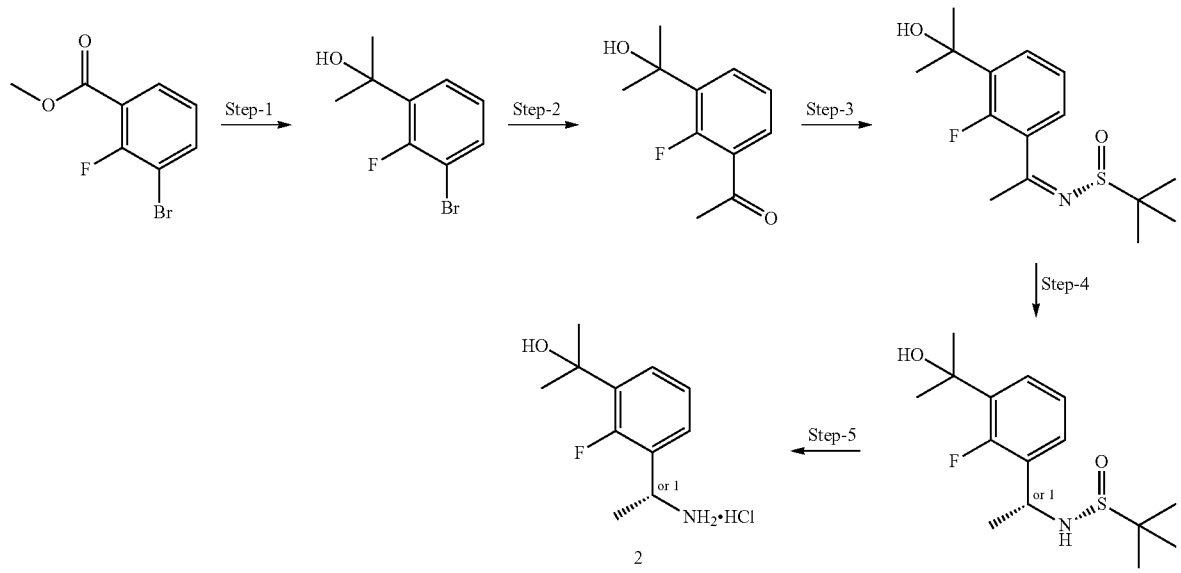

Step-1: 2-(3-bromo-2-fluorophenyl)propan-2-ol

Taken methyl 3-bromo-2-fluorobenzoate (9.5 g, 40.8 mmol) (commercially available) in THF (40 ml) cooled in ice bath and methyl magnesium chloride (40.8 ml, 122 mmol) in diethyl ether was added dropwise into it. After stirring for 1.5 h at room temperature, a saturated aqueous solution of ammonium chloride (5 ml) and water (20 ml) was added sequentially to the reaction mixture and extracted with ethyl acetate (40 ml), the organic layer was dried with anhydrous sodium sulfate, filtered and concentrated under reduced pressure. The crude mass was purified by flash column chromatography by using eluent 0-10% ethyl acetate in hexane to get 2-(3-bromo-2-fluorophenyl)propan-2-ol (7.0 g, 73.7% yield) as a colorless liquid.

¹H NMR (400 MHz, DMSO-d₆) δ 7.65-7.60 (m, 1H), 7.59-7.54 (m, 1H), 5.42 (s, 1H), 1.48 (d, J=1.4 Hz, 6H).

Step-2: 1-(2-fluoro-3-(2-hydroxypropan-2-yl)phenyl)ethan-1-one

The title compound was synthesized by using 2-(3-bromo-2-fluorophenyl)propan-2-ol and following analogous reaction protocol as described in Step-2 of intermediate-1.

¹H NMR (400 MHz, DMSO-d₆) δ 7.90-7.83 (m, 1H), 7.70-7.61 (m, 1H), 7.27 (t, J=7.7 Hz, 1H), 5.41 (s, 1H), 2.58 (s, 3H), 1.52 (d, J=1.4 Hz, 6H).

Step-3: (R)—N-(1-(2-fluoro-3-(2-hydroxypropan-2-yl)phenyl)ethylidene)-2-methylpropane-2-sulfinamide To a stirred solution of 1-(2-fluoro-3-(2-hydroxypropan-2-yl)phenyl)ethan-1-one (3.9 g, 19.88 mmol) and (R)-2-methylpropane-2-sulfinamide (3.13 g, 25.8 mmol) in THF (30 ml) was added titanium(IV) isopropoxide (14.56 ml, 49.7 mmol) under nitrogen atmosphere. The resulting reaction mixture was heated at 80° C. for 16 h. After complete consumption of starting material, the reaction mixture was allowed to room temperature and diluted with ethyl acetate (100 ml). Water (10 ml) was added dropwise, resulted white precipitate was filtered through celite, washed residue with ethyl acetate (30 ml×2). The filtrate was washed with water (50 ml), dried over anhydrous sodium sulphate, filtered and concentrated. The crude mass was purified by flash column chromatography by using 0 to 30% ethyl acetate in hexane to afford (R)—N-(1-(2-fluoro-3-(2-hydroxypropan-2-yl)phenyl)ethylidene)-2-methylpropane-2-sulfinamide (5 g, 84%) as colorless liquid.

Step-4: (R)—N—((R/S)-1-(2-fluoro-3-(2-hydroxypropan-2-yl)phenyl)ethyl)-2-methylpropane-2-sulfinamide To a solution of (R)—N-(1-(2-fluoro-3-(2-hydroxypropan-2-yl)phenyl)ethylidene)-2-methylpropane-2-sulfinamide (5 g, 16.70 mmol) in MeOH (30 ml) was added NaBH₄ (0.634 g. 16.70 mmol) at 0° C. and stirred at 27° C. for 1 hr. The reaction mixture was poured in ice cold water and extracted with ethyl acetate (50×2 ml). The combined organic layer was dried over sodium sulphate, filtered and concentrated. The obtained crude product was purified by flash column chromatography (0-40% ethyl acetate in Hexane) to afford (R)—N—((R/S)-1-(2-fluoro-3-(2-hydroxypropan-2-yl)phenyl)ethyl)-2-methylpropane-2-sulfinamide (2.3 g, 45.7% yield) as a brown sticky solid.

MS (ES+) m/z=324.15 (M+Na).

¹H NMR (400 MHz, DMSO-d₆) δ 7.54-7.47 (m, 1H), 7.43-7.36 (m, 1H), 7.17-7.09 (m, 1H), 5.75 (s, 1H), 5.23 (s, 1H), 4.72-4.63 (m, 1H), 1.48 (s, 6H), 1.39 (d, J=6.8 Hz, 3H), 1.09 (s, 9H).

Step-5: (R/S)-2-(3-(1-aminoethyl)-2-fluorophenyl)propan-2-ol hydrochloride

The title compound was synthesized by using (R)—N—((R/S)-1-(2-fluoro-3-(2-hydroxypropan-2-yl)phenyl)ethyl)-2-methylpropane-2-sulfinamide and following analogous reaction protocol as described in Step-4 of Intermediate-1.

¹H NMR (400 MHz, DMSO-d₆) δ 8.36 (s, 2H), 7.69-7.62 (m, 1H), 7.50-7.43 (m, 1H), 7.29-7.23 (m, 1H), 5.36 (s, 1H), 4.72-4.56 (m, 1H), 1.56-1.44 (m, 9H).

Intermediate-3: (R/S)-3-(1-aminoethyl)-5-methylaniline

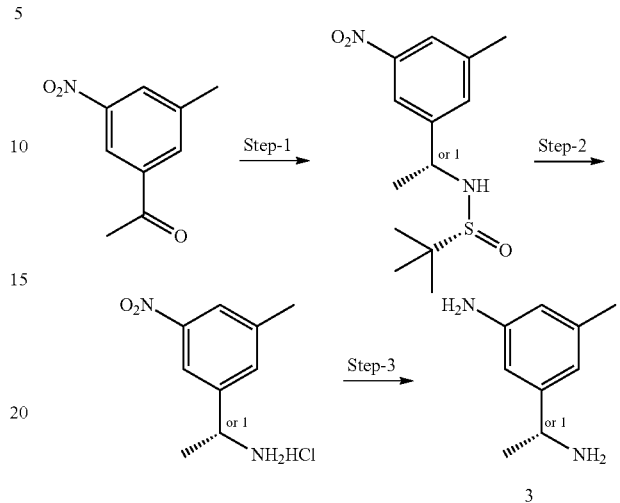

Step-1: (R)-2-methyl-N—((R/S)-1-(3-methyl-5-nitrophenyl)ethyl)propane-2-sulfinamide The title compound was synthesized by using 1-(3-methyl-5-nitrophenyl)ethan-1-one (commercially available) and following analogous reaction protocol as described in Step-3 of Intermediate-1.

¹H NMR (400 MHz, Chloroform-d) δ 8.06-8.01 (m, 1H), 8.00-7.97 (m, 1H), 7.52-7.50 (m, 1H), 4.66-4.57 (m, 1H), 2.49 (s, 3H), 1.57 (d, J=6.6 Hz, 3H), 1.26 (s, 9H).

Step-2: (R/S)-1-(3-methyl-5-nitrophenyl)ethan-1-amine hydrochloride

The title compound was synthesized by using (R)-2-methyl-N—((R/S)-1-(3-methyl-5-nitrophenyl)ethyl)propane-2-sulfinamide and following analogous reaction protocol as described in Step-4 of Intermediate-1.

¹H NMR (400 MHz, DMSO-d₆) δ 8.72 (s, 3H), 8.29-8.26 (m, 1H), 8.10-8.07 (m, 1H), 7.88-7.85 (m, 1H), 4.60-4.51 (m, 1H), 2.46 (s, 3H), 1.55 (d, J=6.8 Hz, 3H).

Step-3: (R/S)-3-(1-aminoethyl)-5-methylaniline

A mixture of (R/S)-1-(3-methyl-5-nitrophenyl)ethan-1-amine hydrochloride (4.6 g, 21.23 mmol) 10% wet Pd—C (0.226 g, 2.123 mmol) and MeOH (50 ml) was stirred in Parr Shaker in presence of hydrogen atmosphere (40 psi) at 27° C. for 5 h. The reaction mixture was filtered and concentrated. An obtained residue was dissolved in water and basified with sodium carbonate and extracted with DCM (100 ml×2). The organic layer was dried over sodium sulphate, filtered and concentrated to afford (R/S)-3-(1-aminoethyl)-5-methylaniline (2.8 g, 88% yield) as red liquid.

¹H NMR (400 MHz, DMSO-d₆) δ 6.36-6.34 (m, 1H), 6.33-6.31 (m, 1H), 6.22-6.20 (m, 1H), 4.83 (s, 2H), 3.76 (q, J=6.6 Hz, 1H), 2.13 (s, 3H), 1.17 (d, J=6.6 Hz, 3H).

Intermediate-4: (R/S)-4-(1-aminoethyl)-6-(trifluoromethyl)pyridin-2-amine

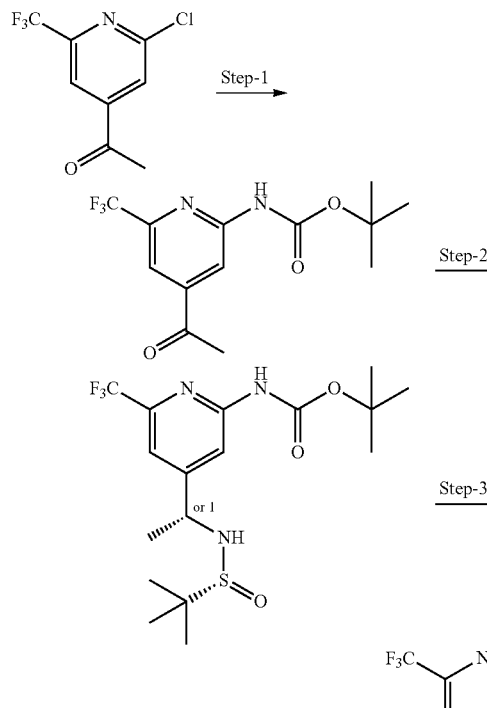

Step-1: tert-butyl(4-acetyl-6-(trifluoromethyl)pyridin-2-yl)carbamate

A mixture of 1-(2-chloro-6-(trifluoromethyl)pyridin-4-yl)ethan-1-one (2.8 g, 12.52 mmol) (commercially available), tert-butyl carbamate (1.761 g, 15.03 mmol), Pd$_2$(dba)$_3$ (1.147 g, 1.252 mmol), Cs$_2$CO$_3$ (8.16 g, 25.05 mmol) and xantphos (1.449 g, 2.505 mmol) in 1,4-Dioxane (4 ml) was stirred at 90° C. for 12 h. After completion, reaction mixture was concentrated and purified by column chromatography using eluent 0-20% ethyl acetate in hexane to afford a tert-butyl(4-acetyl-6-(trifluoromethyl)pyridin-2-yl)carbamate (1.4 g, 36.7% yield) as a yellow solid.

$^1$H NMR (400 MHz, DMSO-d$_6$) δ 10.60 (s, 1H), 8.52-8.50 (m, 1H), 7.95-7.72 (m, 1H), 2.67 (s, 3H), 1.49 (s, 9H).

Step-2: t-butyl(4-((R/S)-1-(((R)-tert-butylsulfinyl)amino)ethyl)-6-(trifluoromethyl)pyridin-2-yl)carbamate The title compound was synthesized by using tert-butyl (4-acetyl-6-(trifluoromethyl)pyridin-2-yl)carbamate by following analogous reaction protocol as described in Step-3 of Intermediate-1.

MS (ES+) m/z=410.3 (M+1).

Step-3: (R/S)-4-(1-aminoethyl)-6-(trifluoromethyl)pyridin-2-amine

To a stirred solution of t-butyl (4-((R/S)-1-(((R)-tert-butylsulfinyl)amino)ethyl)-6-(trifluoromethyl)pyridin-2-yl)carbamate (1.0 g, 5.50 mmol) in DCM (20 ml) was added dropwise 4M HCl in Dioxane (5 ml) at 0° C. and continued the stirring at same temp for 1 h. After completion of reaction, reaction mixture was concentrated at 35° C. Obtained residue was dissolved in water basified with sodium carbonate and extracted with ethyl acetate (100 ml×2). Organic layer was dried over sodium sulphate and concentrated to get (R/S)-4-(1-aminoethyl)-6-(trifluoromethyl)pyridin-2-amine (0.4 g, 80.0% yield) as a yellow liquid.

$^1$H NMR (400 MHz, DMSO-d) δ 6.95 (d, J=1.2 Hz, 1H), 6.65 (d, J=1.3 Hz, 1H), 6.42 (s, 2H), 3.87 (q, J=6.6 Hz, 1H), 3.34 (s, 2H), 1.20 (d, J=6.7 Hz, 3H).

Intermediate-5: (R/S)-2-(3-(1-aminoethyl)phenyl)-2-methylpropan-1-ol hydrochloride

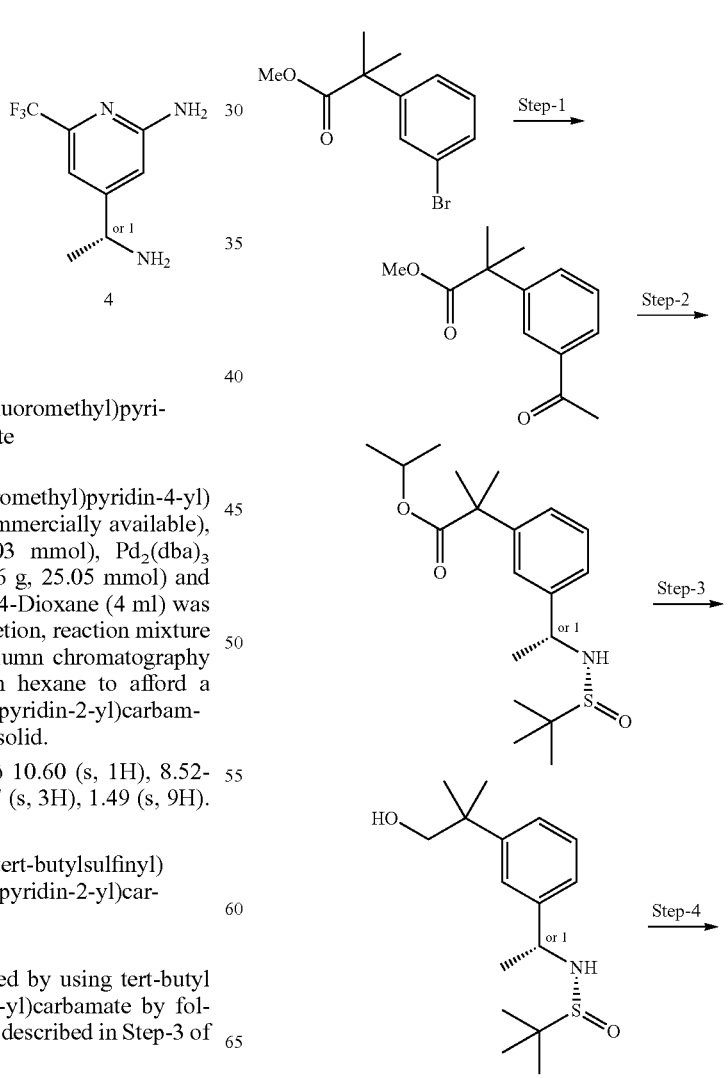

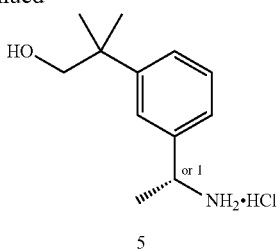

Step-1: Methyl 2-(3-acetylphenyl)-2-methylpropanoate

The title compound was synthesized by using methyl 2-(3-bromophenyl)-2-methylpropanoate (*Journal of Medicinal Chemistry*, 51(3), 392-395; 2008) following analogous reaction protocol as described in Step-2 of Intermediate-1.
MS (ES+) m/z=221.2 (M+1).

Step-2: Isopropyl 2-(3-((R/S)-1-(((R)-tert-butylsulfinyl)amino)ethyl)phenyl)-2-methylpropanoate The title compound was synthesized by using Methyl 2-(3-acetylphenyl)-2-methylpropanoate and following analogous reaction protocol as described in Step-3 of Intermediate-1.
MS (ES+) m/z=354.3 (M+1).

Step-3: (R)—N—((R/S)-1-(3-(1-hydroxy-2-methylpropan-2-yl)phenyl)ethyl)-2-methylpropane-2-sulfinamide To a solution of isopropyl 2-(3-((R/S)-1-(((R)-tert-butylsulfinyl)amino)ethyl)phenyl)-2-methylpropanoate (3 g, 8.49 mmol) in MeOH (30 ml) was added LAH (0.322 g, 8.49 mmol) at 0° C. and stirred at 27° C. for 2 h. After completion of reaction, reaction mixture was quenched with aq. sodium hydroxide solution (50 ml) and extracted with ethyl acetate (100 ml×2). The combined organic layer was dried over anhydrous sodium sulfate, filtered, concentrated to afford (R)—N—((R/S)-1-(3-(1-hydroxy-2-methylpropan-2-yl)phenyl)ethyl)-2-methylpropane-2-sulfinamide (1.9 g, 75% yield) as a colorless liquid.
MS (ES+) m/z=298.3 (M+1).

Step-4: (R/S)-2-(3-(1-aminoethyl)phenyl)-2-methylpropan-1-ol hydrochloride

The title compound was synthesized by using (R)—N—((R/S)-1-(3-(1-hydroxy-2-methylpropan-2-yl)phenyl)ethyl)-2-methylpropane-2-sulfinamide and following analogous reaction protocol as described in Step-4 of Intermediate-1.
$^1$H NMR (400 MHz, DMSO-$d_6$) δ 8.51 (s, 2H), 7.57-7.53 (m, 1H), 7.47-7.22 (m, 3H), 4.48-4.26 (m, 1H), 3.44 (s, 2H), 1.57-1.46 (m, 3H), 1.24 (s, 6H).

Intermediate-6: (R)-1-(3-(1-aminoethyl)-2-fluorophenyl)-1,1-difluoro-2-methylpropan-2-ol

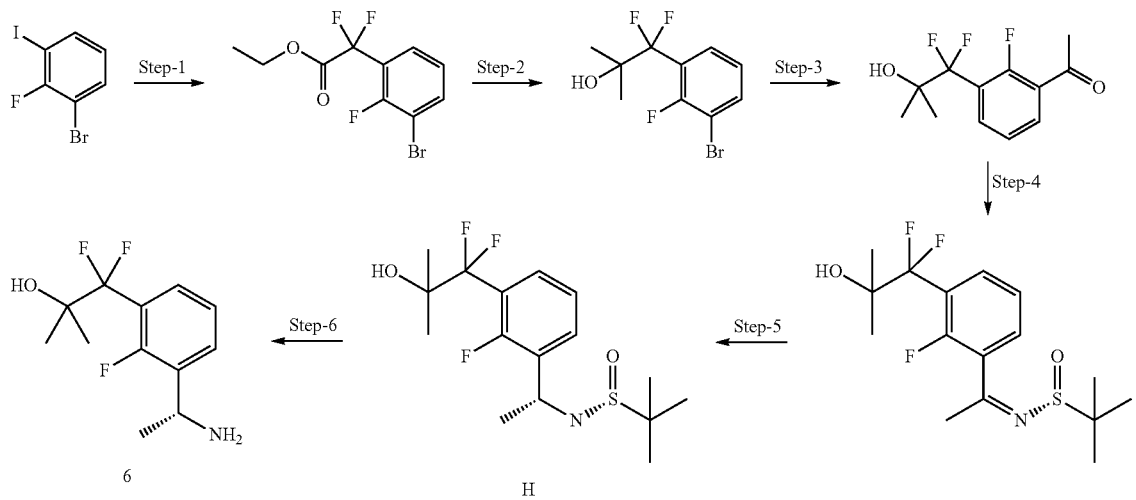

Step-1: Ethyl 2-(3-bromo-2-fluorophenyl)-2,2-difluoroacetate

A suspension of ethyl 2-bromo-2,2-difluoroacetate (33.7 g, 166 mmol) (commercially available) and copper (10.56 g, 166 mmol) in DMSO (200 ml) was stirred at room temperature for 30 min under nitrogen atm. To this reaction mixture, 1-bromo-2-fluoro-3-iodobenzene (20 g, 66.5 mmol) in DMSO (50 ml) was added dropwise, then reaction was stirred at 50° C. for 15 min. After completion of reaction, reaction was quenched with water (100 ml) and extracted with diethyl ether (500 ml). The organic layer was separated, filtered on celite, dried over sodium sulfate and evaporated to give crude (16 g) compound. The crude compound was purified by column chromatography using eluent 5% ethyl acetate in hexane to afford ethyl 2-(3-bromo-2-fluorophenyl)-2,2-difluoroacetate (12 g, 60.8% yield) as colorless liquid.
$^1$H NMR (400 MHz, Chloroform-d) δ 7.77-7.70 (m, 1H), 7.65-7.59 (m, 1H), 7.21-7.15 (m, 1H), 4.39 (q, J=7.1 Hz, 2H), 1.36 (t, J=7.1 Hz, 3H).

Step-2: 1-(3-bromo-2-fluorophenyl)-1,1-difluoro-2-methylpropan-2-ol

The title compound was synthesized by using Ethyl 2-(3-bromo-2-fluorophenyl)-2,2-difluoroacetate and following analogous reaction protocol as described in Step-1 of intermediate-2.

¹H NMR (400 MHz, Chloroform-d) δ 7.70-7.65 (m, 1H), 7.45-7.40 (m, 1H), 7.14-7.08 (m, 1H), 1.38-1.36 (m, 6H).

Step-3: 1-(3-(1,1-difluoro-2-hydroxy-2-methylpropyl)-2-fluorophenyl)ethan-1-one The title compound was synthesized by using 1-(3-bromo-2-fluorophenyl)-1,1-difluoro-2-methylpropan-2-ol and following analogous reaction protocol as described in Step-2 of intermediate-1.

¹H NMR (400 MHz, Chloroform-d) δ 7.99-7.94 (m, 1H), 7.68-7.63 (m, 1H), 7.34-7.27 (m, 1H), 2.68 (d, J=5.3 Hz, 3H), 1.40-1.36 (m, 6H).

Step-4: (R)—N-(1-(3-(1,1-difluoro-2-hydroxy-2-methylpropyl)-2-fluorophenyl)ethylidene)-2-methylpropane-2-sulfinamide The title compound was synthesized by using 1-(3-(1,1-difluoro-2-hydroxy-2-methylpropyl)-2-fluorophenyl)ethan-1-one and following analogous reaction protocol as described in Step-3 of intermediate-2.

MS (ES+) m/z=372.28 (M+23).

¹H NMR (400 MHz, DMSO-d₆) δ 7.77-7.70 (m, 1H), 7.61-7.55 (m, 1H), 7.41-7.34 (m, 1H), 5.41 (s, 1H), 2.80-2.57 (m, 3H), 1.22 (s, 15H).

Step-5: (R)—N—((R)-1-(3-(1,1-difluoro-2-hydroxy-2-methylpropyl)-2-fluorophenyl)ethyl)-2-methylpropane-2-sulfinamide To the stirred solution of (R)—N-(1-(3-(1,1-difluoro-2-hydroxy-2-methylpropyl)-2-fluorophenyl)ethylidene)-2-methylpropane-2-sulfinamide (29 g, 83 mmol) in THF (450 ml) and ethanol (45 ml) were added a NaBH₄ (6.28 g, 166 mmol) portion wise at −40° C. The resulting reaction mixture was stirred at same temp for 1 h and slowly allowed to room temperature and again stirred for 3 h at 25° C. After complete consumption of starting material, reaction mass was diluted with ethyl acetate (200 ml) and quenched with saturated solution of ammonium chloride (50 ml). The organic layer was washed with water (100 ml) and brine (100 ml). The separated organic layer was dried over anhydrous sodium sulphate, filtered and concentrated. The crude mass was purified by flash column chromatography by using 0-70% ethyl acetate in hexane to afford (R)—N—((R)-1-(3-(1,1-difluoro-2-hydroxy-2-methylpropyl)-2-fluorophenyl)ethyl)-2-methylpropane-2-sulfinamide (10.5 g, 29.9 mmol, 36.0% yield) as sticky colorless solid.

MS (ES+) m/z=352.28 (M+1).

¹H NMR (400 MHz, DMSO-d₆) δ 7.70-7.63 (m, 1H), 7.37-7.31 (m, 1H), 7.30-7.25 (m, 1H), 5.84 (d, J=7.7 Hz, 1H), 5.33 (s, 1H), 4.74-4.62 (m, 1H), 1.40 (d, J=6.8 Hz, 3H), 1.20 (s, 6H), 1.10 (s, 9H).

Step-6: (R)-1-(3-(1-aminoethyl)-2-fluorophenyl)-1,1-difluoro-2-methylpropan-2-ol The title compound was synthesized by using (R)—N—((R)-1-(3-(1,1-difluoro-2-hydroxy-2-methylpropyl)-2-fluorophenyl)ethyl)-2-methylpropane-2-sulfinamide and following analogous reaction protocol as described in Step-3 of Intermediate-4.

¹H NMR (400 MHz, DMSO-d₆) δ 7.73-7.67 (m, 1H), 7.36-7.19 (m, 2H), 5.30 (s, 1H), 4.28 (q, J=6.6 Hz, 1H), 1.25 (d, J=6.6 Hz, 3H), 1.22-1.18 (m, 6H).

Intermediate-7: (R/S)-2-(3-(1-aminoethyl)-2-methylphenyl)-2,2-difluoroethan-1-ol hydrochloride

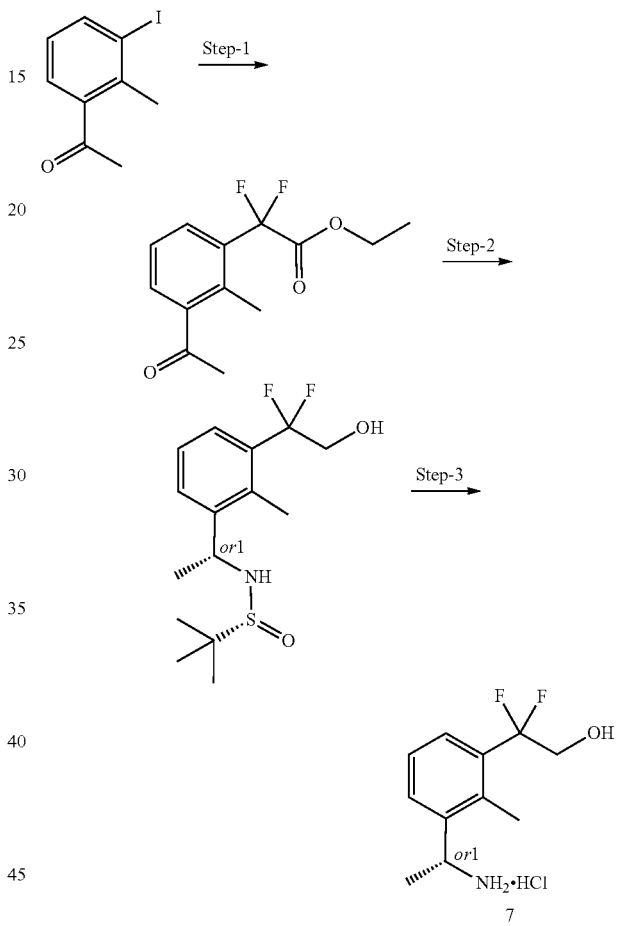

Step-1: Ethyl 2-(3-acetyl-2-methylphenyl)-2,2-difluoroacetate

The title compound was synthesized by using 1-(3-iodo-2-methylphenyl)ethan-1-one (commercially available) and following analogous reaction protocol as described in Step-1 of intermediate-6.

MS (ES+) m/z=257.2 (M+1).

Step-2: (R)—N—((R/S)-1-(3-(1,1-difluoro-2-hydroxyethyl)-2-methylphenyl)ethyl)-2-methylpropane-2-sulfinamide The title compound was synthesized by using Ethyl 2-(3-acetyl-2-methylphenyl)-2,2-difluoroacetate and following analogous reaction protocol as described in Step-3 of intermediate-1.

MS (ES+) m/z=320.03 (M+1).

¹H NMR (400 MHz, DMSO-d₆) δ 7.64-7.59 (m, 1H), 7.40-7.35 (m, 1H), 7.30 (t, J=7.8 Hz, 1H), 5.75-5.63 (m, 2H), 4.77-4.65 (m, 1H), 3.95-3.83 (m, 2H), 2.40-2.37 (m, 3H), 1.38 (d, J=6.7 Hz, 3H), 1.09 (s, 9H).

Step-3: (R/S)-2-(3-(1-aminoethyl)-2-methylphenyl)-2,2-difluoroethan-1-ol hydrochloride The title compound was synthesized by using (R)—N—((R/S)-1-(3-(1,1-difluoro-2-hydroxyethyl)-2-methylphenyl)ethyl)-2-methylpropane-2-sulfinamide and following analogous reaction protocol as described in Step-4 of Intermediate-1.

¹H NMR (400 MHz, DMSO-d₆) δ 8.72-8.58 (m, 3H), 7.86-7.73 (m, 1H), 7.53-7.45 (m, 1H), 7.44-7.36 (m, 1H), 4.72-4.54 (m, 1H), 3.90 (t, J=14.5 Hz, 2H), 2.43-2.39 (m, 3H), 1.49-1.46 (m, 3H).

Intermediate-8: (R)-2-(3-(1-aminoethyl)-2-fluorophenyl)-2,2-difluoroethan-1-ol

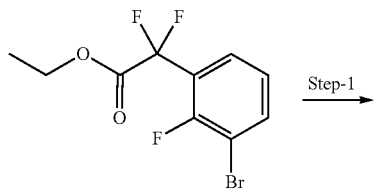

Step-1

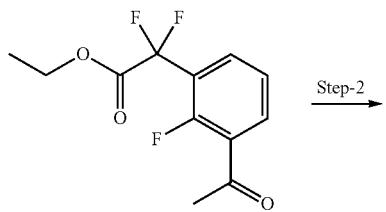

Step-2

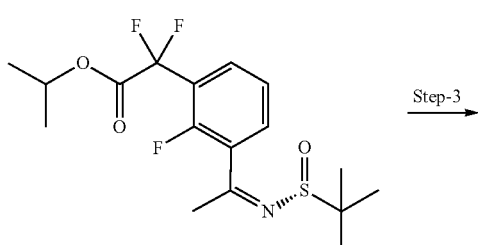

Step-3

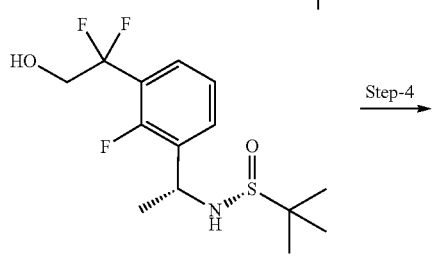

Step-4

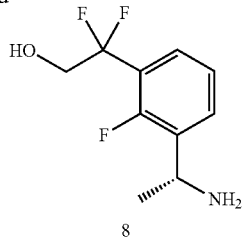

Step-1: Ethyl 2-(3-acetyl-2-fluorophenyl)-2,2-difluoroacetate

The title compound was synthesized by using Ethyl 2-(3-bromo-2-fluorophenyl)-2,2-difluoroacetate and following analogous reaction protocol as described in Step-2 of intermediate-1.

GCMS (m/z)=260.20 (M+).

¹H NMR (400 MHz, Chloroform-d) δ 8.09-8.00 (m, 1H), 7.91-7.79 (m, 1H), 7.38 (t, J=7.9 Hz, 1H), 4.40 (q, J=7.0 Hz, 2H), 2.67 (d, J=5.1 Hz, 3H), 1.37 (t, J=7.1 Hz, 3H).

Step-2: isopropyl (R)-2-(3-(1-((tert-butylsulfinyl)imino)ethyl)-2-fluorophenyl)-2,2-difluoroacetate The title compound was synthesized by using Ethyl 2-(3-acetyl-2-fluorophenyl)-2,2-difluoroacetate and following analogous reaction protocol as described in Step-3 of intermediate-2.

¹H NMR (400 MHz, DMSO-d₆) δ 7.97-7.90 (m, 1H), 7.88-7.82 (m, 1H), 7.54-7.46 (m, 1H), 5.24-5.06 (m, 1H), 2.70 (d, J=2.2 Hz, 3H), 1.25 (d, J=6.2 Hz, 6H), 1.21 (s, 9H).

Step-3: (R)—N—((R)-1-(3-(1,1-difluoro-2-hydroxyethyl)-2-fluorophenyl)ethyl)-2-methylpropane-2-sulfinamide The title compound was synthesized by using isopropyl (R)-2-(3-(1-((tert-butylsulfinyl)imino)ethyl)-2-fluorophenyl)-2,2-difluoroacetate and following analogous reaction protocol as described in Step-5 of intermediate-6.

MS (ES+) m/z=324.34 (M+1).

¹H NMR (400 MHz, DMSO-d₆) δ 7.71 (t, J=7.0 Hz, 1H), 7.47-7.41 (m, 1H), 7.31 (t, J=7.7 Hz, 1H), 5.87 (d, J=7.7 Hz, 1H), 5.71 (t, J=6.5 Hz, 1H), 4.74-4.63 (m, 1H), 3.97-3.84 (m, 2H), 1.41 (d, J=6.8 Hz, 3H), 1.11 (s, 9H).

Step-4: (R)-2-(3-(1-aminoethyl)-2-fluorophenyl)-2,2-difluoroethan-1-ol

The title compound was synthesized by using (R)—N—((R)-1-(3-(1,1-difluoro-2-hydroxyethyl)-2-fluorophenyl)ethyl)-2-methylpropane-2-sulfinamide and following analogous reaction protocol as described in Step-3 of intermediate-4.

¹H NMR (400 MHz, DMSO-d₆) δ 7.80-7.71 (m, 1H), 7.43-7.37 (m, 1H), 7.31-7.27 (m, 1H), 5.69 (brs, 1H), 4.36-4.27 (m, 1H), 3.91 (t, J=14.4 Hz, 2H), 1.33-1.19 (m, 3H).

Intermediate-9: (R/S)-2-(5-(1-aminoethyl)-2-fluorophenyl)-2,2-difluoroethan-1-ol hydrochloride

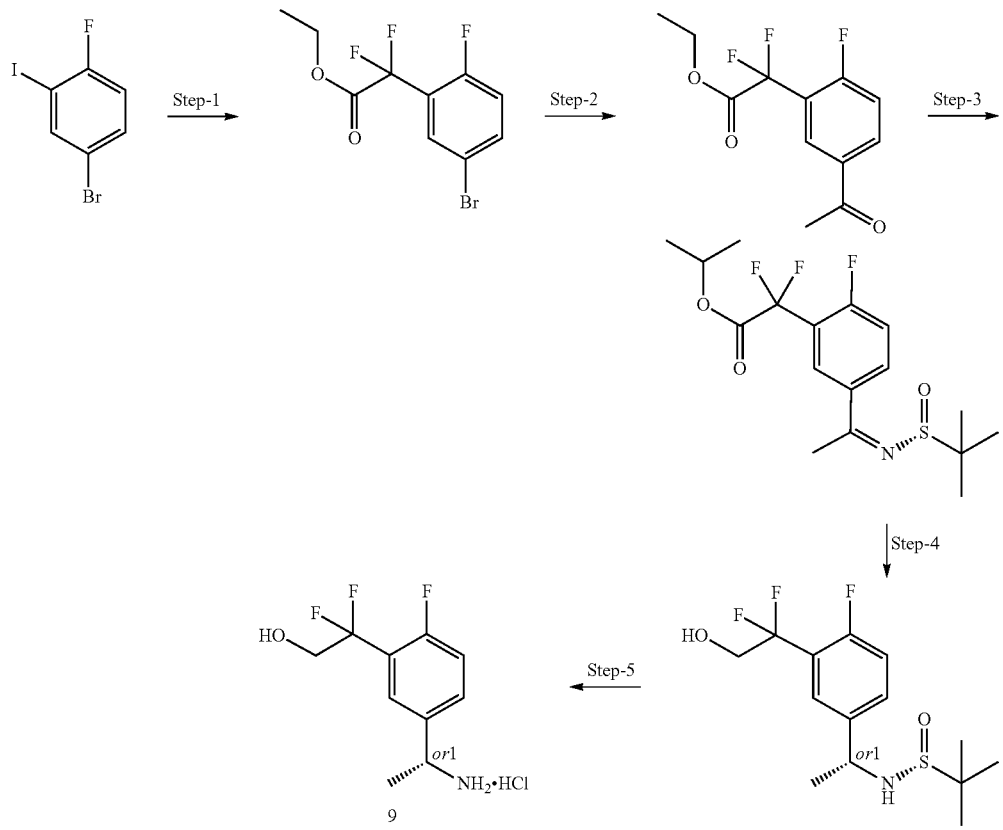

Step-1: Ethyl 2-(5-bromo-2-fluorophenyl)-2,2-difluoroacetate

The title compound was synthesized by using 4-bromo-1-fluoro-2-iodobenzene (commercially available) and following analogous reaction protocol as described in Step-1 of intermediate-6.

$^1$H NMR (400 MHz, DMSO-d) δ 7.97-7.83 (m, 2H), 7.49-7.42 (m, 1H), 4.36 (q, J=7.1 Hz, 2H), 1.23 (t, J=7.1 Hz, 3H).

Step-2: Ethyl 2-(5-acetyl-2-fluorophenyl)-2,2-difluoroacetate

The title compound was synthesized by using Ethyl 2-(5-bromo-2-fluorophenyl)-2,2-difluoroacetate and following analogous reaction protocol as described in Step-2 of intermediate-1.

GCMS (m/z)=260.13.

$^1$H NMR (400 MHz, DMSO-d) δ 8.32-8.26 (m, 1H), 8.19 (dd, J=7.1, 2.3 Hz, 1H), 7.65-7.85 (m, 1H), 4.37 (q, J=7.1 Hz, 2H), 2.65 (s, 3H), 1.24 (t, J=7.1 Hz, 3H).

Step-3: isopropyl (R)-2-(5-(1-((tert-butylsulfinyl)imino)ethyl)-2-fluorophenyl)-2,2-difluoroacetate The title compound was synthesized by using Ethyl 2-(5-acetyl-2-fluorophenyl)-2,2-difluoroacetate and following analogous reaction protocol as described in Step-3 of intermediate-2.

MS (ES+) m/z=378.22 (M+1).

$^1$H NMR (400 MHz, DMSO-d$_6$) δ 8.24-8.19 (m, 1H), 8.18-8.14 (m, 1H), 7.61-7.56 (m, 1H), 5.20-5.10 (m, 1H), 2.77 (s, 3H), 1.26 (d, J=6.3 Hz, 6H), 1.23 (s, 9H).

Step-4: (R)—N—((R/S)-1-(3-(1,1-difluoro-2-hydroxyethyl)-4-fluorophenyl)ethyl)-2-methylpropane-2-sulfinamide The title compound was synthesized by using isopropyl (R)-2-(5-(1-((tert-butylsulfinyl)imino)ethyl)-2-fluorophenyl)-2,2-difluoroacetate and following analogous reaction protocol as described in Step-5 of intermediate-6.

MS (ES+) m/z=324.03 (M+1).

$^1$H NMR (400 MHz, DMSO-d$_6$) δ 7.63-7.55 (m, 2H), 7.34-7.25 (m, 1H), 5.79 (d, J=7.3 Hz, 1H), 5.71 (t, J=6.8 Hz, 1H), 4.45 (p, J=6.9 Hz, 1H), 3.97-3.83 (m, 2H), 1.40 (d, J=6.8 Hz, 3H), 1.12 (s, 9H).

Step-5: (R/S)-2-(3-(1-aminoethyl)phenyl)-2,2-difluoroethan-1-ol hydrochloride The title compound was synthesized by using (R)—N—((R/S)-1-(3-(1,1-difluoro-2-hydroxyethyl)-4-fluorophenyl)ethyl)-2-methylpropane-2-sulfinamide and following analogous reaction protocol as described in Step-4 of Intermediate-1.

$^1$H NMR (400 MHz, DMSO-d$_6$) δ 8.66 (s, 3H), 7.86-7.71 (m, 2H), 7.45-7.40 (m, 1H), 5.82-5.79 (m, 1H), 4.55-4.44 (m, 1H), 3.95-3.92 (m, 2H), 1.52 (d, J=6.8 Hz, 3H).

Intermediate-10: (R)-3-(1-aminoethyl)-5-(trifluoromethyl)aniline

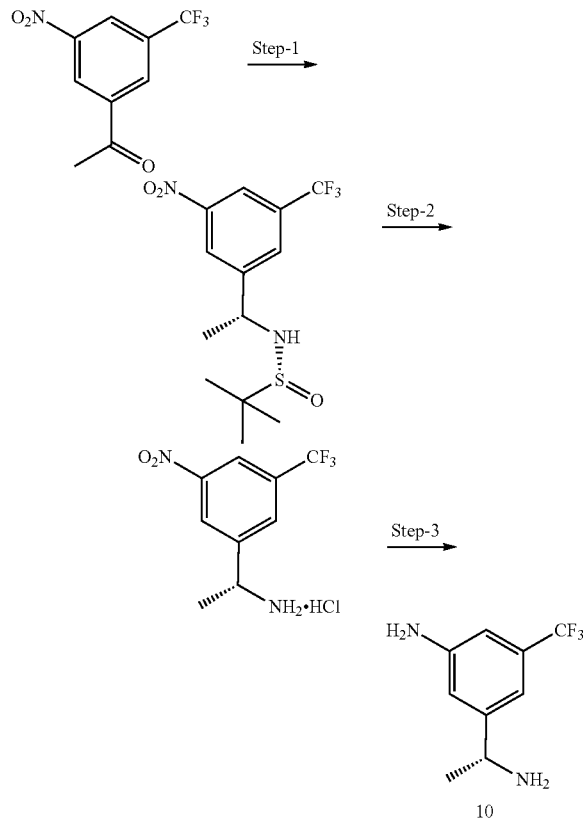

Step-1: (R)-2-methyl-N—((R)-1-(3-nitro-5-(trifluoromethyl)phenyl)ethyl)propane-2-sulfinamide The title compound was synthesized by using 1-(3-nitro-5-(trifluoromethyl)phenyl)ethan-1-one (commercially available) following analogous reaction protocol as described in Step-3 of Intermediate 1.

$^1$H NMR (400 MHz, DMSO-$d_6$) δ 8.66-8.62 (m, 1H), 8.43-8.37 (m, 1H), 8.32-8.29 (m, 1H), 6.09 (d, J=8.7 Hz, 1H), 4.74-4.66 (m, 1H), 1.46 (d, J=6.9 Hz, 3H), 1.14 (s, 9H).

Step-2: (R)-1-(3-nitro-5-(trifluoromethyl)phenyl)ethan-1-amine hydrochloride The title compound was synthesized by using (R)-2-methyl-N—((R)-1-(3-nitro-5-(trifluoromethyl)phenyl)ethyl)propane-2-sulfinamide and following analogous reaction protocol as described in Step-4 of Intermediate-1.

$^1$H NMR (400 MHz, DMSO-$d_6$) δ 8.99 (s, 3H), 8.81 (t, J=1.9 Hz, 1H), 8.63-8.40 (m, 2H), 4.82-4.69 (m, 1H), 1.60 (d, J=6.8 Hz, 3H).

Step-3: (R)-3-(1-aminoethyl)-5-(trifluoromethyl)aniline

To a stirred solution of (R)-1-(3-nitro-5-(trifluoromethyl)phenyl)ethan-1-amine hydrochloride (14 g, 51.7 mmol) in MeOH (100 ml) was added 10% wet Pd—C (1.101 g, 10.35 mmol) in Parr shaker. The resulting reaction mixture was stirred for 3 h at room temperature under hydrogen pressure (40 psi). The reaction mixture was filtered, the filtrate was concentrated under reduced pressure to give crude product. The residue was dissolved in dichloromethane (200 ml) and washed with saturated sodium bicarbonate solution (100 ml). The organic layer was dried over anhydrous sodium sulphate, filtered and concentrated under reduced pressure to afford (R)-3-(1-aminoethyl)-5-(trifluoromethyl)aniline (6 g, 56.8% yield).

MS (ES+) m/z=205.82, (M+1).

$^1$H NMR (400 MHz, DMSO-$d_6$) δ 6.83-6.78 (m, 2H), 6.69-6.65 (m, 1H), 5.45 (bs, 2H), 3.93-3.86 (m, 1H), 1.79 (bs, 2H), 1.20 (d, J=6.6 Hz, 3H).

Intermediate-11: (R/S)-1-(2-fluoro-3-(trifluoromethyl)phenyl)ethan-1-amine hydrochloride

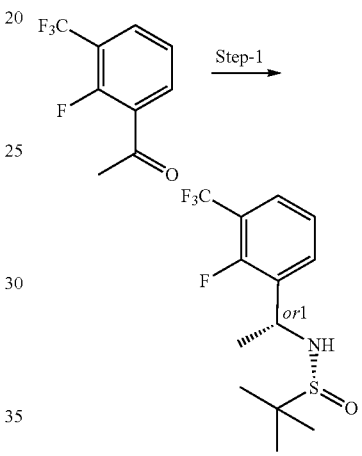

Step-1: (R)-2-methyl-N—((R/S)-1-(2-methyl-3-(trifluoromethyl)phenyl)ethyl)propane-2-sulfinamide The title compound was synthesized by using 1-(2-fluoro-3-(trifluoromethyl)phenyl)ethan-1-one (WO200740382007) and following analogous reaction protocol as described in Step-3 of Intermediate-1.

$^1$H NMR (400 MHz, DMSO-$d_6$) δ 7.93-7.87 (m, 1H), 7.71-7.65 (m, 1H), 7.46-7.40 (m, 1H), 5.92 (d, J=7.8 Hz, 1H), 4.79-4.67 (m, 1H), 1.44 (d, J=6.8 Hz, 3H), 1.11 (s, 9H).

Step-2: (R/S)-1-(2-fluoro-3-(trifluoromethyl)phenyl)ethan-1-amine hydrochloride The title compound was synthesized by using (R)-2-methyl-N—((R/S)-1-(2-methyl-3-(trifluoromethyl)phenyl)ethyl)propane-2-sulfinamide and following analogous reaction protocol as described in Step-4 of Intermediate-1.

$^1$H NMR (400 MHz, DMSO-$d_6$) δ 8.94 (s, 3H), 8.21-8.09 (m, 1H), 7.90-7.75 (m, 1H), 7.52 (t, J=7.8 Hz, 1H), 4.74-4.64 (m, 1H), 1.58 (d, J=6.8 Hz, 3H).

Intermediate-12: (R/S)-3-(1-amino ethyl)-5-(difluoromethyl)aniline

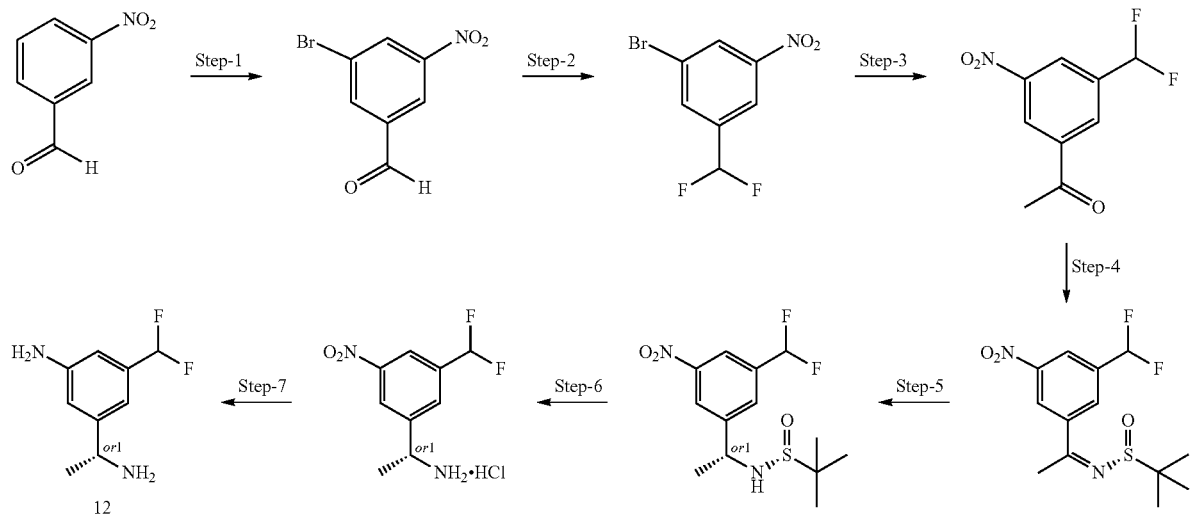

Step-1: 3-bromo-5-nitrobenzaldehyde

Experimental and analytical data was reported in *Journal of Medicinal Chemistry,* 2018, vol. 61, #12, p. 5235-5244 and WO201175515.

Step-2: 1-bromo-3-(difluoromethyl)-5-nitrobenzene 3-bromo-5-nitrobenzaldehyde (35 g, 152 mmol) was dissolved in DCM (350 ml), DAST (101 ml, 761 mmol) was added dropwise at 0° C. and the reaction was allowed to room temperature and continued the stirring for 18 h. After completion of reaction, the resulting solution was poured over ice and extracted with dichloromethane (400 ml). The organic layer was washed with water (500 ml×2) and brine (300 ml). The separated organic layer was dried over sodium sulphate, filtered and concentrated under reduced pressure to get the crude compound. The crude mass was purified by flash column chromatography using eluent 0-5% ethyl acetate in hexane to afford 1-bromo-3-(difluoromethyl)-5-nitrobenzene (36.0 g, 94% yield) as brown oil.
$^1$H NMR (400 MHz, DMSO-$d_6$) δ 8.59-8.57 (m, 1H), 8.42-8.39 (m, 1H), 8.31-8.28 (m, 1H), 7.20 (t, J=55.0 Hz, 1H).

Step-3: 1-(3-(difluoromethyl)-5-nitrophenyl)ethan-1-one

The title compound was synthesized by using 1-bromo-3-(difluoromethyl)-5-nitrobenzene and following analogous reaction protocol as described in Step-2 of Intermediate-1.
$^1$H NMR (400 MHz, DMSO-$d_6$) δ 8.78-8.76 (m, 1H), 8.66-8.63 (m, 1H), 8.55-8.53 (m, 1H), 7.27 (t, J=55 Hz, 1H), 2.74 (s, 3H).

Step-4: (R)—N-(1-(3-(difluoromethyl)-5-nitrophenyl)ethylidene)-2-methylpropane-2-sulfinamide The title compound was synthesized by using 1-(3-(difluoromethyl)-5-nitrophenyl)ethan-1-one and following analogous reaction protocol as described in Step-3 of Intermediate-2.

$^1$H NMR (400 MHz, DMSO-$d_6$) δ 8.76-8.74 (m, 1H), 8.57-8.54 (m, 1H), 8.49-8.46 (m, 1H), 7.30 (t, J=55.1 Hz, 1H), 2.84 (s, 3H), 1.26 (s, 9H).

Step-5: (R)—N—((R/S)-1-(3-(difluoromethyl)-5-nitrophenyl)ethyl)-2-methylpropane-2-sulfinamide The title compound was synthesized by using (R)—N-(1-(3-(difluoromethyl)-5-nitrophenyl)ethylidene)-2-methylpropane-2-sulfinamide and following analogous reaction protocol as described in Step-4 of Intermediate-2.
$^1$H NMR (400 MHz, DMSO-$d_6$) δ 8.53-8.51 (m, 1H), 8.29-8.31 (m, 1H), 8.12-8.10 (m, 1H), 7.22 (t, J=55.3 Hz, 1H), 6.05 (d, J=8.3 Hz, 1H), 4.70-4.58 (m, 1H), 1.45 (d, J=6.9 Hz, 3H), 1.14 (s, 9H).

Step-6: (R/S)-1-(3-(difluoromethyl)-5-nitrophenyl)ethan-1-amine hydrochloride The title compound was synthesized by using product of (R)—N—((R/S)-1-(3-(difluoromethyl)-5-nitrophenyl)ethyl)-2-methylpropane-2-sulfinamide and following analogous reaction protocol as described in Step-5 of Intermediate-2.
$^1$H NMR (400 MHz, DMSO-$d_6$) δ 8.89 (s, 3H), 8.69-8.66 (m, 1H), 8.45-8.41 (m, 1H), 8.30-8.28 (m, 1H), 7.26 (t, J=55.1 Hz, 1H), 4.75-4.66 (m, 1H), 1.58 (d, J=6.8 Hz, 3H).

Step-7: (R/S)-3-(1-aminoethyl)-5-(difluoromethyl)aniline

To a stirred solution of (R/S)-1-(3-(difluoromethyl)-5-nitrophenyl)ethan-1-amine hydrochloride (2 g, 7.92 mmol) in EtOH (25 ml): Water (5 ml) were added iron (0.884 g, 15.83 mmol) and ammonium chloride (0.847 g, 15.83 mmol) at room temperature. The resulting reaction mixture was heated at 95° C. for 1 h. After complete consumption of starting material, reaction mixture was allowed to room temperature, magnetic bid was removed with iron power. The reaction mixture was diluted with water (50 ml) and product was extracted in ethyl acetate (100 ml×2). The organic layer was dried over anhydrous $Na_2SO_4$, filtered and concentrated under vacuo. The crude mass was purified by flash column chromatography by using 0 to 70% ethyl acetate in hexane as eluent to afford (R/S)-3-(1-aminoethyl)-5-(difluoromethyl)aniline (1.4 g, 95% yield) as a brown thick oil.

$^1$H NMR (400 MHz, DMSO-d) δ 6.80 (t, J=55 Hz, 1H), 6.71-6.67 (m, 2H), 6.57-6.54 (m, 1H), 5.28 (s, 2H), 3.91-3.83 (m, 1H), 1.92-1.71 (m, 2H), 1.20 (d, J=6.5 Hz, 3H).

Intermediate-13: (R/S)-1-(3-(difluoro(tetrahydrofuran-2-yl)methyl)phenyl)ethan-1-amine hydrochloride sulphate and concentrated under the reduced pressure to obtain the crude residue (2.3 g). The crude residue was purified by flash chromatography using eluent 0-5% ethyl acetate in n-hexane to afford 2-((3-Bromophenyl)difluoromethyl)tetrahydrofuran (1.5 g, 69%).

$^1$H NMR (400 MHz, Chloroform-d) δ 7.72-7.69 (m, 1H), 7.62-7.57 (m, 1H), 7.51-7.46 (m, 1H), 7.35-7.30 (m, 1H), 4.38-4.27 (m, 1H), 3.88-3.82 (m, 2H), 2.10-2.02 (m, 2H), 1.94-1.82 (m, 2H).

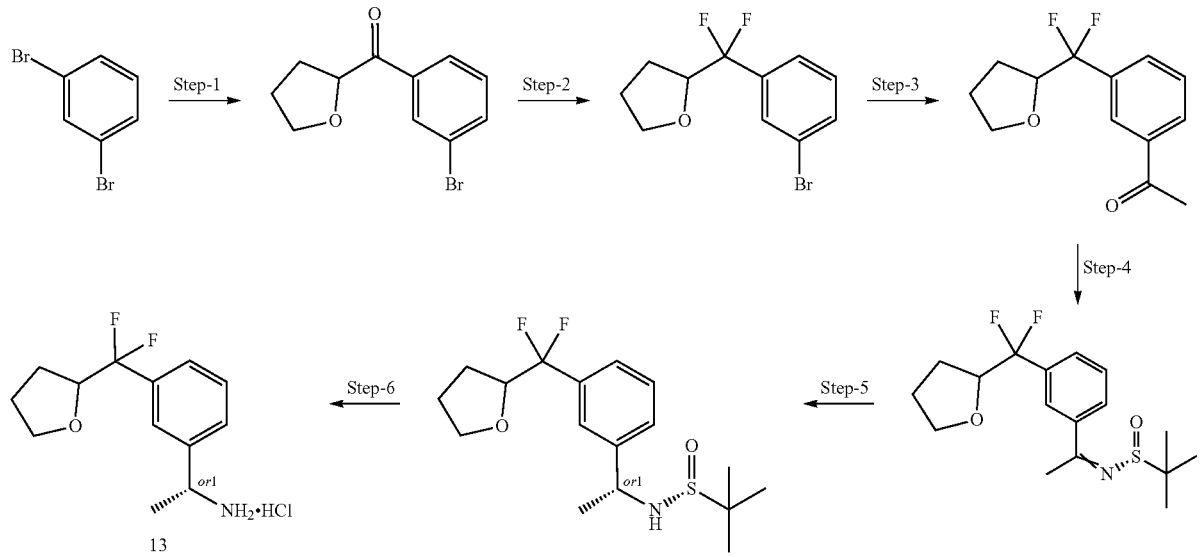

Step-1:
3-Bromophenyl(tetrahydrofuran-2-yl)methanone

To a stirred solution of 1,3-dibromobenzene (6.45 ml, 53.4 mmol) in THF (50.0 ml) was slowly added nBuLi (21.36 ml, 53.4 mmol) at −78° C. and stirred it for 30 min at −78° C. To this, a solution of N-methoxy-N-methyltetrahydrofuran-2-carboxamide (5.0 g, 31.4 mmol) in THF (30.0 ml) was added slowly at −78° C. This was stirred for 1 h till reaction mixture comes to room temperature. The reaction mixture was quenched with saturated solution of ammonium chloride and it was extracted with ethyl acetate (200 ml). The organic layer was washed with water (50 ml), brine (50 ml), dried over anhydrous sodium sulphate and concentrated under the reduced pressure to get a crude residue. The crude residue was purified by flash chromatography using eluent 0-5% ethyl acetate in hexane to afford the title compound 3-Bromophenyl(tetrahydrofuran-2-yl)methanone (2.0 g, 24.96%).

MS (ES+) m/z=255.51.

Step-2:
2-((3-Bromophenyl)difluoromethyl)tetrahydrofuran

To a stirred solution of 3-Bromophenyl)(tetrahydrofuran-2-yl)methanone (2.00 g, 7.84 mmol) was added DAST (10.36 ml, 78 mmol) and heated at 50° C. for 48 h. The reaction mixture was slowly quenched in ice water and then basified with aq. sodium bicarbonate solution, extracted with ethyl acetate (75.0 ml×2). The combined organic layer was washed with brine (50 ml), dried over anhydrous sodium Step-3: 1-(3-(Difluoro(tetrahydrofuran-2-yl)methyl)phenyl)ethan-1-one The title compound was synthesized by using 2-((3-Bromophenyl)difluoromethyl)tetrahydrofuran and following analogous reaction protocol as described in Step-2 of Intermediate-1.

$^1$H NMR (400 MHz, Chloroform-d) δ 8.16-8.12 (m, 1H), 8.08-8.04 (m, 1H), 7.79-7.74 (m, 1H), 7.60-7.54 (m, 1H), 4.45-4.28 (m, 1H), 3.91-3.80 (m, 2H), 2.66 (s, 3H), 2.14-2.05 (m, 2H), 1.93-1.83 (m, 2H).

Step-4: (R)—N-(1-(3-(difluoro(tetrahydrofuran-2-yl)methyl)phenyl)ethylidene)-2-methylpropane-2-sulfinamide The title compound was synthesized by using 1-(3-(Difluoro(tetrahydrofuran-2-yl)methyl)phenyl)ethan-1-one and following analogous reaction protocol as described in Step-3 of Intermediate-2.

$^1$H NMR (400 MHz, Chloroform-d) δ 8.06-8.03 (m, 1H), 8.01-7.95 (m, 1H), 7.70-7.65 (m, 1H), 7.54-7.48 (m, 1H), 4.42-4.40 (m, 1H), 3.87-3.81 (m, 2H), 2.81 (s, 3H), 2.11-2.02 (m, 2H), 1.97-1.79 (m, 2H), 1.35 (s, 9H).

Step-5: (R)—N—((R/S)-1-(3-(difluoro(tetrahydrofuran-2-yl)methyl)phenyl)ethyl)-2-methylpropane-2-sulfinamide The title compound was synthesized by using (R)—N-(1-(3-(difluoro(tetrahydrofuran-2-yl)methyl)phenyl)ethylidene)-2-methylpropane-2-sulfinamide and following analogous reaction protocol as described in Step-4 of Intermediate-2.

MS (ES+) m/z=346.2.

$^1$H NMR (400 MHz, Chloroform-d) δ 7.53-7.50 (m, 1H), 7.50-7.41 (m, 3H), 4.66-4.56 (m, 1H), 4.41-4.28 (m, 1H), 3.89-3.79 (m, 2H), 3.48-3.44 (m, 1H), 2.10-2.01 (m, 2H), 1.92-1.79 (m, 2H), 1.55 (d, J=6.6 Hz, 3H), 1.26 (s, 9H).

Step-6: (R/S)-1-(3-(difluoro(tetrahydrofuran-2-yl)methyl)phenyl)ethan-1-amine hydrochloride The title compound was synthesized by using (R)—N—((R/S)-1-(3-(difluoro(tetrahydrofuran-2-yl)methyl)phenyl)ethyl)-2-methylpropane-2-sulfinamide and following analogous reaction protocol as described in Step-4 of Intermediate-1.

$^1$H NMR (400 MHz, DMSO-d) δ 8.55 (s, 2H), 7.73-7.63 (m, 2H), 7.55 (d, J=7.3 Hz, 2H), 4.54-4.32 (m, 2H), 3.78-3.65 (m, 2H), 2.05-1.89 (m, 2H), 1.85-1.65 (m, 3H), 1.52 (d, J=6.8 Hz, 3H).

Intermediate-14: (R/S)-3-(1-aminoethyl)-4-fluoro-5-methylaniline hydrochloride

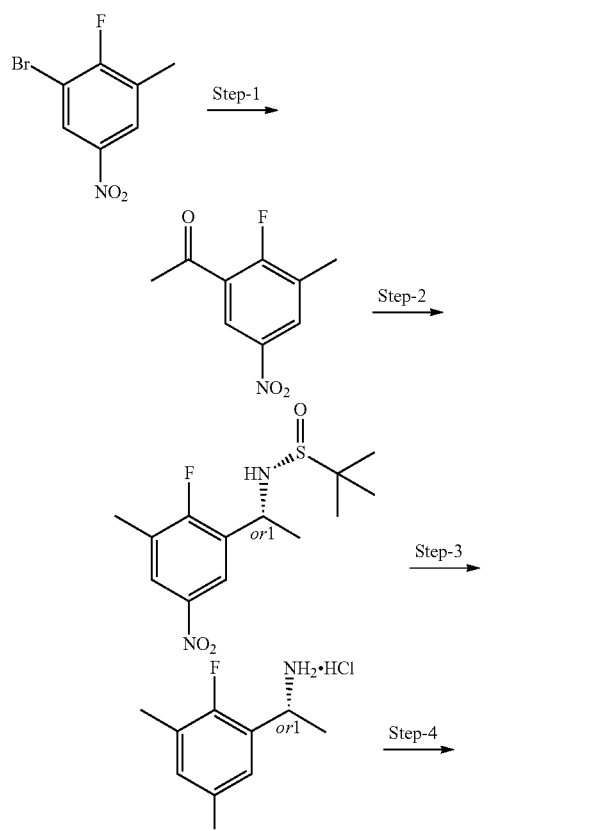

Step-1: 1-(2-fluoro-3-methyl-5-nitrophenyl)ethan-1-one

The title compound was synthesized by using 1-bromo-2-fluoro-3-methyl-5-nitrobenzene (commercially available) following analogous reaction protocol as described in Step-2 of Intermediate-1.

$^1$H NMR (400 MHz, Chloroform-d) δ 8.67-8.54 (m, 1H), 8.35-8.21 (m, 1H), 2.72 (d, J=5.0 Hz, 3H), 2.48-2.45 (m, 3H).

Step-2: (R)—N—((R/S)-1-(2-fluoro-3-methyl-5-nitrophenyl)ethyl)-2-methylpropane-2-sulfinamide The title compound was synthesized by using 1-(2-fluoro-3-methyl-5-nitrophenyl)ethan-1-one and following analogous reaction protocol as described in Step-3 of Intermediate-1.

$^1$H NMR (400 MHz, DMSO-d$_6$) δ 8.36 (dd, J=6.0, 2.9 Hz, 1H), 8.17 (dd, J=6.4, 2.9 Hz, 1H), 6.06 (d, J=8.6 Hz, 1H), 4.79-4.61 (m, 1H), 2.36 (d, J=2.2 Hz, 3H), 1.43 (d, J=6.9 Hz, 3H), 1.12 (s, 9H).

Step-3: (R/S)-1-(2-fluoro-3-methyl-5-nitrophenyl)ethan-1-amine hydrochloride

The title compound was synthesized by using (R)—N—((R/S)-1-(2-fluoro-3-methyl-5-nitrophenyl)ethyl)-2-methylpropane-2-sulfinamide following analogous reaction protocol as described in Step-4 of Intermediate-1.

$^1$H NMR (400 MHz, DMSO-d$_6$) δ 8.76 (s, 2H), 8.49 (dd, J=6.0, 2.9 Hz, 1H), 8.37-8.21 (m, 1H), 4.70 (s, 1H), 2.38 (d, J=2.2 Hz, 3H), 1.55 (d, J=6.8 Hz, 3H).

Step-4: (R/S)-3-(1-aminoethyl)-4-fluoro-5-methylaniline hydrochloride

To a stirred solution (R/S)-1-(2-fluoro-3-methyl-5-nitrophenyl)ethan-1-amine hydrochloride (2.2 g, 9.38 mmol) in Methanol (80 ml) added Pd—C (0.998 g, 0.938 mmol) and stirred under hydrogen atmosphere at 60 psi for 6 h at room temperature. After completion of reaction, reaction mass filtered through celite and evaporated to get (R/S)-3-(1-aminoethyl)-4-fluoro-5-methylaniline hydrochloride (1.8 g, 94% yield) as an off-white solid.

$^1$H NMR (400 MHz, DMSO-d$_6$) δ 8.34 (s, 3H), 6.61-6.40 (m, 2H), 5.47 (s, 2H), 4.54-4.36 (m, 1H), 2.13 (d, J=2.0 Hz, 3H), 1.46 (d, J=6.8 Hz, 3H).

Following intermediates shown in Table-1 were prepared by following above mentioned procedure in intermediate-1 and using corresponding raw material.

TABLE I

| Intermediate | Chemical structure | NMR/LCMS (m/z) data |
|---|---|---|
| 15 | NC-phenyl-CH(CH$_3$)-NH$_2$·HCl | $^1$H NMR (400 MHz, DMSO-d$_6$) δ 8.82 (s, 1H), 8.04 (s, 2H), 7.94-7.81 (m, 2H), 7.71-7.63 (m, 1H), 4.55-4.44 (m, 1H), 1.54 (d, J = 6.9 Hz, 3H). |

TABLE I-continued

| Inter-mediate | Chemical structure | NMR/LCMS (m/z) data |
|---|---|---|
| 16 | (structure: F₃C-phenyl-CH(CH₃)-NH₂·HCl) | ¹H NMR (400 MHz, DMSO-d₆) δ 8.70 (s, 3H), 7.97-7.94 (m, 1H), 7.89-7.85 (m, 1H), 7.78-7.73 (m, 1H), 7.71-7.64 (m, 1H), 4.59-4.50 (m, 1H), 1.55 (d, J = 6.8 Hz, 3H). |

Intermediate-17: (R/S)-1-(indolin-4-yl)ethan-1-amine hydrochloride

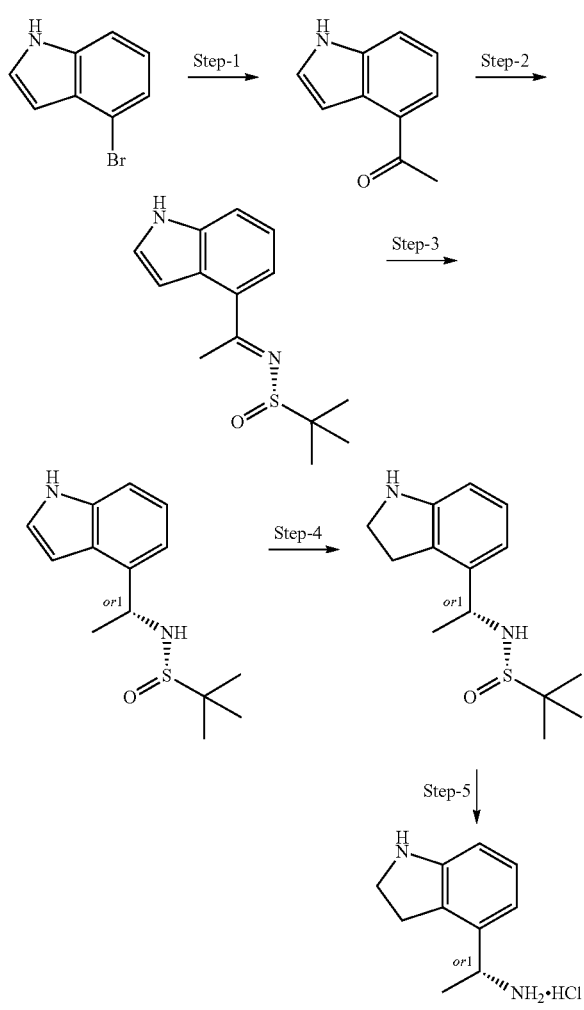

Step-1: 1-(1H-indol-4-yl)ethan-1-one

The title compound was synthesized by using commercially available 4-bromo-1H-indole following analogous reaction protocol as described in Step-2 of Intermediate-1.

MS (ES+) m/z=160.2 (M+1).

¹H NMR (400 MHz, DMSO-d₆) δ 11.46 (bs, 1H), 7.78-7.75 (m, 1H), 7.72-7.68 (m, 1H), 7.57-7.52 (m, 1H), 7.24-7.17 (m, 1H), 7.13-7.07 (m, 1H), 2.65 (s, 3H).

Step-2: (R)—N-(1-(1H-indol-4-yl)ethylidene)-2-methylpropane-2-sulfinamide

The title compound was synthesized by using 1-(1H-indol-4-yl)ethan-1-one and following analogous reaction protocol as described in Step-3 of Intermediate-2.

MS (ES+) m/z=263.15 (M+1).

1H NMR (400 MHz, Chloroform-d) δ 8.67 (s, 1H), 7.81-7.77 (m, 1H), 7.66-7.62 (m, 1H), 7.60-7.55 (m, 2H), 7.27-7.25 (m, 1H), 2.92 (s, 3H), 1.39 (s, 9H).

Step-3: (R)—N—((R/S)-1-(1H-indol-4-yl)ethyl)-2-methylpropane-2-sulfinamide

The title compound was synthesized by using (R)—N-(1-(1H-indol-4-yl)ethylidene)-2-methylpropane-2-sulfinamide and following analogous reaction protocol as described in Step-3 of Intermediate-1.

MS (ES+) m/z=265.21 (M+1).

¹H NMR (400 MHz, DMSO-d₆) δ 7.34-7.27 (m, 2H), 7.09-7.04 (m, 2H), 6.56 (d, J=3.2 Hz, 1H), 5.45 (d, J=5.6 Hz, 1H), 4.83-4.70 (m, 1H), 3.45-3.37 (m, 1H), 1.49 (d, J=6.7 Hz, 3H), 1.11 (s, 9H).

Step-4: (R)—N—((R/S)-1-(indolin-4-yl)ethyl)-2-methylpropane-2-sulfinamide

To a stirred solution of (R)—N—((R/S)-1-(1H-indol-4-yl)ethyl)-2-methylpropane-2-sulfinamide (1.3 g, 4.92 mmol) in acetic acid (15 ml) was slowly added sodium cyanoborohydride (0.618 g, 9.83 mmol) at room temperature and continued the stirring for 1.5 h. After completion of reaction, filtered the reaction mixture and solvent was evaporated under reduced pressure to get the crude residue (1.7 g). The crude residue was purified by flash column chromatography by using eluent 0-60% ethyl acetate in hexane to afford (R)—N—((R/S)-1-(indolin-4-yl)ethyl)-2-methylpropane-2-sulfinamide (1 g, 76% yield).

¹H NMR (400 MHz, DMSO-d₆) δ 6.89 (t, J=7.7 Hz, 1H), 6.60 (dd, J=7.7, 0.9 Hz, 1H), 6.38 (dd, J=7.7, 0.9 Hz, 1H), 5.46 (s, 1H), 5.38 (d, J=5.7 Hz, 1H), 4.32 (p, J=6.6 Hz, 1H), 3.44-3.45 (m, 2H), 2.97-2.88 (m, 2H), 1.34 (d, J=6.7 Hz, 3H), 1.10 (s, 9H).

Step-5: (R/S)-1-(indolin-4-yl)ethan-1-amine hydrochloride

The title compound was synthesized by using (R)—N—((R/S)-1-(indolin-4-yl)ethyl)-2-methylpropane-2-sulfinamide and following analogous reaction protocol as described in Step-4 of Intermediate-1.

¹H NMR (400 MHz, DMSO-d₆) δ 8.69-8.64 (m, 2H), 7.58 (d, J=7.7 Hz, 1H), 7.44 (t, J=7.8 Hz, 1H), 7.33 (d, J=7.8 Hz, 1H), 4.47-4.34 (m, 1H), 3.69 (t, J=7.9 Hz, 2H), 3.41-3.21 (m, 2H), 1.52 (d, J=6.8 Hz, 3H).

Intermediate-18: 6-bromo-2-methyl-3,7,8,9-tetra-hydro-4H-cyclopenta[h]quinazolin-4-one Route-I:

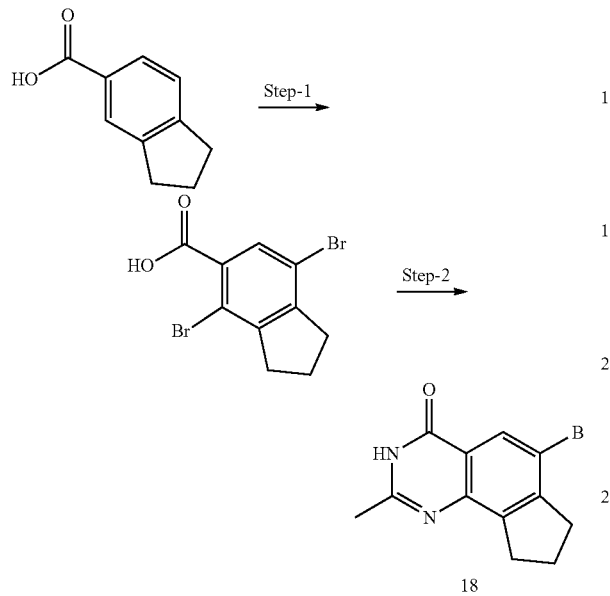

Step-1: 4,7-dibromo-2,3-dihydro-1H-indene-5-carboxylic acid

NBS (5.49 g, 30.8 mmol) was added portion wise to a solution of 2,3-dihydro-1H-indene-5-carboxylic acid (Commercially available) (2.00 g, 12.33 mmol) in Conc. $H_2SO_4$ (20 ml) at room temperature and the mixture was stirred overnight at room temperature, then poured the reaction mass onto crushed ice cold water solution. The solution was stirred for 30 min, the solid was filtered, air dried and precipitated with EtOAc and hexane to get 4,7-dibromo-2,3-dihydro-1H-indene-5-carboxylic acid (3.81 g, 97% yield (crude) as a brown solid.

MS (ES+) m/z=319.94 (M+).

$^1$H NMR (400 MHz, DMSO-$d_6$) δ 13.49 (s, 1H, $D_2O$ exchangeable), 7.71 (s, 1H), 3.11-3.96 (m, 4H), 2.15-2.04 (m, 2H).

Step-2: 6-bromo-2-methyl-3,7,8,9-tetrahydro-4H-cyclopenta[h]quinazolin-4-one A mixture of 4,7-dibromo-2,3-dihydro-1H-indene-5-carboxylic acid (70 g, 219 mmol), acetamidamide hydrochloride (31.0 g, 328 mmol), copper(I)iodide (8.33 g, 43.8 mmol) and cesium carbonate (143 g, 438 mmol) in DMF (500 ml) were heated at 70° C. for 16 hours. After completion of reaction, poured the reaction mass into water and extracted with EtOAc, washed the organic layer with water (100 ml), brine (50 ml) and dried over anhydrous sodium sulphate and concentrated under reduced pressure to get a crude compound (45.2 g). The crude compound was purified by column chromatography using 20-30% ethyl acetate in hexane to afford the titled compound 6-bromo-2-methyl-3,7,8,9-tetrahydro-4H-cyclopenta[h]quinazolin-4-one (27 g, 44.2% yield) as a white solid.

MS (ES+) m/z=279.15 (M+).

$^1$H NMR (400 MHz, DMSO-$d_6$) δ 12.27 (s, 1H), 7.99 (s, 1H), 3.20 (t, J=7.6 Hz, 2H), 3.01 (t, J=7.5 Hz, 2H), 2.34 (s, 3H), 2.20-2.09 (m, 2H).

Route-II:

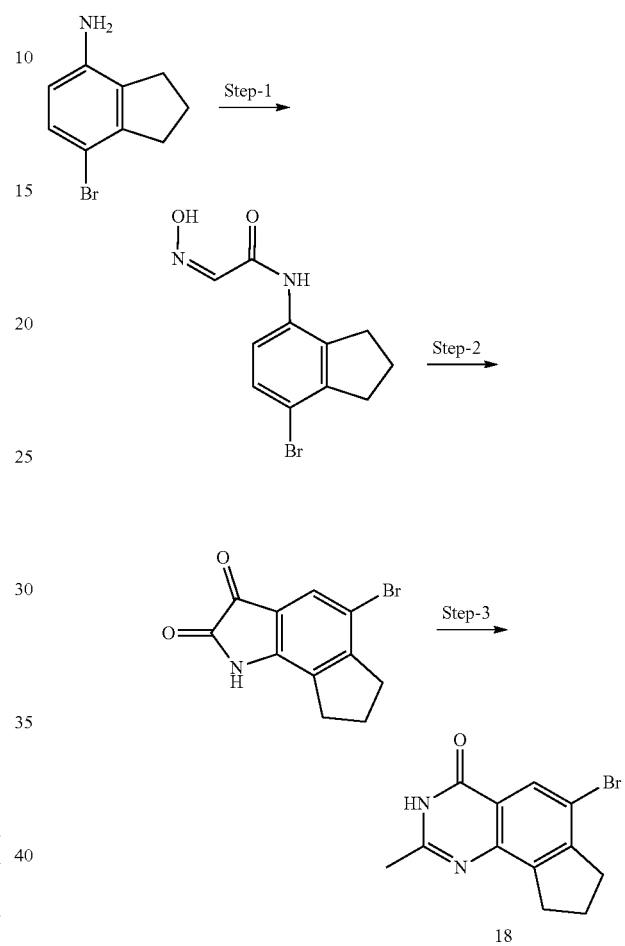

Step-1: N-(7-bromo-2,3-dihydro-1H-inden-4-yl)-2-(hydroxyimino)acetamide

A solution of 2,2,2-trichloroethane-1,1-diol (4.29 g, 25.9 mmol) and sodium sulphate (26.8 g, 189 mmol) in DM water (140 ml) was heated to 40° C. Added sequentially a suspension of 7-bromo-2,3-dihydro-1H-inden-4-amine (5 g, 23.57 mmol) (WO2017/139778A1), DM water (38 ml) and HCl (3.93 ml, 47.1 mmol). To this reaction mixture, was added a solution of hydroxylamine hydrochloride (4.91 g, 70.7 mmol) in DM water (21 ml). Reaction mixture was then stirred at 80° C. for 1 h. After completion of reaction, cooled to 10° C., the precipitates were filtered, washed with water, hexane and dried to afford N-(7-bromo-2,3-dihydro-1H-inden-4-yl)-2-(hydroxyimino)acetamide (6 g, 90% yield).

MS (ES+) m/z=283.09 (M+).

$^1$H NMR (400 MHz, DMSO-$d_6$) δ 12.23 (s, 1H), 9.55 (s, 1H), 7.71 (s, 1H), 7.46 (d, J=8.5 Hz, 1H), 7.34 (d, J=8.5 Hz, 1H), 2.99-2.86 (m, 4H), 2.10-1.98 (m, 2H).

Step-2: 5-bromo-1,6,7,8-tetrahydrocyclopenta[g]indole-2,3-dione

To sulfuric acid (3.77 ml, 70.6 mmol) at room temperature was added N-(7-bromo-2,3-dihydro-1H-inden-4-yl)-2-(hydroxyimino)acetamide (1 g, 3.53 mmol) in small portions, then the reaction mixture was heated at 60° C. for 1 h without allowing the internal temperature to rise above 60° C. Then reaction mixture was poured into ice water solution and precipitated solid was filtered. Dissolved residual solid in 10% MeOH/DCM and evacuated this mixture under vacuum. The residue was then stirred in ethyl acetate and filtered, washed with ethyl acetate to afford desired product (900 mg, 96% yield).

MS (ES+) m/z=265.90 (M+).

$^1$H NMR (400 MHz, DMSO-d$_6$) δ 11.22 (s, 1H), 7.48 (s, 1H), 2.89 (t, J=7.3 Hz, 4H), 2.16-2.04 (m, 2H).

Step-3: 6-bromo-2-methyl-3,7,8,9-tetrahydro-4H-cyclopenta[h]quinazolin-4-one To a solution of 5-bromo-1,6,7,8-tetrahydrocyclopenta[g]indole-2,3-dione (100 mg, 0.376 mmol) in DMSO (10 ml) were added acetamide hydrochloride (42.6 mg, 0.451 mmol), tert-butyl hydroperoxide (0.102 ml, 0.564 mmol) and sodium carbonate (119 mg, 1.127 mmol) at room temperature, continued the stirring for 16 h. After completion of reaction, reaction mixture diluted with water, extracted with ethyl acetate (20 ml×2). Combined organic layer was washed with water (20 ml), brine, dried over anhydrous Na$_2$SO$_4$ and concentrated to get crude residue (130 mg). This residue was purified by column chromatography (Rf200, Teledyne/Isco) instrument onto a Redisep® Rf column with gradient elution (0 to 40%) of Ethyl acetate in Hexane to afford 6-bromo-2-methyl-3,7,8,9-tetrahydro-4H-cyclopenta[h]quinazolin-4-one (90 mg, 86%).

MS (ES+) m/z=279.02 (M+).

$^1$H NMR (400 MHz, DMSO-d$_6$) δ 12.25 (s, 1H), 7.99 (s, 1H), 3.20 (t, J=7.6 Hz, 2H), 3.06-2.97 (m, 2H), 2.34 (s, 3H), 2.25-2.02 (m, 2H).

Intermediate-19: 6-bromo-4-chloro-2-methyl-8,9-dihydro-7H-cyclopenta[h]quinazoline

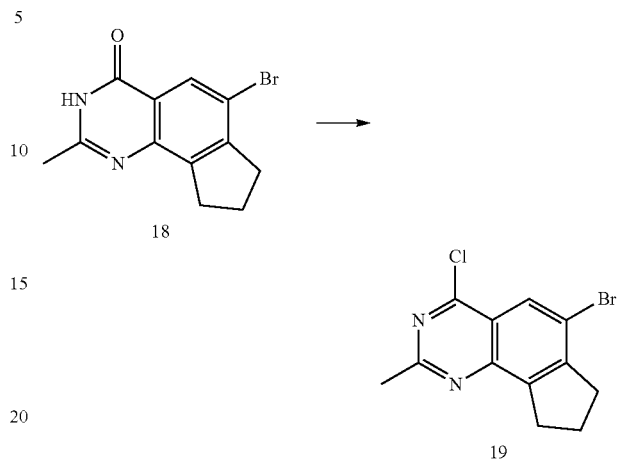

To a stirred solution of 6-bromo-2-methyl-3,7,8,9-tetrahydro-4H-cyclopenta[h]quinazolin-4-one (0.290 g, 1.039 mmol) in chlorobenzene (10 ml) was added DIPEA (0.272 ml, 1.558 mmol) followed by POCl$_3$ (0.116 ml, 1.247 mmol) at 0° C. and stirred at room temperature for 0.5 h. Then reaction mixture was heated to 90° C. for 2 h. After completion of reaction, reaction mixture was concentrated in vacuo to get crude (0.41 g). Crude residue was purified by biotage purifier using eluent 0-5% ethyl acetate in hexane to obtain 6-bromo-4-chloro-2-methyl-8,9-dihydro-7H-cyclopenta[h]quinazoline (130 mg, 42.0% yield) as pale yellow solid.

MS (ES+) m/z=299.21 (M+1).

$^1$H NMR (400 MHz, Chloroform-d) δ 8.27 (d, J=1.0 Hz, 1H), 3.59-3.44 (m, 2H), 3.26-3.15 (m, 2H), 2.85 (s, 3H), 2.35-2.28 (m, 2H).

Intermediate-20: (R)—N-(1-(3-amino-5-(trifluoromethyl)phenyl)ethyl)-6-bromo-2-methyl-7,8,9,10-tetrahydrobenzo[h]quinazolin-4-amine

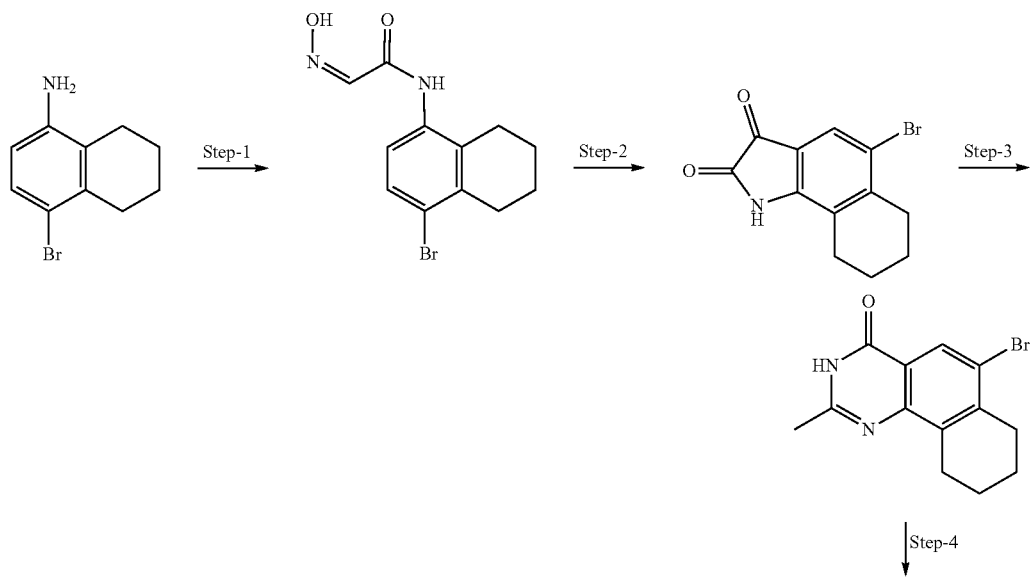

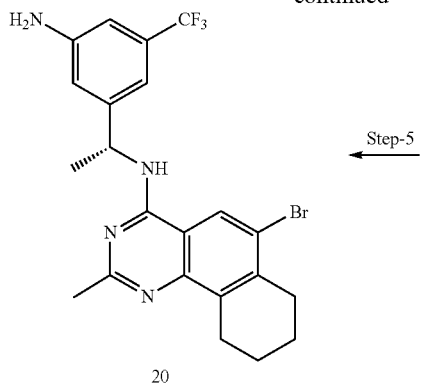

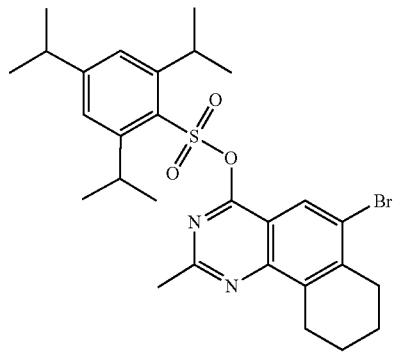

Step-1: N-(4-bromo-5,6,7,8-tetrahydronaphthalen-1-yl)-2-(hydroxyimino)acetamide The title compound was synthesized by using 4-bromo-5,6,7,8-tetrahydronaphthalen-1-amine (commercially available) following analogous reaction protocol as described in Step-1 of Route-II of Intermediate-18.

$^1$H NMR (400 MHz, DMSO-$d_6$) δ 12.22 (s, 1H), 9.45 (s, 1H), 7.67 (s, 1H), 7.44 (d, J=8.5 Hz, 1H), 7.28 (d, J=8.5 Hz, 1H), 2.69-2.66 (m, 2H), 2.61-2.58 (m, 2H), 1.74-1.69 (m, 4H).

Step-2: 5-bromo-6,7,8,9-tetrahydro-1H-benzo[g]indole-2,3-dione

The title compound was synthesized by using N-(4-bromo-5,6,7,8-tetrahydronaphthalen-1-yl)-2-(hydroxyimino)acetamide and following analogous reaction protocol as described in Step-2 of Route-II of Intermediate-18.

$^1$H NMR (400 MHz, DMSO-$d_6$) δ 11.10 (s, 1H), 7.53 (s, 1H), 2.75-2.57 (m, 4H), 1.76-1.71 (m, 4H).

Step-3: 6-bromo-2-methyl-7,8,9,10-tetrahydrobenzo[h]quinazolin-4(3H)-one

The title compound was synthesized by using 5-bromo-6,7,8,9-tetrahydro-1H-benzo[g]indole-2,3-dione and following analogous reaction protocol as described in Step-3 of Route-II of Intermediate-18.

MS (ES+) m/z=293.1 (M+).

$^1$H NMR (400 MHz, DMSO-$d_6$) δ 12.30 (s, 1H), 8.04 (s, 1H), 3.02 (t, J=6.1 Hz, 2H), 2.76 (t, J=6.2 Hz, 2H), 2.35 (s, 3H), 1.79-1.63 (m, 4H).

Step-4: 6-bromo-2-methyl-7,8,9,10-tetrahydrobenzo[h]quinazolin-4-yl-2,4,6-triisopropylbenzenesulfonate To a stirred suspension of 6-bromo-2-methyl-7,8,9,10-tetrahydrobenzo[h]quinazolin-4(3H)-one (0.3 g, 1.023 mmol) in tetrahydrofuran (60 mL) were added potassium carbonate (0.424 g, 3.07 mmol), DMAP (0.125 g, 1.023 mmol) followed by 2,4,6-triisopropylbenzenesulfonyl chloride (0.682 g, 2.251 mmol) at 25° C. The reaction mixture was stirred at 80° C. for 2 h. After completion of reaction, reaction mixture was filtered, filtrate was concentrated to give crude residue (0.41 g). Crude compound was purified by flash column chromatography by using gradient eluent 0-15% ethyl acetate in hexane to give 6-bromo-2-methyl-7,8,9,10-tetrahydrobenzo[h]quinazolin-4-yl 2,4,6-triisopropylbenzenesulfonate (0.26 g, 45.4% yield) as an off white solid.

$^1$H NMR (400 MHz, Chloroform-d) δ 8.23 (s, 1H), 7.22 (s, 2H), 4.40-4.27 (m, 2H), 3.30-3.17 (m, 2H), 2.97-2.88 (m, 3H), 2.61 (s, 3H), 1.92-1.82 (m, 4H), 1.28 (d, J=6.8 Hz, 18H).

Step-5: (R)—N-(1-(3-amino-5-(trifluoromethyl)phenyl)ethyl)-6-bromo-2-methyl-7,8,9,10-tetrahydrobenzo[h]quinazolin-4-amine To a stirred solution of 6-bromo-2-methyl-7,8,9,10-tetrahydrobenzo[h]quinazolin-4-yl 2,4,6-triisopropylbenzenesulfonate (0.25 g, 0.447 mmol) in DMSO (2.5 mL) was added (R)-3-(1-aminoethyl)-5-(trifluoromethyl)aniline (0.109 g, 0.536 mmol) followed by triethylamine (0.498 mL, 3.57 mmol) at 25° C. The reaction mixture was stirred at 90° C. for 16 h. After completion of reaction, reaction mixture was allowed to room temperature diluted with DCM (50 ml), washed with saturated solution of sodium bicarbonate. The separated organic layer was washed with water (20 ml), brine (20 ml), dried over anhydrous $Na_2SO_4$, filtered and concentrated to give crude residue (0.321 g). The crude residue was purified by flash column chromatography by using eluent 0-0.5% methanol in DCM to get (R)—N-(1-(3-amino-5-(trifluoromethyl)phenyl)ethyl)-6-bromo-2-methyl-7,8,9,10-tetrahydrobenzo[h]quinazolin-4-amine (0.14 g, 65.4% yield).

$^1$H NMR (400 MHz, DMSO-$d_6$) δ 8.57 (s, 1H), 8.32 (d, J=7.8 Hz, 1H), 6.87 (s, 1H), 6.83 (d, J=1.9 Hz, 1H), 6.69 (d, J=1.9 Hz, 1H), 5.54 (s, 2H), 5.50 (d, J=7.2 Hz, 1H), 3.11-3.02 (m, 2H), 2.81-2.72 (m, 2H), 2.40 (s, 3H), 1.83-1.71 (m, 4H), 1.53 (d, J=7.0 Hz, 3H).

Intermediate-21: (R)-6-bromo-2-methyl-N-(1-(3-nitro-5-(trifluoromethyl)phenyl)ethyl)-8,9-dihydro-7H-cyclopenta[h]quinazolin-4-amine

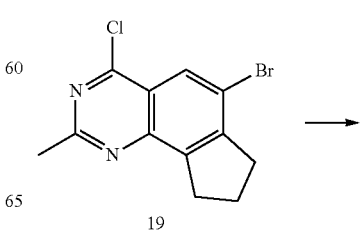

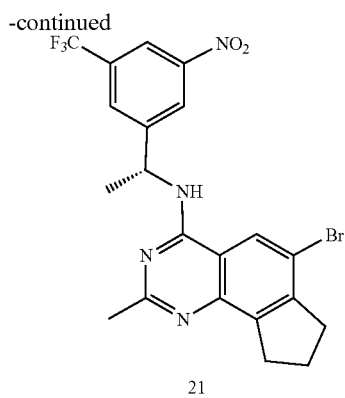

21

To a stirred solution of 6-bromo-4-chloro-2-methyl-8,9-dihydro-7H-cyclopenta[h]quinazoline (1 g, 3.36 mmol) (Intermediate-19) in 1,4-dioxane (30 ml) were added (R)-1-(3-nitro-5-(trifluoromethyl)phenyl) ethan-1-amine hydrochloride (0.909 g, 3.36 mmol) and di-isopropylamine (1.761 ml, 10.08 mmol) in microwave vial at room temperature. The reaction mixture was heated at 120° C. for 16 h. After completion of reaction, reaction mixture was concentrated in vacuo to get 2.0 g of a crude compound. This crude residue was purified by flash chromatography with gradient elution (0-50%) of ethyl acetate in hexane to afford the (R)-6-bromo-2-methyl-N-(1-(3-nitro-5-(trifluoromethyl)phenyl)ethyl)-8,9-dihydro-7H-cyclopenta[h]quinazolin-4-amine (1.5 g, 90% yield) as a sticky yellow solid.

$^1$H NMR (400 MHz, DMSO-d$_6$) δ 8.61 (t, J=1.8 Hz, 1H), 8.53 (d, J=7.3 Hz, 1H), 8.46 (s, 1H), 8.36-8.30 (m, 2H), 5.73-5.55 (m, 1H), 3.29-3.13 (m, 2H), 3.13-2.85 (m, 2H), 2.36 (s, 3H), 2.19-2.08 (m, 2H), 1.66 (d, J=7.1 Hz, 3H). MS (m/z)=495.10 (M+1).

Intermediate-22: (R)—N-(1-(3-amino-5-(trifluoromethyl)phenyl)ethyl)-6-bromo-2-methyl-8,9-dihydro-7H-cyclopenta[h]quinazolin-4-amine

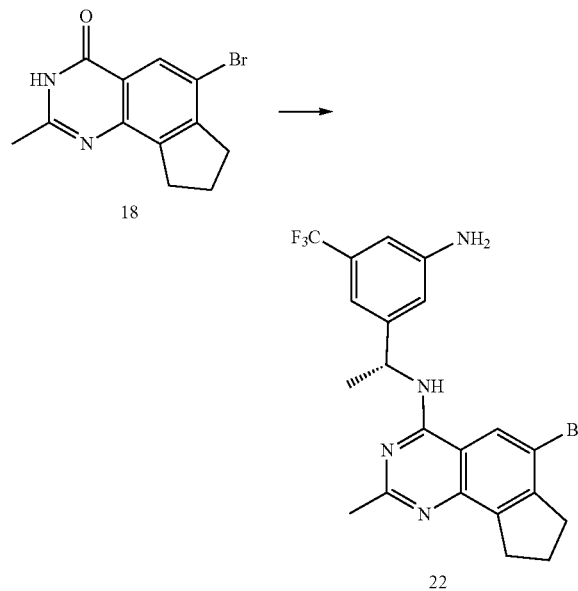

To a solution of 6-bromo-2-methyl-3,7,8,9-tetrahydro-4H-cyclopenta[h]quinazolin-4-one (Intermediate-18) (2.0 g, 7.16 mmol) (Intermediate-18) and Benzotriazol-1-yloxytris(dimethylamino)-phosphonium hexafluorophosphate (4.75 g, 10.75 mmol) in DMF (60 ml) was added DBU (5.40 ml, 35.8 mmol) followed by addition of (R/S)-3-(1-aminoethyl)-5-(trifluoromethyl)aniline (1.975 g, 9.67 mmol) at room temperature. The resulting reaction mixture was stirred at 120° C. for 2 h. The reaction mixture was quenched with ice cold water (50 ml) and extracted with ethyl acetate (60 ml×3), washed with water (30 ml) and brine (30 ml). The ethyl acetate layer was dried over anhydrous sodium sulfate and concentrated to get crude residue (3.1 g). The crude mass was purified by flash column chromatography by using gradient elution of 0-30% ethyl acetate in hexane to afford (R)—N-(1-(3-amino-5-(trifluoromethyl)phenyl)ethyl)-6-bromo-2-methyl-8,9-dihydro-7H-cyclopenta[h]quinazolin-4-amine (1.5 g, 45.0% yield) as a colorless oil.

MS (ES+) m/z=465.1 (M+).

$^1$H NMR (400 MHz, DMSO-d$_6$) δ 8.52 (s, 1H), 8.35 (d, J=7.8 Hz, 1H), 6.91-6.81 (m, 2H), 6.70 (d, J=1.9 Hz, 1H), 5.53 (d, J=11.8 Hz, 3H), 3.23 (t, J=7.7 Hz, 2H), 3.03 (t, J=7.5 Hz, 2H), 2.39 (s, 3H), 2.19-2.09 (m, 2H), 1.54 (d, J=7.1 Hz, 3H).

Following intermediates disclosed in Table-II were prepared using intermediate 18 and appropriate amine the similar procedure described above in Intermediate-22.

TABLE II

| Intermediate | Chemical structure | LCMS (m/z) data |
| --- | --- | --- |
| 23 |  | 476.11 |
| 24 |  | 450.10 |

Intermediate-25: (R)-4-(2-methyl-4-((1-(3-nitro-5-(trifluoromethyl)phenyl)ethyl)amino)-8,9-dihydro-7H-cyclopenta[h]quinazolin-6-yl)morpholin-3-one Intermediate-26: (R)-2-(3-(1-(((6-bromo-2-methyl-8,9-dihydro-7H-cyclopenta[h]quinazolin-4-yl)amino)ethyl)-2-fluorophenyl)-2,2-difluoroethan-1-ol

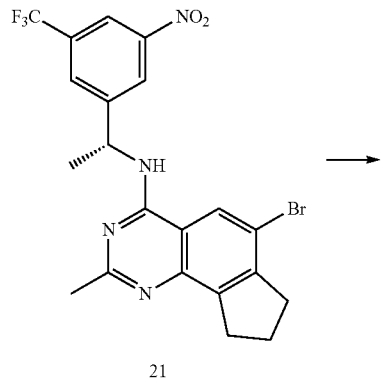

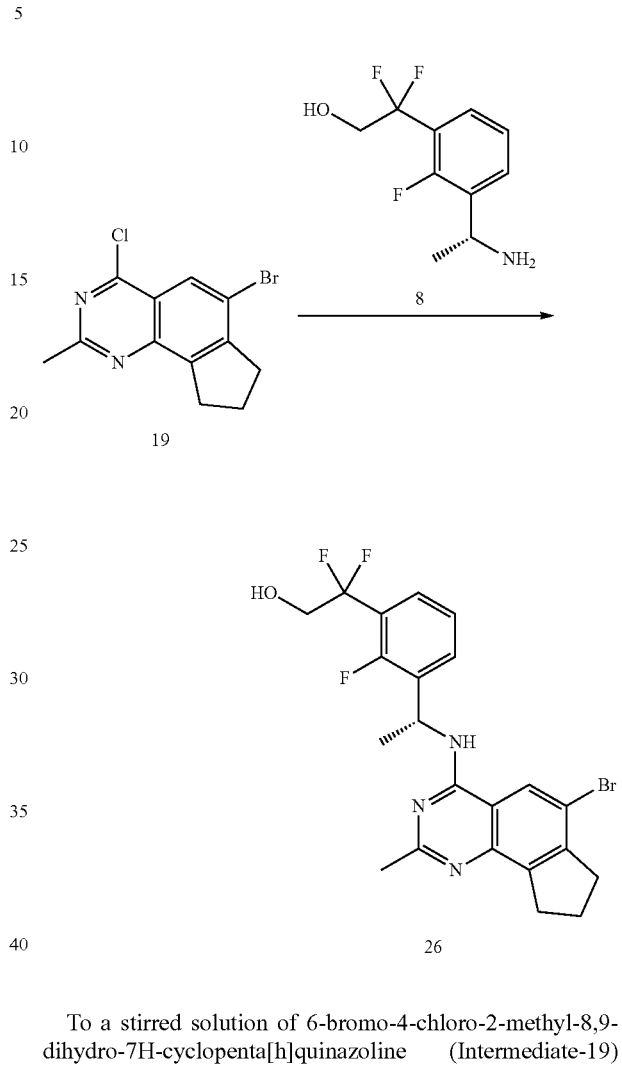

Taken a solution of (R)-6-bromo-2-methyl-N-(1-(3-nitro-5-(trifluoromethyl)phenyl)ethyl)-8,9-dihydro-7H-cyclopenta[h]quinazolin-4-amine (Intermediate-21) (500 mg, 1.009 mmol), morpholin-3-one (306 mg, 3.03 mmol), K$_2$CO$_3$ (279 mg, 2.019 mmol) in dioxane (20 ml) was degassed with N$_2$ in microwave vial for 5 min. followed by addition of Cu(I)I (19.23 mg, 0.101 mmol). The resulting reaction mixture was heated at 95° C. for 16 h. The reaction mixture was concentrated in vacuo to get crude (0.9 g). This crude residue was purified by flash column chromatography with gradient elution (0-60%) of ethyl acetate in hexane to afford (R)-4-(2-methyl-4-((1-(3-nitro-5-(trifluoromethyl)phenyl)ethyl)amino)-8,9-dihydro-7H-cyclopenta[h]quinazolin-6-yl)morpholin-3-one (450 mg, 86% yield) as off white solid.

MS (ES+) m/z=516.0 (M+1).

$^1$H NMR (400 MHz, DMSO-d$_6$) δ 8.62 (t, J=1.8 Hz, 1H), 8.42 (d, J=7.3 Hz, 1H), 8.37-8.30 (m, 2H), 8.12 (s, 1H), 5.73-5.64 (m, 1H), 4.09-4.00 (m, 2H), 3.77-3.68 (m, 4H), 3.28-3.19 (m, 3H), 3.19-3.11 (m, 2H), 2.95-2.85 (m, 2H), 2.17-2.04 (m, 2H), 1.67 (d, J=7.1 Hz, 3H).

To a stirred solution of 6-bromo-4-chloro-2-methyl-8,9-dihydro-7H-cyclopenta[h]quinazoline (Intermediate-19) (200 mg, 0.672 mmol) in Dioxane (5.0 ml) were added (R)-2-(3-(1-aminoethyl)-2-fluorophenyl)-2,2-difluoroethan-1-ol (Intermediate-8) (147 mg, 0.672 mmol) and DIPEA (0.352 ml, 2.016 mmol) in microwave vial. The resulting reaction mixture was heated at 100° C. for 16 h. After complete consumption of starting material, the reaction mixture was concentrated in vacuo to get crude product (371 mg). The crude product was purified by flash column chromatography by using eluent 0-40% ethyl acetate in hexane to afford (R)-2-(3-(1-(((6-bromo-2-methyl-8,9-dihydro-7H-cyclopenta[h]quinazolin-4-yl)amino)ethyl)-2-fluorophenyl)-2,2-difluoroethan-1-ol (300 mg, 93% yield).

MS (ES+) m/z=481.11 (M+1).

$^1$H NMR (400 MHz, DMSO-d$_6$) δ 8.55 (s, 1H), 8.45 (d, J=7.3 Hz, 1H), 7.68-7.60 (m, 1H), 7.45-7.37 (m, 1H), 7.25 (t, J=7.7 Hz, 1H), 5.84-5.76 (m, 1H), 4.84-4.73 (m, 1H), 4.00-3.87 (m, 2H), 3.29-3.16 (m, 2H), 3.03 (t, J=7.5 Hz, 2H), 2.35 (s, 3H), 2.20-2.07 (m, 2H), 1.58 (d, J=7.0 Hz, 3H).

Following Examples disclosed in Table-III were prepared using the similar procedure described above Intermediate-26 and using Intermediate-19 and appropriate amine.

TABLE III

| Intermediate | Chemical Structure | LCMS (m/z) data |
|---|---|---|
| 27 | | 468.0 |
| 28 | | 429.04 |
| 29 | | 460.10 |
| 30 | | 510.11 |

TABLE III-continued

| Intermediate | Chemical Structure | LCMS (m/z) data |
|---|---|---|
| 31 | | 454.11 |
| 32 | | 466.10 |
| 33 | | 504.18 |

TABLE III-continued

| Intermediate | Chemical Structure | LCMS (m/z) data |
|---|---|---|
| 34 | 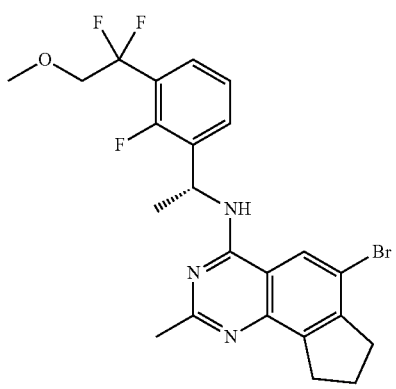 | 482.05 |

Intermediate-35: (R)-6-bromo-N-(1-(3-(1,1-difluoro-2-methoxyethyl)-2-fluorophenyl)ethyl)-2-methyl-8,9-dihydro-7H-cyclopenta[h]quinazolin-4-amine

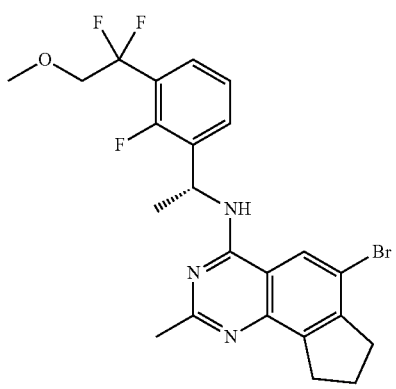

To a stirred solution of (R)-2-(3-(1-((6-bromo-2-methyl-8,9-dihydro-7H-cyclopenta[h]quinazolin-4-yl)amino)ethyl)-2-fluorophenyl)-2,2-difluoroethan-1-ol (300 mg, 0.625 mmol) (Intermediate-26) in DCM (10 ml) were added 1,8-Bis(dimethylamino)naphthalene (361 mg, 1.686 mmol), trimethyloxonium tetrafluoroborate (231 mg, 1.561 mmol) at 0° C. The resulting heterogeneous reaction mass was stirred at room temperature for 20 h. After completion of reaction, reaction mixture was diluted with DCM (50 ml), filtered through celite and filtrate was washed with 10% aq. HCl solution. The separated organic layer was again washed with water (20 ml), brine (30 mL), dried over anhydrous $Na_2SO_4$, filtered and concentrated in vaccuo to give crude product (500 mg). The crude product was purified by flash column chromatography with gradient elution of 20% ethyl acetate in hexane to afford the (R)-6-bromo-N-(1-(3-(1,1-difluoro-2-methoxyethyl)-2-fluorophenyl)ethyl)-2-methyl-8,9-dihydro-7H-cyclopenta[h]quinazolin-4-amine (120 mg, 38.83% yield) as a colorless liquid.

MS (ES+) m/z=496.05 (M+2).

$^1$H NMR (400 MHz, DMSO-$d_6$) δ 8.56 (s, 1H), 8.47 (d, J=7.2 Hz, 1H), 7.65-2.60 (m, 1H), 7.46-7.40 (m, 1H), 7.28-7.23 (m, 1H), 5.81-5.73 (m, 1H), 4.05-3.93 (m, 2H), 3.26-3.29 (m, 1H), 3.03 (t, J=7.6 Hz, 2H), 2.34 (s, 3H), 2.17-1.99 (m, 2H), 1.58 (d, J=7.1 Hz, 3H).

Intermediate-36: (R)-1-(4-((1-(3-amino-5-(trifluoromethyl)phenyl)ethyl)amino)-2-methyl-8,9-dihydro-7H-cyclopenta[h]quinazolin-6-yl)ethan-1-one

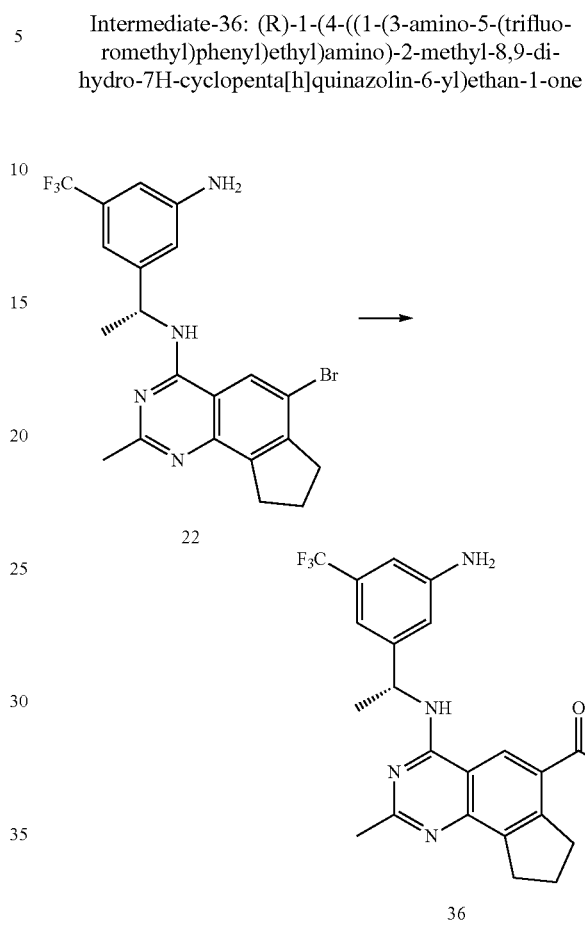

To a mixture of (R)—N-(1-(3-amino-5-(trifluoromethyl)phenyl)ethyl)-6-bromo-2-methyl-8,9-dihydro-7H-cyclopenta[h]quinazolin-4-amine (1.8 g, 3.87 mmol) (Intermediate-22), tributyl(1-ethoxyvinyl)stannane (1.075 ml, 5.03 mmol) and $PdCl_2(PPh_3)_2$ (0.272 g, 0.387 mmol) in toluene (20 ml) was heated at 100° C. for 16 h. After completion of the reaction, the reaction mass was cooled to room temperature, filtered through a celite bed, the solvent was removed in vacuo and the residue was suspended in 2N HCl (10 ml) and THF (30 ml). The resulting mixture was stirred for 2 h at room temperature, basified with aq. $NaHCO_3$ and then extracted with EtOAc (3×50 ml). The organic phase was separated, dried over anhydrous sodium sulphate, filtered and concentrated in vacuo to get 5.5 g of crude compound. The crude compound was purified by flash column chromatography by using gradient elution of 20-30% ethyl acetate in hexane to get (R)1-(4-((1-(3-amino-5-(trifluoromethyl)phenyl)ethyl)amino)-2-methyl-8,9-dihydro-7H-cyclopenta[h]quinazolin-6-yl)ethan-1-one (1.2 g, 72.4% yield) as colorless oil.

MS (ES+) m/z=429.1 (M+1).

$^1$H NMR (400 MHz, DMSO-$d_6$) δ 8.81 (s, 1H), 8.64 (d, J=7.9 Hz, 1H), 6.90-6.88 (m, 1H), 6.87-6.85 (d, J=1.9 Hz, 1H), 6.73-6.70 (m, 1H), 5.68-5.61 (m, 1H), 5.57 (s, 2H), 3.29 (t, J=7.5 Hz, 2H), 3.09 (t, J=7.7 Hz, 2H), 2.70 (s, 3H), 2.43 (s, 3H), 2.13-2.04 (m, 2H), 1.60 (d, J=7.1 Hz, 3H).

Intermediate-37: (R)-3-(3-(1-((6-bromo-2-methyl-8,9-dihydro-7H-cyclopenta[h]quinazolin-4-yl)amino)ethyl)-2-fluorophenyl)-3,3-difluoropropan-1-ol

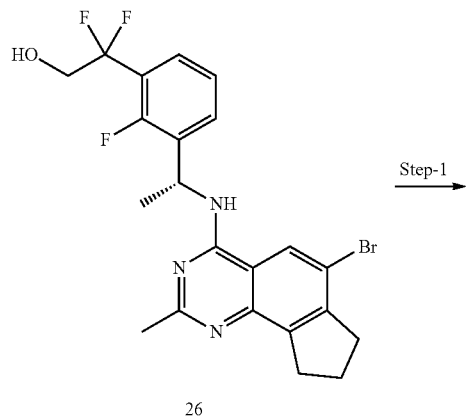

26

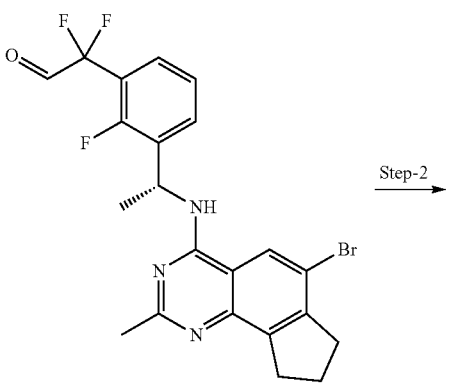

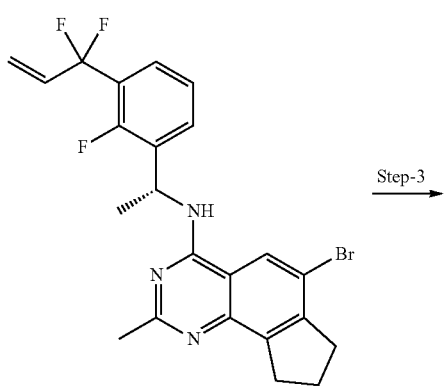

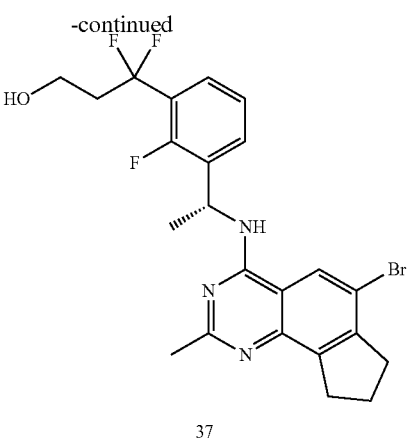

37

Step-1: (R)-2-(3-(1-((6-bromo-2-methyl-8,9-dihydro-7H-cyclopenta[h]quinazolin-4-yl)amino)ethyl)-2-fluorophenyl)-2,2-difluoroacetaldehyde Taken a solution of oxalyl chloride (0.087 ml, 0.999 mmol) in dichloromethane (20 ml) at −78° C. and added anhydrous DMSO (0.136 ml, 1.915 mmol) into it. The mixture was kept at −60° C. for 30 min. To the reaction mixture added a solution of ((R)-2-(3-(1-((6-bromo-2-methyl-8,9-dihydro-7H-cyclopenta[h]quinazolin-4-yl)amino)ethyl)-2-fluorophenyl)-2,2-difluoroethan-1-ol) (400 mg, 0.833 mmol) (Intermediate-26) in dichloromethane (10 ml) and stirred vigorously at −60° C. for 30 min. Added thereafter triethylamine (0.522 ml, 3.75 mmol) to the reaction mixture and stirred at room temperature for 6 h. After completion, reaction mixture was diluted with dichloromethane (100 ml), washed with water (50 ml) and brine (50 ml). The separated organic layer was dried over anhydrous sodium sulphate, filtered and evaporated to afford crude (R)-2-(3-(1-((6-bromo-2-methyl-8,9-dihydro-7H-cyclopenta[h]quinazolin-4-yl)amino)ethyl)-2-fluorophenyl)-2,2-difluoroacetaldehyde. The crude product was used as such for next step.

MS (ES+) m/z=478.05 (M+).

Step-2: (R)-6-bromo-N-(1-(3-(1,1-difluoroallyl)-2-fluorophenyl)ethyl)-2-methyl-8,9-dihydro-7H-cyclopenta[h]quinazolin-4-amine To a suspension of methyl triphenyl phosphonium bromide (892 mg, 2.496 mmol)) in THF (20 ml) was added KHMDS (2.496 ml, 2.496 mmol) at 0° C. The yellow mixture was stirred at 0° C. for 30 min. A solution of (R)-2-(3-(1-((6-bromo-2-methyl-8,9-dihydro-7H-cyclopenta[h]quinazolin-4-yl)amino)ethyl)-2-fluorophenyl)-2,2-difluoroacetaldehyde (398 mg, 0.832 mmol) in 5 ml of THF was added to the reaction mixture. The yellow suspension was stirred at room temperature again for 16 h. After completion, reaction mixture was diluted with water and extracted with ethyl acetate (50 ml×2). The combined organic layer was dried over sodium sulphate, filtered and concentrated. The obtained crude product was purified by flash chromatography with gradient elution (0-30%) of ethyl acetate in hexane to afford (R)-6-bromo-N-(1-(3-(1,1-difluoroallyl)-2-fluorophenyl)ethyl)-2-methyl-8,9-dihydro-7H-cyclopenta[h]quinazolin-4-amine (140 mg, 35.3% yield) as colorless sticky solid.

MS (ES+) m/z=476.1 (M+).

$^1$H NMR (400 MHz, DMSO-d$_6$) δ 8.57-8.54 (m, 1H), 8.48-8.45 (m, 1H), 7.67-7.59 (m, 1H), 7.49-7.41 (m, 1H), 7.29-7.22 (m, 1H), 6.47-6.34 (m, 1H), 5.78-5.68 (m, 1H), 5.67-5.54 (m, 2H), 3.24-3.17 (m, 2H), 3.07-2.98 (m, 2H), 2.32 (s, 3H), 2.17-2.06 (m, 2H), 1.57 (d, J=6.6 Hz, 3H).

Step-3: (R)-3-(3-(1-((6-bromo-2-methyl-8,9-dihydro-7H-cyclopenta[h]quinazolin-4-yl)amino)ethyl)-2-fluorophenyl)-3,3-difluoropropan-1-ol BH$_3$.THF (1.491 ml, 1.491 mmol) was added to a solution of (R)-6-bromo-N-(1-(3-(1,1-difluoroallyl)-2-fluorophenyl)ethyl)-2-methyl-8,9-dihydro-7H-cyclopenta[h]quinazolin-4-amine (142 mg, 0.298 mmol) in THF (10 ml) at 0° C. The resulting solution was allowed to warm to room temperature and then stirred for 3 h. The solution was again cooled to 0° C. and treated with 10 N NaOH (0.298 ml, 1.49 mmol) drop wise, followed by slow addition of H$_2$O$_2$ (0.304 ml, 2.98 mmol). The resulting mixture was allowed to warm to room temperature and again stirred for 1 h. The reaction mixture was diluted with 10% HCl (10 ml) and extracted with ethyl acetate (20 ml×3). The combined organic phases were dried over Na$_2$SO$_4$, filtered and concentrated to afford crude (R)-3-(3-(1-((6-bromo-2-methyl-8,9-dihydro-7H-cyclopenta[h]quinazolin-4-yl)amino)ethyl)-2-fluorophenyl)-3,3-difluoropropan-1-ol (70 mg) as a green sticky solid which was used as such for next step.

MS (ES+) m/z=494.11 (M+).

Intermediate-38: 1-(3-((R)-1-((6-bromo-2-methyl-8,9-dihydro-7H-cyclopenta[h]quinazolin-4-yl)amino)ethyl)-2-fluorophenyl)-1,1-difluoropropan-2-ol

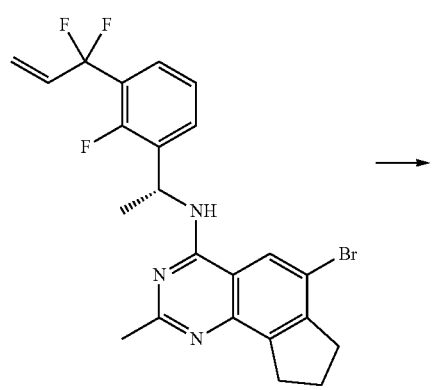

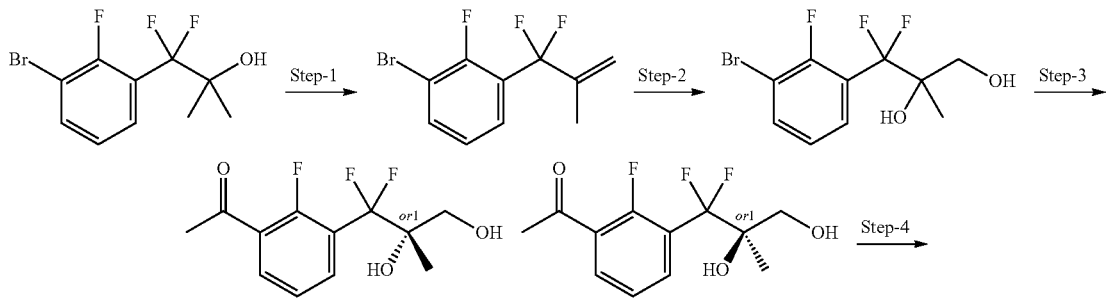

38

BH$_3$.THF (8.40 ml, 8.40 mmol) was added to a solution of (R)-6-bromo-N-(1-(3-(1,1-difluoroallyl)-2-fluorophenyl)ethyl)-2-methyl-8,9-dihydro-7H-cyclopenta[h]quinazoline-4-amine (800 mg, 1.679 mmol) in THF (20 ml) at 0° C. The solution was allowed to warm to room temperature and then stirred for 3 h. The solution was again cooled to 0° C. and treated with 10 N NaOH (2.0 ml) drop wise, followed by slow addition of H$_2$O$_2$(1.715 ml, 16.79 mmol. The resulting reaction mixture was allowed to warm to room temperature and stirred for 1 h. The reaction mixture was diluted with 10% aq. HCl (10 ml) and extracted with ethyl acetate (60 ml×3). The combined organic phases were dried over Na$_2$SO$_4$, filtered and concentrated and purified by flash chromatography with gradient elution (0 to 30%) of ethyl acetate in hexane to afford 1-(3-((R)-1-((6-bromo-2-methyl-8,9-dihydro-7H-cyclopenta[h]quinazolin-4-yl)amino)ethyl)-2-fluorophenyl)-1,1-difluoropropan-2-ol (360 mg, 43.4% yield) as white solid.

MS (ES+) m/z=494.17 (M+).

$^1$H NMR (400 MHz, DMSO-d$_6$) δ 8.56 (s, 1H), 8.49-8.41 (m, 1H), 7.66-7.56 (m, 1H), 7.41-7.32 (m, 1H), 7.27-7.17 (m, 1H), 5.85-5.75 (m, 1H), 5.60-5.55 (m, 1H), 4.20 (s, 1H), 3.27-3.18 (m, 2H), 3.03 (t, J=7.6 Hz, 2H), 2.40-2.28 (m, 3H), 2.18-2.08 (m, 2H), 1.62-1.54 (m, 3H), 1.17-1.12 (m, 3H).

Intermediate-39: 3-(3-((R/S)-1-((6-bromo-2-methyl-8,9-dihydro-7H-cyclopenta[h]quinazolin-4)amino)ethyl)-2-fluorophenyl)-3,3-difluoro-2-methylpropane-1,2-diol (Compound-39a) and 3-(3-((S/R)-1-((6-bromo-2-methyl-8,9-dihydro-7H-cyclopenta[h]quinazolin-4)amino)ethyl)-2-fluorophenyl)-3,3-difluoro-2-methylpropane-1,2-diol (Compound-39b)

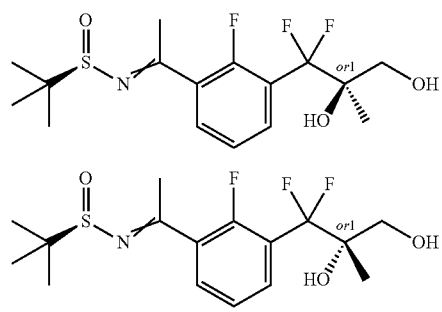 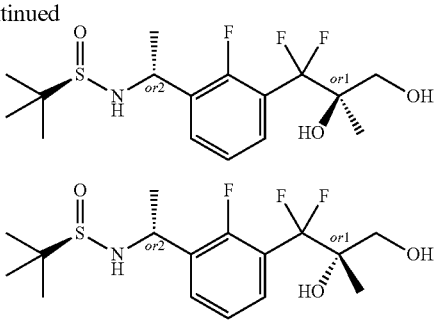

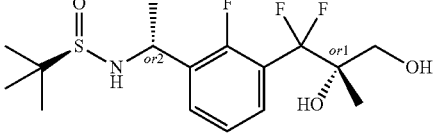

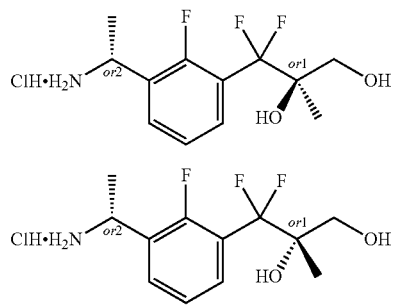

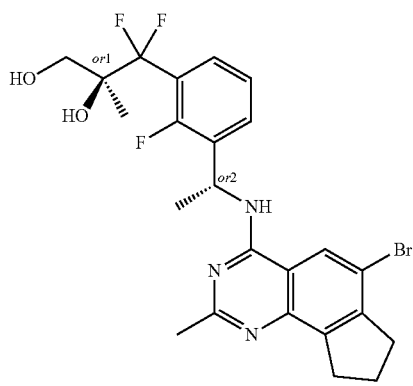 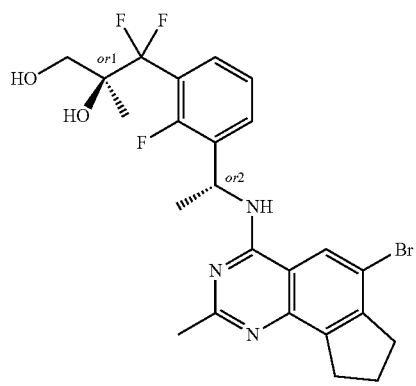

39a          39b

Step-1: 1-bromo-3-(1,1-difluoro-2-methylallyl)-2-fluorobenzene

To a solution of 1-(3-bromo-2-fluorophenyl)-1,1-difluoro-2-methylpropan-2-ol (12.5 g, 44.2 mmol) in dichloromethane (130 ml) was added Martin's Sulfurane (29.7 g, 44.2 mmol) at room temperature. The reaction mixture was stirred at same temperature for 30 min. After completion of reaction, the reaction mixture was concentrated under reduced pressure to get 21.0 g crude residue. An obtained crude product was purified by flash chromatography with gradient elution (0-2%) of ethyl acetate in hexane to afford the 1-bromo-3-(1,1-difluoro-2-methylallyl)-2-fluorobenzene (8.1 g, 69.2% yield) as a colorless liquid.

$^1$H NMR (400 MHz, Chloroform-d) δ 7.72-7.64 (m, 1H), 7.55-7.47 (m, 1H), 7.17-7.08 (m, 1H), 5.36-5.21 (m, 2H), 1.91-1.84 (m, 3H). GCMS (m/z)=264.10 (M+).

Step-2: 3-(3-bromo-2-fluorophenyl)-3,3-difluoro-2-methylpropane-1,2-diol

To a solution of 1-bromo-3-(1,1-difluoro-2-methylallyl)-2-fluorobenzene (7.0 g, 26.4 mmol) in acetone (60 ml) and water (15 ml) were added N-Methylmorpholine N-oxide (6.19 g, 52.8 mmol) and potassium osmate dihydrate (0.584 g, 1.584 mmol) at room temperature. The reaction mixture was stirred at same temperature for 24 h. After completion of reaction, reaction mixture was diluted with cold water (70 ml) and compound was extracted with ethyl acetate (70 ml×3). The combined organic layer was dried over anhydrous $Na_2SO_4$, filtered and concentrated under reduced pressure to afford the 14.0 g crude product. The obtained crude product was purified by flash chromatography with gradient elution (0-60%) of ethyl acetate in hexane to afford the 3-(3-bromo-2-fluorophenyl)-3,3-difluoro-2-methylpropane-1,2-diol (6.7 g, 85% yield) as brown liquid.

$^1$H NMR (400 MHz, DMSO-$d_6$) δ 7.90-7.79 (m, 1H), 7.54-7.42 (m, 1H), 7.31-7.20 (m, 1H), 4.07-3.98 (m, 1H), 3.57-3.55 (m, 1H), 3.46-3.40 (m, 1H), 3.38-3.30 (m, 1H), 1.18 (s, 3H).

Step-3: (R/S)-1-(3-(1,1-difluoro-2,3-dihydroxy-2-methylpropyl)-2-fluorophenyl)ethan-1-one (Peak-1) and (S/R)-1-(3-(1,1-difluoro-2,3-dihydroxy-2-methylpropyl)-2-fluorophenyl)ethan-1-one (Peak-2)

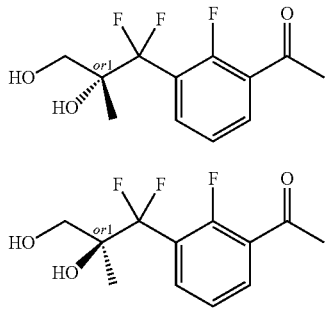

The title compounds were synthesized by using 3-(3-bromo-2-fluorophenyl)-3,3-difluoro-2-methylpropane-1,2-diol and following analogous reaction protocol as described in Step-2 of Intermediate-1 and further separated by chiral chromatography (Instrument Method: MEOH_0.1% DEA_100_B_1.0ML_8MIN Flow Rate: 1.00 ml/min) to afford two isomers as Peak-1 and Peak-2 respectively.

Peak-1: $^1$H NMR (400 MHz, DMSO-$d_6$) δ 7.98-7.83 (m, 1H), 7.73-7.62 (m, 1H), 7.45-7.34 (m, 1H), 5.35 (s, 1H), 4.74 (t, J=6.0 Hz, 1H), 3.52-3.36 (m, 2H), 2.59 (d, J=4.3 Hz, 3H), 1.21 (s, 3H).

Chiral Purity—99.93%, (RT—3.75).

Peak-2: $^1$H NMR (400 MHz, DMSO-$d_6$) δ 7.95-7.84 (m, 1H), 7.72-7.64 (m, 1H), 7.44-7.35 (m, 1H), 5.35 (s, 1H), 4.74 (t, J=6.1 Hz, 1H), 3.50-3.33 (m, 2H), 2.59 (d, J=4.3 Hz, 3H), 1.21 (s, 3H).

Chiral Purity—93.76%, (RT—4.28).

Step-4: (R)—N-(1-(3-((R/S)-1,1-difluoro-2,3-dihydroxy-2-methylpropyl)-2-fluorophenyl)ethylidene)-2-methylpropane-2-sulfinamide (Peak-1) and (R)—N-(1-(3-((S/R)-1,1-difluoro-2,3-dihydroxy-2-methylpropyl)-2-fluorophenyl)ethylidene)-2-methylpropane-2-sulfinamide (Peak-2)

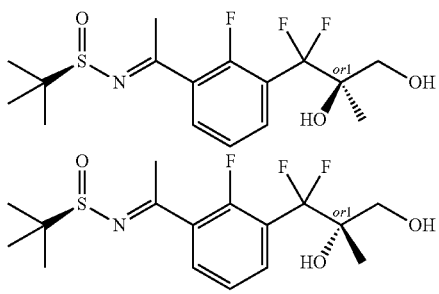

The title compounds were synthesized by using (R/S)-1-(3-(1,1-difluoro-2,3-dihydroxy-2-methylpropyl)-2-fluorophenyl)ethan-1-one (Peak-1) and (S/R)-1-(3-(1,1-difluoro-2,3-dihydroxy-2-methylpropyl)-2-fluorophenyl) ethan-1-one (Peak-2) (Peak-1 and Peak-2 carried forwarded separately) following analogous reaction protocol as described in Step-3 of Intermediate-1 to afford Peak-1 and Peak-2 respectively.

Peak-1:

MS (ES+) m/z=366.35 (M+1).

$^1$H NMR (400 MHz, DMSO-$d_6$) δ 7.79-7.68 (m, 1H), 7.64-7.55 (m, 1H), 7.42-7.32 (m, 1H), 5.33 (s, 1H), 4.73 (t, J=6.0 Hz, 1H), 3.48-3.36 (m, 2H), 2.68 (d, J=2.5 Hz, 3H), 1.22 (s, 3H), 1.08 (s, 9H).

Peak-2:

MS (ES+) m/z=366.35 (M+1).

$^1$H NMR (400 MHz, DMSO-$d_6$) δ 7.78-7.68 (m, 1H), 7.63-7.54 (m, 1H), 7.42-7.31 (m, 1H), 5.33 (s, 1H), 4.73 (t, J=6.0 Hz, 1H), 3.50-3.38 (m, 2H), 2.68 (d, J=2.6 Hz, 3H), 1.23 (s, 3H), 1.08 (s, 9H).

Step-5: (R)—N—((R/S)-1-(3-((R/S)-1,1-difluoro-2,3-dihydroxy-2-methylpropyl)-2-fluorophenyl)ethyl)-2-methylpropane-2-sulfinamide (Peak-1) and (R)—N—((S/R)-1-(3-((S/R)-1,1-difluoro-2,3-dihydroxy-2-methylpropyl)-2-fluorophenyl)ethyl)-2-methylpropane-2-sulfinamide (Peak-2)

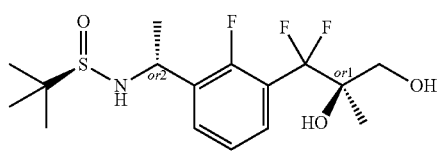

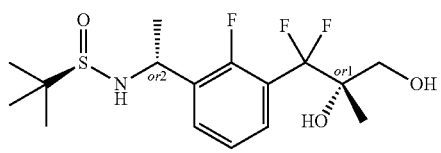

The title compounds were synthesized by using (R)—N-(1-(3-((R/S)-1,1-difluoro-2,3-dihydroxy-2-methylpropyl)-2-fluorophenyl)ethylidene)-2-methylpropane-2-sulfinamide (Peak-1) and (R)—N-(1-(3-((S/R)-1,1-difluoro-2,3-dihydroxy-2-methylpropyl)-2-fluorophenyl)ethylidene)-2-methylpropane-2-sulfinamide (Peak-2) (Peak-1 and Peak-2 carried forward separately) and following analogous reaction protocol as described in Step-4 of Intermediate-2 to afford major isomer of Peak-1 and Peak-2 respectively.

Peak-1:

MS (ES+) m/z=368.35 (M+1).

$^1$H NMR (400 MHz, DMSO-$d_6$) δ 7.69-7.63 (m, 1H), 7.38-7.31 (m, 1H), 7.31-7.23 (m, 1H), 5.85 (d, J=7.7 Hz, 1H), 5.23 (s, 1H), 4.71-4.65 (m, 2H), 3.48-3.35 (m, 2H), 1.40 (d, J=6.8 Hz, 3H), 1.19 (s, 3H), 1.11 (s, 9H).

Peak-2:

MS (ES+) m/z=368.35 (M+1).

$^1$H NMR (400 MHz, DMSO-$d_6$) δ 7.69-7.63 (m, 1H), 7.38-7.31 (m, 1H), 7.30-7.23 (m, 1H), 5.85 (d, J=7.6 Hz, 1H), 5.24 (s, 1H), 4.76-4.61 (m, 2H), 3.44-3.38 (m, 2H), 1.40 (d, J=6.8 Hz, 3H), 1.19 (s, 3H), 1.11 (s, 9H).

Step-6: (R/S)-3-(3-((R/S)-1-aminoethyl)-2-fluoro-phenyl)-3,3-difluoro-2-methylpropane-1,2-diol hydrochloride (Peak-1) and (S/R)-3-(3-((S/R)-1-aminoethyl)-2-fluorophenyl)-3,3-difluoro-2-methyl-propane-1,2-diol hydrochloride (Peak-2)

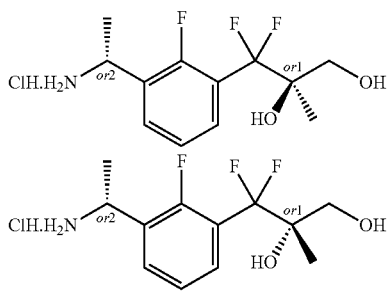

The title compounds were synthesized by using (R)—N—((R/S)-1-(3-((R/S)-1,1-difluoro-2,3-dihydroxy-2-meth-ylpropyl)-2-fluorophenyl)ethyl)-2-methylpropane-2-sulfi-namide (peak-1) and (R)—N—((S/R)-1-(3-((S/R)-1,1-difluoro-2,3-dihydroxy-2-methylpropyl)-2-fluorophenyl)ethyl)-2-methylpropane-2-sulfinamide (peak-2) and following analogous reaction protocol as described in Step-4 of Intermediate-1.

Peak-1:
MS (ES+) m/z=263.95 (M+1).
$^1$H NMR (400 MHz, DMSO-d$_6$) δ 8.62 (s, 2H), 7.84-7.76 (m, 1H), 7.52-7.45 (m, 1H), 7.41-7.34 (m, 1H), 5.43-5.21 (m, 1H), 4.77-4.55 (m, 1H), 3.46-3.37 (m, 2H), 1.53 (d, J=6.8 Hz, 3H), 1.20 (s, 3H).

Peak-2:
MS (ES+) m/z=364.15 (M+1).
$^1$H NMR (400 MHz, DMSO-d$_6$) δ 8.60 (s, 2H), 7.81-7.74 (m, 1H), 7.53-7.45 (m, 1H), 7.41-7.33 (m, 1H), 5.37-5.28 (m, 1H), 4.77-4.55 (m, 1H), 3.46-3.37 (m, 2H), 1.53 (d, J=6.8 Hz, 3H), 1.20 (s, 3H).

Step-7: (R/S)-3-(3-((R/S)-1-((6-bromo-2-methyl-8,9-dihydro-7H-cyclopenta[h]quinazolin-4-yl)amino) ethyl)-2-fluorophenyl)-3,3-difluoro-2-methylpro-pane-1,2-diol (Peak-1) (39a) and (S/R)-3-(3-((S/R)-1-((6-bromo-2-methyl-8,9-dihydro-7H-cyclopenta[h] quinazolin-4-yl)amino)ethyl)-2-fluorophenyl)-3,3-difluoro-2-methylpropane-1,2-diol (Peak-2) (39b)

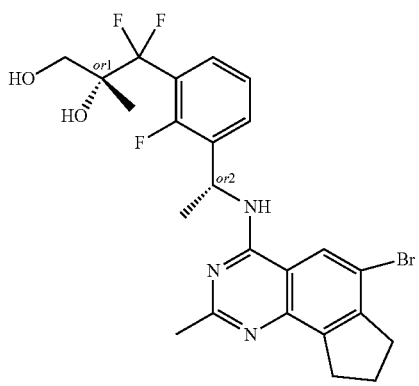

39a

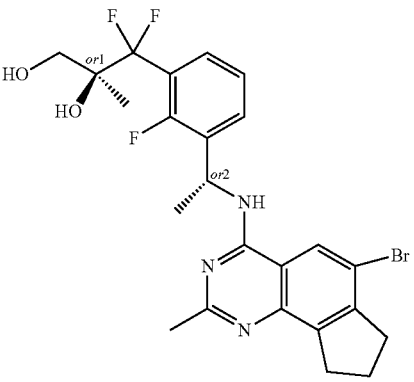

39b

The title compounds were prepared by using Intermediate-19 and (R/S)-3-(3-((R/S)-1-aminoethyl)-2-fluorophe-nyl)-3,3-difluoro-2-methylpropane-1,2-diol hydrochloride (Peak-1) and (S/R)-3-(3-((S/R)-1-aminoethyl)-2-fluorophe-nyl)-3,3-difluoro-2-methylpropane-1,2-diol hydrochloride (Peak-2) and following analogous reaction protocol as described in synthesis of Intermediate-21.

Intermediate-39a: MS (ES+) m/z=526.32 (M+2),
Intermediate-39b: MS (ES+) m/z=526.30 (M+2).

Intermediate-40: (R/S)—N-(3-(1-aminoethyl)-5-fluorophenyl)acetamide hydrochloride

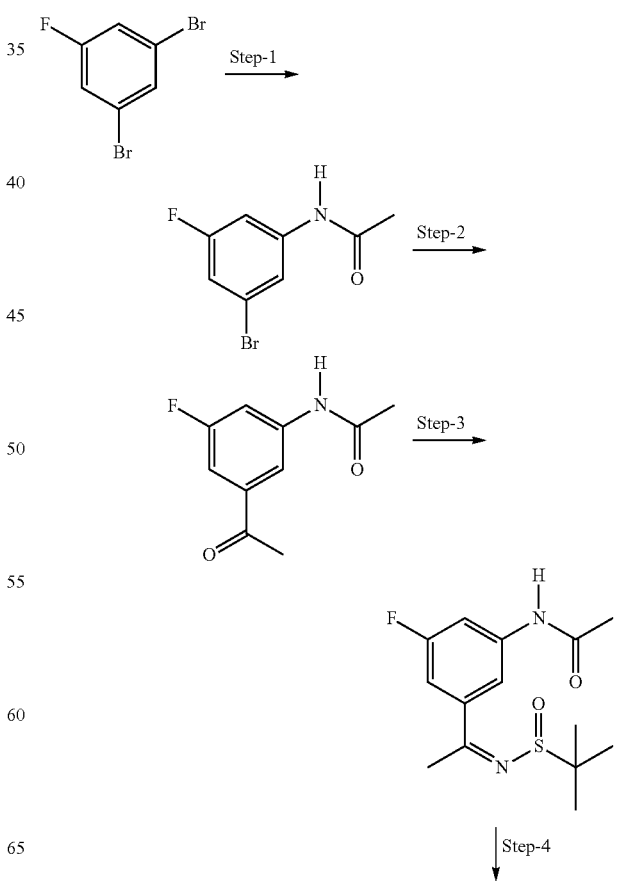

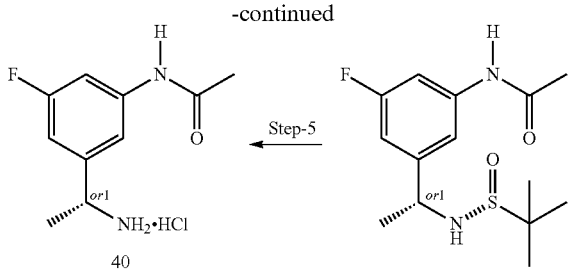

Step-1: N-(3-bromo-5-fluorophenyl)acetamide

To an RB containing a solution of 1,3-dibromo-5-fluorobenzene (25 g, 98 mmol) (Commercially available) and acetamide (7.56 g, 128 mmol) in Dioxane (200 ml) was added Cs$_2$CO$_3$ (48.1 g, 148 mmol). The mixture was thoroughly deoxygenated by purging nitrogen for 15 min and then Pd$_2$(dba)$_3$ (1.803 g, 1.969 mmol) and xantphos (1.140 g, 1.969 mmol) were added. The resulting reaction mixture was stirred at 80° C. for 16 h. After completion of reaction, reaction mass was cooled to room temperature, diluted with ethyl acetate (500 ml) and filtered through celite. The filtrate was concentrated under vacuum and the crude product (30 g) was purified by flash column chromatography by gradient elution of 30% ethyl acetate in hexane to afford the N-(3-bromo-5-fluorophenyl)acetamide (15 g, 65.6% yield).

MS (ES+) m/z=234.1 (M+2).

$^1$H NMR (400 MHz, DMSO-d$_6$) δ 10.29 (s, 1H), 7.64-7.61 (m, 1H), 7.51-7.45 (m, 1H), 7.21-7.18 (m, 1H), 2.07 (s, 3H).

Step-2: N-(3-acetyl-5-fluorophenyl)acetamide

The title compound was synthesized by using N-(3-bromo-5-fluorophenyl)acetamide and following analogous reaction protocol as described in Step-2 of Intermediate-1.

GCMS (m/z)=195.15 (M+).

$^1$H NMR (400 MHz, DMSO-d$_6$) δ 10.36 (s, 1H), 7.88-7.81 (m, 2H), 7.45-7.35 (m, 1H), 2.56 (s, 3H), 2.08 (s, 3H).

Step-3: (R)—N-(3-(1-((tert-butylsulfinyl)imino)ethyl)-5-fluorophenyl)acetamide The title compound was synthesized by using N-(3-acetyl-5-fluorophenyl)acetamide and following analogous reaction protocol as described in Step-3 of Intermediate-2.

MS (ES+) m/z=299.34 (M+1).

$^1$H NMR (400 MHz, DMSO-d$_6$) δ 10.34 (s, 1H), 7.87-7.84 (m, 1H), 7.83-7.79 (m, 1H), 7.39-7.32 (m, 1H), 2.69 (s, 3H), 2.08 (s, 3H), 1.24 (s, 9H).

Step-4: N-(3-((R/S)-1-(((R)-tert-butylsulfinyl)amino)ethyl)-5-fluorophenyl)acetamide The title compound was synthesized by using (R)—N-(3-(1-((tert-butylsulfinyl)imino)ethyl)-5-fluorophenyl)acetamide and following analogous reaction protocol as described in Step-4 of Intermediate-2.

MS (ES+) m/z=301.28 (M+1).

$^1$H NMR (400 MHz, DMSO-d$_6$) δ 10.14 (s, 1H), 7.52-7.45 (m, 1H), 7.25-7.21 (m, 1H), 6.96-6.92 (m, 1H), 5.71 (d, J=7.0 Hz, 1H), 4.38-7.28 (m, 1H), 2.05 (s, 3H), 1.38 (d, J=6.7 Hz, 3H), 1.12 (s, 9H).

Step-5: (R/S)—N-(3-(1-aminoethyl)-5-fluorophenyl)acetamide hydrochloride

The title compound was synthesized by using N-(3-((R/S)-1-(((R)-tert-butylsulfinyl)amino)ethyl)-5-fluorophenyl)acetamide and following analogous reaction protocol as described in Step-5 of Intermediate-2.

MS (ES+) m/z=301.28 (M+1).

$^1$H NMR (400 MHz, DMSO-d$_6$) δ 10.49 (s, 1H), 8.71-8.47 (m, 3H), 7.59-7.52 (m, 1H), 7.46-7.43 (m, 1H), 7.18-7.13 (m, 1H), 4.42-4.23 (m, 1H), 2.08 (s, 3H), 1.50 (d, J=6.8 Hz, 3H).

Intermediate-41: (R/S)—N-(3-(1-aminoethyl)-5-(difluoromethyl)phenyl)acetamide hydrochloride

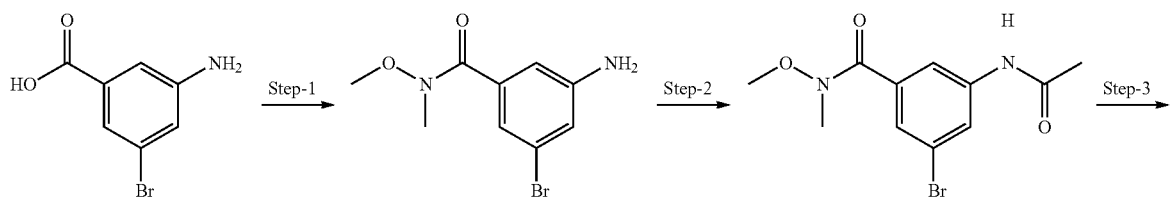

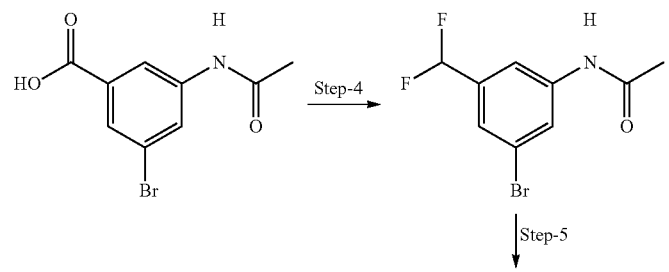

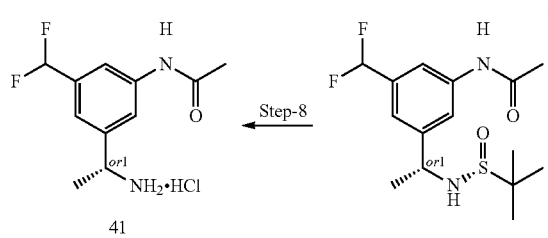 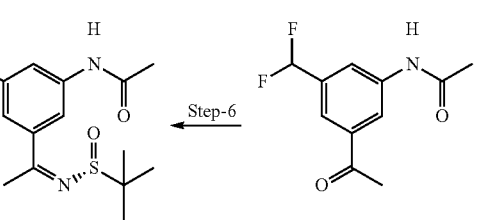

-continued

Step-1: 3-amino-5-bromo-N-methoxy-N-methylbenzamide

To a stirred solution of 3-amino-5-bromobenzoic acid (24 g, 111 mmol) (Commercially available) in DMF (10 ml) were added N,O-dimethylhydroxylamine hydrochloride (108 g, 1111 mmol) and DIPEA (233 ml, 1333 mmol), stirred this mixture for 15 min followed by addition of HATU (46.5 g, 122 mmol) at room temperature. The resulting reaction mass was stirred at 25° C. for 16 h. After complete consumption of starting material, reaction mass was cooled to 0° C., added cold water, solid product got precipitated. The solid product was filtered and dried under vacuo to afford 3-amino-5-bromo-N-methoxy-N-methylbenzamide (28 g, 97% yield) as off white solid.

MS (ES+) m/z=260.96 (M+2).

$^1$H NMR (400 MHz, DMSO-$d_6$) δ 6.83-6.81 (m, 1H), 6.78-6.73 (m, 1H), 6.73-6.70 (m, 1H), 5.61 (s, 2H), 3.55 (s, 3H), 3.21 (s, 3H).

Step-2: 3-acetamido-5-bromo-N-methoxy-N-methylbenzamide

To a stirred solution of 3-amino-5-bromo-N-methoxy-N-methylbenzamide (28 g, 108 mmol) in DCM (200 ml) were added DIPEA (37.7 ml, 216 mmol) and catalytic amount of DMAP (0.660 g, 5.40 mmol) at room temperature. The reaction mass was cooled to 0° C. and then added acetyl chloride (9.22 ml, 130 mmol) dropwise. The resulting reaction mixture was allowed to room temperature and stirred for 16 h. The DCM (500 ml) was added and washed it with water (200 ml) and brine (200 ml). The separated organic layer was dried over anhydrous Na$_2$SO$_4$, filtered and concentrated under vacuo. The crude mass (32 g) was purified by flash column chromatography using 0 to 30% ethyl acetate in hexane as gradient elution to afford 3-acetamido-5-bromo-N-methoxy-N-methylbenzamide (12 g, 36.9% yield) as white solid.

MS (ES+) m/z=303.21 (M+2).

$^1$H NMR (400 MHz, DMSO-$d_6$) δ 10.25 (s, 1H), 8.01-8.00 (m, 1H), 7.75-7.73 (m, 1H), 7.40-7.38 (m, 1H), 3.56 (s, 3H), 3.25 (s, 3H), 2.07 (s, 3H).

Step-3: N-(3-bromo-5-formylphenyl)acetamide

To a stirred solution of 3-acetamido-5-bromo-N-methoxy-N-methylbenzamide (12 g, 39.8 mmol) in THF (100 ml) was added 1M DIBAL-H in Toluene (47.8 ml, 47.8 mmol) dropwise at −78° C. for 30 min. The resulting reaction mass was stirred for 3 hr at same temperature. After complete consumption of starting material, reaction mass was poured in ice cold saturated solution of ammonium chloride and diluted with ethyl acetate (900 ml). The layers were separated, dried over anhydrous Na$_2$SO$_4$, filtered and concentrated under vacuo. The crude mass (18 g) was purified by flash column chromatography using 0 to 50% EtOAc in Hexane as gradient eluent to afford N-(3-bromo-5-formylphenyl)acetamide (6 g, 62.2% yield) as white solid.

MS (ES+) m/z=244.1 (M+2).

$^1$H NMR (400 MHz, DMSO-$d_6$) δ 10.38 (s, 1H), 9.93 (s, 1H), 8.18-8.15 (m, 1H), 8.07-8.02 (m, 1H), 7.77-7.75 (m, 1H), 2.09 (s, 3H).

Step-4: N-(3-bromo-5-(difluoromethyl)phenyl)acetamide

DAST (13.64 ml, 103 mmol) was added dropwise to a cooled (−15° C.) solution of N-(3-bromo-5-formylphenyl)acetamide (5 g, 20.66 mmol) in DCM (100 ml). The mixture was stirred for 15 min and then allowed to room temperature. After completion of reaction, the mixture was poured in ice cold saturated aqueous sodium bicarbonate solution (100 ml) and extracted product in DCM (100 ml×2). The combined organic layers were washed with water (100 ml) and brine (100 ml). The separated organic layer was dried over anhydrous sodium sulfate, filtered and evaporated under vacuum. The crude mass was purified by flash column chromatography by using 0 to 10% ethyl acetate in hexane as gradient eluent to afford N-(3-bromo-5-(difluoromethyl)phenyl)acetamide (0.7 g, 12.83% yield).

MS (ES+) m/z=266.1 (M+2).

$^1$H NMR (400 MHz, DMSO-$d_6$) δ 10.31 (s, 1H), 8.02-8.00 (m, 1H), 7.79-7.76 (m, 1H), 7.44-7.42 (m, 1H), 7.03 (t, J=55.6 Hz, 1H), 2.08 (s, 3H).

Step-5: N-(3-acetyl-5-(difluoromethyl)phenyl)acetamide

The title compound was synthesized by using N-(3-bromo-5-(difluoromethyl)phenyl)acetamide and following analogous reaction protocol as described in Step-2 of Intermediate-1.

MS (ES+) m/z=228.2 (M+1).

$^1$H NMR (400 MHz, DMSO-$d_6$) δ 10.37 (s, 1H), 8.25-8.20 (m, 1H), 8.18-8.14 (m, 1H), 7.83-7.81 (m, 1H), 7.12 (t, J=55.6 Hz, 1H), 2.60 (s, 3H), 2.09 (s, 3H).

Step-6: (R)—N-(3-(1-((tert-butylsulfinyl)imino)ethyl)-5-(difluoromethyl)phenyl)acetamide The title compound was synthesized by using N-(3-acetyl-5-(difluoromethyl)phenyl)acetamide and following analogous reaction protocol as described in Step-3 of Intermediate-2.

MS (ES+) m/z=331.34 (M+1).

$^1$H NMR (400 MHz, DMSO-$d_6$) δ 10.33 (s, 1H), 8.24-8.21 (m, 1H), 8.12-8.10 (m, 1H), 7.74-7.71 (m, 1H), 7.11 (t, J=55.7 Hz, 1H), 2.73 (s, 3H), 2.09 (s, 3H), 1.24 (s, 9H).

Step-7: N-(3-((R/S)-1-(((R)-tert-butylsulfinyl) amino)ethyl)-5-(difluoromethyl)phenyl)acetamide The title compound was synthesized by using (R)—N-(3-(1-(((tert-butylsulfinyl)imino)ethyl)-5-(difluoromethyl) phenyl)acetamide and following analogous reaction protocol as described in Step-4 of Intermediate-2.

MS (ES+) m/z=333.40 (M+1).

$^1$H NMR (400 MHz, DMSO-d$_6$) δ 10.14 (s, 1H), 7.81-7.79 (m, 1H), 7.63-7.61 (m, 1H), 7.29-7.27 (m, 1H), 7.00 (t, J=55.9 Hz, 1H), 5.75 (d, J=6.5 Hz, 1H), 4.40-4.37 (m, 1H), 2.06 (s, 3H), 1.40 (d, J=6.7 Hz, 3H), 1.12 (s, 9H).

Step-8: (R/S)—N-(3-(1-aminoethyl)-5-(difluoromethyl)phenyl)acetamide hydrochloride The title compound was synthesized by using N-(3-((R/S)-1-(((R)-tert-butylsulfinyl)amino)ethyl)-5-(difluoromethyl)phenyl)acetamide and following analogous reaction protocol as described in Step-4 of Intermediate-1.

$^1$H NMR (400 MHz, DMSO-d$_6$) δ 10.38 (s, 1H), 8.53-8.36 (m, 3H), 7.85-7.79 (m, 2H), 7.43-7.41 (m, 1H), 7.05 (t, J=55.7 Hz, 1H), 4.55-4.31 (m, 1H), 2.09 (s, 3H), 1.51 (d, J=6.8 Hz, 3H).

Intermediate-42: (R/S)—N-(3-fluoro-5-(1-((2-methyl-6-morpholino-8,9-dihydro-7H-cyclopenta[h]quinazolin-4-yl)amino)ethyl)phenyl)acetamide

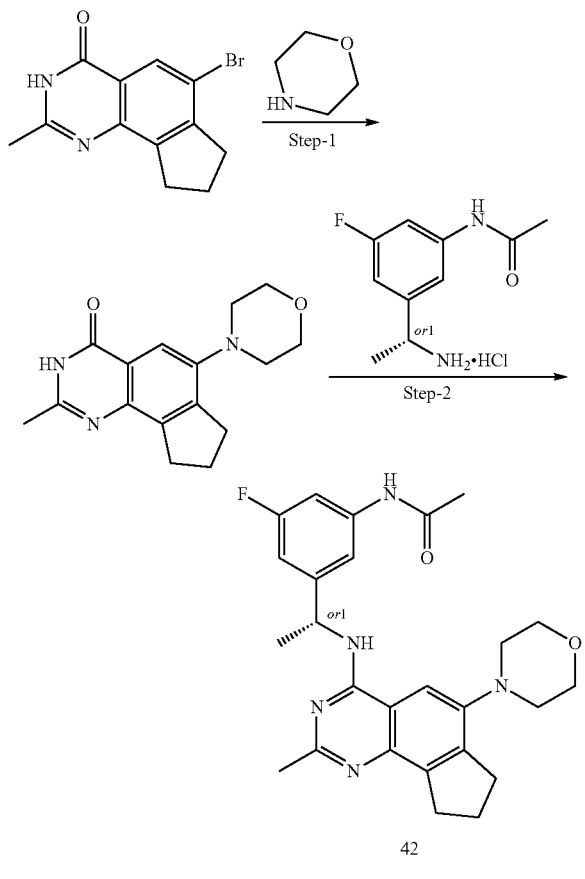

Step-1: 2-methyl-6-morpholino-3,7,8,9-tetrahydro-4H-cyclopenta[h]quinazolin-4-one To a stirred solution of 6-bromo-2-methyl-3,7,8,9-tetrahydro-4H-cyclopenta[h]quinazolin-4-one (5 g, 17.91 mmol) (Intermediate-18) in NMP (200 ml) were added Pd$_2$(dba)$_3$ (1.640 g, 1.791 mmol), BINAP (2.231 g, 3.58 mmol) and sodium tert-butoxide (3.44 g, 35.8 mmol) at room temperature. The resulting mixture was stirred at 120° C. for 16 h. After completion of reaction, reaction mixture was filtered through celite and filtrate was diluted with water (100 ml) and extracted with ethyl acetate (150 ml×2). The organic layer was washed by water (100 ml), brine (100 ml). The organic layer was dried over sodium sulphate, filtered and concentrated in vaccuo to get crude product (5.4 g). The crude product was purified by flash column chromatography by using gradient elution of 0 to 80% ethyl acetate in hexane to afford 2-methyl-6-morpholino-3,7,8,9-tetrahydro-4H-cyclopenta[h]quinazolin-4-one (1.8 g, 35.2% yield) as a grey solid.

MS (ES+) m/z=286.34 (M+1).

$^1$H NMR (400 MHz, DMSO-d$_6$) δ 12.01 (s, 1H), 7.33 (s, 1H), 3.79-3.74 (m, 4H), 3.07 (t, J=7.3 Hz, 2H), 3.00-2.91 (m, 6H), 2.32 (s, 3H), 2.12-2.04 (m, 2H).

Step-2: (R/S)—N-(3-fluoro-5-(1-((2-methyl-6-morpholino-8,9-dihydro-7H-cyclopenta[h]quinazolin-4-yl)amino)ethyl)phenyl)acetamide To a stirred solution of 2-methyl-6-morpholino-3,7,8,9-tetrahydro-4H-cyclopenta[h]quinazolin-4-one (0.25 g, 0.876 mmol) in DMF (10 ml) was added DBU (1.321 ml, 8.76 mmol) and BOP (0.581 g, 1.314 mmol) sequentially and stirred for 15 min at room temperature followed by addition of (R/S)—N-(3-(1-aminoethyl)-5-fluorophenyl)acetamide hydrochloride (0.306 g, 1.314 mmol) (Intermediate-40). The resulting mixture was heated at 120° C. for 2 h. The reaction mass was allowed to RT and poured it in to ice cold water (20 ml). The yellow solid was precipitated, filtered and dried. The residue was dissolved in DCM (50 ml), dried on anhydrous Na$_2$SO$_4$, filtered and concentrated under vacuo. The crude mass (300 mg) was purified by flash column chromatography using 0 to 100% ethyl acetate in hexane as gradient eluent to afford (R/S)—N-(3-fluoro-5-(1-((2-methyl-6-morpholino-8,9-dihydro-7H-cyclopenta[h]quinazolin-4yl)amino)ethyl)phenyl)acetamide (0.2 g, 49.2% yield) as brown solid.

MS (ES+) m/z=464.23 (M+1).

Intermediate-43: (R/S)—N-(3-(difluoromethyl)-5-(1-((2-methyl-6-morpholino-8,9-dihydro-7H-cyclopenta[h]quinazolin-4-yl)amino)ethyl)phenyl)acetamide

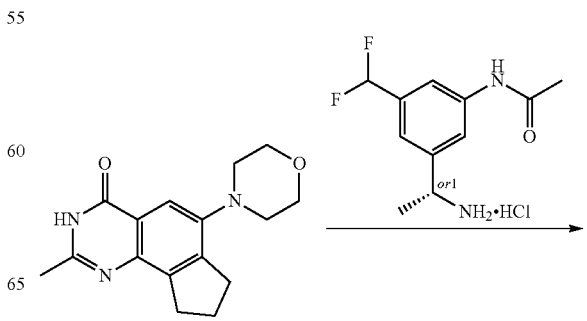

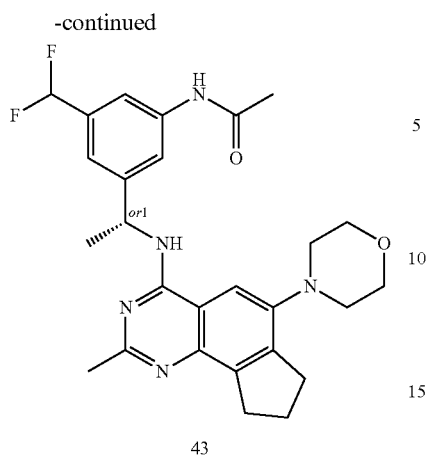

43

The title compound was synthesized by using 2-methyl-6-morpholino-3,7,8,9-tetrahydro-4H-cyclopenta[h]quinazolin-4-one and following analogous reaction protocol as described in Step-2 of Intermediate-42.

MS (ES+) m/z=496.24 (M+1).

Intermediate-44: 1-(3-((R/S)-1-aminoethyl)phenyl)-2,2,2-trifluoroethan-1-ol hydrochloride

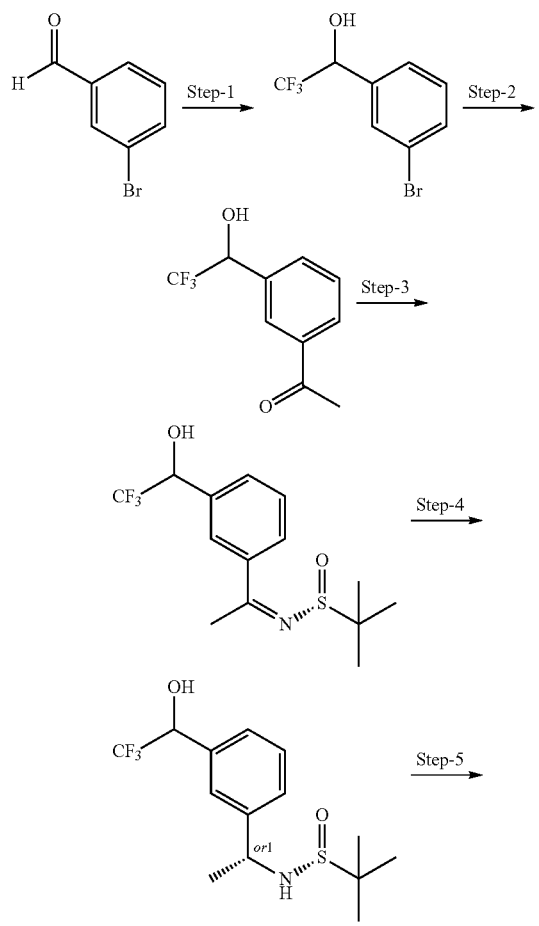

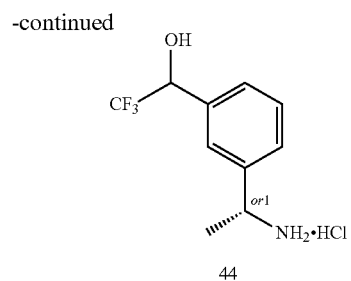

44

Step-1: 1-(3-bromophenyl)-2,2,2-trifluoroethan-1-ol

To a stirred solution of 3-bromobenzaldehyde (12 g, 64.9 mmol) in tetrahydrofuran (100 ml) were added (Trifluoromethyl)trimethylsilane (13.83 g, 97 mmol) and a catalytic amount of TBAF (12.97 ml, 12.97 mmol) at 0° C. The reaction mixture was allowed to room temperature and stirred for 16 h. After completion of reaction, the reaction mixture was diluted with 3 N HCl solution (30 ml) and then was stirred for 30 min. The reaction mixture was diluted with water (30 ml) and was extracted with ethyl acetate (100 ml×3). The combined organics were washed with brine (100 ml), dried over Na2SO4, filtered and concentrated to get crude (22 g). This crude residue was purified by flash column chromatography by using 0-20% ethyl acetate in hexane as eluent to afford 1-(3-bromophenyl)-2, 2,2-trifluoroethan-1-ol (13 g, 79% yield) as a light brown liquid.

GCMS (m/z)=255.97 (M+).

$^1$H NMR (400 MHz, DMSO-d6) δ 7.72-7.67 (m, 1H), 7.63-7.59 (m, 1H), 7.54-7.49 (m, 1H), 7.43-7.37 (m, 1H), 7.00 (d, J=5.7 Hz, 1H), 5.29-5.21 (m, 1H).

Step-2: 1-(3-(2,2,2-trifluoro-1-hydroxyethyl)phenyl)ethan-1-one

The title compound was synthesized by using 1-(3-bromophenyl)-2,2,2-trifluoroethan-1-ol and following analogous reaction protocol as described in Step-2 of Intermediate-1.

GCMS (m/z)=218.13 (M+).

$^1$H NMR (400 MHz, DMSO-d6) δ 8.11-8.05 (m, 1H), 8.04-7.97 (m, 1H), 7.79-7.72 (m, 1H), 7.63-7.55 (m, 1H), 6.99 (d, J=5.7 Hz, 1H), 5.36-5.24 (m, 1H), 2.60 (s, 3H).

Step-3: (R/S)-2-methyl-N-(1-(3-(2,2,2-trifluoro-1-hydroxyethyl)phenyl)ethylidene)propane-2-sulfinamide The title compound was synthesized by using 1-(3-(2,2,2-trifluoro-1-hydroxyethyl)phenyl)ethan-1-one and following analogous reaction protocol as described in Step-3 of Intermediate-2.

MS (ES+) m/z=321.28 (M+).

Step-4: (R/S)-2-methyl-N-(1-(3-(2,2,2-trifluoro-1-hydroxyethyl)phenyl)ethylidene)propane-2-sulfinamide The title compound was synthesized by using (R/S)-2-methyl-N-(1-(3-(2,2,2-trifluoro-1-hydroxyethyl)phenyl)ethylidene)propane-2-sulfinamide and following analogous reaction protocol as described in Step-4 of Intermediate-2.

MS (ES+) m/z=323.97 (M+).

¹H NMR (400 MHz, DMSO-d₆) δ 7.52-7.47 (m, 1H), 7.45-7.40 (m, 1H), 7.38-7.33 (m, 2H), 6.89-6.76 (m, 1H), 5.74-5.67 (m, 1H), 5.18-5.05 (m, 1H), 4.46-4.33 (m, 1H), 1.40 (d, J=6.8 Hz, 3H), 1.11 (s, 9H).

Step-5: 1-(3-((R/S)-1-aminoethyl)phenyl)-2,2,2-trifluoroethan-1-ol hydrochloride The title compound was synthesized by using (R/S)-2-methyl-N-(1-(3-(2,2,2-trifluoro-1-hydroxyethyl)phenyl)ethylidene)propane-2-sulfinamide and following analogous reaction protocol as described in Step-4 of Intermediate-1.

¹H NMR (400 MHz, DMSO-d₆) δ 8.57-8.26 (m, 3H), 7.64-7.61 (m, 1H), 7.56-7.52 (m, 1H), 7.51-7.47 (m, 2H), 6.99 (s, 1H), 5.18 (s, 1H), 4.44 (s, 1H), 1.50 (d, J=6.8 Hz, 3H).

Intermediate-45: (R/S)-1-(3-(1-((6-bromo-2-methyl-8,9-dihydro-7H-cyclopenta[h]quinazolin-4-yl)amino)ethyl)phenyl)-1,1-difluoro-2-methylpropan-2-ol

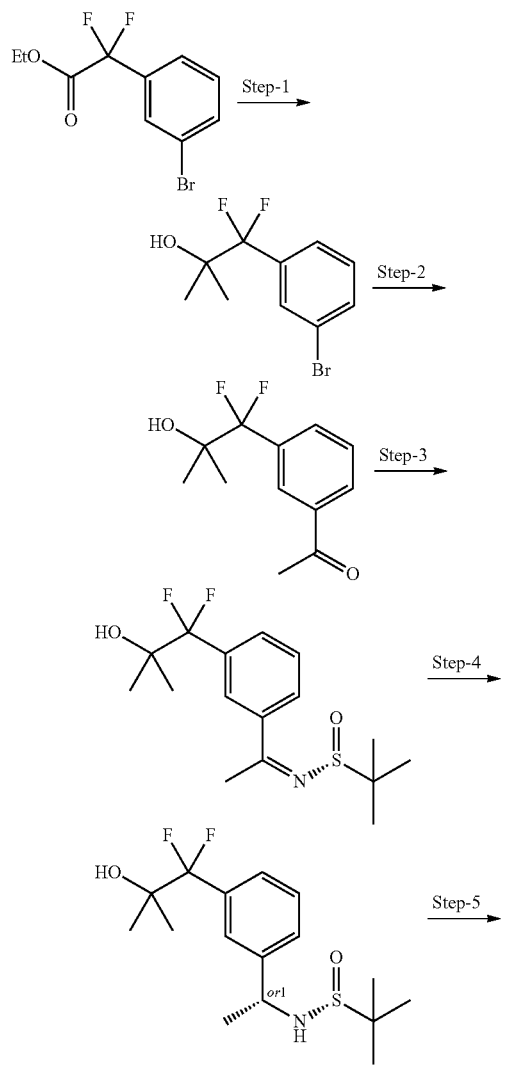

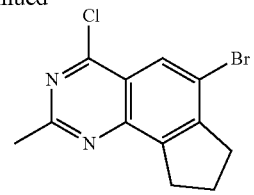

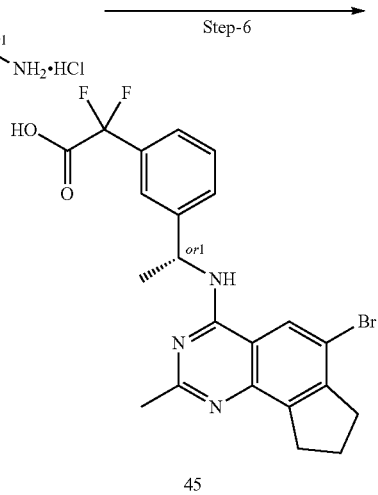

Step-1: 1-(3-Bromophenyl)-1,1-difluoro-2-methylpropan-2-ol

The titled compounds was synthesized from commercially available ethyl 2-(3-bromophenyl)-2,2-difluoroacetate by following analogous reaction protocol as described in Step-1 of Intermediate-2.

1H NMR (400 MHz, DMSO-d6) δ 7.73-7.69 (m, 1H), 7.64-7.61 (m, 1H), 7.52-7.41 (m, 2H), 5.41 (s, 1H), 1.18 (s, 3H), 1.15 (s, 6H).

Step-2: 1-(3-(1,1-Difluoro-2-hydroxy-2-methylpropyl)phenyl)ethan-1-one

The title compound was synthesized by using 1-(3-Bromophenyl)-1,1-difluoro-2-methylpropan-2-ol and following analogous reaction protocol as described in Step-2 of Intermediate-2.

1H NMR (400 MHz, DMSO-d6) δ 8.13-8.07 (m, 1H), 8.04-7.99 (m, 1H), 7.76-7.72 (m, 1H), 7.67-7.60 (m, 1H), 5.41 (s, 1H), 2.62 (s, 3H), 1.21 (s, 3H), 1.14 (s, 6H).

Step-3: (R/S)—N-(1-(3-(1,1-Difluoro-2-hydroxy-2-methylpropyl)phenyl)ethylidene)-2-methylpropane-2-sulfinamide The title compound was synthesized by using 1-(3-(1,1-Difluoro-2-hydroxy-2-methylpropyl)phenyl)ethan-1-one and following analogous reaction protocol as described in Step-3 of Intermediate-2.

LCMS m/z=332.28 (M+1).

Step-4: (R/S)-2-methyl-N—((R/S)-1-(3-(1,1,2,2-tetrafluoro-2-hydroxyethyl)phenyl)ethyl)propane-2-sulfinamide The title compound was synthesized by using (R/S)—N-(1-(3-(1,1-Difluoro-2-hydroxy-2-methylpropyl)phenyl)ethylidene)-2-methylpropane-2-sulfinamide and following analogous reaction protocol as described in Step-4 of Intermediate-2.

LCMS m/z=334.11 (M+1).

Step-5: (R/S)-1-(3-(1-Aminoethyl)phenyl)-1,1-difluoro-2-methylpropan-2-ol hydrochloride The title compound was synthesized by using (R/S)-2-methyl-N—((R/S)-1-(3-(1,1,2,2-tetrafluoro-2-hydroxyethyl)phenyl)ethyl)propane-2-sulfinamide and following analogous reaction protocol as described in Step-5 of Intermediate-2.

1H NMR (400 MHz, DMSO-d6) δ 8.68-8.53 (m, 3H), 7.69-7.64 (m, 1H), 7.63-7.59 (m, 1H), 7.55-7.45 (m, 2H), 5.32 (s, 1H), 4.57-4.38 (m, 1H), 1.53 (d, J=6.8 Hz, 3H), 1.22-1.13 (m, 6H).

Step-6: (R/S)-1-(3-(1-((6-bromo-2-methyl-8,9-dihydro-7H-cyclopenta[h]quinazolin-4-yl)amino)ethyl)phenyl)-1,1-difluoro-2-methylpropan-2-ol The title compound was synthesized by using (R/S)-1-(3-(1-Aminoethyl)phenyl)-1,1-difluoro-2-methylpropan-2-ol hydrochloride and Intermediate-19 and following analogous reaction protocol as described in Intermediate-21.

LCMS m/z=492.11 (M+2).

Example-1: (R)—N-(1-(3-amino-5-(trifluoromethyl)phenyl)ethyl)-6-(4-methoxypiperidin-1-yl)-2-methyl-8,9-dihydro-7H-cyclopenta[h]quinazolin-4-amine (Compound-1)

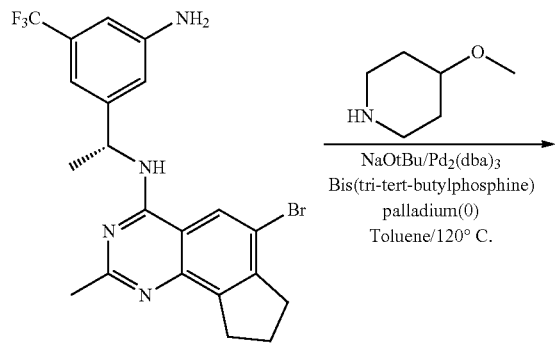

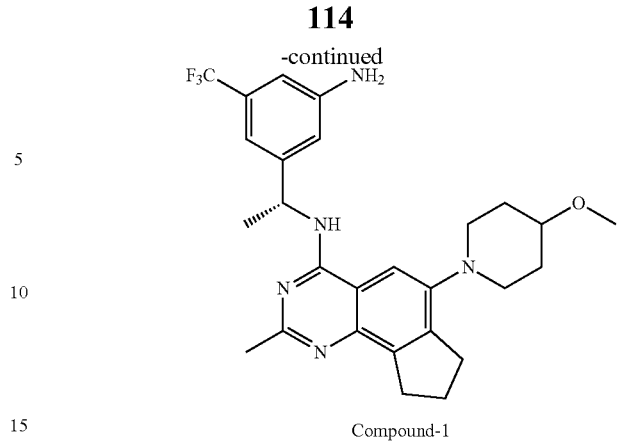

Compound-1

To a solution of (R)—N-(1-(3-amino-5-(trifluoromethyl)phenyl)ethyl)-6-bromo-2-methyl-8,9-dihydro-7H-cyclopenta[h]quinazolin-4-amine (200 mg, 0.430 mmol) (Intermediate-22), 4-methoxypiperidine (49.5 mg, 0.430 mmol), sodium tert-butoxide (83 mg, 0.860 mmol) and 2-Di-t-butylphosphino-2'-(N,N-dimethylamino)biphenyl (29.4 mg, 0.086 mmol) in Dioxane (10 ml) was degassed with $N_2$ for 15 min followed by addition of $Pd_2(dba)_3$ (79 mg, 0.086 mmol) at room temperature. The resulting reaction mixture was heated at 100° C. for 1 h. After completion of reaction, reaction mixture was diluted with ethyl acetate (40 ml) and filtered through celite, residue was washed with ethyl acetate (20 ml×2). The filtrate was concentrated under vacuum to get crude product (291 mg). The crude product was purified by flash column chromatography by using gradient elution of 0 to 0.5% MeOH in DCM to afford (R)—N-(1-(3-amino-5-(trifluoromethyl)phenyl)ethyl)-6-(4-methoxypiperidin-1-yl)-2-methyl-8,9-dihydro-7H-cyclopenta[h]quinazolin-4-amine (21 mg, 9.78% yield).

MS (ES+) m/z=500.24 (M+1).

$^1$H NMR (400 MHz, DMSO-$d_6$) δ 8.12 (s, 1H), 7.54 (bs, 1H), 6.88-6.87 (m, 1H), 6.86-6.83 (s, 1H), 6.71-6.68 (m, 1H), 5.63-5.56 (m, 1H), 5.54 (s, 2H), 3.30 (s, 3H), 3.27-3.17 (m, 2H), 3.10 (t, J=7.6 Hz, 2H), 2.95 (t, J=7.3 Hz, 2H), 2.85-2.78 (m, 2H), 2.37 (s, 3H), 2.13-2.04 (m, 2H), 2.03-1.91 (m, 3H), 1.75-1.65 (m, 2H), 1.56 (d, J=7.1 Hz, 3H).

The examples disclosed in Table-IV were prepared using the similar procedure described above in Example-1 and using commercially available appropriate amine.

TABLE IV

| Example | Chemical structure | LCMS and 1H NMR data |
|---|---|---|
| 2 | (R)-N-(1-(3-amino-5-(trifluoromethyl)phenyl)ethyl)-2-methyl-6-morpholino-8,9-dihydro-7H- | MS (ES+) m/z = 472.30 (M + 1). $^1$H NMR (400 MHz, DMSO-$d_6$) δ 8.08 (d, J = 8.0 Hz, 1H), 7.56-7.49 (m, 1H), 6.92-6.88 (m, 1H), 6.86-6.82 (m, 1H), 6.73-6.66 (m, 1H), 5.65-5.55 (m, 1H), 5.53 (s, 2H), 3.83-3.75 (m, 4H), 3.15-3.05 (m, 2H), 3.06-3.00 (m, 4H), 3.00-2.93 (m, 2H), 2.38 (s, 3H), 2.13-2.03 (m, 2H), 1.57 (d, J = 7.1 Hz, 3H). |

TABLE IV-continued

| Example | Chemical structure | LCMS and 1H NMR data |
|---|---|---|
| | cyclopenta[h]quinazolin-4-amine (Compound - 2) | |
| 3 | (R/S)-2-(2-fluoro-3-(1-((2-methyl-6-(2-oxa-6-azaspiro[3.3]heptan-6-yl)-8,9-dihydro-7H-cyclopenta[h]quinazolin-4-yl)amino)ethyl)phenyl)propan-2-ol (Compound - 3) | MS (ES+) m/z = 477.20 (M + 1). $^1$H NMR (400 MHz, DMSO-d$_6$) δ 7.59-7.45 (m, 1H), 7.45-7.30 (m, 1H), 7.21-7.15 (m, 1H), 7.13-7.10 (m, 1H), 6.00-5.83 (m, 1H), 5.25 (s, 1H), 4.76 (s, 4H), 4.29-4.14 (m, 4H), 3.09-3.04 (m, 2H), 3.04-2.96 (m, 2H), 2.47 (s, 3H), 2.19-2.05 (m, 2H), 1.63 (d, J = 7.0 Hz, 3H), 1.51 (s, 3H), 1.50 (s, 3H). |
| 4 | (R/S)-2-(2-fluoro-3-(1-((2-methyl-6-morpholino-8,9-dihydro-7H-cyclopenta[h]quinazolin-4-yl)amino)ethyl)phenyl)propan-2-ol (Compound - 4) | MS (ES+) m/z = 465.20 (M + 1). $^1$H NMR (400 MHz, DMSO-d$_6$) δ 7.74 (bs, 1H), 7.53-7.51 (m, 1H), 7.40-7.38 (m, 1H), 7.13-7.11 (m, lH), 5.94(bs, 1H), 5.25 (s, 1H), 3.82-8.80 (m, 4H), 3.24-2.93 (m, 8H), 2.51-2.47 (m, 3H), 2.23-2.06 (m, 2H), 1.64 (d, J = 7.1 Hz, 3H), 1.52-1.50 (m, 6H). |
| 5 | (R/S)-N-(1-(5-amino-2-fluoro-3-methylphenyl)ethyl)-2-methyl-6-morpholino-8,9-dihydro-7H-cyclopenta[h]quinazolin-4-amine (Compound - 5) | MS (ES+) m/z = 436.17 (M + 1). $^1$H NMR (400 MHz, DMSO-d$_6$) δ 8.06 (s, 1H), 7.60 (s, 1H), 6.44-6.42 (m, 1H), 6.30-6.26 (m, 1H), 5.79-5.73 (m, 1H), 4.77 (s, 2H), 3.82-3.79 (m, 4H), 3.25-2.87 (m, 8H), 2.35 (s, 3H), 2.14-2.09 (m, 3H), 2.09-2.00 (m, 2H), 1.52 (d, J = 7.0 Hz, 3H). |

TABLE IV-continued

| Example | Chemical structure | LCMS and 1H NMR data |
|---|---|---|
| 6 | 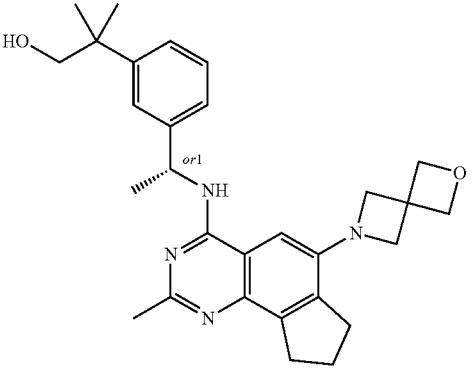 [SMILES: Cc1nc(N[C@H](C)c2cccc(C(C)(C)CO)c2)c2cc(N3CC4(COC4)C3)c3c(c2n1)CCC3]<br>(R/S)-2-methy 1-2-(3-(1-((2-methyl-6-(2-oxa-6-azaspiro[3.3]heptan-6-yl)-8,9-dihydro-7H-cyclopenta[h]quinazolin-4-yl)amino)ethyl)phenyl)propan-1-ol<br>(Compound - 6) | MS (ES+) m/z = 473.36 (M + 1).<br>$^1$H NMR (400 MHz, DMSO-$d_6$) δ 7.90 (d, J = 8.2 Hz, 1H), 7.49 (bs, 1H), 7.30-7.18 (m, 3H), 6.95 (s, 1H), 5.71-5.59 (m, 1H), 4.75 (s, 4H), 4.65 (t, J = 5.4 Hz, 1H), 4.12 (s, 4H), 3.39 (d, J = 5.4 Hz, 2H), 3.04 (t, J = 7.7 Hz, 2H), 2.94 (t, J = 7.5 Hz, 2H), 2.36 (s, 3H), 2.13-2.00 (m, 2H), 1.59 (d, J = 7.1 Hz, 3H), 1.21 (s, 6H). |
| 7 | 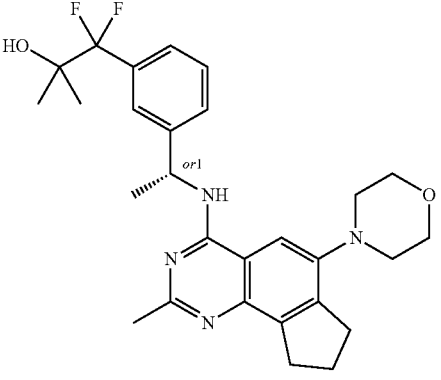 [SMILES: Cc1nc(N[C@H](C)c2cccc(C(F)(F)C(C)(C)O)c2)c2cc(N3CCOCC3)c3c(c2n1)CCC3]<br>(R/S)-1,1-difluoro-2-methyl-1-(3-(1-((2-methyl-6-morpholino-8,9-dihydro-7H-cyclopenta[h]quinazolin-4-yl)amino)ethyl)phenyl)propan-2-ol<br>(Compound - 7) | MS (ES+) m/z = 497.24 (M + 1).<br>$^1$H NMR (400 MHz, DMSO-$d_6$) δ 8.14-8.13 (m, 1H), 7.58-7.52 (m, 3H), 7.41-7.37 (m, 1H), 7.33-7.31 (m, 1H), 5.70-5.63 (1H), 5.23 (s, 1H), 3.79-3.10 (m, 4H), 3.09-3.03 (m, 2H), 3.02-3.01 (m, 4H), 2.96-2.36 (m, 2H), 2.36 (s, 3H), 2.06-2.00 (m, 2H), 1.63-1.62 (m, 3H), 1.13-1.08 (m, 6H). |
| 8 | 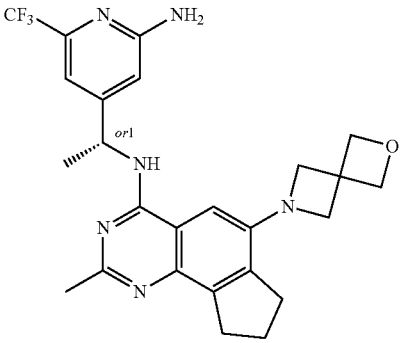 [SMILES: Cc1nc(N[C@H](C)c2cc(N)nc(C(F)(F)F)c2)c2cc(N3CC4(COC4)C3)c3c(c2n1)CCC3]<br>(R/S)-N-(1-(2-amino-6-(trifluoromethyl)pyridin-4-yl)ethyl)-2-methyl-6-(2-oxa-6-azaspiro[3.3]heptan-6-yl)-8,9-dihydro-7H-cyclopenta[h]quinazolin-4-amine<br>(Compound - 8) | MS (ES+) m/z = 485.05 (M + 1).<br>$^1$H NMR (400 MHz, DMSO-$d_6$) δ 7.95 (d, J = 7.8 Hz, 1H), 7.07-6.88 (m, 2H), 6.65 (s, 1H), 6.49 (s, 2H), 5.57-5.42 (m, 1H), 4.76 (s, 4H), 4.21-4.10 (m, 4H), 3.06 (t, J = 7.6 Hz, 2H), 2.95 (t, J = 7.5 Hz, 2H), 2.33 (s, 3H), 2.15-2.01 (m, 2H), 1.56 (d, J = 7.1 Hz, 3H). |

TABLE IV-continued

| Example | Chemical structure | LCMS and 1H NMR data |
|---|---|---|
| 9 | 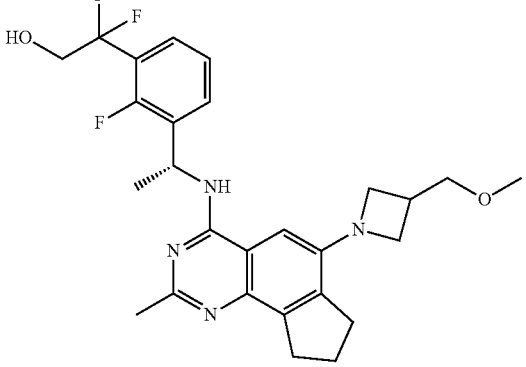<br>(R)-2,2-difluoro-2-(2-fluoro-3-(1-((6-(3-(methoxy methyl)azetidin-1-yl)-2-methyl-8,9-dihydro-7H-cyclopenta[h]quinazolin-4-yl)amino)ethyl)phenyl)ethan-1-ol<br>(Compound - 9) | MS (ES+) m/z = 501.3 (M + 1).<br>$^1$H NMR (400 MHz, DMSO-$d_6$) δ 7.95 (d, J = 7.5 Hz, 1H), 7.62(t, J = 7.1 Hz, 1H), 7.45-7.35 (m, 1H), 7.24 (t, J = 7.7 Hz, 1H), 6.95 (s, 1H), 5.83-5.81 (m, 1H), 5.72 (t, J = 6.4 Hz, 1H), 4.09-3.99 (m, 2H), 4.05-3.94 (m, 2H), 3.76-3.73 (m, 2H), 3.56 (d, J = 6.6 Hz, 2H), 3.30 (s, 3H), 3.08-3.04 (m, 2H), 2.94 (t, J = 7.4 Hz, 3H), 2.29 (s, 3H), 2.09-2.05 (m, J = 7.6 Hz, 2H), 1.59 (d, J = 7.1 Hz, 3H). |
| 10 | 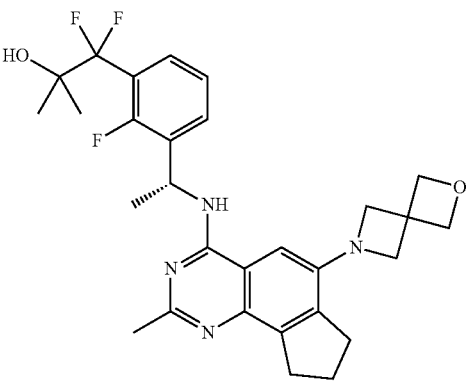 [SMILES: Cc1nc(N[C@H](C)c2cccc(C(F)(F)C(C)(C)O)c2F)c2cc(N3CC4(COC4)C3)c3c(c2n1)CCC3]<br>(R)-1,1-difluoro-1-(2-fluoro-3-(1-((2-methyl-6-(2-oxa-6-azaspiro[3.3]heptan-6-yl)-8,9-dihydro-7H-cyclopenta[h]quinazolin-4-yl)amino)ethyl)phenyl)-2-methylpropan-2-ol<br>(Compound - 10) | MS (ES+) m/z = 527.24 (M + 1).<br>$^1$H NMR (400 MHz, DMSO-$d_6$) δ 8.00 (d, J = 7.6 Hz, 1H), 7.58 (t, J = 7.1 Hz, 1H), 7.29 (t, J = 7.3 Hz, 1H), 7.23-7.16 (m, 1H), 7.00 (s, 1H), 5.86-5.75 (m, 1H), 5.33 (s, 1H), 4.76 (s, 4H), 4.31-4.04 (m, 4H), 3.09-2.99 (m, 2H), 2.95 (t, J = 7.4 Hz, 2H), 2.27 (s, 3H), 2.12-2.01 (m, 2H), 1.58 (d, J = 7.0 Hz, 3H), 1.24 (s, 3H), 1.21 (s, 3H). |
| 11 | 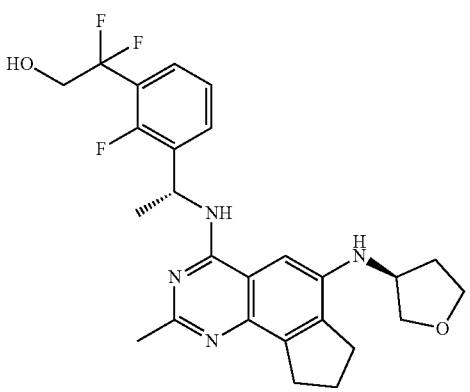 [SMILES: Cc1nc(N[C@H](C)c2cccc(C(F)(F)CO)c2F)c2cc(N[C@H]3CCOC3)c3c(c2n1)CCC3]<br>2,2-difluoro-2-(2-fluoro-3-((R)-1-((2-methyl-6-(((S)-tetrahydrofuran-3-yl)amino)-8,9-dihydro-7H-cyclopenta[h]quinazolin-4-yl)amino)ethyl)phenyl)ethan-1-ol<br>(Compound - 11) | MS (ES+) m/z = 487.17 (M + 1).<br>$^1$H NMR (400 MHz, DMSO-$d_6$) δ 7.88 (d, J = 7.5 Hz, 1H), 7.62(t, J = 7.3 Hz, 1H), 7.44-7.37 (m, 1H), 7.24 (t, J = 7.7 Hz, 1H), 7.04 (s, 1H), 5.85-5.83 (m, 1H), 5.73 (t, J = 6.4 Hz, 1H), 5.27 (d, J = 7.1 Hz, 1H), 4.32 (q, J = 5.7 Hz, 1H), 4.16-4.14 (m, 1H), 3.97-3.93 (m, 3H), 3.84-3.80 (m, 1H), 3.55-3.52 (m, 1H), 3.10-3.05 (m, 2H), 2.85 (t, J = 7.4 Hz, 2H), 2.39-2.37 (m, 1H), 2.29 (s, 3H), 2.10-2.07 (m, 2H), 1.99-1.92 (m, 1H), 1.61 (d, J = 7.1 Hz, 3H). |

TABLE IV-continued

| Example | Chemical structure | LCMS and 1H NMR data |
|---|---|---|
| 12 | 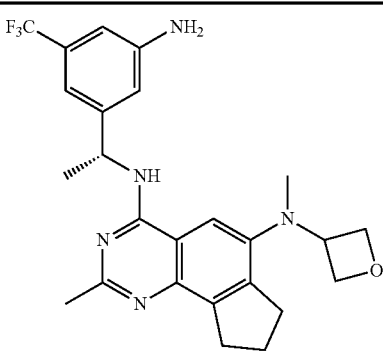<br>(R)-N⁴-(1-(3-amino-5-(trifluoromethyl)phenyl)ethyl)-N⁶,2-dimethyl-N⁶-(oxetan-3-yl)-8,9-dihydro-7H-cyclopenta[h]quinazoline-4,6-diamine (Compound - 12) | MS (ES+) m/z = 472.2 (M + 1).<br>$^1$H NMR (400 MHz, DMSO-d$_6$) δ 8.03 (s, 1H), 7.18 (s, 1H), 6.88-6.86 (m, 2H), 6.70 (s, 1H), 5.61 (d, J = 7.4 Hz, 1H), 5.56 (d, J = 5.5 Hz, 2H), 4.77 (t, J = 6.4 Hz, 2H), 4.61 (d, J = 6.4 Hz, 1H), 4.43-4.37 (m, 2H), 3.11 (t, J = 7.5 Hz, 2H), 3.02 (t, J = 7.3 Hz, 2H), 2.66 (s, 3H), 2.37 (s, 3H), 2.20-2.08 (m, 2H), 1.56 (d, J = 7.1 Hz, 3H). |
| 13 | 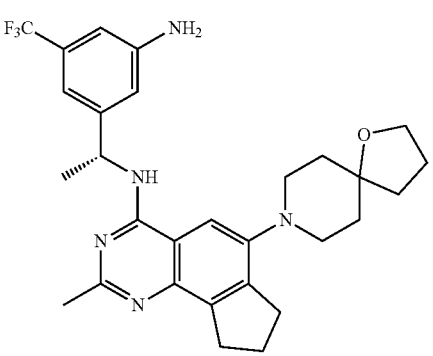 [SMILES: Cc1nc(N[C@H](C)c2cc(N)cc(C(F)(F)F)c2)c2cc(N3CCC4(CCCO4)CC3)c3c(c2n1)CCC3]<br>(R)-N-(1-(3-amino-5-(trifluoromethyl)phenyl)ethyl)-2-methyl-6-(1-oxa-8-azaspiro[4.5]decan-8-yl)-8,9-dihydro-7H-cyclopenta[h]quinazolin-4-amine (Compound - 13) | MS (ES+) m/z = 526.19 (M + 1).<br>$^1$H NMR (400 MHz, DMSO-d$_6$) δ 8.14 (s, 1H), 7.58 (s, 1H), 6.93-6.81 (m, 2H), 6.70 (d, J = 1.9 Hz, 1H), 5.64-5.51 (m, 3H), 3.77 (t, J = 6.7 Hz, 2H), 3.16-3.06 (m, 4H), 3.06-2.94 (m, 4H), 2.39 (s, 3H), 2.12-2.04 (m, 2H), 1.96-1.87 (m, 2H), 1.78-1.70 (m, 6H), 1.56 (d, J = 7.1 Hz, 3H). |
| 14 | 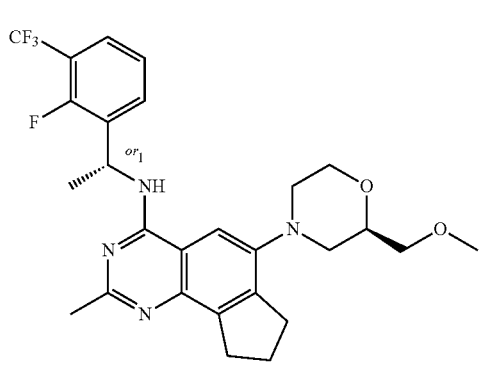 [SMILES: COC[C@H]1CN(c2cc3c(N[C@H](C)c4cccc(C(F)(F)F)c4F)nc(C)nc3c3c2CCC3)CCO1]<br>N-((R/S)-1-(2-fluoro-3-(trifluoromethyl)phenyl)ethyl)-6-((R)-2-(methoxymethyl)morpholino)-2-methyl-8,9-dihydro-7H-cyclopenta[h]quinazolin-4-amine (Compound - 14) | MS (ES+) m/z = 519.07 (M + 1).<br>$^1$H NMR (400 MHz, DMSO-d$_6$) δ 8.25 (d, J = 6.8 Hz, 1H), 7.82-7.78 (m, 1H), 7.66-7.61 (m, 1H), 7.57 (s, 1H), 7.39-7.31 (m, 1H), 5.80-5.73 (m, 1H), 4.02-3.93 (m, 1H), 3.84-3.77 (m, 1H), 3.75-3.72 (m, 1H), 3.52-3.42 (m, 2H), 3.33-3.24 (m, 4H), 3.20-3.18 (m, 1H), 3.14-3.05 (m, 2H), 2.97 (t, J = 7.3 Hz, 2H), 2.88-2.81 (m, 1H), 2.66-2.61 (m, 1H), 2.29 (s, 3H), 2.11-2.05 (m, 2H), 1.64 (d, J = 7.1 Hz, 3H). |

TABLE IV-continued

| Example | Chemical structure | LCMS and 1H NMR data |
|---|---|---|
| 15 | (S)-1-(4-(((R/S)-1-(2-fluoro-3-(trifluoromethyl)phenyl)ethyl)amino)-2-methyl-8,9-dihydro-7H-cyclopenta[h]quinazolin-6-yl)pyrrolidin-3-ol (Compound - 15) | MS (ES+) m/z = 475.17 (M + 1).<br>$^1$H NMR (400 MHz, DMSO-$d_6$) δ 8.06 (d, J = 7.2 Hz, 1H), 7.80-7.76 (m, 1H), 7.66-7.60 (m, 1H), 7.38-7.31 (m, 1H), 7.06 (s, 1H), 5.80-5.76 (m, 1H), 4.97 (t, J = 3.9 Hz, 1H), 4.47-4.37 (m, 1H), 3.65-3.60 (m, 1H), 3.57-3.54 (m, 1H), 3.46-3.40 (m, 1H), 3.28-3.26 (m, 1H), 3.21-3.12 (m, 2H), 3.06 (t, J = 7.8 Hz, 2H), 2.27 (s, 3H), 2.11-2.03 (m, 3H), 1.98-1.87 (m, 1H), 1.62 (d, J = 7.1 Hz, 3H). |
| 16 | (R)-1-(4-(((R/S)-1-(2-fluoro-3-(trifluoromethyl)phenyl)ethyl)amino)-2-methyl-8,9-dihydro-7H-cyclopenta[h]quinazolin-6-yl)pyrrolidin-3-ol (Compound - 16) | MS (ES+) m/z = 475.17 (M + 1).<br>$^1$H NMR (400 MHz, DMSO-$d_6$) δ 8.06 (d, J = 7.2 Hz, 1H), 7.80-7.74 (m, 1H), 7.64-7.60 (m, 1H), 7.38-7.31 (m, 1H), 7.07 (s, 1H), 5.82-5.75 (m, 1H), 4.97 (d, J = 3.8 Hz, 1H), 4.47-4.36 (m, 1H), 3.68-3.66 (m, 1H), 3.63-3.56 (m, 1H), 3.41-3.37 (m, 2H), 3.24-3.22 (m, 1H), 3.19-3.10 (m, 2H), 3.05-2.97 (m, 1H), 2.27 (s, 3H), 2.10-2.03 (m, 3H), 1.89 (s, 1H), 1.62 (d, J = 7.1 Hz, 3H). |
| 17 | N-((R)-1-(3-amino-5-(trifluoromethyl)phenyl)ethyl)-6-((2S,6R)-2,6-dimethylmorpholino)-2-methyl-8,9-dihydro-7H-cyclopenta[h]quinazolin-4-amine (Compound - 17) | MS (ES+) m/z = 500.24 (M + 1).<br>$^1$H NMR (400 MHz, DMSO-$d_6$) δ 8.07 (d, J = 8.1 Hz, 1H), 7.49 (s, 1H), 6.89-6.86 (m, 2H), 6.72-6.69 (m, 1H), 5.68-5.50 (m, 3H), 3.78 (s, 2H), 3.24-3.21 (m, 2H), 3.14-3.06 (m, 2H), 2.98 (t, J = 7.3 Hz, 2H), 2.46-2.34 (m, 5H), 2.09-2.06 (m, 2H), 1.57 (d, J = 7.1 Hz, 3H), 1.20-1.16 (m, 6H). |

TABLE IV-continued

| Example | Chemical structure | LCMS and 1H NMR data |
|---|---|---|
| 18 | 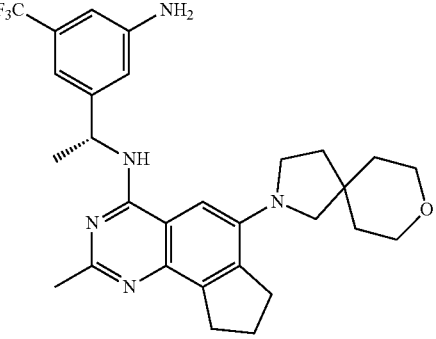<br>(R)-N-(1-(3-amino-5-(trifluoromethyl)phenyl)ethyl)-2-methyl-6-(8-oxa-2-azaspiro[4.5]decan-2-yl)-8,9-dihydro-7H-cyclopenta[h]quinazolin-4-amine (Compound - 18) | MS (ES+) m/z = 526.19 (M + 1).<br>$^1$H NMR (400 MHz, DMSO-d$_6$) δ 7.94 (d, J = 8.1 Hz, 1H), 7.04 (s, 1H), 6.91-6.82 (m, 2H), 6.71-6.68 (m, 1H), 5.62-5.57 (m, 1H), 5.53 (s, 2H), 3.63 (t, J = 5.4 Hz, 4H), 3.51-3.46 (m, 2H), 3.28 (d, J = 3.0 Hz, 2H), 3.16 (t, J = 7.4 Hz, 2H), 3.08 (t, J = 7.6 Hz, 2H), 2.35 (s, 3H), 2.06-2.03 (m, 2H), 1.88 (t, J = 7.0 Hz, 2H), 1.68-1.58 (m, 4H), 1.56 (d, J = 7.0 Hz, 3H). |
| 19 | 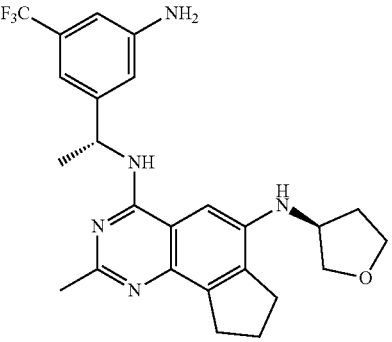 [SMILES: Cc1nc(N[C@H](C)c2cc(N)cc(C(F)(F)F)c2)c2cc(N[C@H]3CCOC3)c3c(c2n1)CCC3]<br>N$^4$-((R)-1-(3-amino-5-(trifluoromethy)phenyl)ethyl)-2-methyl-N$^6$-((S)-tetrahydrofuran-3-yl)-8,9-dihydro-7H-cyclopenta[h]qumazoline-4,6-diamine (Compound - 19) | MS (ES+) m/z = 472.2 (M + 1).<br>$^1$H NMR (400 MHz, DMSO-d$_6$) δ 7.80 (d, J = 8.0 Hz, 1H), 7.01 (s, 1H), 6.90-6.80 (m, 2H), 6.69 (d, J = 1.9 Hz, 1H), 5.63-5.60 (m, 1H), 5.53 (s, 2H), 5.23 (d, J = 7.1 Hz, 1H), 4.31-4.25 (m, 1H), 4.14-4.10 (m, 1H), 3.92-3.87 (m, 1H), 3.83-3.72 (m, 2H), 3.54-3.50 (m, 1H), 3.13-3.03 (m, 2H), 2.85 (t, J = 7.5 Hz, 2H), 2.34 (s, 3H), 2.12-2.05 (m, 2H), 1.96-1.86 (m, 1H), 1.56 (d, J = 7.1 Hz, 3H). |
| 20 | 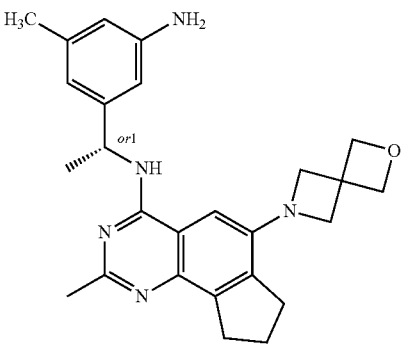 [SMILES: Cc1cc(N)cc([C@@H](C)Nc2nc(C)nc3c4c(c(N5CC6(COC6)C5)cc23)CCC4)c1]<br>(R/S)-N-(1-(3-amino-5-methylphenyl)ethyl)-2-methyl-6-(2-oxa-6-azaspiro[3.3]heptan-6-yl)-8,9-dihydro-7H-cyclopenta[h]quinazolin-4-amine (Compound - 20) | MS (ES+) m/z = 430.17 (M + 1).<br>$^1$H NMR (400 MHz, DMSO-d$_6$) δ 7.80 (d, J = 8.3 Hz, 1H), 6.97 (s, 1H), 6.41 (d, J = 1.8 Hz, 2H), 6.23 (d, J = 1.8 Hz, 1H), 5.58-5.51 (m, 1H), 4.89 (s, 2H), 4.75 (s, 4H), 4.12 (s, 4H), 3.05 (t, J = 7.6 Hz, 2H), 2.94 (t, J = 7.5 Hz, 2H), 2.35 (s, 3H), 2.13 (s, 3H), 2.10-2.02 (m, 2H), 1.50 (d, J = 7.1 Hz, 3H). |

| Example | Chemical structure | LCMS and 1H NMR data |
|---|---|---|
| 21 | (R)-N⁴-(1-(3-amino-5-(trifluoromethyl)phenyl)ethyl)-2-methyl-N⁶-(tetrahydro-2H-pyran-4-yl)-8,9-dihydro-7H-cyclopenta[h]quinazoline-4,6-diamine (Compound - 21) | MS (ES+) m/z = 486.17 (M + 1).<br>$^1$H NMR (400 MHz, DMSO-d$_6$) δ 7.70 (d, J = 8.2 Hz, 1H), 7.03 (s, 1H), 6.91-6.82 (m, 2H), 6.71-6.67 (m, 1H), 5.66-5.59 (m, 1H), 5.53 (s, 2H), 4.84 (d, J = 8.7 Hz, 1H), 3.98-3.89 (m, 2H), 3.82-3.75 (m, 1H), 3.53-3.46 (m, 2H), 3.13-3.06 (m, 2H), 2.89-2.80 (m, 2H), 2.33 (s, 3H), 2.13-2.05 (m, 2H), 1.97-1.93 (m, 2H), 1.57 (d, J = 7.1 Hz, 3H), 1.55-1.47 (m, 2H). |
| 22 | (S)-1-(4-(((R)-1-(3-(1,1-difluoro-2-hydroxyethyl)-2-fluorophenyl)ethyl)amino)-2-methyl-8,9-dihydro-7H-cyclopenta[h]quinazolin-6-yl)pyrrolidine-3-ol (Compound - 22) | MS (ES+) m/z = 487.24 (M + 1).<br>$^1$H NMR (400 MHz, DMSO-d$_6$) δ 8.00 (d, J = 7.5 Hz, 1H), 7.66-7.60 (m, 1H), 7.42-7.37 (m, 1H), 7.26-7.22 (m, 1H), 7.06 (s, 1H), 5.85-5.82 (m, 1H), 5.74-5.71 (m, 1H), 4.99-4.96 (m, 1H), 4.43-4.40 (m, 1H), 3.95-3.90 (m, 2H), 3.66-3.60 (m, 1H), 3.56 (t, J = 8.1 Hz, 1H), 3.45-3.40 (m, 1H), 3.28-3.25 (m, 1H), 3.19-3.12 (m, 2H), 3.06 (t, J = 7.6 Hz, 2H), 2.30 (s, 3H), 2.14-1.95 (m, 3H), 1.90-1.86 (m, 1H), 1.59 (d, J = 7.0 Hz, 3H). |
| 23 | (R)-2,2-difluoro-2-(2-fluoro-3-(1-((2-methyl-6-(2-oxa-6-azaspiro[3.3]heptan-6-yl)-8,9-dihydro-7H-cyclopenta[h]quinazolin-4-yl)amino)ethyl)phenyl)ethan-1-ol (Compound - 23) | MS (ES+) m/z = 499.24 (M + 1).<br>$^1$H NMR (400 MHz, DMSO-d$_6$) δ 8.00 (d, J = 7.5 Hz, 1H), 7.65-7.59 (m, 1H), 7.43-7.38 (m, 1H), 7.26-7.22 (m, 1H), 7.00 (s, 1H), 5.85-5.78 (m, 1H), 5.72 (t, J = 6.4 Hz, 1H), 4.76 (s, 4H), 4.20-4.11 (m, 4H), 3.99-3.90 (m, 2H), 3.11-2.99 (m, 2H), 2.94 (t, J = 7.5 Hz, 2H), 2.29 (s, 3H), 2.10-2.03 (m, 2H), 1.60 (d, J = 7.1 Hz, 3H). |

TABLE IV-continued

| Example | Chemical structure | LCMS and 1H NMR data |
|---|---|---|
| 24 | 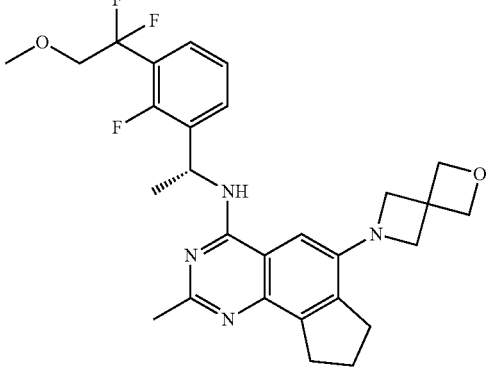<br>(R)-N-(1-(3-(1,1-difluoro-2-methoxyethyl)-2-fluorophenyl)ethyl)-2-methyl-6-(2-oxa-6-azaspiro[3.3]heptan-6-yl)-8,9-dihydro-7H-cyclopenta[h]quinazolin-4-amine (Compound - 24) | MS (ES+) m/z = 512.36 (M+).<br>$^1$H NMR (400 MHz, DMSO-$d_6$) δ 8.03 (s, 1H), 7.65-7.61 (m, 1H), 7.46-7.38 (m, 1H), 7.27-7.23 (m, 1H), 7.00 (s, 1H), 5.83-5.73 (m, 1H), 4.76 (s, 4H), 4.21-4.12 (m, 4H), 4.01-3.98 (m, 2H), 3.34 (s, 3H), 3.10-2.99 (m, 2H), 2.94 (t, J = 7.4 Hz, 2H), 2.28 (s, 3H), 2.10-2.03 (m, 2H), 1.60 (d, J = 7.1 Hz, 3H). |
| 25 | 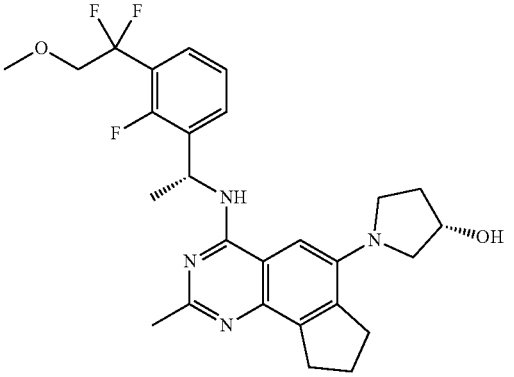 [SMILES: COCC(F)(F)c1cccc([C@@H](C)Nc2nc(C)nc3c4c(c(N5CC[C@H](O)C5)cc23)CCC4)c1F]<br>(S)-1-(4-(((R)-1-(3-(1,1-difluoro-2-methoxyethyl)-2-fluorophenyl)ethyl)amino)-2-methyl-8,9-dihydro-7H-cyclopenta[h]quinazolin-6-yl)pyrrolidin-3-ol (Compound - 25) | MS (ES+) m/z = 501.3 (M + 1).<br>$^1$H NMR (400 MHz, DMSO-$d_6$) δ 8.02 (d, J = 7.2 Hz, 1H), 7.65-7.60 (m, 1H), 7.43-7.38 (m, 1H), 7.26-7.22 (m, 1H), 7.06 (s, 1H), 5.85-5.77 (m, 1H), 4.97 (d, J = 3.9 Hz, 1H), 4.48-4.37 (m, 1H), 4.03-3.98 (m, 2H), 3.65-3.61 (m, 1H), 3.58-3.55 (m, 1H), 3.44 (s, 1H), 3.37 (s, 3H) 3.28-3.25 (m, 1H), 3.21-3.11 (m, 2H), 3.06 (t, J = 7.7 Hz, 2H), 2.28 (s, 3H), 2.11-1.91 (m, 3H), 1.90-1.89 (m, 1H), 1.59 (d, J = 7.1 Hz, 3H). |
| 26 | 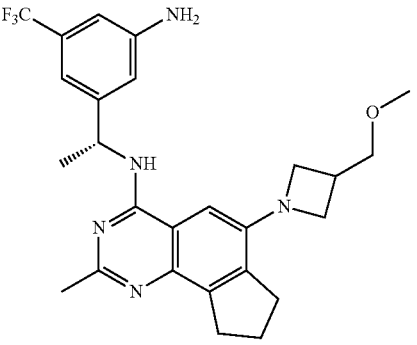 [SMILES: COCC1CN(c2cc3c(N[C@H](C)c4cc(N)cc(C(F)(F)F)c4)nc(C)nc3c3c2CCC3)C1]<br>(R)-N-(1-(3-amino-5-(trifluoromethyl)phenyl)ethyl)-6-(3-(methoxymethyl)azetidin-1-yl)-2-methyl-8,9-dihydro-7H-cyclopenta[h]quinazolin-4-amine (Compound - 26) | MS (ES+) m/z = 486.2 (M + 1).<br>$^1$H NMR (400 MHz, DMSO-$d_6$) δ 7.89 (d, J = 8.1 Hz, 1H), 6.95-6.83 (m, 3H), 6.69 (s, 1H), 5.62-5.49 (m, 3H), 4.01-4.06 (m, 2H), 3.73-3.69 (m, 2H), 3.57-3.55 (m, 2H), 3.29 (s, 3H), 3.05-2.99 (m, 2H), 2.96-2.85 (m, 3H), 2.35 (s, 3H), 2.10-2.02 (m, 2H), 1.55 (d, J = 7.1 Hz, 3H). |

TABLE IV-continued

| Example | Chemical structure | LCMS and 1H NMR data |
|---|---|---|
| 27 | 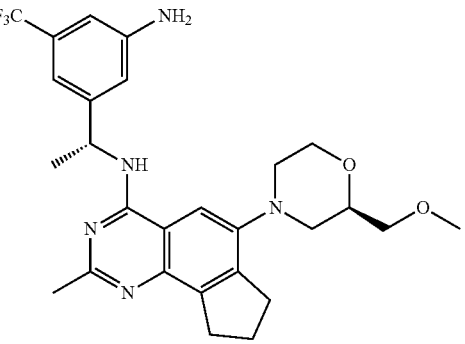<br>N-((R)-1-(3-amino-5-(trifluoromethyl)phenyl)ethyl)-6-((R)-2-(methoxymethyl)morpholino)-2-methyl-8,9-dihydro-7H-cyclopenta[h]quinazolin-4-amine (Compound - 27) | MS (ES+) m/z = 516.3 (M + 1).<br>$^1$H NMR (400 MHz, DMSO-d$_6$) δ 8.16 (s, 1H), 7.53 (s, 1H), 6.89-6.86 (m, 2H), 6.70 (s, 1H), 5.61-5.58 (m, 3H), 3.98-3.95 (m, 2H), 3.86-3.66 (m, 3H), 3.29 (s, 3H), 3.13-3.10 (m, 2H), 2.99-2.96 (m, 2H), 2.84-2.81 (m, 2H), 2.64-2.60 (m, 2H), 2.39 (s, 3H), 2.12-2.06 (m, 2H), 1.57 (d, J = 7.1 Hz, 3H). |
| 28 | 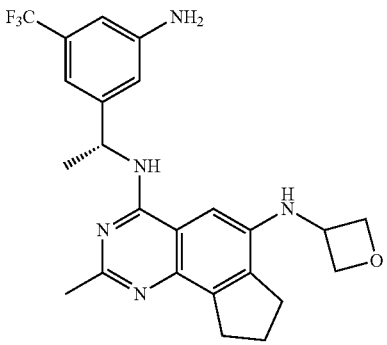 [SMILES: Cc1nc(N[C@H](C)c2cc(N)cc(C(F)(F)F)c2)c2cc(NC3COC3)c3c(c2n1)CCC3]<br>(R)-N$^4$-(1-(3-amino-5-(trifluoromethyl)phenyl)ethyl)-2-methyl-N$^6$-(oxetan-3-yl)-8,9-dihydro-7H-cyclopenta[h]quinazoline-4,6-diamine (Compound - 28) | MS (ES+) m/z = 458.2 (M + 1).<br>$^1$H NMR (400 MHz, DMSO-d$_6$) δ 7.76 (s, 1H), 6.91-6.78 (m, 3H), 6.71-6.68 (m, 1H), 5.97 (d, J = 7.4 Hz, 1H), 5.65-5.49 (m, 3H), 4.97-4.91 (m, 2H), 4.89-4.83 (m, 1H), 4.63-4.53 (m, 2H), 3.11-3.07 (m, 2H), 2.97-2.84 (m, 2H), 2.34 (s, 3H), 2.16-2.07 (m, 2H), 1.56 (d, J = 7.1 Hz, 3H). |
| 29 | 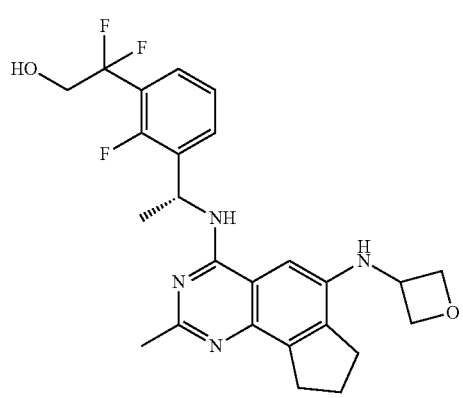 [SMILES: Cc1nc(N[C@H](C)c2cccc(C(F)(F)CO)c2F)c2cc(NC3COC3)c3c(c2n1)CCC3]<br>(R)-2,2-difluoro-2-(2-fluoro-3-(1-((2-methyl-6-(oxetan-3-ylamino)-8,9-dihydro-7H-cyclopenta[h]quinazolin-4-yl)amino)ethyl)phenyl)ethan-1-ol (Compound - 29) | MS (ES+) m/z = 473.2 (M + 1).<br>$^1$H NMR (400 MHz, DMSO-d$_6$) δ 7.82 (d, J = 7.5 Hz, 1H), 7.63-7.59 (m, 1H), 7.42-7.38 (m, 1H), 7.26-7.22 (m, 1H), 6.83 (s, 1H), 6.01-5.97 (m, 1H), 5.85-5.78 (m, 1H), 5.74-5.70 (m, 1H), 4.99-4.96 (m, 2H), 4.93-4.86 (m, 1H), 4.64-4.60 (m, 1H), 4.58-4.54 (m, 1H), 3.99-3.90 (m, 2H), 3.12-3.07 (m, 2H), 2.92-2.87 (m, 2H), 2.29 (s, 3H), 2.14-2.06 (m, 2H), 1.60 (d, J = 7.1 Hz, 3H). |

TABLE IV-continued

| Example | Chemical structure | LCMS and 1H NMR data |
|---|---|---|
| 30 | (R)-1-(4-(((R)-1-(3-(1,1-difluoro-2-hydroxyethyl)-2-fluorophenyl)ethyl)amino)-2-methyl-8,9-dihydro-7H-cyclopenta[h]quinazolin-6-yl)pyrrolidin-3-ol (Compound - 30) | MS (ES+) m/z = 487.24 (M + 1).<br>$^1$H NMR (400 MHz, DMSO-d$_6$) δ 8.00 (d, J = 7.6 Hz, 1H), 7.65-7.61 (m, 1H), 7.43-7.36 (m, 1H), 7.24-7.22 (m, 1H), 7.07 (s, 1H), 5.85-5.82 (m, 1H), 5.74-5.70 (m, 1H), 4.99-4.95 (m, 1H), 4.43-4.40 (m, 1H), 4.02-3.90 (m, 2H), 3.73-3.55 (m, 2H), 3.41-3.36 (m, 1H), 3.25-3.20 (m, 1H), 3.20-3.07 (m, 3H), 3.07-2.98 (m, 1H), 2.29 (s, 3H), 2.13-1.96 (m, 3H), 1.91-1.87 (m, 1H), 1.59 (d, J = 7.1 Hz, 3H). |
| 31 | (R)-N-(1-(3-amino-5-(trifluoromethyl)phenyl)ethyl)-6-(4-isopropylpiperazin-1-yl)-2-methyl-8,9-dihydro-7H-cyclopenta[h]quinazolin-4-amine (Compound - 31) | MS (ES+) m/z = 512.43 (M+).<br>$^1$H NMR (400 MHz, DMSO-d$_6$) δ 8.19-8.13 (m, 2H), 7.52 (s, 1H), 6.89-6.85 (m, 2H), 5.56-5.52 (m, 1H), 3.08 (s, 3H), 3.06 (s, 3H), 2.95 (s, 2H), 2.77 (s, 1H), 2.67 (s, 4H), 2.40-2.36 (m, 3H), 2.07 (s, 3H), 1.56 (d, J = 6.9 Hz, 3H), 1.08-1.00 (m, 6H). |
| 32 | N-((R)-1-(3-amino-5-(trifluoromethyl)phenyl)ethyl)-6-((S)-2-(methoxymethyl)morpholino)-2-methyl-8,9-dihydro-7H-cyclopenta[h]quinazolin-4-amine (Compound - 32) | MS (ES+) m/z = 515.57 (M+).<br>$^1$H NMR (400 MHz, DMSO-d$_6$) δ 8.14 (s, 1H), 7.53 (s, 1H), 6.89-6.81 (m, 2H), 6.73-6.69 (m, 1H), 5.64-5.49 (m, 3H), 3.97-3.94 (m, 1H), 3.81-3.77 (m, 1H), 3.76-3.68 (m, 1H), 3.46-3.44 (m, 2H), 3.30 (s, 3H), 3.27-3.16 (m, 2H), 3.18-3.10 (m, 2H), 2.97 (t, J = 7.2 Hz, 2H), 2.84-2.75 (m, 1H), 2.67-2.61 (m, 1H), 2.38 (s, 3H), 2.12-2.06 (m, 2H), 1.57 (d, J = 7.1 Hz, 3H). |

TABLE IV-continued

| Example | Chemical structure | LCMS and 1H NMR data |
|---|---|---|
| 33 | 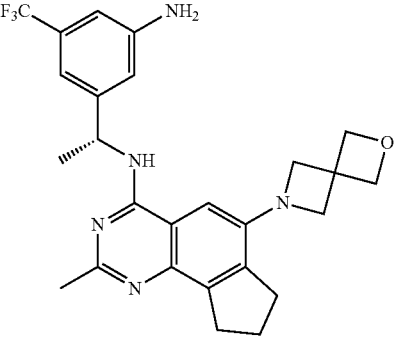 [SMILES: Cc1nc(N[C@H](C)c2cc(N)cc(C(F)(F)F)c2)c2cc(N3CC4(COC4)C3)c3c(c2n1)CCC3]<br>(R)-N-(1-(3-amino-5-(trifluoromethyl)phenyl)ethyl)-2-methyl-6-(2-oxa-6-azaspiro[3.3]heptan-6-yl)-8,9-dihydro-7H-cyclopenta[h]quinazolin-4-amine (Compound - 33) | MS (ES+) m/z = 483.99 (M+).<br>$^1$H NMR (400 MHz, DMSO-$d_6$) δ 7.92 (d, J = 8.0 Hz, 1H), 6.96 (s, 1H), 6.90-6.82 (m, 2H), 6.73-6.67 (m, 1H), 5.57-5.61 (m, 2H), 5.53 (s, 1H), 4.75 (s, 4H), 4.13 (s, 4H), 3.05 (t, J = 7.7 Hz, 2H), 2.94 (t, J = 7.6 Hz, 2H), 2.34 (s, 3H), 2.11-2.05 (m, 2H), 1.55 (d, J = 7.0 Hz, 3H). |
| 34 | 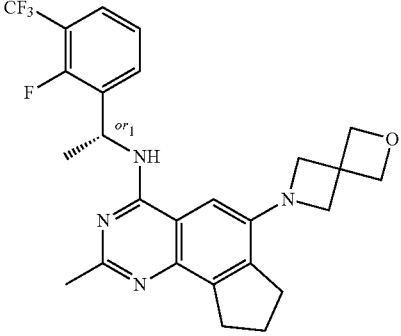 [SMILES: Cc1nc(N[C@H](C)c2cccc(C(F)(F)F)c2F)c2cc(N3CC4(COC4)C3)c3c(c2n1)CCC3]<br>(R/S)-N-(1-(2-fluoro-3-(trifluoromethyl)phenyl)ethyl)-2-methyl-6-(2-oxa-6-azaspiro[3.3]heptan-6-yl)-8,9-dihydro-7H-cyclopenta[h]quinazolin-4-amine (Compound - 34) | MS (ES+) m/z = 487.24 (M + 1).<br>$^1$H NMR (400 MHz, DMSO-$d_6$) δ 8.06 (d, J = 7.1 Hz, 1H), 7.79-7.73 (m, 1H), 7.64-7.60 (m, 1H), 7.36-7.31 (m, 1H), 6.99 (s, 1H), 5.80-5.73 (m, 1H), 4.76 (s, 4H), 4.22-4.08 (m, 4H), 3.08-3.01 (m, 2H), 2.94 (t, J = 7.5 Hz, 2H), 2.27 (s, 3H), 2.10-2.00 (m, 2H), 1.62 (d, J = 7.1 Hz, 3H). |
| 35 | 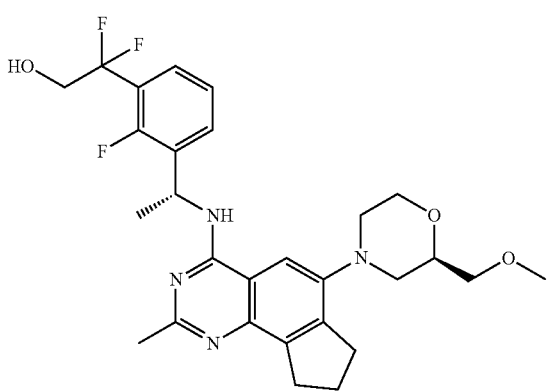 [SMILES: COC[C@H]1CN(c2cc3c(N[C@H](C)c4cccc(C(F)(F)CO)c4F)nc(C)nc3c3c2CCC3)CCO1]<br>2,2-difluoro-2-(2-fluoro-3-((R)-1-((6-((R)-2-(methoxymethyl)morpholino)-2-methyl-8,9-dihydro-7H-cyclopenta[h]quinazolin-4-yl)amino)ethyl)phenyl)ethan-1-ol (Compound - 35) | MS (ES+) m/z = 531.19 (M + 1).<br>$^1$H NMR (400 MHz, DMSO-$d_6$) δ 8.20 (d, J = 7.4 Hz, 1H), 7.66-7.62 (m, 1H), 7.57 (s, 1H), 7.44-7.38 (m, 1H), 7.27-7.23 (m, 1H), 5.85-5.80 (m, 1H), 5.76-5.70 (m, 1H), 3.98-3.96 (m, 2H), 3.82-3.79 (m, 1H), 3.75-3.70 (m, 1H), 3.50-3.43 (m, 3H), 3.33-3.28 (m, 4H), 3.20-3.17 (m, 1H), 3.11-3.08 (m, 2H), 2.97 (t, J = 7.3 Hz, 2H), 2.88-2.82 (m, 1H), 2.64-2.61 (m, 1H), 2.32 (s, 3H), 2.11-2.05 (m, 2H), 1.61 (d, J = 7.1 Hz, 3H). |

TABLE IV-continued

| Example | Chemical structure | LCMS and 1H NMR data |
|---|---|---|
| 36 | (R)-N-(1-(3-amino-5-(trifluoromethyl)phenyl)ethyl)-6-(3-methoxyazetidin-1-yl)-2-methyl-8,9-dihydro-7H-cyclopenta[h]quinazolin-4-amine (Compound - 36) | MS (ES+) m/z = 472.23 (M + 1).<br>$^1$H NMR (400 MHz, DMSO-d$_6$) δ 7.89 (d, J = 8.0 Hz, 1H), 6.97 (s, 1H), 6.89-6.86 (m, 2H), 6.69 (s, 1H), 5.57-5.54 (m, 3H), 4.35-4.29 (m, 1H), 4.25-4.18 (m, 2H), 3.78-3.73 (m, 2H), 3.27 (s, 3H), 3.06 (t, J = 7.7 Hz, 2H), 2.94 (t, J = 7.5 Hz, 2H), 2.35 (s, 3H), 2.09-2.03 (m, 2H), 1.55 (d, J = 7.0 Hz, 3H). |
| 37 | (R/S)-1'-methyl-4'-(1-((2-methyl-6-(2-oxa-6-azaspiro[3.3]heptan-6-yl)-8,9-dihydro-7H-cyclopenta[h]quinazolin-4-yl)amino)ethyl)spiro[cyclopropane-1,3'-indolin]-2'-one (Compound - 37) | MS (ES+) m/z = 496.30 (M + 1).<br>$^1$H NMR (400 MHz, DMSO-d$_6$) δ 8.02 (d, J = 7.6 Hz, 1H), 7.30-7.26 (m, 1H), 7.24-7.20 (m, 1H), 7.01 (s, 1H), 6.92-6.90 (m, 1H), 5.21-5.16 (m, 1H), 4.77 (s, 4H), 4.19-4.13 (m, 4H), 3.20 (s, 3H), 3.09-3.00 (m, 2H), 2.93 (t, J = 7.4 Hz, 2H), 2.33 (s, 3H), 2.08-2.01 (m, 2H), 1.84-1.78 (m, 1H), 1.65-1.60 (m, 1H), 1.55-1.42 (m, 5H). |
| 38 | N-((R/S)-1-(3-(difluoro((R/S)-tetrahydrofuran-2-yl)methyl)phenyl)ethyl)-2-methyl-6-(2-oxa-6-azaspiro[3.3]heptan-6-yl)-8,9-dihydro-7H-cyclopenta[h]quinazolin-4-amine (Compound - 38) | MS (ES+) m/z = 521.3 (M + 1).<br>$^1$H NMR (400 MHz, DMSO-d$_6$) δ 7.61 (s, 1H), 7.59-7.55 (m, 1H), 7.46-7.42 (m, 1H), 7.39-7.36 (m, 1H), 7.00 (s, 1H), 5.75-5.62 (m, 1H), 4.75 (s, 4H), 4.44-4.32 (m, 1H), 4.15 (s, 4H), 3.67-3.60 (m, 1H), 3.56-3.51 (m, 1H), 3.05 (t, J = 7.7 Hz, 2H), 2.96 (t, J = 7.5 Hz, 2H), 2.37 (s, 3H), 2.08 (t, J = 7.4 Hz, 2H), 2.02-1.89 (m, 2H), 1.86-1.71 (m, 2H), 1.63-1.58 (m, 1H), 1.63 (d, J = 7.1 Hz, 3H). |

TABLE IV-continued

| Example | Chemical structure | LCMS and 1H NMR data |
|---|---|---|
| 39 | 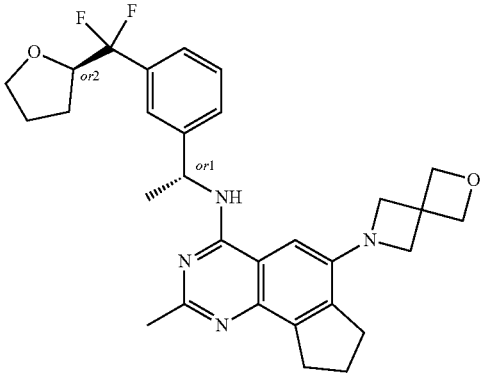 [SMILES: Cc1nc(N[C@H](C)c2cccc(C(F)(F)[C@H]3CCCO3)c2)c2cc(N3CC4(COC4)C3)c3c(c2n1)CCC3]<br>N-((S/R)1-(3-(difluoro((S/R)-tetrahydrofuran-2-yl)methyl)phenyl)ethyl)-2-methyl-6-(2-oxa-6-azaspiro[3.3]heptan-6-yl)-8,9-dihydro-7H-cyclopenta[h]quinazolin-4-amine (Compound - 39) | MS (ES+) m/z = 521.3 (M + 1).<br>$^1$H NMR (400 MHz, DMSO-d$_6$) δ 7.61 (s, 1H), 7.59-7.55 (m, 1H), 7.46-7.42 (m, 1H), 7.39-7.36 (m, 1H), 7.00 (s, 1H), 5.75-5.62 (m, 1H), 4.75 (s, 4H), 4.44-4.32 (m, 1H), 4.15 (s, 4H), 3.67-3.60 (m, 1H), 3.56-3.51 (m, 1H), 3.05 (t, J = 7.7 Hz, 2H), 2.96 (t, J = 7.5 Hz, 2H), 2.37 (s, 3H), 2.11-2.06 (m, 2H), 2.02-1.89 (m, 2H), 1.86-1.71 (m, 2H), 1.63-1.58 (m, 1H), 1.63 (d, J = 7.1 Hz, 3H). |
| 40 | 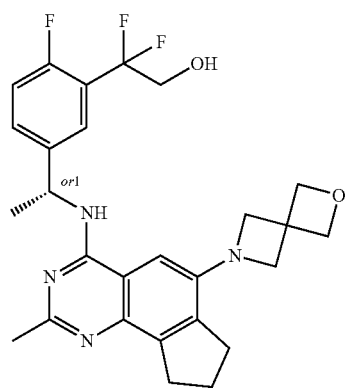 [SMILES: Cc1nc(N[C@H](C)c2ccc(F)c(C(F)(F)CO)c2)c2cc(N3CC4(COC4)C3)c3c(c2n1)CCC3]<br>(R/S)-2,2-difluoro-2-(2-fluoro-5-(1-((2-methyl)-6-(2-oxa-6-azaspiro[3.3]heptan-6-yl)-8,9-dihydro-7H-cyclopenta[h]quinazolin-4-yl)amino)ethyl)phenyl)ethan-1-ol (Compound - 40) | MS (ES+) m/z = 499.24 (M + 1).<br>$^1$H NMR (400 MHz, DMSO-d$_6$) δ 8.12 (s, 1H), 7.67-7.61 (m, 2H), 7.32-7.27 (m, 1H), 6.96 (s, 1H), 5.71-5.64 (m, 2H), 4.75 (s, 4H), 4.15 (s, 4H), 3.94-3.85 (m, 2H), 3.05 (t, J = 7.5 Hz, 2H), 2.95 (t, J = 7.4 Hz, 2H), 2.37 (s, 3H), 2.14-2.09 (m, 2H), 1.61 (d, J = 7.0 Hz, 3H). |
| 41 | 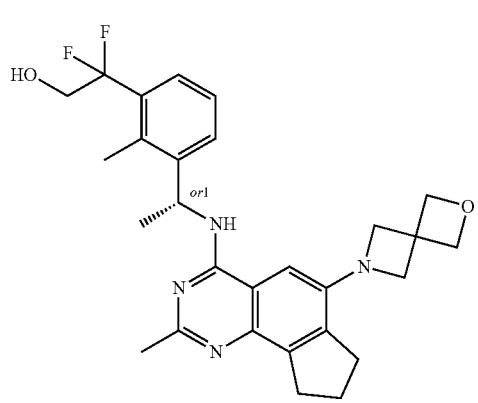 [SMILES: Cc1nc(N[C@H](C)c2cccc(C(F)(F)CO)c2C)c2cc(N3CC4(COC4)C3)c3c(c2n1)CCC3]<br>(R/S)-2,2-difluoro-2-(2-methyl-3-(1-((2-methyl-6-(2-oxa-6-azaspiro[3.3]heptan-6-yl)-8,9-dihydro-7H-cyclopenta[h]quinazolin-4-yl)amino)ethyl)phenyl)ethan-1-ol (Compound - 41) | MS (ES+) m/z = 495.3 (M + 1).<br>$^1$H NMR (400 MHz, DMSO-d$_6$) δ 8.06 (d, J = 7.4 Hz, 1H), 7.66-7.62 (m, 1H), 7.34-7.31 (m, 1H), 7.26-7.22 (m, 1H), 6.99 (s, 1H), 5.82-5.73 (m, 1H), 5.67 (t, J = 6.3 Hz, 1H), 4.76 (s, 4H), 4.22-4.06 (m, 4H), 3.99-3.81 (m, 2H), 3.08-2.97 (m, 2H), 2.93 (t, J = 7.4 Hz, 2H), 2.59 (s, 3H), 2.30 (s, 3H), 2.12-1.97 (m, 2H), 1.53 (d, J = 7.0 Hz, 3H). |

TABLE IV-continued

| Example | Chemical structure | LCMS and 1H NMR data |
|---|---|---|
| 42 | 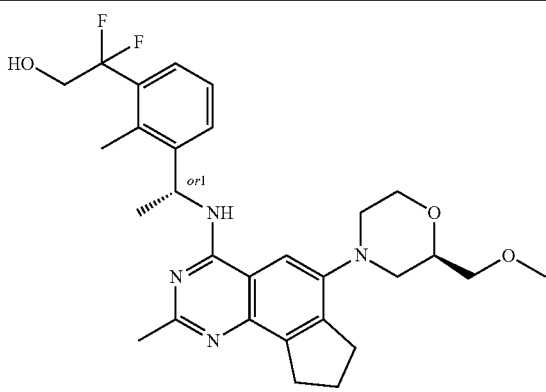

2,2-difluoro-2-(3-((R/S)-1-((6-((R)-2-(methoxymethyl)morpholino)-2-methyl-8,9-dihydro-7H-cyclopenta[h]quinazolin-4-yl)amino)ethyl)-2-methylphenyl)ethan-1-ol (Compound - 42) | MS (ES+) m/z = 527.3 (M + 1).<br>$^1$H NMR (400 MHz, DMSO-d$_6$) δ 8.25 (d, J = 7.3 Hz, 1H), 7.67-7.63 (m, 1H), 7.56 (s, 1H), 7.35-7.31 (m, 1H), 7.27-7.23 (m, 1H), 5.74-5.82 (m, 1H), 5.68 (s, 1H), 4.02-3.85 (m, 3H), 3.84-3.67 (m, 2H), 3.48-3.45 (m, 2H), 3.30 (s, 3H), 3.18-3.15 (m, 1H), 3.09-307 (m, 2H), 2.96 (t, J = 7.3 Hz, 2H), 2.90-2.80 (m, 1H), 2.63-2.60 (m, 4H), 2.33 (s, 3H), 2.13-1.99 (m, 2H), 1.57-1.52 (m, 4H). |
| 43 | 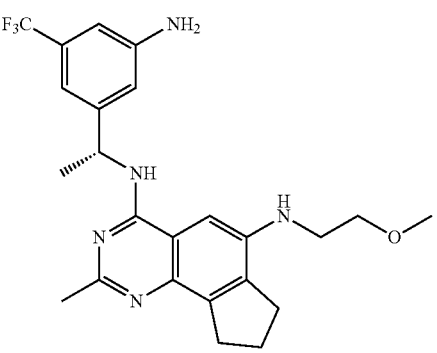 [SMILES: COCCNc1cc2c(N[C@H](C)c3cc(N)cc(C(F)(F)F)c3)nc(C)nc2c2c1CCC2]

(R)-N$^4$-(1-(3-amino-5-(trifluoromethyl)phenyl)ethyl)-N$^6$-(2-methoxyethyl)-2-methyl-8,9-dihydro-7H-cyclopenta[h]quinazoline-4,6-diamine (Compound - 43) | MS (ES+) m/z = 460.17 (M + 1).<br>$^1$H NMR (400 MHz, DMSO-d$_6$) δ 7.80 (d, J = 8.1 Hz, 1H), 7.04 (s, 1H), 6.94-6.83 (m, 2H), 6.69 (t, J = 1.9 Hz, 1H), 5.68-5.42 (m, 3H), 5.09-5.06 (m, 1H), 3.63-3.61 (m, 2H), 3.48-3.39 (m, 2H), 3.36 (s, 3H), 3.10-3.08 (m, 2H), 2.82 (t, J = 7.6 Hz, 2H), 2.34 (s, 3H), 2.04-2.14 (m, 2H), 1.56 (d, J = 7.2 Hz, 3H). |
| 44 | 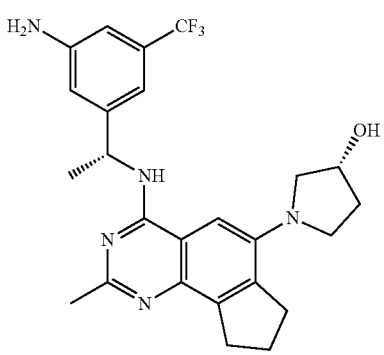 [SMILES: Cc1nc(N[C@H](C)c2cc(N)cc(C(F)(F)F)c2)c2cc(N3CC[C@@H](O)C3)c3c(c2n1)CCC3]

(R)-1-(4-(((R)-1-(3-amino-5-(trifluoromethyl)phenyl)ethyl)amino)-2-methyl-8,9-dihydro-7H-cyclopenta[h]quinazolin-6-yl)pyrrolidin-3-ol (Compound - 44) | MS (ES+) m/z = 472.23 (M + 1).<br>$^1$H NMR (400 MHz, DMSO-d$_6$) δ 7.98 (s, 1H), 7.03 (s, 1H), 6.95-6.79 (m, 2H), 6.71-6.67 (m, 1H), 5.71-5.44 (m, 3H), 4.96 (d, J = 3.9 Hz, 1H), 4.43-4.37 (m, 1H), 3.67-3.50 (m, 2H), 3.37-3.45 (m, 1H), 3.30-2.96 (m, 4H), 2.35 (s, 3H), 2.14-1.96 (m, 3H), 1.94-1.81 (m, 2H), 1.55 (d, J = 7.1 Hz, 3H). |

TABLE IV-continued

| Example | Chemical structure | LCMS and 1H NMR data |
|---|---|---|
| 45 | 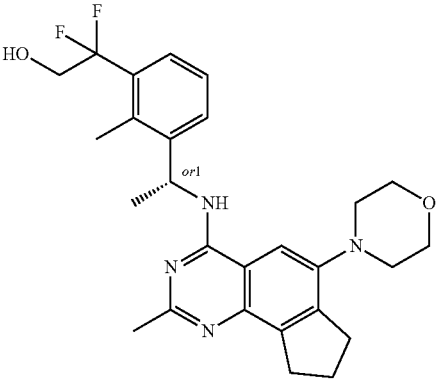 [SMILES: Cc1nc(N[C@H](C)c2cccc(C(F)(F)CO)c2C)c2cc(N3CCOCC3)c3c(c2n1)CCC3]<br>(R/S)-2,2-difluoro-2-(2-methyl-3-(1-((2-methyl-6-morpholino-8,9-dihydro-7H-cyclopenta[h]quinazolin-4-yl)amino)ethyl)phenyl)ethan-1-ol (Compound - 45) | MS (ES+) m/z = 482.67 (M+).<br>$^1$H NMR (400 MHz, DMSO-d$_6$) δ 8.23 (d, J = 7.4 Hz, 1H), 7.67-7.63 (m, 1H), 7.55 (s, 1H), 7.37-7.29 (m, 1H), 7.26-7.22 (m, 1H), 5.81-5.74 (m, 1H), 5.70-5.66 (m, 1H), 3.97-3.83 (m, 2H), 3.81-3.77 (m, 4H), 3.11-3.00 (m, 6H), 2.96 (t, J = 7.3 Hz, 2H), 2.59 (s, 3H), 2.33 (s, 3H), 2.10-2.01 (m, 2H), 1.54 (d, J = 7.0 Hz, 3H). |
| 46 | 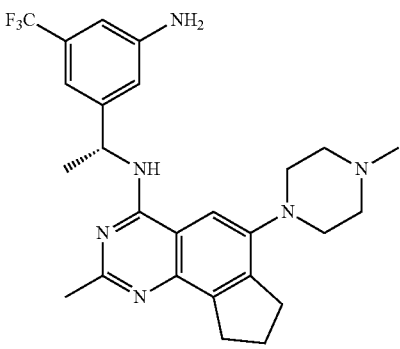 [SMILES: Cc1nc(N[C@H](C)c2cc(N)cc(C(F)(F)F)c2)c2cc(N3CCN(C)CC3)c3c(c2n1)CCC3]<br>(R)-N-(1-(3-amino-5-(trifluoromethyl)phenyl)ethyl)-2-methyl-6-(4-methylpiperazin-1-yl)-8,9-dihydro-7H-cyclopenta[h]quinazolin-4-amine (Compound - 46) | MS (ES+) m/z = 485.18 (M + 1).<br>$^1$H NMR (400 MHz, DMSO-d$_6$) δ 13.66 (s, 1H), 11.52 (s, 1H), 10.34 (d, J = 7.7 Hz, 1H), 8.00 (s, 1H), 7.16 (s, 1H), 7.10 (s, 1H), 6.96 (s, 1H), 5.88-5.69 (m, 1H), 3.62-3.47 (m, 4H), 3.42-3.30 (m, 2H), 3.30-3.17 (m, 4H), 3.09-2.98 (m, 2H), 2.89-2.79 (m, 3H), 2.68 (s, 3H), 2.25-2.09 (m, 2H), 1.70 (d, J = 7.0 Hz, 3H). |
| 47 | 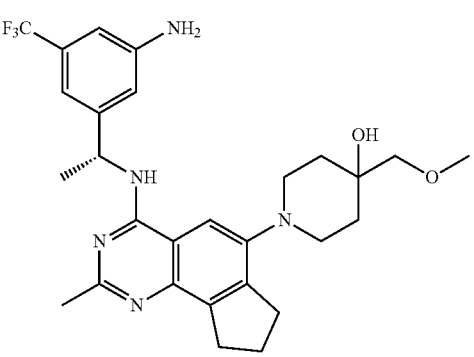 [SMILES: COCC1(O)CCN(c2cc3c(N[C@H](C)c4cc(N)cc(C(F)(F)F)c4)nc(C)nc3c3c2CCC3)CC1]<br>(R)-1-(4-((1-(3-amino-5-(trifluoromethyl)phenyl)ethyl)amino)-2-methyl-8,9-dihydro-7H-cyclopenta[h]quinazolin-6-yl)-4-(methoxymethyl)piperidin-4-ol (Compound - 47) | MS (ES+) m/z = 530.3 (M+).<br>$^1$H NMR (400 MHz, DMSO-d$_6$) δ 8.10 (d, J = 8.0 Hz, 1H), 7.55 (s, 1H), 6.93-6.82 (m, 2H), 6.69-6.68 (m, 1H), 5.61-5.53 (m, 1H), 5.53 (s, 2H), 4.41 (s, 1H), 3.32 (s, 3H), 3.23 (s, 2H), 3.11-3.04 (m, 6H), 2.94 (t, J = 7.3 Hz, 2H), 2.37 (s, 3H), 2.08-2.02 (m, 2H), 1.77 (s, 2H), 1.62- 1.51 (m, 5H). |

TABLE IV-continued

| Example | Chemical structure | LCMS and 1H NMR data |
| --- | --- | --- |
| 48 | (R)-1-(4-((1-(3-amino-5-(trifluoromethyl)phenyl)ethyl)amino)-2-methyl-8,9-dihydro-7H-cyclopenta[h]quinazolin-6-yl)piperidin-4-ol (Compound - 48) | MS (ES+) m/z = 486.2 (M+).<br>$^1$H NMR (400 MHz, DMSO-d$_6$) δ 8.06 (d, J = 8.1 Hz, 1H), 7.52 (s, 1H), 6.92-6.83 (m, 2H), 6.73-6.66 (m, 1H), 5.62-5.55 (m, 1H), 5.53 (s, 2H), 4.71 (d, J = 4.0 Hz, 1H), 3.76-3.61 (m, 1H), 3.29-3.20 (m, 2H), 3.09 (t, J = 7.5 Hz, 2H), 2.95 (t, J = 7.3 Hz, 2H), 2.83-2.72 (m, 2H), 2.37 (s, 3H), 2.12-2.02 (m, 2H), 1.94-1.86 (m, 2H), 1.66-1.49 (m, 5H). |
| 49 | (R)-(1-(4-((1-(3-amino-5-(trifluoromethyl)phenyl)ethyl)amino)-2-methyl-8,9-dihydro-7H-cyclopenta[h]quinazolin-6-yl)piperidin-4-yl)methanol (Compound - 49) | MS (ES+) m/z = 500.3 (M + 1).<br>$^1$H NMR (400 MHz, DMSO-d$_6$) δ 8.05 (d, J = 8.0 Hz, 1H), 7.50 (s, 1H), 6.93-6.83 (m, 2H), 6.72-6.68 (m, 1H), 5.63-5.56 (m, 1H), 5.53 (s, 2H), 4.52 (t, J = 5.2 Hz, 1H), 3.41-3.34 (m, 4H), 3.09 (t, J = 7.4 Hz, 2H), 2.94 (t, J = 7.3 Hz, 2H), 2.73-2.62 (m, 2H), 2.37 (s, 3H), 2.12-2.01 (m, 2H), 1.87-1.78 (m, 2H), 1.60-1.49 (m, 4H), 1.40-1.28 (m, 2H). |
| 50 | (R)-1-(4-((1-(3-amino-5-(trifluoromethyl)phenyl)ethyl)amino)-2-methyl-8,9-dihydro-7H-cyclopenta[h]quinazolin-6-yl)-4-methylpiperidin-4-ol (Compound - 50) | MS (ES+) m/z = 500.24 (M + 1).<br>$^1$H NMR (400 MHz, DMSO-d$_6$) δ 8.08 (d, J = 8.0 Hz, 1H), 7.55 (s, 1H), 6.89 (s, 1H), 6.85 (s, 1H), 6.69 (s, 1H), 5.64-5.49 (m, 3H), 4.30 (s, 1H), 3.20-2.98 (m, 6H), 2.94 (t, J = 7.3 Hz, 2H), 2.37 (s, 3H), 2.12-2.02 (m, 2H), 1.72-1.62 (m, 4H), 1.55 (d, J = 7.1 Hz, 3H), 1.22 (s, 3H). |

TABLE IV-continued

| Example | Chemical structure | LCMS and 1H NMR data |
| --- | --- | --- |
| 51 | (R)-2-(1-(4-((1-(3-amino-5-(trifluoromethyl)phenyl)ethyl)amino)-2-methyl-8,9-dihydro-7H-cyclopenta[h]quinazolin-6-yl)piperidin-4-yl)propan-2-ol (Compound - 51) | MS m/z = 528.30 (M + 1).<br>$^1$H NMR (400 MHz, DMSO-d$_6$) δ 8.04 (d, J = 8.0 Hz, 1H), 7.49 (s, 1H), 6.90-6.88 (m, 1H), 6.86-6.84 (m, 1H), 6.70-6.68 (m, 1H), 5.65-5.55 (m, 1H), 5.53 (s, 2H), 4.16 (s, 1H), 3.47-3.37 (m, 2H), 3.10 (t, J = 7.3 Hz, 2H), 2.95 (t, J = 7.2 Hz, 2H), 2.37 (s, 3H), 2.12-2.03 (m, 2H), 1.89-1.79 (m, 2H), 1.56 (d, J = 7.1 Hz, 3H), 1.51-1.24 (m, 5H), 1.10 (s, 6H). |
| 52 | (R)-2-(4-((1-(3-amino-5-(trifluoromethyl)phenyl)ethyl)amino)-2-methyl-8,9-dihydro-7H-cyclopenta[h]quinazolin-6-yl)-2-azaspiro[3.3]heptan-6-ol (Compound - 52) | MS (ES+) m/z = 498.42 (M + 1).<br>$^1$H NMR (400 MHz, DMSO-d$_6$) δ 7.86 (d, J = 8.1 Hz, 1H), 6.91-6.89 (m, 1H), 6.88-6.86 (m, 1H), 6.85-6.82 (m, 1H), 6.71-6.67 (m, 1H), 5.61-5.49 (m, 3H), 5.07 (d, J = 6.1 Hz, 1H), 4.07-3.98 (m, 1H), 3.93 (s, 2H), 3.90 (s, 2H), 3.04 (t, J = 7.7 Hz, 2H), 2.92 (t, J = 7.5 Hz, 2H), 2.48-2.39 (m, 1H), 2.34 (s, 3H), 2.12-1.95 (m, 4H), 1.76 (s, 1H), 1.55 (d, J = 7.0 Hz, 3H). |
| 53 | (R)-4-(4-((1-(3-amino-5-(trifluoromethyl)phenyl)ethyl)amino)-2-methyl-8,9-dihydro-7H-cyclopenta[h]quinazolin-6-yl)piperazin-2-one (Compound - 53) | MS (ES+) m/z = 485.36 (M + 1).<br>$^1$H NMR (400 MHz, DMSO-d$_6$) δ 8.15 (d, J = 8.0 Hz, 1H), 8.04-8.00 (m, 1H), 7.55-7.50 (m, 1H), 6.90-6.87 (m, 1H), 6.86-6.84 (m, 1H), 6.72-6.68 (m, 1H), 5.66-5.58 (m, 1H), 5.54 (s, 2H), 3.68 (s, 2H), 3.39-3.33 (m, 2H), 3.24-3.16 (m, 2H), 3.11 (t, J = 7.5 Hz, 2H), 3.00 (t, J = 7.3 Hz, 2H), 2.38 (s, 3H), 2.14-2.04 (m, 2H), 1.56 (d, J = 7.0 Hz, 3H). |

TABLE IV-continued

| Example | Chemical structure | LCMS and 1H NMR data |
|---|---|---|
| 54 | 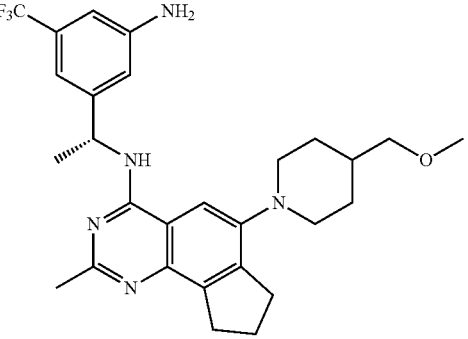<br>(R)-N-(1-(3-amino-5-(trifluoromethyl)phenyl)ethyl)-6-(4-(methoxymethyl)piperidin-1-yl)-2-methyl-8,9-dihydro-7H-cyclopenta[h]quinazolin-4-amine (Compound - 54) | MS (ES+) m/z = 514.3 (M + 1).<br>$^1$H NMR (400 MHz, DMSO-d$_6$) δ 8.06 (d, J = 8.0 Hz, 1H), 7.51 (s, 1H), 6.92-6.83 (m, 2H), 6.72-6.66 (m, 1H), 5.62-5.55 (m, 1H), 5.53 (s, 2H), 3.39-3.35 (m, 2H), 3.31-3.24 (m, 5H), 3.09 (t, J = 7.4 Hz, 2H), 2.94 (t, J = 7.3 Hz, 2H), 2.72-2.63 (m, 2H), 2.37 (s, 3H), 2.11-2.00 (m, 2H), 1.84-1.78 (m, 2H), 1.75-1.66 (m, 1H), 1.56 (d, J = 7.1 Hz, 3H), 1.44-1.32 (m, 2H). |
| 55a<br>Peak-1 | 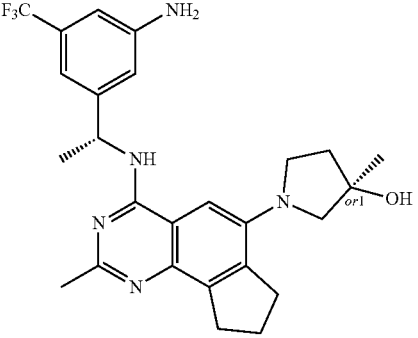 [SMILES: Cc1nc(N[C@H](C)c2cc(N)cc(C(F)(F)F)c2)c2cc(N3CC[C@@](C)(O)C3)c3c(c2n1)CCC3]<br>(R/S)-1-(4-(((R)-1-(3-amino-5-(trifluoromethyl)phenyl)ethyl)amino)-2-methyl-8,9-dihydro-7H-cyclopenta[h]quinazolin-6-yl)-3-methylpyrrolidin-3-ol (Compound - 55a) | MS (ES+) m/z = 486.2 (M + 1).<br>$^1$H NMR (400 MHz, DMSO-d$_6$) δ 8.02 (bs, 1H), 6.99-6.97 (m, 1H), 6.89-6.87 (m, 1H), 6.85-6.86 (m, 1H), 6.70-6.69 (m, 1H), 5.66-5.57 (m, 1H), 5.53 (s, 2H), 4.77 (s, 1H), 3.72-7.64 (m, 1H), 3.48-3.36 (m, 3H), 3.23-2.90 (m, 4H), 2.36 (s, 3H), 2.19-1.79 (m, 4H), 1.56 (d, J = 7.1 Hz, 3H), 1.34 (s, 3H).<br>Chiral RT: 5.13 min, Chiral Purity: 99.96%, Instrument Method: HEX_0.1% DEA_IPA-MEOH80_20_A_B_1.2 ML_12 MIN_253 nm Flow Rate: 1.20 ml/min. |
| 55b<br>Peak-2 | 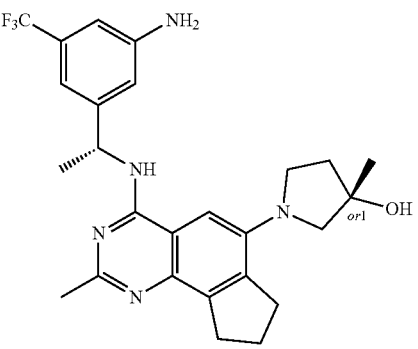 [SMILES: Cc1nc(N[C@H](C)c2cc(N)cc(C(F)(F)F)c2)c2cc(N3CC[C@](C)(O)C3)c3c(c2n1)CCC3]<br>(S/R)-1-(4-(((R)-1-(3-amino-5-(trifluoromethyl)phenyl)ethyl)amino)-2-methyl-8,9-dihydro-7H-cyclopenta[h]quinazolin-6-yl)-3-methylpyrrolidin-3-ol (Compound - 55b) | MS (ES+) m/z = 486.2 (M + 1).<br>$^1$H NMR (400 MHz, DMSO-d$_6$) δ 8.02 (bs, 1H), 6.99-6.96 (m, 1H), 6.89-6.87 (m, 1H), 6.85-6.86 (m, 1H), 6.70-6.69 (m, 1H), 5.66-5.57 (m, 1H), 5.53 (s, 2H), 4.77 (s, 1H), 3.72-7.64 (m, 1H), 3.48-3.36 (m, 3H), 3.23-2.90 (m, 4H), 2.36 (s, 3H), 2.19-1.79 (m, 4H), 1.56 (d, J = 7.1 Hz, 3H), 1.34 (s, 3H).<br>Chiral RT: 6.16 min, Chiral Purity: 97.18%, Instrument Method: HEX_0.1% DEA_IPA-MEOH_80_20_A_B_1.2 ML_12 MIN_253 nm Flow Rate: 1.20 ml/min. |

TABLE IV-continued

| Example | Chemical structure | LCMS and 1H NMR data |
|---|---|---|
| 56 | 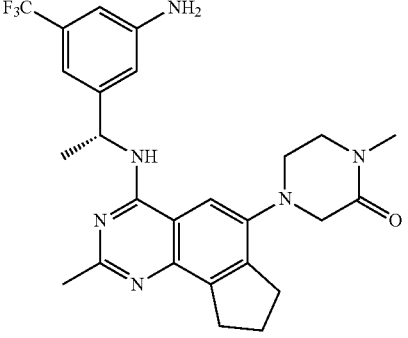 [SMILES: Cc1nc(N[C@H](C)c2cc(N)cc(C(F)(F)F)c2)c2cc(N3CCN(C)C(=O)C3)c3c(c2n1)CCC3]<br>(R)-4-(4-((1-(3-amino-5-(trifluoromethyl)phenyl)ethyl)amino)-2-methyl-8,9-dihydro-7H-cyclopenta[h]quinazolin-6-yl)-1-methylpiperazin-2-one (Compound - 56) | MS (ES+) m/z = 499.42 (M + 1).<br>$^1$H NMR (400 MHz, DMSO-d$_6$) δ 8.16 (d, J = 8.0 Hz, 1H), 7.59-7.47 (m, 1H), 6.98-6.80 (m, 2H), 6.77-6.61 (m, 1H), 5.67-5.50 (m, 3H), 3.79-3.68 (m, 2H), 3.55-3.39 (m, 4H), 3.16-3.08 (m, 2H), 3.06-2.88 (m, 5H), 2.38 (s, 3H), 2.14-2.02 (m, 2H), 1.56 (d, J = 6.9 Hz, 3H). |
| 57 | 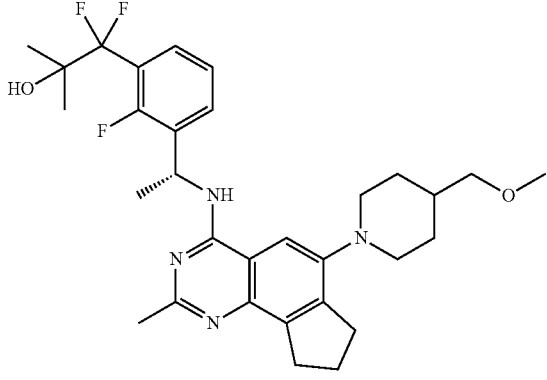 [SMILES: COCC1CCN(c2cc3c(N[C@H](C)c4cccc(C(F)(F)C(C)(C)O)c4F)nc(C)nc3c3c2CCC3)CC1]<br>(R)-1,1-difluoro-1-(2-fluoro-3-(1-((6-(4-(methoxymethyl)piperidin-1-yl)-2-methyl-8,9-dihydro-7H-cyclopenta[h]quinazolin-4-yl)amino)ethyl)phenyl)-2-methylpropan-2-ol (Compound - 57) | MS (ES+) m/z = 557.18 (M + 1).<br>$^1$H NMR (400 MHz, DMSO-d$_6$) δ 8.14 (d, J = 7.5 Hz, 1H), 7.62-7.53 (m, 2H), 7.32-7.25 (m, 1H), 7.23-7.17 (m, 1H), 5.86-5.77 (m, 1H), 5.35 (s, 1H), 3.42-3.34 (m, 2H), 3.30-3.26 (m, 5H), 3.12-3.03 (m, 2H), 2.98-2.91 (m, 2H), 2.75-2.64 (m, 2H), 2.30 (s, 3H), 2.11-2.01 (m, 2H), 1.89-1.69 (m, 3H), 1.58 (d, J = 7.1 Hz, 3H), 1.45-1.33 (m, 2H), 1.21 (s, 3H), 1.24 (s, 3H). |
| 58 | 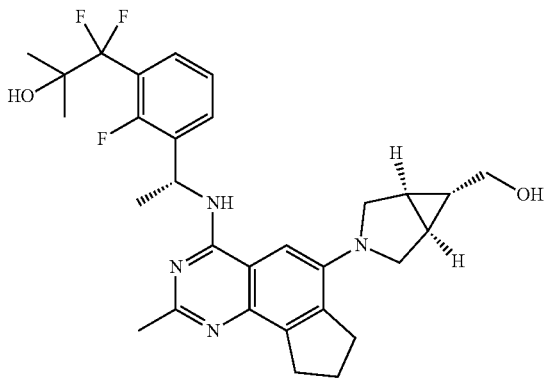 [SMILES: Cc1nc(N[C@H](C)c2cccc(C(F)(F)C(C)(C)O)c2F)c2cc(N3C[C@@H]4[C@@H](CO)[C@@H]4C3)c3c(c2n1)CCC3]<br>1,1-difluoro-1-(2-fluoro-3-((R)-1-((6-((1R,5S,6R)-6-(hydroxymethyl)-3-azabicyclo[3.1.0]hexan-3-yl)-2-methyl-8,9-dihydro-7H-cyclopenta[h]quinazolin-4-yl)amino)ethyl)phenyl)-2-methylpropan-2-ol (Compound - 58) | MS (ES+) m/z = 541.30 (M + 1).<br>$^1$H NMR (400 MHz, DMSO-d$_6$) δ 8.01 (d, J = 7.5 Hz, 1H), 7.61-7.54 (m, 1H), 7.32-7.26 (m, 1H), 7.23-7.16 (m, 1H), 7.14 (s, 1H), 5.88-5.78 (m, 1H), 5.32 (s, 1H), 4.53 (t, J = 5.5 Hz, 1H), 3.73-3.60 (m, 2H), 3.39-3.34 (s, 2H), 3.32-3.24 (m, 2H), 3.13-3.00 (m , 4H), 2.28 (s, 3H), 2.09-1.97 (m, 2H), 1.61-1.55 (m, 5H), 1.24 (s, 3H), 1.21 (s, 3H), 1.19-1.14 (m, 1H). |

TABLE IV-continued

| Example | Chemical structure | LCMS and 1H NMR data |
|---|---|---|
| 59 | 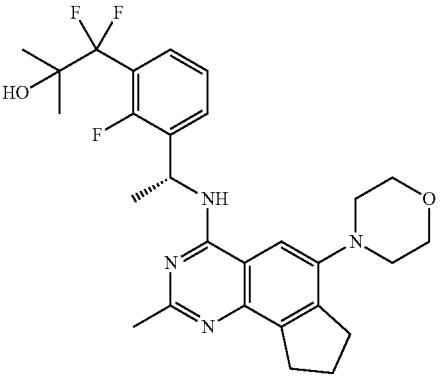 [SMILES: Cc1nc(N[C@H](C)c2cccc(C(F)(F)C(C)(C)O)c2F)c2cc(N3CCOCC3)c3c(c2n1)CCC3]<br>(R)-1,1-difluoro-1-(2-fluoro-3-(1-((2-methyl-6-morpholino-8,9-dihydro-7H-cyclopenta[h]quinazolin-4-yl)amino)ethyl)phenyl)-2-methylpropan-2-ol (Compound - 59) | MS (ES+) m/z = 514.68 (M+).<br>$^1$H NMR (400 MHz, DMSO-d$_6$) δ 8.19 (d, J = 7.3 Hz, 1H), 7.68-7.51 (m, 2H), 7.36-7.15 (m, 2H), 5.95-5.79 (m, 1H), 5.34 (s, 1H), 3.80 (s, 3H), 3.57-3.27 (m, 2H), 3.18-3.01 (m, 5H), 3.00-2.88 (m, 3H), 2.35-2.29 (m, 2H), 2.14-1.97 (m, 2H), 1.60 (d, J = 7.0 Hz, 3H), 1.25 (s, 3H), 1.22 (s, 3H). |
| 60 | 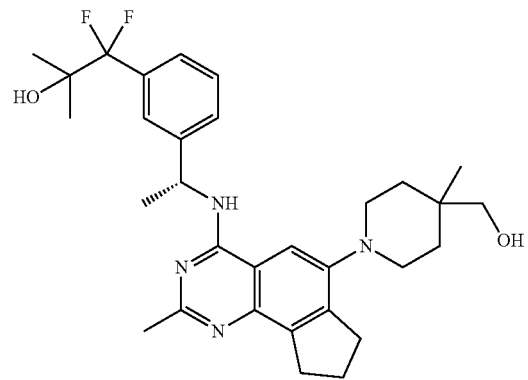<br>(R)-1,1-difluoro-1-(2-fluoro-3-(1-((6-(4-(hydroxymethyl)-4-methylpiperidin-1-yl)-2-methyl-8,9-dihydro-7H-cyclopenta[h]quinazolin-4-yl)amino)ethyl)phenyl)-2-methylpropan-2-ol (Compound - 60) | MS (ES+) m/z = 557.20 (M + 1).<br>$^1$H NMR (400 MHz, DMSO-d$_6$) δ 8.14 (d, J = 7.4 Hz, 1H), 7.63-7.54 (m, 2H), 7.35-7.26 (m, 1H), 7.24-7.16 (m, 1H), 5.87-5.78 (m, 1H), 5.33 (s, 1H), 4.58 (t, J = 5.3 Hz, 1H), 3.27 (d, J = 5.3 Hz, 2H), 3.15-3.05 (m, 4H), 2.99-2.88 (m, 4H), 2.30 (s, 3H), 2.10-2.02 (m, 2H), 1.72-1.64 (m, 2H), 1.59 (d, J =7.1 Hz, 3H), 1.46-1.37 (m, 2H), 1.24 (s, 3H), 1.21 (s, 3H), 0.99 (s, 3H). |
| 61a<br>Peak-1 | 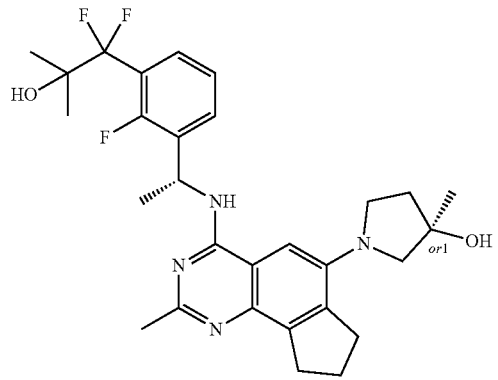 [SMILES: Cc1nc(N[C@H](C)c2cccc(C(F)(F)C(C)(C)O)c2F)c2cc(N3CC[C@@](C)(O)C3)c3c(c2n1)CCC3]<br>(R/S)-1-(4-((R)-1-(3-(1,1-difluoro-2-hydroxy-2-methylpropyl)-2-fluorophenyl)ethyl)amino)-2-methyl-8,9-dihydro-7H-cyclopenta[h]quinazoline-6-yl)-3-methylpyrrolidin-3-ol (Compound - 61a) | MS (ES+) m/z = 529.19 (M + 1).<br>$^1$H NMR (400 MHz, DMSO-d$_6$) δ 8.01 (bs, 1H), 7.62-7.50 (m, 1H), 7.32-7.26 (m, 1H), 7.23-7.16 (m, 1H), 7.01 (s, 1H), 5.88-5.81 (m, 1H), 5.33 (s, 1H), 4.79 (s, 1H), 3.74-3.66 (m, 1H), 3.52- 3.40 (m, 2H), 3.26-2.90 (m, 4H), 2.28 (s, 3H), 2.16-1.84 (m, 5H), 1.59 (d, J = 7.1 Hz, 3H), 1.40 (s, 3H), 1.24 (s, 3H), 1.21 (s, 3H).<br>Chiral RT: 3.76 min, Chiral Purity: 99.44%, Instrument Method: HEX_0.1% DEA_IPA-MEOH_80_20_A_B_1.2 ML_12 MIN_253 nm Flow Rate: 1.20 ml/min. |

TABLE IV-continued

| Example | Chemical structure | LCMS and 1H NMR data |
|---|---|---|
| 61b Peak-2 | (S/R)-1-(4-((R)-1-(3-(1,1-difluoro-2-hydroxy-2-methylpropyl)-2-fluorophenyl)ethyl)amino)-2-methyl-8,9-dihydro-7H-cyclopenta[h]quinazoline-6-yl)-3-methylpyrrolidin-3-ol (Compound - 61b) | MS (ES+) m/z = 529.19 (M + 1). $^1$H NMR (400 MHz, DMSO-d$_6$) δ 8.05 (bs, 1H), 7.62-7.50 (m, 1H), 7.32-7.26 (m, 1H), 7.23-7.16 (m, 1H), 7.02 (s, 1H), 5.88-5.81 (m, 1H), 5.33 (s, 1H), 4.79 (s, 1H), 3.74-3.66 (m, 1H), 3.52-3.40 (m, 2H), 3.26-2.90 (m, 4H), 2.28 (s, 3H), 2.16-1.84 (m, 5H), 1.59 (d, J = 7.1 Hz, 3H), 1.40 (s, 3H), 1.24 (s, 3H), 1.21 (s, 3H). Chiral RT: 4.77 min, Chiral Purity: 99.44%, Instrument Method: HEX_0.1% DEA_IPA-MEOH_80_20_A_B_1.2 ML_12 MIN_253 nm Flow Rate: 1.20 ml/min. |
| 62 | 1,1-difluoro-1-(2-fluoro-3-((R)-1-((6-((R)-2-(methoxymethyl)morpholino)-2 methyl-8,9-dihydro-7H-cyclopenta[h]quinazolin-4-yl)amino)ethyl)phenyl)-2-methylpropan-2-ol (Compound - 62) | MS (ES+) m/z = 559.18 (M + 1). $^1$H NMR (400 MHz, DMSO-d$_6$) δ 8.24 (bs, 1H), 7.68-7.54 (m, 2H), 7.38-7.24 (m, 1H), 7.24-7.13 (m, 1H), 5.88-5.75 (m, 1H), 5.34 (s, 1H), 4.03-3.86 (m, 1H), 3.84-3.77 (m, 1H), 3.76-3.69 (m, 1H), 3.52-3.38 (m, 2H), 3.31 (s, 3H), 3.23-3.14 (m, 1H), 3.13-3.06 (m, 2H), 3.03-2.93 (m, 2H), 2.89-2.80 (m, 1H), 2.91-2.79 (m, 1H), 2.72-2.56 (m, 1H), 2.31 (s, 3H), 2.11-1.98 (m, 2H), 1.60 (d, J = 7.1 Hz, 3H), 1.24 (s, 3H), 1.21 (s, 3H). |
| 63 | (R)-1-(4-((1-(3-(1,1-difluoro-2-hydroxy-2-methylpropyl)-2-fluorophenyl)ethyl)amino)-2-methyl-8,9-dihydro-7H-cyclopenta[h]quinazolin-6-yl)-4-(methoxymethyl)piperidin-4-ol (Compound - 63) | MS (ES+) m/z = 573.12 (M + 1). $^1$H NMR (400 MHz, DMSO-d$_6$) δ 8.19 (d, J = 7.5 Hz, 1H), 7.63-7.55 (m, 2H), 7.33-7.26 (m, 1H), 7.23-7.17 (m, 1H), 5.86-5.78 (m, 1H), 5.33 (s, 1H), 4.43 (s, 1H), 3.24 (s, 2H), 3.11-3.03 (m, 5H), 2.98-2.90 (m, 2H), 2.29 (s, 3H), 2.16-1.98 (m, 2H), 1.89-1.67 (m, 2H), 1.67-1.52 (m, 5H), 1.24 (s, 6H), 1.21 (s, 3H). |

| Example | Chemical structure | LCMS and 1H NMR data |
|---|---|---|
| 64 | 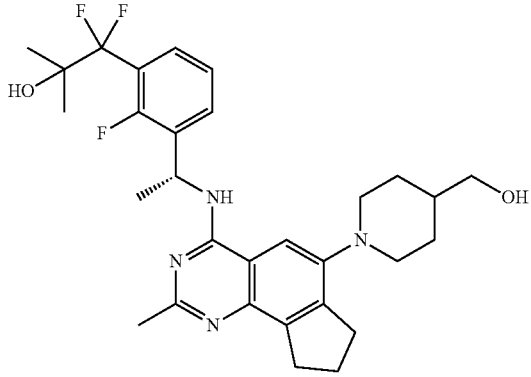 [SMILES: Cc1nc(N[C@H](C)c2cccc(C(F)(F)C(C)(C)O)c2F)c2cc(N3CCC(CO)CC3)c3c(c2n1)CCC3]<br>(R)-1,1-difluoro-1-(2-fluoro-3-(1-((6-(4-(hydroxymethyl)piperidin-1-yl)-2-methyl-8,9-dihydro-7H-cyclopenta[h]quinazolin-4-yl)amino)ethyl)phenyl)-2-methylpropan-2-ol (Compound - 64) | MS (ES+) m/z = 543.2 (M + 1).<br>$^1$H NMR (400 MHz, DMSO-d$_6$) δ 8.14 (d, J = 7.5 Hz, 1H), 7.64-7.55 (m, 2H), 7.33-7.29 (m, 1H), 7.22-7.18 (m, 1H), 5.85-5.78 (m, 1H), 5.33 (s, 1H), 4.56-4.51 (m, 1H), 3.44-3.35 (m, 4H), 3.13-3.03 (m, 2H), 2.99-2.92 (m, 2H), 2.75-2.62 (m, 2H), 2.30 (s, 3H), 2.10-2.01 (m, 2H), 1.88-1.80 (m, 2H), 1.62-1.51 (m, 4H), 1.41-1.28 (m, 2H), 1.24 (s, 3H), 1.21 (s, 3H). |
| 65 | 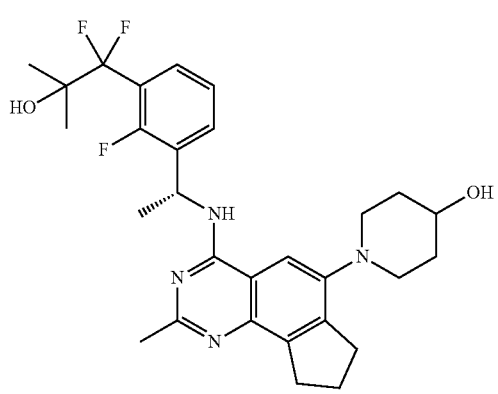 [SMILES: Cc1nc(N[C@H](C)c2cccc(C(F)(F)C(C)(C)O)c2F)c2cc(N3CCC(O)CC3)c3c(c2n1)CCC3]<br>(R)-1-(4-((1-(3-(1,1-difluoro-2-hydroxy-2-methylpropyl)-2-fluorophenyl)ethyl)amino)-2-methyl-8,9-dihydro-7H-cyclopenta[h]quinazolin-6-yl)piperidin-4-ol (Compound - 65) | MS (ES+) m/z = 529.3 (M + 1).<br>$^1$H NMR (400 MHz, DMSO-d$_6$) δ 8.14 (d, J = 7.5 Hz, 1H), 7.61-7.55 (m, 2H), 7.32-7.27 (m, 1H), 7.23-7.17 (m, 1H), 5.86-5.78 (m, 1H), 5.34 (s, 1H), 4.72 (s, 1H), 3.69 (s, 1H), 3.31-3.23 (m, 2H), 3.13-3.03 (m, 2H), 2.95 (t, J = 7.3 Hz, 2H), 2.86-2.74 (m, 2H), 2.30 (s, 3H), 2.11-2.01 (m, 2H), 1.99-1.86 (m, 2H), 1.68-1.54 (m, 5H), 1.24 (s, 3H), 1.21 (s, 3H). |
| 66 | 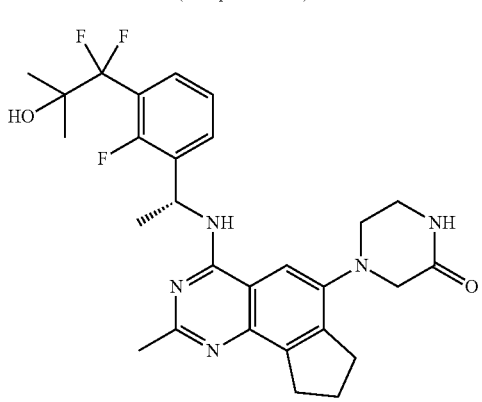<br>(R)-4-(4-((1-(3-(1,1-difluoro-2-hydroxy-2-methylpropyl)-2-fluorophenyl)ethyl)amino)-2-methyl-8,9-dihydro-7H-cyclopenta[h]quinazolin-6-yl)piperazin-2-one (Compound - 66) | MS (ES+) m/z = 528.44 (M + 1).<br>$^1$H NMR (400 MHz, DMSO-d$_6$) δ 8.33-8.18 (m, 1H), 8.04 (s, 1H), 7.68-7.54 (m, 2H), 7.37-7.25 (m, 1H), 7.27-7.16 (m, 1H), 5.89-5.74 (m, 1H), 5.36 (bs, 1H), 3.71 (s, 2H), 3.39-3.34 (m, 2H), 3.26-3.18 (m, 2H), 3.14-3.04 (m, 2H), 3.03-2.95 (m, 2H), 2.31 (s, 3H), 2.15-2.01 (m, 2H), 1.59 (d, J = 7.0 Hz, 3H), 1.24 (s, 3H), 1.21 (s, 3H). |

TABLE IV-continued

| Example | Chemical structure | LCMS and 1H NMR data |
|---|---|---|
| 67a Peak-1 | (R/S)-1-(4-((R)-1-(3-(1,1-difluoro-2-hydroxyethyl)-2-fluorophenyl)ethyl)amino)-2-methyl-8,9-dihydro-7H-cyclopenta[h]quinazoline-6-yl)-3-methylpyrrolidin-3-ol (Compound - 67a) | MS (ES+) m/z = 501.30 (M + 1).<br>$^1$H NMR (400 MHz, DMSO-d$_6$) δ 8.15 (s, 1H), 8.05-7.95 (m, 1H), 7.71-7.58 (m, 1H), 7.42-7.35 (m, 1H), 7.28-7.21 (m, 1H), 7.01 (s, 1H), 5.84-5.79 (m, 1H), 5.73 (s, 1H), 4.80 (s, 1H), 3.99-3.89 (m, 2H), 3.75-3.59 (m, 1H), 3.51-2.91 (m, 6H), 2.29 (s, 3H), 2.14-1.79 (m, 4H), 1.60 (d, J = 7.1 Hz, 3H), 1.39 (s, 3H). Chiral RT: 5.81 min, Chiral Purity: 98.76%, Instrument Method: HEX_0.1% DEA_IPA-MEOH_80_20_A_B_1.2 ML_12 MIN_253 nm Flow Rate: 1.20 ml/min. |
| 67b Peak-2 | (S/R)-1-(4-((R)-1-(3-(1,1-difluoro-2-hydroxyethyl)-2-fluorophenyl)ethyl)amino)-2-methyl-8,9-dihydro-7H-cyclopenta[h]quinazoline-6-yl)-3-methylpyrrolidin-3-ol (Compound - 67b) | MS (ES+) m/z = 501.30 (M + 1).<br>$^1$H NMR (400 MHz, DMSO-d$_6$) δ 8.15 (s, 1H), 8.05-7.95 (m, 1H), 7.71-7.58 (m, 1H), 7.43-7.35 (m, 1H), 7.28-7.20 (m, 1H), 7.01 (s, 1H), 5.88-5.79 (m, 1H), 5.73 (s, 1H), 4.80 (s, 1H), 4.01-3.88 (m, 2H), 3.75-3.59 (m, 1H), 3.51-2.91 (m, 6H), 2.29 (s, 3H), 2.14-1.79 (m, 4H), 1.60 (d, J = 7.1 Hz, 3H), 1.39 (s, 3H). Chiral RT: 7.171 min, Chiral Purity: 98.76%, Instrument Method: HEX_0.1% DEA_IPA-MEOH_80_20_A_B_1.2 ML_12 MIN_253 nm Flow Rate: 1.20 ml/min. |
| 68 | (R)-1-(4-((1-(3-(1,1-difluoro-2-hydroxyethyl)-2-fluorophenyl)ethyl)amino)-2-methyl-8,9-dihydro-7H-cyclopenta[h]quinazolin-6-yl)-4-(methoxymethyl)piperidin-4-ol (Compound - 68) | MS (ES+) m/z = 545.20 (M + 1).<br>$^1$H NMR (400 MHz, DMSO-d$_6$) δ 8.18 (d, J = 7.4 Hz, 1H), 7.66-7.61 (m, 1H), 7.59 (s, 1H), 7.43-7.36 (m, 1H), 7.28-7.21 (m, 1H), 5.87-5.79 (m, 1H), 5.72 (s, 1H), 4.43 (s, 1H), 4.01-3.89 (m, 2H), 3.33 (s, 3H), 3.24 (s, 2H), 3.15-3.00 (m, 6H), 2.94 (t, J = 7.3 Hz, 2H), 2.31 (s, 3H), 2.12-2.01 (m, 2H), 1.85-1.72 (m, 2H), 1.65-154 (m, 5H). |

TABLE IV-continued

| Example | Chemical structure | LCMS and 1H NMR data |
|---|---|---|
| 69 | 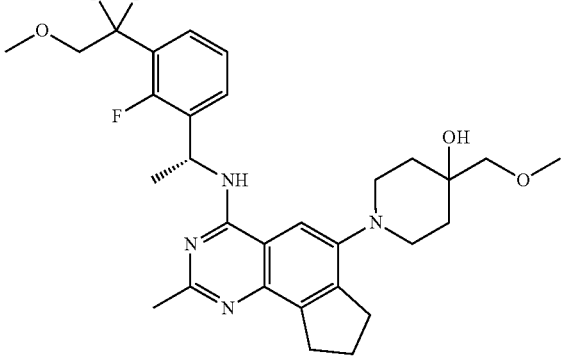<br>(R)-1-(4-((1-(3-(1,1-difluoro-2-methoxyethyl)-2-fluorophenyl)ethyl)amino)-2-methyl-8,9-dihydro-7H-cyclopenta[h]quinazolin-6-yl)-4-(methoxymethyl)piperidin-4-ol (Compound - 69) | MS (ES+) m/z = 559.20 (M + 1).<br>$^1$H NMR (400 MHz, DMSO-d$_6$) δ 8.20 (d, J = 7.4 Hz, 1H), 7.69-7.61 (m, 1H), 7.59 (s, 1H), 7.48-7.38 (m, 1H), 7.29-7.19 (m, 1H), 5.84-5.78 (m, 1H), 4.43 (s, 1H), 4.05-3.93 (m, 2H), 3.44-3.42 (m, 6H), 3.33 (s, 2H), 3.24 (s, 2H), 3.12-3.05 (m, 5H), 2.94 (t, J = 7.3 Hz, 2H), 2.30 (s, 3H), 2.12-2.00 (m, 2H), 1.85-1.71 (m, 2H), 1.62-1.58 (m, 3H). |
| 70 | 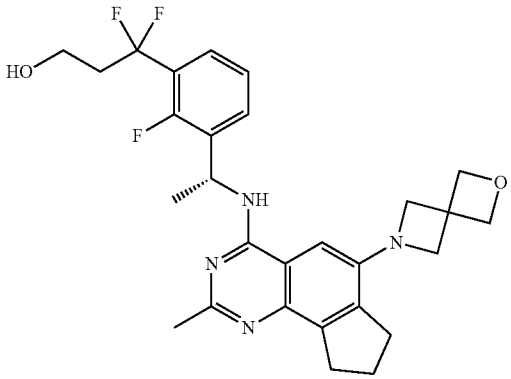 [SMILES: Cc1nc(N[C@H](C)c2cccc(C(F)(F)CCO)c2F)c2cc(N3CC4(COC4)C3)c3c(c2n1)CCC3]<br>(R)-3,3-difluoro-3-(2-fluoro-3-(1-((2-methyl-6-(2-oxa-6-azaspiro[3.3]heptan-6-yl)-8,9-dihydro-7H-cyclopenta[h]quinazolin-4-yl)amino)ethyl)phenyl)propan-1-ol (Compound - 70) | MS (ES+) m/z = 511.56 (M − 1).<br>$^1$H NMR (400 MHz, DMSO-d$_6$) δ 8.01 (d, J = 7.4 Hz, 1H), 7.62-7.58 (m, 1H), 7.39-7.35 (m, 1H), 7.24-7.20 (m, 1H), 7.00 (s, 1H), 5.88-5.70 (m, 1H), 4.79-4.73 (m, 5H), 4.73-4.64 (m, 1H), 4.23-4.08 (m, 4H), 3.56-3.48 (m, 2H), 3.17 (d, J = 5.2 Hz, 1H), 3.08-2.99 (m, 2H), 2.95 (t, J = 7.5 Hz, 2H), 2.28 (s, 3H), 2.15-1.97 (m, 2H), 1.60 (d, J = 7.1 Hz, 3H). |
| 71 | 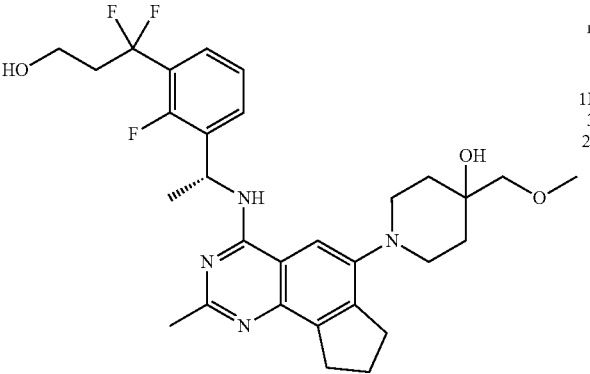<br>(R)-1-(4-(1-(3-(1,1-difluoro-3-hydroxypropyl)-2-fluorophenyl)ethyl)amino)-2-methyl-8,9-dihydro-7H-cyclopenta[h]quinazolin-6-yl)-4-(methoxymethyl)piperidin-4-ol (Compound - 71) | MS (ES+) m/z = 559.20 (M + 1).<br>$^1$H NMR (400 MHz, DMSO-d$_6$) δ 8.19 (d, J = 7.3 Hz, 1H), 7.63-7.57 (m, 2H), 7.42-7.32 (m, 1H), 7.26-7.19 (m, 1H), 5.83-5.74 (m, 1H), 4.68 (t, J = 5.3 Hz, 1H), 4.43 (s, 1H), 3.57-3.48 (m, 2H), 3.24 (s, 2H), 3.16-3.01 (m, 7H), 2.94 (t, J = 7.3 Hz, 2H), 2.30 (s, 4H), 2.11-1.99 (m, 2H), 1.86-1.73 (m, 3H), 1.62-1.55 (m, 6H). |

TABLE IV-continued

| Example | Chemical structure | LCMS and 1H NMR data |
|---|---|---|
| 72a<br>Peak-1 | 1-(4-(((R)-1-(3-((R/S)-1,1-difluoro-2-hydroxypropyl)-2-fluorophenyl)ethyl)amino)-2-methyl-8,9-dihydro-7H-cyclopenta[h]quinazolin-6-yl)-4-(methoxymethyl)piperidin-4-ol<br>(Compound - 72a) | MS (ES+) m/z = 559.20 (M + 1).<br>$^1$H NMR (400 MHz, DMSO-$d_6$) δ 8.18 (d, J = 7.6 Hz, 1H), 7.65-7.57 (m, 2H), 7.39-7.32 (m, 1H), 7.25-7.18 (m, 1H), 5.80-5.89 (m, 1H), 5.62-5.58 (m, 1H), 4.43 (s, 1H), 4.29-4.15 (bs, 1H), 3.24 (s, 2H), 3.14-3.01 (m, 6H), 2.94 (t, J = 7.3 Hz, 2H), 2.32 (s, 3H), 2.05-2.00 (m, 2H), 1.83-1.74 (m, 2H), 1.61-1.55 (m, 4H), 1.37-1.33 (m, 2H), 1.25-1.22 (m, 3H), 1.13-1.09 (m, 2H).<br>Chiral RT-6.21 min, Chiral Purity: 100%, Instrument Method:<br>HEX_0.1% DEA_ETOH_90_10_A_B_1.2 ML 20 MIN_254 nm Flow Rate: 1.20 ml/min |
| 72b<br>Peak-2 | 1-(4-(((R)-1-(3-((S/R)-1,1-difluoro-2-hydroxypropyl)-2-fluorophenyl)ethyl)amino)-2-methyl-8,9-dihydro-7H-cyclopenta[h]quinazolin-6-yl)-4-(methoxymethyl)piperidin-4-ol<br>(Compound - 72b) | MS (ES+) m/z = 559.20 (M + 1).<br>$^1$H NMR (400 MHz, DMSO-$d_6$) δ 8.19 (d, J = 7.4 Hz, 1H), 7.63-7.57 (m, 2H), 7.38-7.31 (m, 1H), 7.24-7.18 (m, 1H), 5.82-5.75 (m, 1H), 5.60 (d, J = 6.2 Hz, 1H), 4.43 (s, 1H), 4.22 (bs, 1H), 3.35-3.44 (m, 2H), 3.24 (s, 2H), 3.13-3.04 (m, 5H), 2.94 (t, J = 7.3 Hz, 2H), 2.29 (s, 3H), 2.12-2.00 (m, 2H), 1.85-1.71 (m, 2H), 1.63-1.57 (m, 4H), 1.38-1.32 (m, 1H), 1.26-1.22 (m, 3H), 1.17-1.12 (m, 2H).<br>Chiral RT-7.23 min, Chiral Purity: 99.91%, Instrument Method:<br>HEX_0.1% DEA_ETOH_90_10_A_B_1.2 ML 20 MIN_254 nm Flow Rate: 1.20 ml/min. |
| 73a<br>Peak-1 | (R/S)-1,1-difluoro-1-(2-fluoro-3-((R)-1-((2-methyl-6-(2-oxa-6-azaspiro[3.3]heptan-6-yl)-8,9-dihydro-7H-cyclopenta[h]quinazolin-4-yl)amino)ethyl)phenyl)propan-2-ol (Compound - 73a) | MS (ES+) m/z = 513.3 (M + 1).<br>$^1$H NMR (400 MHz, DMSO-$d_6$) δ 8.05 (bs, 1H), 7.64-7.58 (m, 1H), 7.39-7.33 (m, 1H), 7.26-7.20 (m, 1H), 7.01 (s, 1H), 5.84-5.76 (m, 1H), 5.57 (d, J = 6.3 Hz, 1H), 4.76 (s, 4H), 4.18-4.14 (m, 4H), 3.09-3.00 (m, 2H), 2.98-2.92 (m, 2H), 2.32 (s, 3H), 2.10-2.02 (m, 2H), 1.59 (d, J = 7.1 Hz, 3H), 1.23-1.26 (m, 1H), 1.18-1.14 (m, 3H).<br>Chiral RT: 5.74 min, Purity: 100%, Instrument Method: HEX_0.1% DEA_IPA-MEOH_80_20_A_B_1.2 ML_12 MIN_253 nm Flow Rate: 1.20 ml/min. |

TABLE IV-continued

| Example | Chemical structure | LCMS and 1H NMR data |
|---|---|---|
| 73b Peak-2 | 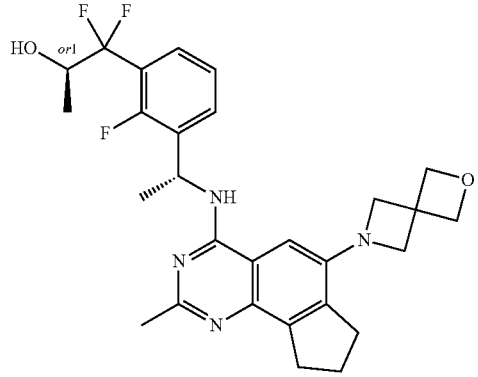 [SMILES: Cc1nc(N[C@H](C)c2cccc(C(F)(F)[C@@H](C)O)c2F)c2cc(N3CC4(COC4)C3)c3c(c2n1)CCC3]<br>(S/R)-1,1-difluoro-1-(2-fluoro-3-((R)-1-((2-methyl-6-(2-oxa-6-azaspiro[3.3]heptan-6-yl)-8,9-dihydro-7H-cyclopenta[h]quinazolin-4-yl)amino)ethyl)phenyl)propan-2-ol (Compound - 73b) | MS (ES+) m/z = 513.3 (M + 1).<br>$^1$H NMR (400 MHz, DMSO-$d_6$) δ 8.10 (bs, 1H), 7.64-7.56 (m, 1H), 7.70-7.32 (m, 1H), 7.25-7.19 (m, 1H), 7.01 (s, 1H), 5.84-5.76 (m, 1H), 5.58 (d, J = 6.3 Hz, 1H), 4.76 (s, 4H), 4.19-4.14 (m, 4H), 3.09-3.00 (m, 2H), 2.98-2.93 (m, 2H), 2.30 (s, 3H), 2.12-2.03 (m, 2H), 1.60 (d, J = 7.1 Hz, 3H), 1.24-1.22 (s, 1H), 1.16-1.12 (m, 3H).<br>Chiral RT: 6.98 min, Chiral Purity: 99.83%, Instrument Method: HEX_0.1% DEA_IPA-MEOH_80_20_A_B_1.2 ML_12 MIN_253 nm Flow Rate: 1.20 ml/min. |

Example-74: 1-((R/S)-1-(4-(((R)-1-(3-amino-5-(trifluoromethyl)phenyl)ethyl)amino)-2-methyl-8,9-dihydro-7H-cyclopenta[h]quinazolin-6-yl)ethyl)azetidine-3-carbonitrile (Compound-74a) and 1-((S/R)-1-(4-(((R)-1-(3-amino-5-(trifluoromethyl)phenyl)ethyl)amino)-2-methyl-8,9-dihydro-7H-cyclopenta[h]quinazolin-6-yl)ethyl)azetidine-3-carbonitrile (Compound-74b)

To a stirred solution of ((R)1-(4-((1-(3-amino-5-(trifluoromethyl)phenyl)ethyl)amino)-2-methyl-8,9-dihydro-7H-cyclopenta[h]quinazolin-6-yl)ethan-1-one) (0.2 g, 0.467 mmol) (Intermediate-36) and azetidine-3-carbonitrile hydrochloride (0.077 g, 0.654 mmol) in MeOH (15 ml) was added acetic acid (0.053 ml, 0.934 mmol) at room temperature and the reaction mixture was stirred for 10 min. Then, NaCNBH$_3$ (0.059 g, 0.934 mmol) was added at room temperature and the reaction mixture was heated to 75° C.

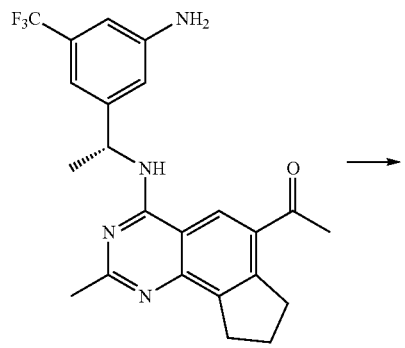

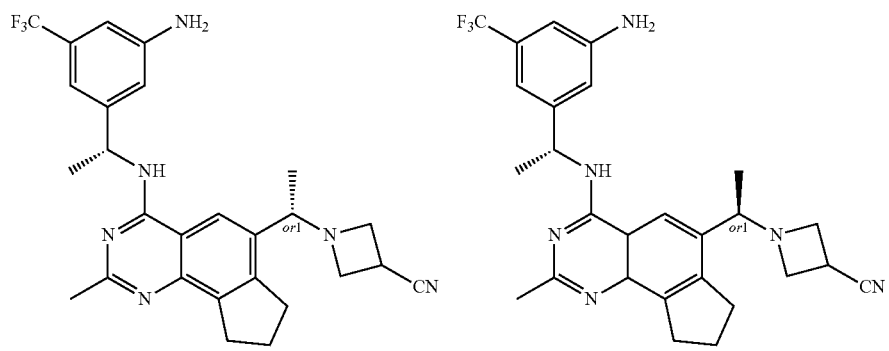

Example-74a      Example-74b for 16 h in a sealed tube. After completion of the reaction, distilled the reaction mass under reduced pressure to get a brown semisolid and then it was poured into water (50 ml) and basified with 10% aq. NaHCO₃ (50 ml). The product was extracted in ethyl acetate (100 ml×3). The combined organic layer was dried over anhydrous Na₂SO₄, filtered and concentrated under reduced pressure to get a crude compound. The crude compound was purified by flash column chromatography by using eluent 0-3% MeOH in DCM followed by purification by Reverse Prep HPLC to afford two diastereomers.

Peak-1: 1-((R/S)-1-(4-(((R)-1-(3-amino-5-(trifluoromethyl)phenyl)ethyl)amino)-2-methyl-8,9-dihydro-7H-cyclopenta[h]quinazolin-6-yl)ethyl)azetidine-3-carbonitrile (Compound-74a)

MS (ES+) m/z=495.24 (M+1), RT: 2.37 min, [GENERIC_BASIC_CT_aghp_4.5minIW, Flow Rate: 0.60 ml/min]

¹H NMR (400 MHz, DMSO-d₆) δ 8.34 (d, J=8.2 Hz, 1H), 8.10 (s, 1H), 6.91 (s, 1H), 6.85 (s, 1H), 6.72-6.69 (m, 1H), 5.62-5.56 (m, 1H), 5.55 (s, 2H), 3.64-3.54 (m, 1H), 3.55-3.34 (m, 3H), 3.26-3.17 (m, 2H), 3.16-3.06 (m, 4H), 2.39 (s, 3H), 2.16-2.04 (m, 2H), 1.56 (d, J=7.1 Hz, 3H), 1.19 (d, J=6.4 Hz, 3H).

Peak-2: 1-((S/R)-1-(4-(((R)-1-(3-amino-5-(trifluoromethyl)phenyl)ethyl)amino)-2-methyl-8,9-dihydro-7H-cyclopenta[h]quinazolin-6-yl)ethyl)azetidine-3-carbonitrile (Compound-74b).

MS (ES+) m/z=495.24 (M+1), RT: 2.40 min, [GENERIC_BASIC_CT_aghp_4.5minIW, Flow Rate: 0.60 ml/min].

¹H NMR (400 MHz, DMSO-d₆) δ 8.34 (d, J=8.2 Hz, 1H), 8.10 (s, 1H), 6.91 (s, 1H), 6.85 (s, 1H), 6.72-6.69 (m, 1H), 5.62-5.56 (m, 1H), 5.55 (s, 2H), 3.64-3.54 (m, 1H), 3.55-3.34 (m, 3H), 3.26-3.17 (m, 2H), 3.16-3.06 (m, 4H), 2.39 (s, 3H), 2.16-2.04 (m, 2H), 1.56 (d, J=7.1 Hz, 3H), 1.19 (d, J=6.4 Hz, 3H).

Example-75: (R)-2,2-difluoro-2-(2-fluoro-3-(1-((2-methyl-6-morpholino-8,9-dihydro-7H-cyclopenta[h]quinazolin-4-yl)amino)ethyl)phenyl)ethan-1-ol (Compound-75)

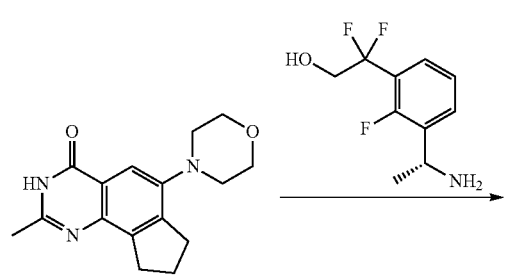

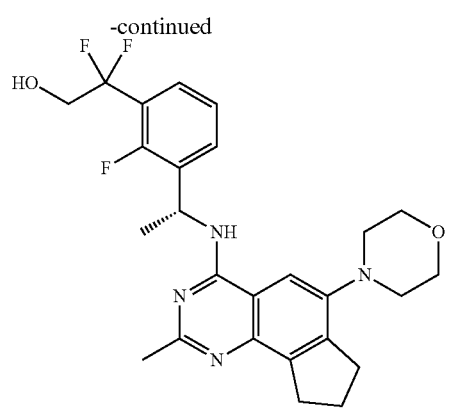

Compound-75

The title compound was synthesized by using 2-methyl-6-morpholino-3,7,8,9-tetrahydro-4H-cyclopenta[h]quinazolin-4-one and Intermediate-8 and following analogous reaction protocol as described in Step-2 of Intermediate-42.

MS (ES+) m/z=487.17 (M+1).

¹H NMR (400 MHz, DMSO-d₆) δ 8.19 (d, J=7.4 Hz, 1H), 7.67-7.60 (m, 1H), 7.57 (s, 1H), 7.45-7.37 (m, 1H), 7.27-7.21 (m, 1H), 5.88-5.80 (m, 1H), 5.76 (s, 1H), 4.00-3.88 (m, 2H), 3.83-3.76 (m, 4H), 3.14-3.02 (m, 6H), 2.97 (t, J=7.3 Hz, 2H), 2.32 (s, 3H), 2.14-2.02 (m, 2H), 1.60 (d, J=7.1 Hz, 3H).

Example-76: (R/S)—N-(1-(3-amino-5-fluorophenyl)ethyl)-2-methyl-6-morpholino-8,9-dihydro-7H-cyclopenta[h]quinazolin-4-amine (Compound-76)

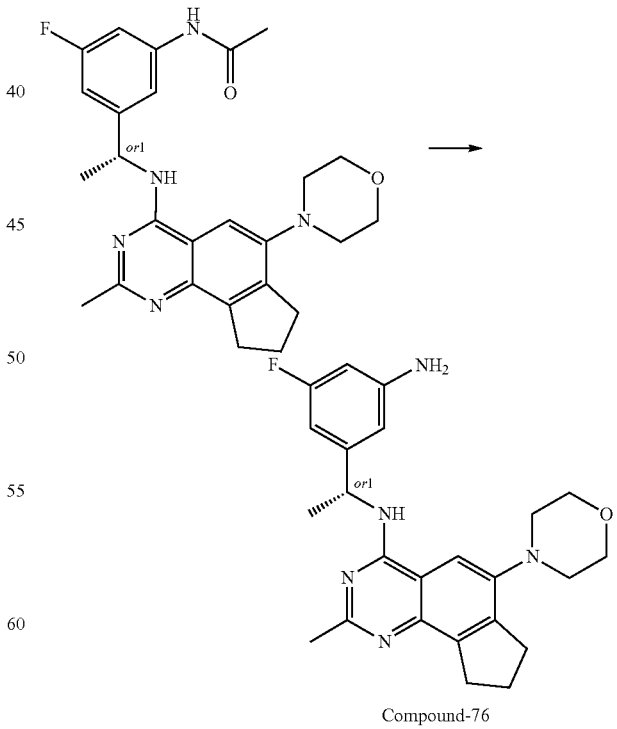

Compound-76

To a stirred solution of (R/S)—N-(3-fluoro-5-(1-((2-methyl-6-morpholino-8,9-dihydro-7H-cyclopenta[h]quinazolin-4-yl)amino)ethyl)phenyl)acetamide (0.2 g, 0.431 mmol) (Intermediate-42) in MeOH (2 ml) was added Con. HCl (0.360 ml, 4.31 mmol) at room temperature. The resulting reaction mixture was heated at 50° C. for 16 h. The consumption of starting material was monitored by TLC and concentrated under vacuo. The residue was neutralized with saturated solution of sodium bicarbonate, product was extracted in ethyl acetate (50 ml), washed it with water (20 ml) and brine (20 ml). The separated organic layer was dried over anhydrous $Na_2SO_4$ and concentrated under vacuo. The crude product (100 mg) was purified by column chromatography using 0 to 5% MeOH in EtOAc as gradient eluent to afford (R/S)—N-(1-(3-amino-5-fluorophenyl)ethyl)-2-methyl-6-morpholino-8,9-dihydro-7H-cyclopenta[h]quinazolin-4-amine (0.095 g, 52.2% yield).

MS (ES+) m/z=422.04 (M+1).

$^1$H NMR (400 MHz, DMSO-$d_6$) δ 8.03 (s, 1H), 7.53 (s, 1H), 6.44-6.42 (m, 1H), 6.36-6.33 (m, 1H), 6.20-6.12 (m, 1H), 5.62-5.52 (m, 1H), 5.36 (s, 2H), 3.80-3.76 (m, 4H), 3.11 (t, J=7.5 Hz, 2H), 3.05-3.00 (m, 4H), 2.97 (t, J=7.3 Hz, 2H), 2.39 (s, 3H), 2.12-2.03 (m, 2H), 1.53 (d, J=7.1 Hz, 3H).

Example-77: (R/S)—N-(1-(3-amino-5-(difluoromethyl)phenyl)ethyl)-2-methyl-6-morpholino-8,9-dihydro-7H-cyclopenta[h]quinazolin-4-amine (Compound-77)

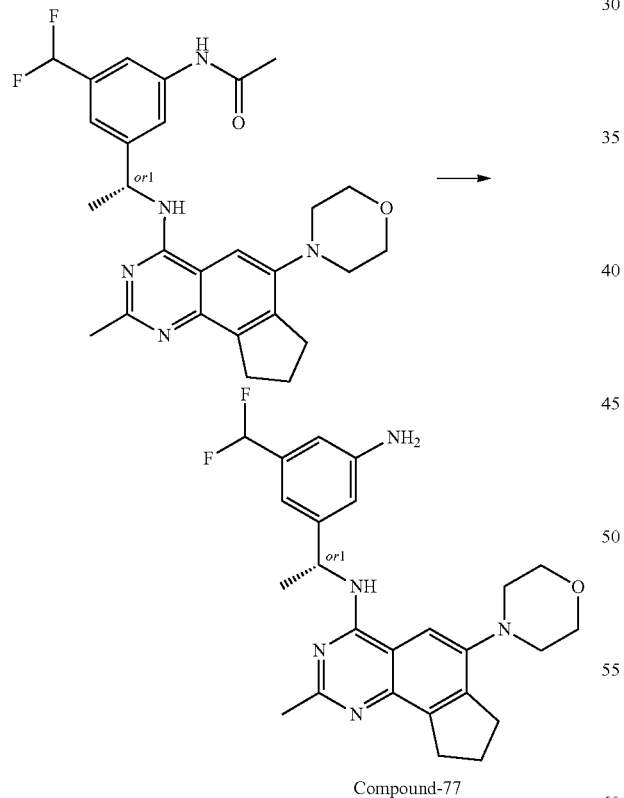

Compound-77

The title compound was synthesized by using Intermediate-43 and following analogous reaction protocol as described in Example-76.

MS (ES+) m/z=454.17 (M+1).

$^1$H NMR (400 MHz, DMSO-$d_6$) δ 8.27 (m, 1H), 7.56 (s, 1H), 6.83 (t, J=56 Hz, 1H), 6.76 (s, 1H), 6.75 (s, 1H), 6.58 (s, 1H), 5.64 (p, J=7.4 Hz, 1H), 5.36 (s, 2H), 3.80-3.77 (m, 4H), 3.11 (t, J=7.5 Hz, 2H), 3.06-3.00 (m, 4H), 2.98 (t, J=7.3 Hz, 2H), 2.41 (s, 3H), 2.14-2.05 (m, 2H), 1.59 (d, J=7.1 Hz, 3H).

Example-78: (R/S)—N-(1-(3-amino-5-(difluoromethyl)phenyl)ethyl)-2-methyl-6-(2-oxa-6-azaspiro[3.3]heptan-6-yl)-8,9-dihydro-7H-cyclopenta[h]quinazolin-4-amine (Compound-78)

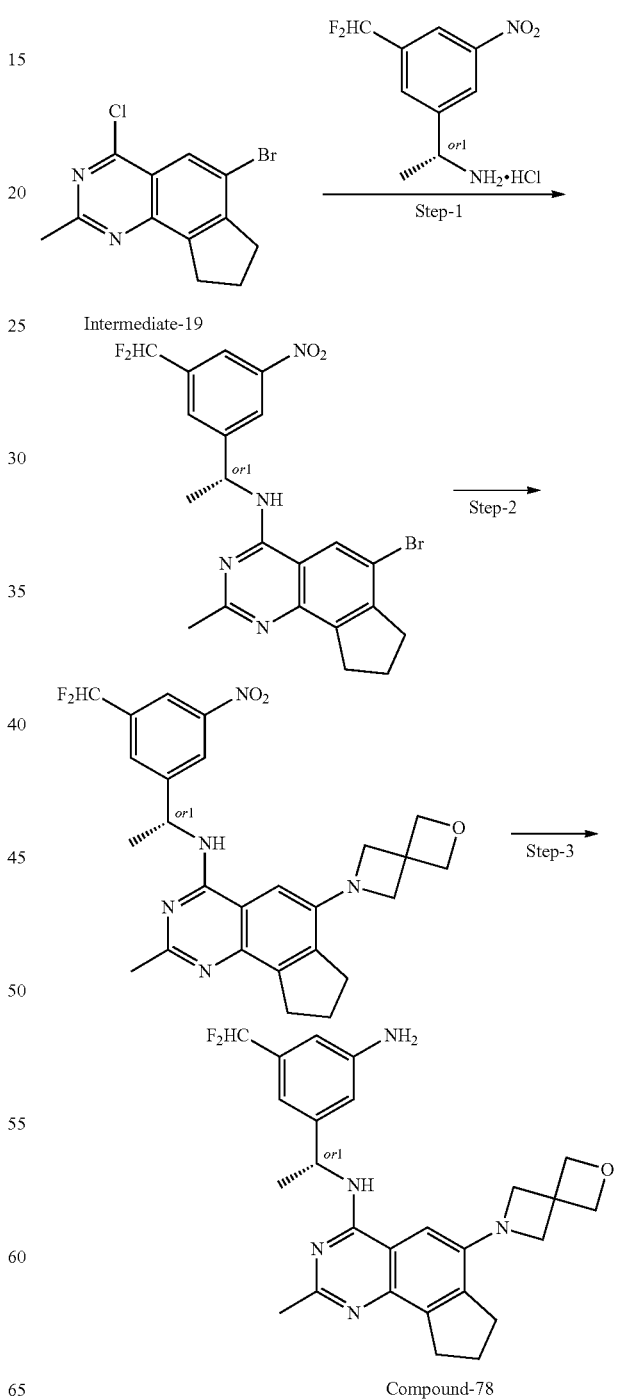

Intermediate-19

Compound-78

Step-1: (R/S)-6-bromo-N-(1-(3-(difluoromethyl)-5-nitrophenyl)ethyl)-2-methyl-8,9-dihydro-7H-cyclopenta[h]quinazolin-4-amine The title compound was synthesized by using Intermediate-19 and step-6 product of Intermediate 12 and following analogous reaction protocol as described synthesis of Intermediate-21.

MS (ES+) m/z=479.11 (M+2).

¹H NMR (400 MHz, DMSO-d₆) δ 8.53 (d, J=7.3 Hz, 1H), 8.51-8.47 (m, 2H), 8.29-8.25 (m, 1H), 8.15-8.12 (m, 1H), 7.22 (t, J=55.3 Hz, 1H), 5.71-5.59 (m, 1H), 3.28-3.16 (m, 2H), 3.09-2.99 (m, 2H), 2.37 (s, 3H), 2.20-2.05 (m, 2H), 1.65 (d, J=7.1 Hz, 3H).

Step-2: (R/S)—N-(1-(3-(difluoromethyl)-5-nitrophenyl)ethyl)-2-methyl-6-(2-oxa-6-azaspiro[3.3]heptan-6-yl)-8,9-dihydro-7H-cyclopenta[h]quinazolin-4-amine The title compound was synthesized by using (R/S)-6-bromo-N-(1-(3-(difluoromethyl)-5-nitrophenyl)ethyl)-2-methyl-8,9-dihydro-7H-cyclopenta[h]quinazolin-4-amine and following analogous reaction protocol as described synthesis of Example-1.

MS (ES+) m/z=496.24 (M+1).

¹H NMR (400 MHz, DMSO-d₆) δ 8.52-8.45 (m, 1H), 8.31-8.24 (m, 1H), 8.15-8.12 (m, 1H), 8.11 (d, J=7.6 Hz, 1H), 7.40-7.04 (m, 1H), 6.96-6.90 (m, 1H), 5.73-5.59 (m, 1H), 4.76 (s, 4H), 4.16 (s, 4H), 3.10-2.99 (m, 2H), 2.98-2.88 (m, 2H), 2.31 (s, 3H), 2.13-2.01 (m, 2H), 1.67 (d, J=7.1 Hz, 3H).

Step-3: (R/S)—N-(1-(3-amino-5-(difluoromethyl)phenyl)ethyl)-2-methyl-6-(2-oxa-6-azaspiro[3.3]heptan-6-yl)-8,9-dihydro-7H-cyclopenta[h]quinazolin-4-amine The title compound was synthesized by using (R/S)—N-(1-(3-(difluoromethyl)-5-nitrophenyl)ethyl)-2-methyl-6-(2-oxa-6-azaspiro[3.3]heptan-6-yl)-8,9-dihydro-7H-cyclopenta[h]quinazolin-4-amine and following analogous reaction protocol as described in Step-7 of Intermediate-12.

MS (ES+) m/z=466.23 (M+1).

¹H NMR (400 MHz, DMSO-d₆) δ 7.90 (d, J=8.2 Hz, 1H), 6.98 (s, 1H), 6.82 (t, J=54 Hz, 1H), 6.77-6.75 (m, 1H), 6.74-6.73 (m, 1H), 6.58-6.56 (m, 1H), 5.63-5.53 (m, 1H), 5.34 (s, 2H), 4.75 (s, 4H), 4.13 (s, 4H), 3.05 (t, J=7.7 Hz, 2H), 2.94 (t, J=7.6 Hz, 2H), 2.35 (s, 3H), 2.13-2.02 (m, 2H), 1.54 (d, J=7.0 Hz, 3H).

The examples disclosed in Table-V were synthesized by using 2-methyl-6-morpholino-3,7,8,9-tetrahydro-4H-cyclopenta[h]quinazolin-4-one and appropriate amine and following analogues reaction protocol as described in Step-2 of Intermediate-42.

TABLE V

| Examples | Chemical Structure | LCMS (m/z) and NMR data |
|---|---|---|
| 79 | 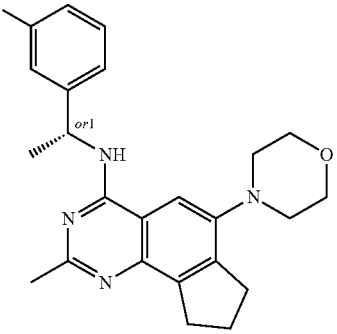<br>(R/S)-3-(1-((2-methyl-6-morpholino-8,9-dihydro-7H-cyclopenta[h]quinazolin-4-yl)amino)ethyl)benzonitrile<br>(Compound - 79) | MS (ES+) m/z = 414.16 (M + 1).<br>¹H NMR (400 MHz, DMSO-d₆) δ 8.14 (d, J = 7.8 Hz, 1H), 7.91-7.87 (m, 1H), 7.81-7.76 (m, 1H), 7.70-7.68 (m, 1H), 7.58-7.50 (m, 2H), 5.66-5.61 (m, 1H), 3.81-3.78 (m, 4H), 3.10 (t, J = 7.4 Hz, 2H), 3.07-3.01 (m, 4H), 2.97 (t, J = 7.3 Hz, 2H), 2.35 (s, 3H), 2.09-2.05 (m, 2H), 1.61 (d, J = 7.1 Hz, 3H). |
| 80 | 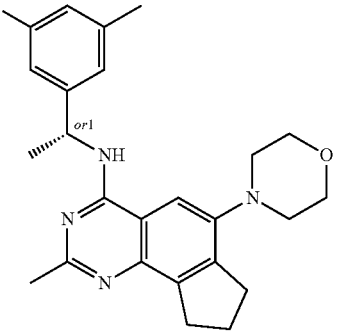<br>(R/S)-N-(1-(3-amino-5-methylphenyl)ethyl)-2-methyl-6-morpholino-8,9-dihydro-7H-cyclopenta[h]quinazolin-4-amine<br>(Compound - 80) | MS (ES+) m/z = 418.5 (M + 1).<br>¹H NMR (400 MHz, DMSO-d₆) δ 8.05 (bs, 1H), 7.54 (s, 1H), 6.48-6.38 (m, 2H), 6.32-6.17 (m, 1H), 5.67-5.50 (m, 1H), 4.91 (s, 2H), 3.81-3.76 (m, 4H), 3.10 (t, J = 7.4 Hz, 2H), 3.06-3.00 (m, 4H), 2.97 (t, J = 7.3 Hz, 2H), 2.39 (s, 3H), 2.13 (s, 3H), 2.11-2.00 (m, 2H), 1.52 (d, J = 7.1 Hz, 3H). |

TABLE V-continued

| Examples | Chemical Structure | LCMS (m/z) and NMR data |
|---|---|---|
| 81 | 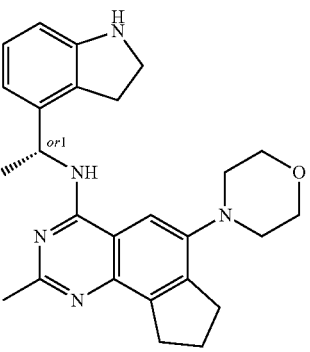 [SMILES: Cc1nc(N[C@H](C)c2cccc3c2CCN3)c2cc(N3CCOCC3)c3c(c2n1)CCC3](R/S)-N-(1-(indolin-4-yl)ethyl)-2-methyl-6-morpholino-8,9-dihydro-7H-cyclopenta[h]quinazolin-4-amine (Compound - 81) | MS (ES+) m/z = 430.17 (M + 1). $^1$H NMR (400 MHz, DMSO-$d_6$) δ 8.09-8.02 (m, 1H), 7.53 (s, 1H), 6.90-6.85 (m, 1H), 6.71-6.67 (m, 1H), 6.38-6.32 (m, 1H), 5.61-5.52 (m, 1H), 5.43 (bs, 1H), 3.86-3.67 (m, 4H), 3.45-3.36 (m, 2H), 3.14-3.05 (m, 2H), 3.51-3.00 (m, 4H), 2.99-2.92 (m, 2H), 2.54 (s, 2H), 2.38 (s, 3H), 2.12-2.00 (m, 2H), 1.53 (d, J = 7.1 Hz, 3H). |

Example-82: (R/S)-3,3-difluoro-3-(2-fluoro-3-((R/S)-1-((2-methyl-6-morpholino-8,9-dihydro-7H-cyclopenta[h]quinazolin-4-yl)amino)ethyl)phenyl)-2-methylpropane-1,2-diol (Compound-82a) and (S1R)-3,3-difluoro-3-(2-fluoro-3-((S/R)-1-((2-methyl-6-morpholino-8,9-dihydro-7H-cyclopenta[h]quinazolin-4-yl)amino)ethyl)phenyl)-2-methylpropane-1,2-diol (Compound-82b)

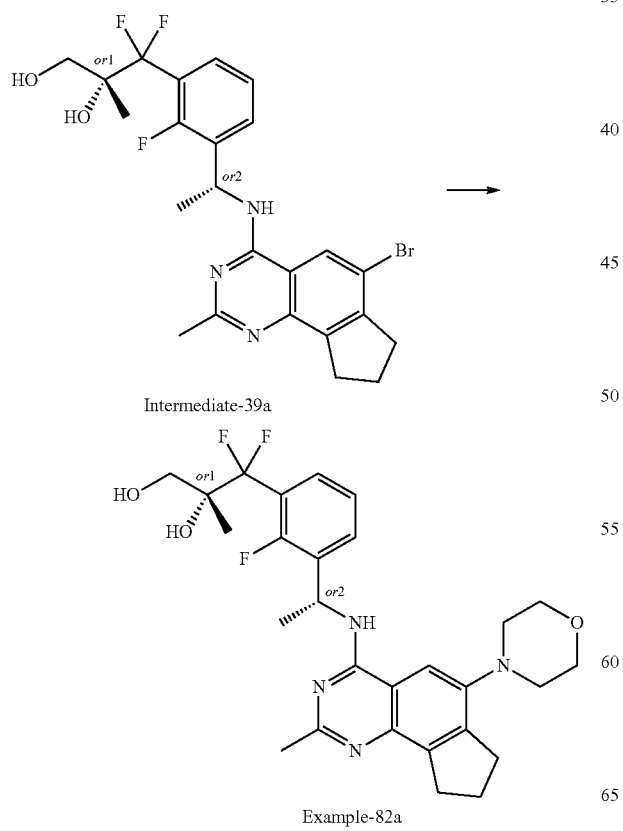

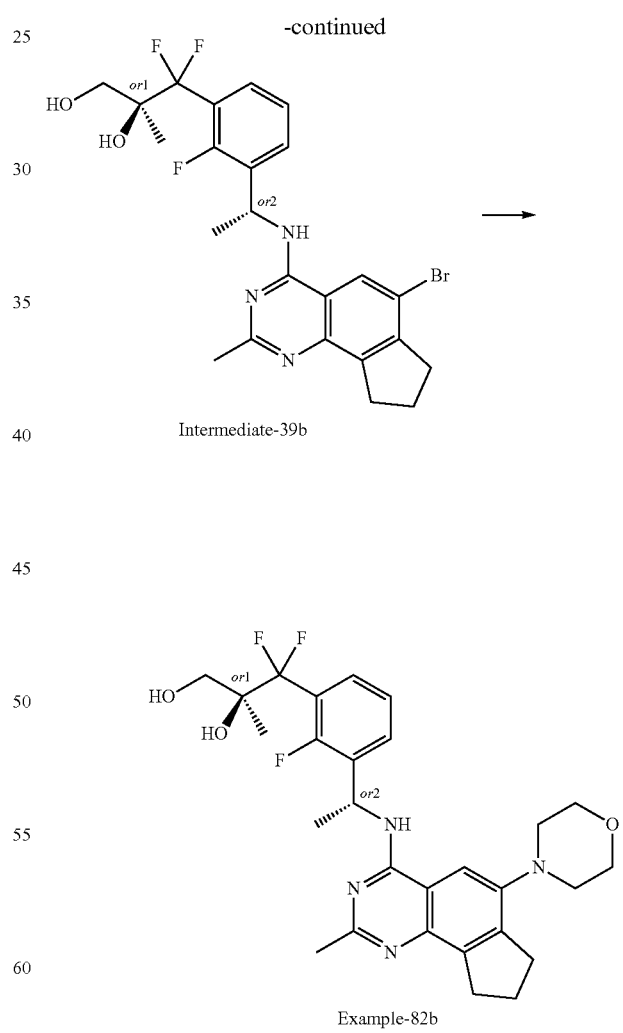

The title compounds were prepared by using Morpholine and Intermediate-39a and 39b respectively following analogues reaction condition as mentioned in example 1.

(R/S)-3,3-difluoro-3-(2-fluoro-3-((R/S)-1-((2-methyl-6-morpholino-8,9-dihydro-7H-cyclopenta[h]quinazolin-4-yl)amino)ethyl)phenyl)-2-methylpropane-1,2-diol (Compound-82a)

MS m/z=531.44 (M+1).
¹H NMR (400 MHz, DMSO-d₆) δ 8.19 (bs, 1H), 7.65-7.55 (m, 2H), 7.34-7.25 (m, 1H), 7.23-7.16 (m, 1H), 5.89-5.78 (m, 1H), 5.23 (s, 1H), 4.69 (t, J=6.1 Hz, 1H), 3.83-3.77 (m, 4H), 3.52-3.43 (m, 2H), 3.14-3.07 (m, 2H), 3.08-3.01 (m, 4H), 3.00-2.94 (m, 2H), 2.32 (s, 3H), 2.12-2.01 (m, 2H), 1.59 (d, J=7.1 Hz, 3H), 1.20 (s, 3H).

(S/R)-3,3-difluoro-3-(2-fluoro-3-((S/R)-1-((2-methyl-6-morpholino-8,9-dihydro-7H-cyclopenta[h]quinazolin-4-yl)amino)ethyl)phenyl)-2-methylpropane-1,2-diol (Compound-82b)

MS m/z=531.43 (M+1).
¹H NMR (400 MHz, DMSO-d₆) δ 8.19 (bs, 1H), 7.65-7.55 (m, 2H), 7.34-7.25 (m, 1H), 7.23-7.16 (m, 1H), 5.89-5.78 (m, 1H), 5.23 (s, 1H), 4.69 (t, J=6.1 Hz, 1H), 3.83-3.77 (m, 4H), 3.52-3.43 (m, 1H), 3.41-3.36 (m, 1H), 3.14-3.07 (m, 2H), 3.08-3.01 (m, 4H), 3.00-2.94 (m, 2H), 2.32 (s, 3H), 2.12-2.01 (m, 2H), 1.59 (d, J=7.1 Hz, 3H), 1.22 (s, 3H).

Example-83: (R)-4-(4-((1-(3-amino-5-(trifluoromethyl)phenyl)ethyl)amino)-2-methyl-8,9-dihydro-7H-cyclopenta[h]quinazolin-6-yl)morpholin-3-one (Compound-83)

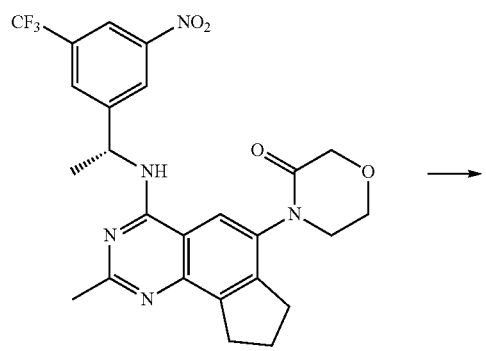

→

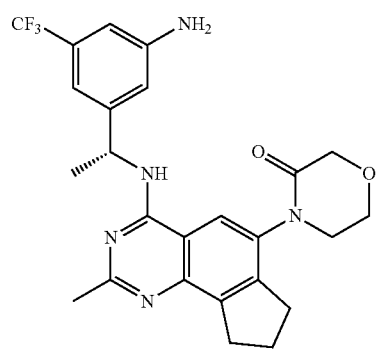

Compound-83

The title compound was synthesized by using Intermediate-25 and following analogous reaction protocol as described in Step-7 of Intermediate-12.

MS (ES+) m/z=486.2 (M+1).
¹H NMR (400 MHz, DMSO-d₆) δ 8.21-8.17 (m, 2H), 6.90-6.87 (m, 1H), 6.86-6.83 (m, 1H), 6.72-6.69 (m, 1H), 5.60-5.50 (m, 3H), 4.25 (s, 2H), 4.09-3.96 (m, 3H), 3.80-3.65 (m, 1H), 3.21-3.13 (m, 2H), 2.91-2.86 (m, 2H), 2.42 (s, 3H), 2.18-2.06 (m, 2H), 1.54 (d, J=7.0 Hz, 3H).

Example-84: (R)-1-(4-((1-(3-amino-5-(trifluoromethyl)phenyl)ethyl)amino)-2-methyl-8,9-dihydro-7H-cyclopenta[h]quinazolin-6-yl)-4-(hydroxymethyl)piperidin-4-ol (Compound-84)

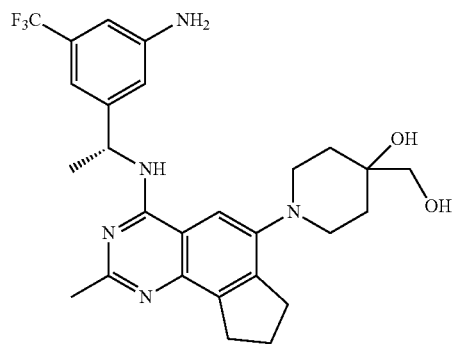 [SMILES: Cc1nc(N[C@H](C)c2cc(N)cc(C(F)(F)F)c2)c2cc(N3CCC(O)(CO)CC3)c3c(c2n1)CCC3]

To a solution of ((R)-1-(4-((1-(3-amino-5-(trifluoromethyl)phenyl)ethyl)amino)-2-methyl-8,9-dihydro-7H-cyclopenta[h]quinazolin-6-yl)-4-(methoxymethyl)piperidin-4-ol) (100 mg, 0.189 mmol) in dichloromethene (5 ml) cooled with ice-water bath was slowly added 1M boron tribromide (0.283 ml, 0.283 mmol) solution in dichloromethene, and the mixture was stirred at room temperature for 1 hr. The reaction mixture was quenched with ice water and extracted with dichloromethene (50 ml×2). The separated organic layer was dried over Na₂SO₄, filtered and concentrated under vacuo to get crude (72 mg). This crude residue was purified by preparative HPLC purification to afford (R)-1-(4-((1-(3-amino-5-(trifluoromethyl)phenyl)ethyl)amino)-2-methyl-8,9-dihydro-7H-cyclopenta[h]quinazolin-6-yl)-4-(hydroxymethyl)piperidin-4-ol (27 mg, 27.7% yield) as a white solid.

MS m/z=515.57 (M+).
¹H NMR (400 MHz, DMSO-d₆) δ 8.10 (d, J=8.0 Hz, 1H), 7.56 (s, 1H), 6.92-6.83 (m, 2H), 6.69 (s, 1H), 5.62-5.55 (m, 1H), 5.53 (s, 2H), 4.66-4.57 (m, 1H), 4.16 (s, 1H), 3.28 (s, 2H), 3.14-2.98 (m, 6H), 2.97-2.91 (m, 2H), 2.37 (s, 3H), 2.12-2.02 (m, 2H), 1.83-1.72 (m, 2H), 1.60-1.48 (m, 5H).

Following compounds were made by using above mentioned procedure given in Example-63 and Example-35 respectively.

| | | |
|---|---|---|
| 85 | 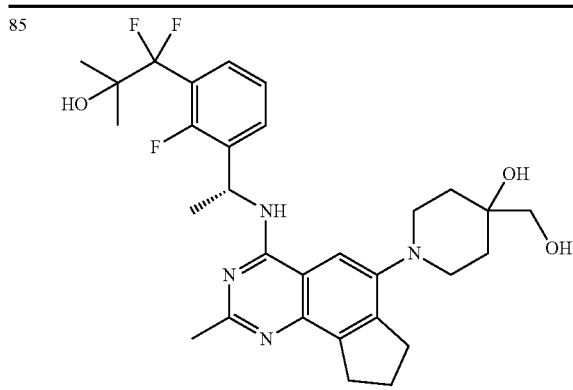

(R)-1-(4-((1-(3-(1,1-difluoro-2-hydroxy-2-methylpropyl)-2-fluorophenyl)ethyl)amino)-2-methyl-8,9-dihydro-7H-cyclopenta[h]quinazolin-6-yl)-4-(hydroxymethyl)piperidin-4-ol
(Compound - 85) | MS (ES+) m/z = 559.3 (M + 1).
$^1$H NMR (400 MHz, DMSO-d$_6$) δ 8.28-8.13 (m, 1H), 7.70-7.52 (m, 2H), 7.38-7.15 (m, 2H), 5.91-5.78 (m, 1H), 5.33 (s, 1H), 4.72-4.55 (m, 1H), 4.22-4.09 (m, 1H), 3.56-3.40 (m, 2H), 3.16-3.02 (m, 5H), 2.99-2.88 (m, 2H), 2.75-2.65 (m, 2H), 2.30 (s, 3H), 2.14-1.99 (m, 2H), 1.85-1.70 (m, 2H), 1.66-1.48 (m, 4H), 1.24 (s, 3H), 1.21 (s, 3H). |
| 86 | 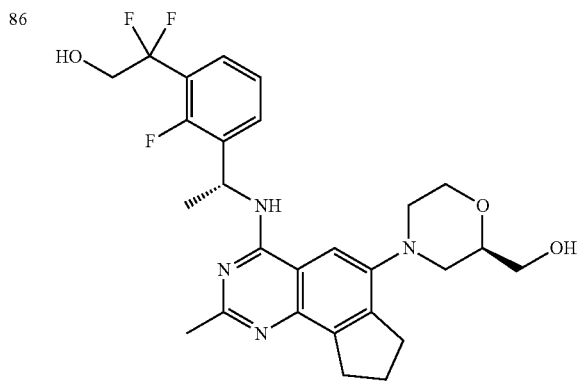

2,2-difluoro-2-(2-fluoro-3-((R)-1-((6-((R)-2-(hydroxymethyl)morpholino)-2-methyl-8,9-dihydro-7H-cyclopenta[h]quinazolin-4-yl)amino)ethyl)phenyl)ethan-1-ol
(Compound - 86) | MS (ES+) m/z = 516.82 (M+).
$^1$H NMR (400 MHz, DMSO-d$_6$) δ 8.20 (d, J = 7.4 Hz, 1H), 7.68-7.61 (m, 1H), 7.57 (s, 1H), 7.43-7.38 (m, 1H), 7.29-7.21 (m, 1H), 5.86-5.81 (m, 1H), 5.78-5.71 (m, 1H), 4.79 (t, J = 5.7 Hz, 1H), 4.05-3.87 (m, 3H), 3.81-3.60 (m, 2H), 3.60-3.41 (m, 2H), 3.25-3.14 (m, 1H), 3.13-3.05 (m, 1H), 2.98 (t, J = 7.3 Hz, 2H), 2.90-2.81 (m, 1H), 2.67 (s, 1H), 2.37-2.30 (m, 3H), 2.13-2.03 (m, 2H), 1.61 (d, J = 7.1 Hz, 3H). |

Example-87: (R)-5-(4-((1-(3-amino-5-(trifluoromethyl)phenyl) ethyl)amino)-2-methyl-8,9-dihydro-7H-cyclopenta[h]quinazolin-6-yl)-1-methylpyridin-2(1H)-one (Compound-87)

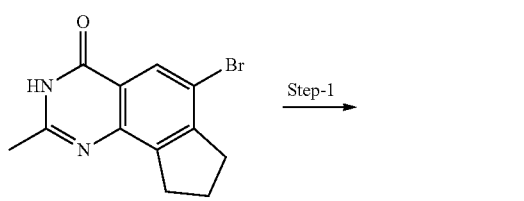

Step-1

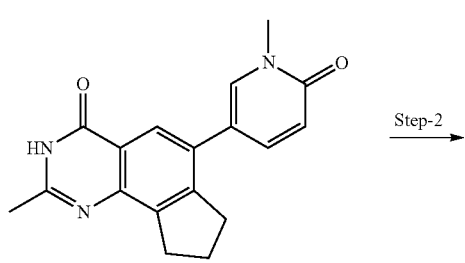

Step-2

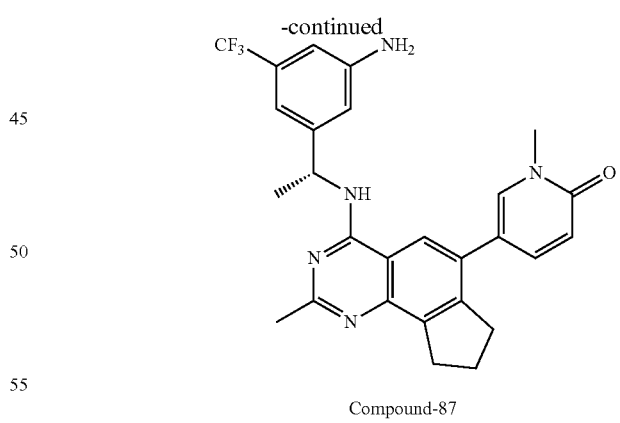

Compound-87

Step-1: 2-methyl-6-(1-methyl-6-oxo-1,6-dihydropyridin-3-yl)-3,7,8,9-tetrahydro-4Hcyclopenta[h]quinazolin-4-one To a stirred solution of 6-bromo-2-methyl-3,7,8,9-tetrahydro-4H-cyclopenta[h]quinazolin-4-one (1.0 g, 3.58 mmol) (Intermediate-18) in 1,4-Dioxane (10 ml) and Water (2 ml) were added 1-methyl-5-(4,4,5,5-tetramethyl-1,3,2-dioxaborolan-2-yl)pyridin-2(1H)-one (1.263 g, 5.37 mmol)

(commercially available), cesium carbonate (3.50 g, 10.75 mmol) and PdCl$_2$(dppf). DCM adduct (0.146 g, 0.179 mmol) at room temperature. The resulting reaction mixture was purged with nitrogen for 15 min and heated at 80° C. for 3 h in a sealed vial. After completion of reaction, reaction mixture was evaporated to get crude (1.9 g) which was purified by flash column chromatography by using gradient elution of 0-1% MeOH in DCM to afford 2-methyl-6-(1-methyl-6-oxo-1,6-dihydropyridin-3-yl)-3,7,8,9-tetrahydro-4Hcyclopenta[h]quinazolin-4-one (0.780 g, 70.8% yield) as light yellow solid.

MS (ES+) m/z=308.09 (M+1).

$^1$H NMR (400 MHz, DMSO-d$_6$) δ 12.12 (s, 1H), 7.94 (d, J=2.7 Hz, 1H), 7.84 (s, 1H), 7.70-7.63 (m, 1H), 6.50-6.44 (m, 1H), 3.51 (s, 3H), 3.14 (t, J=7.5 Hz, 2H), 3.06 (t, J=7.4 Hz, 2H), 2.37 (s, 3H), 2.16-2.02 (m, 2H).

Step-2: (R)-5-(4-((1-(3-amino-5-(trifluoromethyl)phenyl)ethyl)amino)-2-methyl-8,9-dihydro-7H-cyclopenta[h]quinazolin-6-yl)-1-methylpyridin-2(1H)-one To a solution of 2-methyl-6-(1-methyl-6-oxo-1,6-dihydropyridin-3-yl)-3,7,8,9-tetrahydro-4H-cyclopenta[h]quinazolin-4-one (150 mg, 0.488 mmol) and (R)-3-(1-aminoethyl)-5-(trifluoromethyl)aniline (149 mg, 0.732 mmol) (Intermediate-10) in ACN (15 ml) was added benzotriazol-1-yloxytris(dimethylamino)-phosphonium hexafluorophosphate (324 mg, 0.732 mmol) and DBU (0.368 ml, 2.440 mmol) at 0° C. and allowed to stirred 100° C. for 16 h. After completion of reaction, reaction mixture was concentrated and purified by flash column chromatography by using gradient elution of 0-5% MeOH in DCM to afford (R)-5-(4-((1-(3-amino-5-(trifluoromethyl)phenyl)ethyl)amino)-2-methyl-8,9-dihydro-7H-cyclopenta[h]quinazolin-6-yl)-1-methylpyridin-2(1H)-one (10 mg, 4.15% yield).

MS (ES+) m/z=494.17 (M+1).

$^1$H NMR (400 MHz, DMSO-d$_6$) δ 8.26 (d, J=8.0 Hz, 1H), 8.16 (s, 1H), 7.94-7.90 (m, 1H), 7.74-7.69 (m, 1H), 6.91-6.88 (m, 1H), 6.87-6.84 (m, 1H), 6.71-6.68 (m, 1H), 6.55-6.50 (m, 1H), 5.64-5.48 (m, 3H), 3.54 (s, 3H), 3.20-3.13 (m, 2H), 3.12-3.01 (m, 2H), 2.42 (s, 3H), 2.18-2.03 (m, 2H), 1.55 (d, J=7.0 Hz, 3H).

The example disclosed in Table-VI was prepared using the similar procedure described in Example-87 using 2-methyl-6-(1-methyl-6-oxo-1,6-dihydropyridin-3-yl)-3,7,8,9-tetrahydro-4Hcyclopenta[h]quinazolin-4-one and appropriate amine.

TABLE VI

| Example Nos | Chemical Structure | LCMS and $^1$H NMR data |
|---|---|---|
| 88 | (R)-5-(4-((1-(3-(1,1-difluoro-2-hydroxyethyl)-2-fluorophenyl)ethyl)amino)-2-methyl-8,9-dihydro-7H-cyclopenta[h]quinazolin-6-yl)-1-methylpyridin-2(1H)-one (Compound - 88) | MS (ES+) m/z = 509.30 (M + 1). $^1$H NMR (400 MHz, DMSO-d$_6$) δ 8.38 (s, 1H), 8.20 (s, 1H), 7.99-7.95 (m, 1H), 7.76-7.70 (m, 1H), 7.68-7.62 (m, 1H), 7.45-7.36 (m, 1H), 7.28-7.18 (m, 1H), 6.54 (d, J = 9.3 Hz, 1H), 5.89-5.81 (m, 1H), 5.76-5.70 (m, 1H), 4.06-3.86 (m, 2H), 3.55 (s, 3H), 3.24-2.96 (m, 4H), 2.37 (s, 3H), 2.15-2.05 (m, 2H), 1.60 (d, J = 7.1 Hz, 3H). |
| 89 | (R/S)-1-methyl-5-(2-methyl-4-((1-(3-(trifluoromethyl)phenyl)ethyl)amino)-8,9-dihydro-7H-cyclopenta[h]quinazolin-6-yl)pyridin-2(1H)-one (Compound - 89) | MS (ES+) m/z = 479.17 (M + 1). $^1$H NMR (400 MHz, DMSO-d$_6$) δ 8.36 (d, J = 7.8 Hz, 1H), 8.14 (s, 1H), 7.94 (d, J = 2.6 Hz, 1H), 7.84-7.81 (m, 1H), 7.77-7.74 (m, 1H), 7.73-7.70 (m, 1H), 7.61-7.53 (m, 2H), 6.53 (d, J = 9.3 Hz, 1H), 5.70-5.64 (m, 1H), 3.54 (s, 3H), 3.20-3.12 (m, 2H), 3.10-3.01 (m, 2H), 2.39 (s, 3H), 2.13-2.08 (m, 2H), 1.62 (d, J = 7.1 Hz, 3H). |

Example-90: (R)-1-(4-(4-((1-(3-amino-5-(trifluoromethyl)phenyl)ethyl)amino)-2-methyl-8,9-dihydro-7H-cyclopenta[h]quinazolin-6-yl)-3,6-dihydropyridin-1(2H)-yl)ethan-1-one (Compound-90)

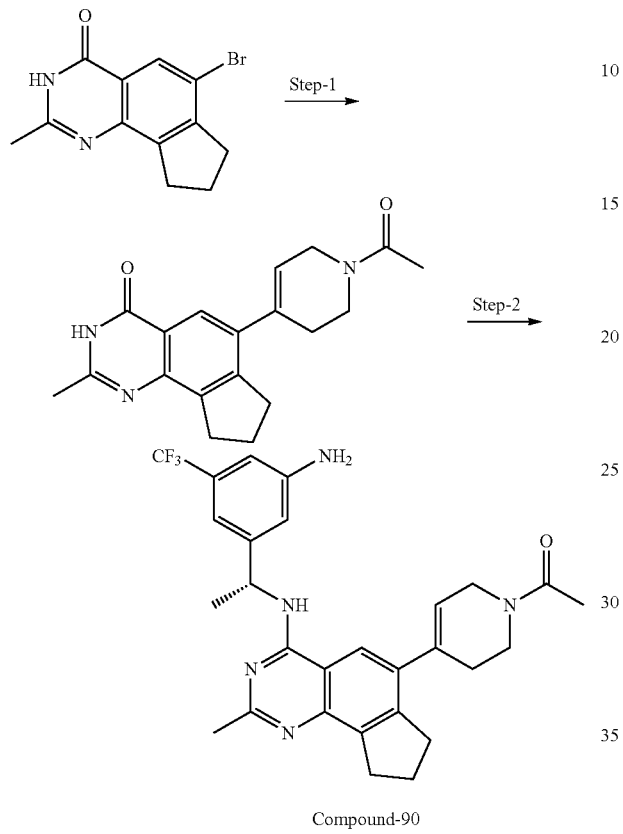

Compound-90

Step-1: 6-(1-acetyl-1,2,3,6-tetrahydropyridin-4-yl)-2-methyl-3,7,8,9-tetrahydro-4H-cyclopenta[h]quinazolin-4-one The title compound was synthesized by using Intermediate-18 and (1-acetyl-1,2,3,6-tetrahydropyridin-4-yl)boronic acid following analogous reaction protocol as described in step-1 of Example-87.

MS (ES+) m/z=324.15 (M+1).

Step-2: (R)-1-(4-(4-((1-(3-amino-5-(trifluoromethyl)phenyl)ethyl)amino)-2-methyl-8,9-dihydro-7H-cyclopenta[h]quinazolin-6-yl)-3,6-dihydropyridin-1(2H)-yl)ethan-1-one The title compound was synthesized by using 6-(1-acetyl-1,2,3,6-tetrahydropyridin-4-yl)-2-methyl-3,7,8,9-tetrahydro-4H-cyclopenta[h]quinazolin-4-one and Intermediate-10 and following analogous reaction protocol as described in step-2 of Example-87.

MS (ES+) m/z=510.5 (M+1).

$^1$H NMR (400 MHz, DMSO-d$_6$) δ 8.24 (d, J=8.0 Hz, 1H), 8.06-8.01 (m, 1H), 6.90-6.88 (m, 1H), 6.86-6.83 (m, 1H), 6.71-6.68 (m, 1H), 5.91-6.84 (m, 1H), 5.61-5.50 (m, 3H), 4.21-4.08 (m, 2H), 3.76-3.61 (m, 2H), 3.17-2.96 (m, 4H), 2.40 (s, 3H), 2.13-2.03 (m, 5H), 1.55 (d, J=7.1 Hz, 3H).

Example-91: (R)—N-(1-(3-amino-5-(trifluoromethyl)phenyl)ethyl)-2-methyl-6-(1-methyl-1,2,3,6-tetrahydropyridin-4-yl)-8,9-dihydro-7H-cyclopenta[h]quinazolin-4-amine (Compound-91)

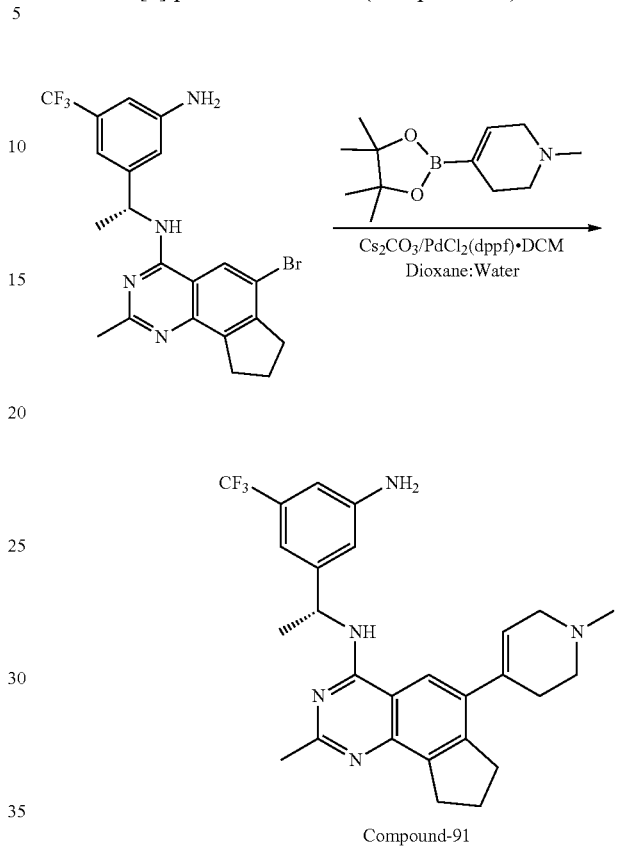

Compound-91

To a solution of (R)—N-(1-(3-amino-5-(trifluoromethyl)phenyl)ethyl)-6-bromo-2-methyl-8,9-dihydro-7H-cyclopenta[h]quinazolin-4-amine (100 mg, 0.215 mmol) (Intermediate-22) in 1,4-Dioxane (50 ml) were added 1-methyl-4-(4,4,5,5-tetramethyl-1,3,2-dioxaborolan-2-yl)-1,2,3,6-tetrahydropyridine (57.5 mg, 0.258 mmol), cesium carbonate (210 mg, 0.645 mmol) and PdCl$_2$(dppf).DCM (8.77 mg, 10.75 μmol) at room temperature. The resulting reaction mixture was heated at 80° C. for 3 h in a sealed vial. After completion of reaction, filtered the reaction mixture and evaporated to get the crude product (195 mg). The crude product was purified flash column chromatography using eluent 22-40% ethyl acetate in hexane get the desired (R)—N-(1-(3-amino-5-(trifluoromethyl)phenyl)ethyl)-2-methyl-6-(1-methyl-1,2,3,6-tetrahydropyridin-4-yl)-8,9-dihydro-7H-cyclopenta[h]quinazolin-4-amine (10 mg, 9.66% yield) as a white solid.

MS (ES+) m/z=481.3 (M+).

$^1$H NMR (400 MHz, DMSO-d$_6$) δ 8.23 (d, J=7.9 Hz, 1H), 8.03 (s, 1H), 6.92-6.87 (m, 1H), 6.86-6.82 (m, 1H), 6.73-6.67 (m, 1H), 5.84-5.78 (m, 1H), 5.64-5.50 (m, 3H), 3.15-3.08 (m, 2H), 3.07-3.00 (m, 3H), 2.63-2.58 (m, 2H), 2.57-2.54 (m, 3H), 2.39 (s, 3H), 2.31 (s, 3H), 2.00-2.12 (m, 2H), 1.55 (d, J=7.1 Hz, 3H).

The example disclosed in Table-VII was prepared using the similar procedure described above using appropriate starting materials and intermediate.

TABLE VII

| Example | Chemical structure | ¹H NMR and LCMS data |
|---|---|---|
| 92 | 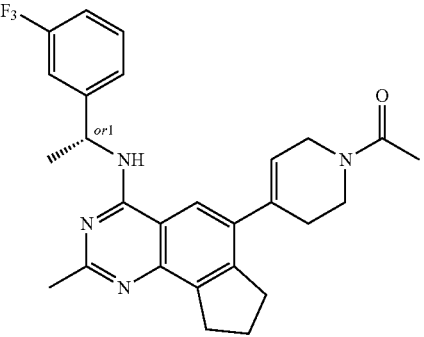<br>(R/S)-1-(4-(2-methyl-4-((1-(3-(trifluoromethyl)phenyl)ethyl)amino)-8,9-dihydro-7H-cyclopenta[h]quinazolin-6-yl)-3,6-dihydropyridin-1(2H)-yl)ethan-1-one<br>(Compound - 92) | MS (ES+) m/z = 495.2 (M + 1).<br>¹H NMR (401 MHz, DMSO-$d_6$) δ 8.33 (d, J = 7.8 Hz, 1H), 8.05-8.00 (m, 1H), 7.81 (s, 1H), 7.78-7.71 (m, 1H), 7.59-7.53 (m, 2H), 5.88 (s, 1H), 5.70-5.63 (m, 1H), 4.08-4.12 (m, 2H), 3.60-3.77 (m, 2H), 3.19-2.97 (m, 4H), 2.50 (s, 3H), 2.38 (s, 3H), 2.02-2.12 (m, 4H), 1.62 (d, J = 7.1 Hz, 3H). |
| 93 | 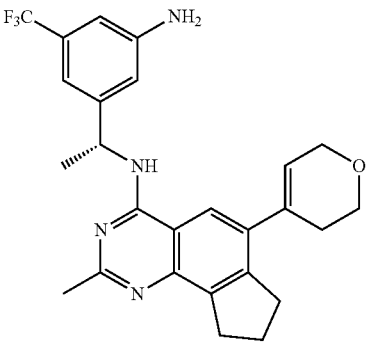 [SMILES: Cc1nc(N[C@H](C)c2cc(N)cc(C(F)(F)F)c2)c2cc(C3=CCOCC3)c3c(c2n1)CCC3]<br>(R)-N-(1-(3-amino-5-(trifluoromethyl)phenyl)ethyl)-6-(3,6-dihydro-2H-pyran-4-yl)-2-methyl-8,9-dihydro-7H-cyclopenta[h]quinazolin-4-amine<br>(Compound - 93) | MS (ES+) m/z = 469.23 (M + 1).<br>¹H NMR (400 MHz, DMSO-$d_6$) δ 8.29 (bs, 1H), 8.05 (s, 1H), 6.90-6.87 (m, 1H), 6.86-6.83 (m, 1H), 6.71-6.67 (m, 1H), 5.96-5.92 (m, 1H), 5.62-5.50 (m, 3H), 4.30-4.22 (m, 2H), 3.91-3.84 (m, 2H), 3.19-3.02 (m, 4H), 2.41 (s, 3H), 2.14-2.04 (m, 2H), 2.21-1.95 (m, 2H), 1.55 (d, J = 7.1 Hz, 3H). |
| 94 | 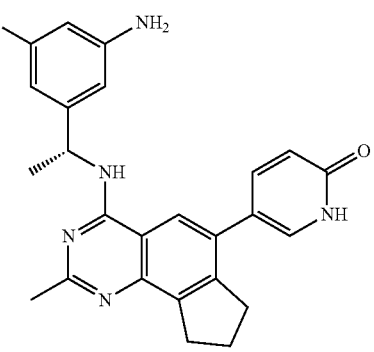<br>(R)-5-(4-((1-(3-amino-5-(trifluoromethyl)phenyl)ethyl)amino)-2-methyl-8,9-dihydro-7H-cyclopenta[h]quinazolin-6-yl)pyridin-2(1H)-one<br>(Compound - 94) | MS (ES+) m/z = 480.2 (M + 1).<br>¹H NMR (400 MHz, DMSO-$d_6$) δ 11.90 (bs, 1H), 8.27 (d, J = 8.0 Hz, 1H), 8.16 (s, 1H), 7.78-7.72 (m, 1H), 7.57-7.54 (m, 1H), 6.93-6.78 (m, 2H), 6.71-6.67 (m, 1H), 6.47 (d, J = 9.4 Hz, 1H), 5.61-5.51 (m, 3H), 3.22-3.11 (m, 2H), 3.09-3.01 (m, 2H), 2.54-2.51 (m, 2H), 2.41 (s, 3H), 1.55 (d, J = 7.1 Hz, 3H). |

TABLE VII-continued

| Example | Chemical structure | $^1$H NMR and LCMS data |
|---|---|---|
| 95 | (R)-4-(4-((1-(3-amino-5-(trifluoromethyl)phenyl)ethyl)amino)-2-methyl-8,9-dihydro-7H-cyclopenta[h]quinazolin-6-yl)pyridin-2(1H)-one (Compound - 95) | MS (ES+) m/z = 480.2 (M + 1). $^1$H NMR (400 MHz, DMSO-d$_6$) δ 11.66 (bs, 1H), 8.42 (d, J = 8.1 Hz, 1H), 8.31 (s, 1H), 7.47 (d, J = 6.8 Hz, 1H), 6.90-6.87 (m, 1H), 6.86-6.84 (m, 1H), 6.70-6.68 (m, 1H), 6.51-6.48 (m, 1H), 6.43 (s, 1H), 5.65-5.48 (m, 3H), 3.22-3.01 (m, 4H), 2.42 (s, 3H), 2.21-1.97 (m, 2H), 1.55 (d, J = 7.0 Hz, 3H). |
| 96 | (R)-1-(4-(4-((1-(3-amino-5-(trifluoromethyl)phenyl)ethyl)amino)-2-methyl-7,8,9,10-tetrahydrobenzo[h]quinazolin-6-yl)-3,6-dihydropyridin-1(2H)-yl)ethan-1-one (Compound - 96) | MS (ES+) m/z = 523.60 (M+). $^1$H NMR (400 MHz, DMSO-d$_6$) δ 8.16 (d, J = 8.0 Hz, 1H), 7.91-7.88 (m, 1H), 6.93-6.86 (m, 1H), 6.85-6.83 (m, 1H), 6.70-6.68 (m, 1H), 5.70-5.62 (m, 1H), 5.56-5.50 (m, 3H), 4.18-4.05 (m, 2H), 3.73-3.62 (m, 2H), 3.11-3.05 (m, 2H), 2.76-2.68 (m, 2H), 2.49-2.43 (m, 1H), 2.40 (s, 3H), 2.36-2.29 (m, 1H), 2.11-2.05 (m, 3H), 1.83-1.68 (m, 4H), 1.57-1.47 (m, 3H). |
| 97 | (R)-5-(4-((1-(3-amino-5-(trifluoromethyl)phenyl)ethyl)amino)-2-methyl-7,8,9,10-tetrahydrobenzo[h]quinazolin-6-yl)-1-methylpyridin-2(1H)-one (Compound - 97) | MS (ES+) m/z = 507.56 (M+). $^1$H NMR (400 MHz, DMSO-d$_6$) δ 8.18 (d, J = 7.9 Hz, 1H), 8.04 (s, 1H), 7.81-7.71 (m, 1H), 7.56-7.51 (m, 1H), 6.90-6.87 (m, 1H), 6.86-6.83 (m, 1H), 6.74-6.64 (m, 1H), 6.47 (d, J = 9.3 Hz, 1H), 5.61-5.46 (m, 3H), 3.51 (s, 3H), 3.12-3.05 (m, 2H), 2.72-2.62 (m, 2H), 2.43 (s, 3H), 1.84-1.76 (m, 2H), 1.75-1.66 (m, 2H), 1.52 (d, J = 7.1 Hz, 3H). |

TABLE VII-continued

| Example | Chemical structure | ¹H NMR and LCMS data |
|---|---|---|
| 98 | (R)-N-(1-(3-amino-5-(trifluoromethyl)phenyl)ethyl)-6-(1-isopropyl-1,2,3,6-tetrahydropyridin-4-yl)-2-methyl-8,9-dihydro-7H-cyclopenta[h]quinazolin-4-amine (Compound - 98) | MS (ES+) m/z = 510.3 (M +1). ¹H NMR (400 MHz, DMSO-$d_6$) δ 10.02 (s, 1H), 8.13 (s, 1H), 6.90-6.88 (m, 1H), 6.87-6.85 (m, 1H), 6.73-6.71 (m, 1H), 5.95-5.93 (m, 1H), 5.64-5.59 (m, 1H), 5.56 (bs, 2H), 3.94-3.82 (m, 2H), 3.36-3.33 (m, 3H), 3.22-3.02 (m, 4H), 2.90-2.64 (m, 1H), 2.43 (s, 3H), 2.13-2.08 (m, 3H), 1.58 (d, J = 7.0 Hz, 3H), 1.38-1.35 (m, 6H). |
| 99 | tert-butyl (R)-4-(4-((1-(3-amino-5-(trifluoromethyl)phenyl)ethyl)amino)-2-methyl-8,9-dihydro-7H-cyclopenta[h]quinazolin-6-yl)-3,6-dihydropyridine-1(2H)-carboxylate (Compound - 99) | MS (ES+) m/z = 568.2 (M + 1). ¹H NMR (400 MHz, DMSO-$d_6$) δ 8.22 (d, J = 8.0 Hz, 1H), 8.03 (s, 1H), 6.88 (s, 1H), 6.85 (s, 1H), 6.71-6.69 (m, 1H), 5.88-5.84 (m, 1H), 5.59-5.56 (m, 1H), 5.54 (s, 2H), 4.08-3.97 (m, 3H), 3.93-3.91 (m, 3H), 3.66-3.52 (m, 2H), 3.16-3.07 (m, 1H), 3.04-3.02 (m, 2H), 2.39 (s, 3H), 2.09-2.06 (m, 2H), 1.55 (d, J = 7.2 Hz, 2H), 1.45 (s, 9H). |

Example-100: (R)-(4-(4-((1-(3-amino-5-(trifluoromethyl)phenyl)ethyl)amino)-2-methyl-8,9-dihydro-7H-cyclopenta[h]quinazolin-6-yl)piperidin-1-yl)(cyclopropyl)methanone (Compound-100)

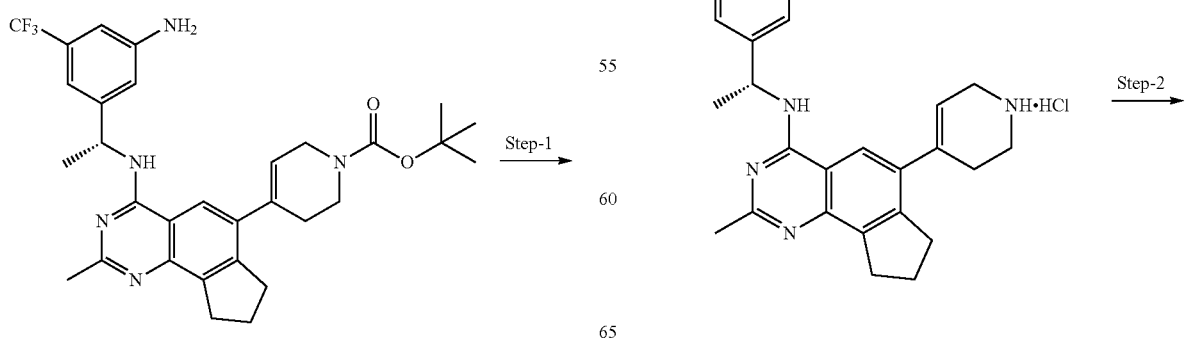

-continued

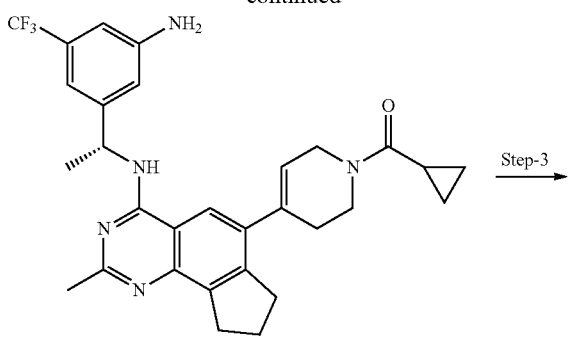

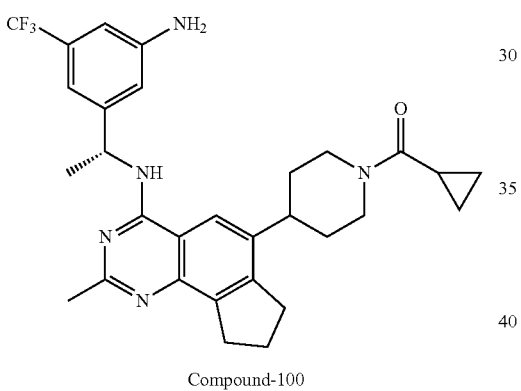

Compound-100

Step-1: (R)—N-(1-(3-amino-5-(trifluoromethyl) phenyl)ethyl)-2-methyl-6-(1,2,3,6-tetrahydropyridin-4-yl)-8,9-dihydro-7H-cyclopenta[h]quinazolin-4-amine hydrochloride To a stirred solution of tert-butyl (R)-4-(4-((1-(3-amino-5-(trifluoromethyl)phenyl)ethyl)amino)-2-methyl-8,9-dihydro-7H-cyclopenta[h]quinazolin-6-yl)-3,6-dihydropyridine-1(2H)-carboxylate (1.1 g, 1.938 mmol) (Compound-99) in 1,4-Dioxane (10 ml) were added 4M HCl in dioxane (24.22 ml, 97 mmol) at 25° C. and then reaction mixture was stirred to same temperature for 1.5 h under $N_2$ atmosphere. After completion of reaction, reaction mixture was evaporated to get crude product (1.56 g). The crude was stirred in ethyl acetate and filtered to get the desired compound (R)—N-(1-(3-amino-5-(trifluoromethyl)phenyl)ethyl)-2-methyl-6-(1,2,3,6-tetrahydropyridin-4-yl)-8,9-dihydro-7H-cyclopenta[h]quinazolin-4-amine hydrochloride (700 mg, 77% yield) as a white solid.

MS (ES+) m/z=468.3 (M+1).

Step-2: (R)-(4-(4-((1-(3-amino-5-(trifluoromethyl) phenyl)ethyl)amino)-2-methyl-8,9-dihydro-7H-cyclopenta[h]quinazolin-6-yl)-3,6-dihydropyridin-1 (2H)-yl)(cyclopropyl)methanone To a stirred solution of cyclopropanecarboxylic acid (0.025 g, 0.286 mmol) in DMF (5 ml) were added HATU (0.109 g, 0.286 mmol) and DIPEA (0.055 ml, 0.317 mmol) at room temperature and the resulting mixture was stirred for 15 min. Meanwhile, In a separate RB a solution of (R)—N-(1-(3-amino-5-(trifluoromethyl)phenyl)ethyl)-2-methyl-6-(1,2,3,6-tetrahydropyridin-4-yl)-8,9-dihydro-7H-cyclopenta[h]quinazolin-4-amine hydrochloride (0.16 g, 0.317 mmol) (Step-1 product of Example-100) in DMF (5 ml) was added DIPEA (0.055 ml, 0.317 mmol) at room temperature and cooled to 0° C. The above prepared solution of cyclopropyl carboxylic acid active ester was added dropwise at 0° C. and stirred for 2 h at same temp. After completion of reaction, the ice-cold water was added, solid precipitated product was filtered off and dried. This residue was purified by flash column chromatography using gradient elution 0 to 80% of ethyl acetate in hexane to afford (R)-(4-(4-((1-(3-amino-5-(trifluoromethyl)phenyl)ethyl)amino)-2-methyl-8,9-dihydro-7H-cyclopenta[h]quinazolin-6-yl)-3,6-dihydropyridin-1(2H)-yl)(cyclopropyl)methanone (0.1 g, 58.8% yield).

MS (ES+) m/z=536.20 (M+1).

Step-3: (R)-(4-(4-((1-(3-amino-5-(trifluoromethyl) phenyl)ethyl)amino)-2-methyl-8,9-dihydro-7H-cyclopenta[h]quinazolin-6-yl)piperidin-1-yl)(cyclopropyl)methanone A mixture of (R)-(4-(4-((1-(3-amino-5-(trifluoromethyl) phenyl)ethyl)amino)-2-methyl-8,9-dihydro-7H-cyclopenta [h]quinazolin-6-yl)-3,6-dihydropyridin-1(2H)-yl)(cyclopropyl)methanone (0.1 g, 0.187 mmol), AMMONIUM FORMATE (0.082 g, 1.307 mmol) and PALLADIUM HYDROXIDE ON CARBON (0.026 g, 0.187 mmol) in Ethanol (10 ml) and water (1 ml) was stirred at 80° C. for 1 h. The reaction mixture was filtered through celite bed, washed with ethyl acetate (50 ml×2) and the combined filtrate was concentrated under vacuum. The crude mass (90 mg) was purified by RP prep to (R)-(4-(4-((1-(3-amino-5-(trifluoromethyl)phenyl)ethyl)amino)-2-methyl-8,9-dihydro-7H-cyclopenta[h]quinazolin-6-yl)piperidin-1-yl)(cyclopropyl)methanone (0.012 g, 0.022 mmol, 11.96% yield) as an off white solid.

MS (ES+) m/z=538.20 (M+1).

$^1$H NMR (400 MHz, DMSO-$d_6$) δ 8.23 (s, 1H), 7.99 (s, 1H), 6.87 (s, 1H), 6.84 (s, 1H), 6.70 (s, 1H), 5.63-5.54 (m, 1H), 5.55 (s, 2H), 4.66-4.62 (m, 1H), 4.47-4.43 (m, 1H), 3.26-3.20 (m, 1H), 3.19-3.11 (m, 2H), 3.10-3.06 (m, 2H), 3.02-2.84 (m, 1H), 2.75-2.63 (m, 1H), 2.39 (s, 3H), 2.18-2.01 (m, 3H), 1.94-1.86 (m, 1H), 1.79-1.76 (m, 1H), 1.74-1.66 (m, 2H), 1.56 (d, J=7.1 Hz, 3H), 0.78-0.70 (m, 4H).

The example disclosed in Table-VIII was prepared using the similar procedure above using appropriate starting materials.

TABLE VIII

| Example | Chemical Structure | LCMS and ¹H NMR data |
|---|---|---|
| 101 | (R)-N-(1-(3-amino-5-(trifluoromethyl)phenyl)ethyl)-2-methyl-6-(1-methylpiperidin-4-yl)-8,9-dihydro-7H-cyclopenta[h]quinazolin-4-amine (Compound - 101) | MS (ES+) m/z = 484.05 (M + 1). ¹H NMR (400 MHz, DMSO-$d_6$) δ 8.19 (s, 1H), 8.01 (s, 1H), 6.89 (s, 1H), 6.86-6.84 (m, 1H), 6.71-6.68 (m, 1H), 5.60-5.51 (m, 1H), 3.16-3.07 (m, 4H), 3.06-2.99 (m, 2H), 2.73-2.64 (m, 1H), 2.51 (s, 3H), 2.38 (s, 3H), 2.35-2.26 (m, 4H), 2.13-2.06 (m, 2H), 1.99-1.85 (m, 2H), 1.84-1.76 (m, 2H), 1.56 (d, J = 7.1 Hz, 3H). |
| 102 | (R)-1-(4-(4-((1-(3-amino-5-(trifluoromethyl)phenyl)ethyl)amino)-2-methyl-8,9-dihydro-7H-cyclopenta[h]quinazolin-6-yl)piperidin-1-yl)ethan-1-one (Compound - 102) | MS (ES+) m/z = 511.81 (M+). ¹H NMR (400 MHz, DMSO-$d_6$) δ 8.18 (s, 1H), 7.98 (s, 1H), 6.88-6.86 (m, 1H), 6.85-6.83 (m, 1H), 6.71-6.68 (m, 1H), 5.64-5.52 (m, 3H), 4.67-4.54 (m, 1H), 3.90-4.07 (m, 2H), 3.01-3.23 (m, 4H), 2.93 (s, 1H), 2.59-2.73 (m, 1H), 2.43-2.30 (m, 4H), 2.16-2.09 (m, 1H), 2.05 (d, J = 2.4 Hz, 3H), 1.88-1.64 (m, 1H), 1.56 (d, J = 7.1 Hz, 3H), 1.33 (s, 3H). |
| 103 | (R)-N-(1-(3-amino-5-(trifluoromethyl)phenyl)ethyl)-6-(1-isopropylpiperidin-4-yl)-2-methyl-8,9-dihydro-7H-cyclopenta[h]quinazolin-4-amine (Compound - 103) | MS (ES+) m/z = 511.86 (M+). ¹H NMR (400 MHz, DMSO-$d_6$) δ 8.29-8.23 (m, 1H), 8.07 (s, 1H), 6.93-6.82 (m, 2H), 6.73-6.66 (m, 1H), 5.64-5.46 (m, 3H), 3.16-3.09 (m, 2H), 3.09-2.98 (m, 4H), 2.97-2.87 (m, 1H), 2.77-2.66 (m, 1H), 2.49-2.43 (m, 2H), 2.38 (s, 3H), 2.16-2.05 (m, 2H), 1.99-1.88 (m, 2H), 1.86-1.76 (m, 2H), 1.56 (d, J = 7.1 Hz, 3H), 1.10-1.05 (m, 6H). |

TABLE VIII-continued

| Example | Chemical Structure | LCMS and $^1$H NMR data |
|---|---|---|
| 104 | 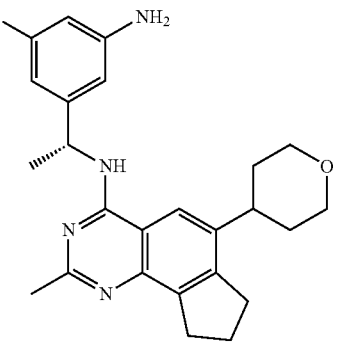<br>(R)-N-(1-(3-amino-5-(trifluoromethyl)phenyl)ethyl)-2-methyl-6-(tetrahydro-2H-pyran-4-yl)-8,9-dihydro-7H-cyclopenta[h]quinazolin-4-amine<br>(Compound - 104) | MS (ES+) m/z = 471.17 (M + 1). $^1$H NMR (400 MHz, DMSO-$d_6$) δ 8.85 (s, 1H), 8.14 (s, 1H), 6.89 (s, 1H), 6.87-6.84 (m, 1H), 6.74-6.72 (m, 1H), 5.66-5.50 (m, 2H), 4.08-3.96 (m, 2H), 3.55-3.46 (m, 2H), 3.15 (t, J = 7.6 Hz, 2H), 3.09 (t, J = 7.5 Hz, 2H), 3.03-2.87 (m, 1H), 2.47 (s, 3H), 2.22-2.08 (m, 2H), 1.96-1.80 (m, 2H), 1.76-1.66 (m, 2H), 1.60 (d, J = 7.0 Hz, 3H). |
| 105 | 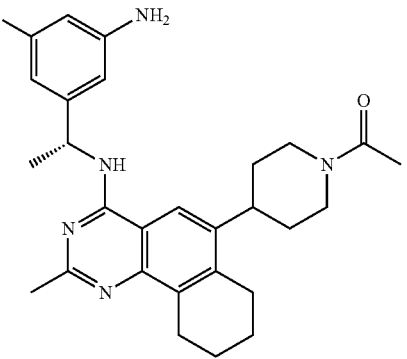<br>(R)-1-(4-(4-((1-(3-amino-5-(trifluoromethyl)phenyl)ethyl)amino)-2-methyl-7,8,9,10-tetrahydrobenzo[h]quinazolin-6-yl)piperidin-1-yl)ethan-1-one<br>(Compound -105) | MS (ES+) m/z = 525.6 (M+). $^1$H NMR (400 MHz, DMSO-$d_6$) δ 8.26-8.17 (m, 1H), 7.99-7.91 (m, 1H), 6.88-6.79 (m, 2H), 6.72-6.66 (m, 1H), 5.65-5.58 (m, 1H), 5.66-5.51 (m, 3H), 4.68-4.59 (m, 1H), 4.04-3.92 (m, 1H), 3.21-3.16 (m, 1H), 3.06 (s, 2H), 2.90-2.83 (m, 2H), 2.64 (s, 1H), 2.39 (s, 3H), 2.06 (s, 3H), 1.85-1.69 (m, 8H), 1.56 (d, J = 7.3 Hz, 3H). |

Example-106: (R)—N$^4$-(1-(3-amino-5-(trifluoromethyl)phenyl)ethyl)-N$^6$-(4,5-dihydrooxazol-2-yl)-2-methyl-8,9-dihydro-7H-cyclopenta[h]quinazoline-4,6-diamine (Compound-106)

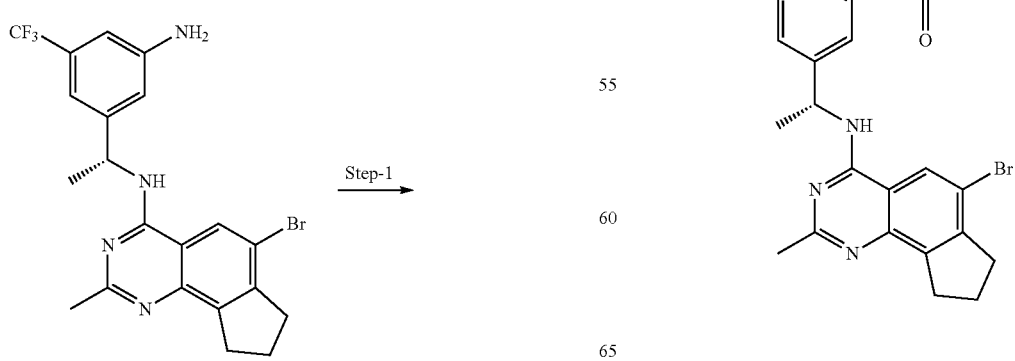

195
-continued

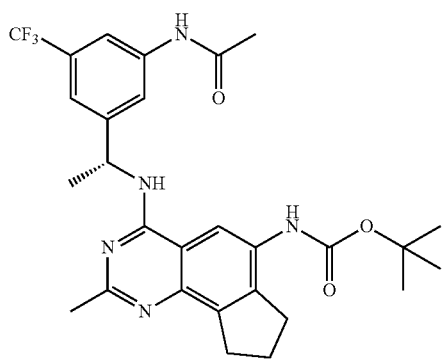

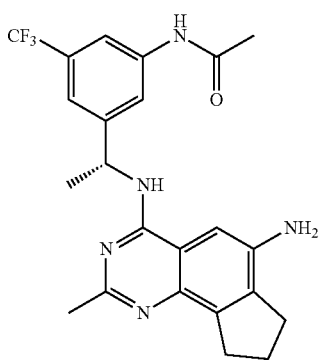

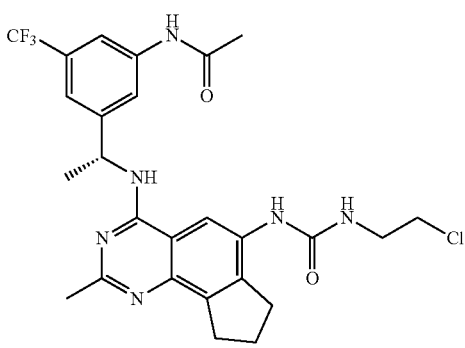

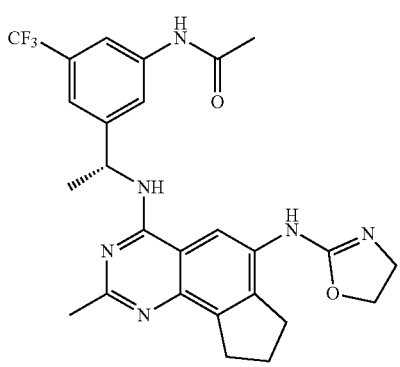

196
-continued

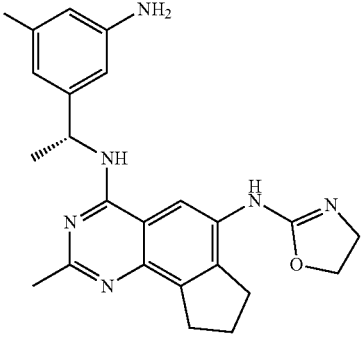

Compound-106

Step-1: (R)—N-(3-(1-(((6-bromo-2-methyl-8,9-di-hydro-7H-cyclopenta[h]quinazolin-4-yl)amino)ethyl)-5-(trifluoromethyl)phenyl)acetamide To a stirred solution of (R)—N-(1-(3-amino-5-(trifluoromethyl)phenyl)ethyl)-6-bromo-2-methyl-8,9-dihydro-7H-cyclopenta[h]quinazolin-4-amine (0.3 g, 0.645 mmol) (Intermediate-22) in CH$_2$Cl$_2$ (15 ml), was added DIPEA (0.338 ml, 1.934 mmol) followed by addition of acetyl chloride (0.055 ml, 0.774 mmol) at 0° C. under nitrogen atmosphere and continued the stirring for 3 hr at same temperature. After completion of the reaction, the reaction mass was poured into water (10 ml) and extracted with CH$_2$Cl$_2$ (3×50 ml), washed the organic layer with water (20 ml), brine (15 ml) and dried over anhydrous Na$_2$SO$_4$. The solvent was concentrated under reduced pressure to get a crude compound. The crude compound was purified by flash column chromatography using gradient elution 0-40% ethyl acetate in hexane to get the titled compound (R)—N-(3-(1-((6-bromo-2-methyl-8,9-dihydro-7H-cyclopenta[h]quinazolin-4-yl)amino)ethyl)-5-(trifluoromethyl)phenyl) acetamide (0.279 g, 85% yield) as a white solid.

MS (ES+) m/z=507.2 (M+1).

$^1$H NMR (400 MHz, Chloroform-d) δ 8.28 (s, 1H), 7.94 (s, 1H), 7.80 (s, 1H), 7.70 (s, 1H), 7.45 (s, 1H), 5.88-5.63 (m, 2H), 3.36-3.21 (m, 2H), 3.13-3.04 (m, 2H), 2.53 (s, 3H), 2.19 (m, 2H), 2.10 (s, 3H), 1.72 (d, J=6.8 Hz, 3H).

Step-2: tert-butyl (R)-(4-((1-(3-acetamido-5-(trifluoromethyl)phenyl)ethyl)amino)-2-methyl-8,9-dihydro-7H-cyclopenta[h]quinazolin-6-yl)carbamate To a seal tube, was added tert-butyl carbamate (4.39 g, 37.4 mmol), Pd$_2$(dba)$_3$ (0.686 g, 0.749 mmol), cesium carbonate (6.10 g, 18.72 mmol), xantphos (0.867 g, 1.498 mmol), (R)—N-(3-(1-((6-bromo-2-methyl-8,9-dihydro-7H-cyclopenta[h]quinazolin-4-yl)amino)ethyl)-5-(trifluoromethyl)phenyl)acetamide (1.9 g, 3.74 mmol) and toluene (30 ml). After sealing the tube, the reaction mixture was stirred at 110° C. for 5 h. After cooling the reaction mass to room temperature, ethyl acetate (100 ml) and water (50 ml) was added. The organic layer was separated and the aqueous layer was extracted with ethyl acetate (100 ml). The combined organic layer was washed with water (100 ml), brine (50 ml) and dried over anhydrous Na$_2$SO$_4$, filtered and concentrated to give a crude compound (3.4 g). The crude compound was purified by flash column chromatography using gradient elution of 0-7% MeOH in CH$_2$Cl$_2$ to get tert-butyl (R)-(4-((1-(3-acetamido-5-(trifluoromethyl)phenyl)ethyl)amino)-2-methyl-8,9-dihydro-7H-cyclopenta[h] quinazolin-6-yl)carbamate (2.01 g, 99% yield) as a white solid.

MS (ES+) m/z=544.2 (M+1).

$^1$H NMR (400 MHz, DMSO-d$_6$) δ 10.24 (s, 1H), 8.84 (s, 1H), 8.29 (s, 1H), 8.08 (s, 1H), 7.97 (s, 1H), 7.76 (s, 1H), 7.56-7.33 (m, 1H), 5.59 (t, J=7.3 Hz, 1H), 3.13 (t, J=9.5 Hz, 2H), 2.98 (m, 2H), 2.37 (s, 3H), 2.14-2.02 (m, 5H), 1.60 (d, J=7.1 Hz, 3H), 1.49 (s, 9H).

Step-3: (R)—N-(3-(1-((6-amino-2-methyl-8,9-dihydro-7H-cyclopenta[h]quinazolin-4-yl)amino) ethyl)-5-(trifluoromethyl)phenyl)acetamide To a stirred solution of tert-butyl (R)-(4-((1-(3-acetamido-5-(trifluoromethyl)phenyl)ethyl)amino)-2-methyl-8,9-dihydro-7H-cyclopenta[h]quinazolin-6-yl)carbamate (0.04 g, 0.074 mmol) in CH$_2$Cl$_2$(2.00 ml,) was added TFA (1.5 ml) drop wise at 0° C. under N$_2$ atm. The reaction mass was stirred for overnight at room temperature. After completion of the reaction, the reaction mass was distilled under reduced pressure to get a crude product, diluted it with 10% aq. NaHCO$_3$ and extracted with ethyl acetate (25 ml×3). Dried the organic layer over anhydrous Na$_2$SO$_4$, filtered and concentrated under reduced pressure to get a crude compound. The crude compound was precipitated into (20%) ethyl acetate in pentane to get (R)—N-(3-(1-((6-amino-2-methyl-8,9-dihydro-7H-cyclopenta[h]quinazolin-4-yl) amino)ethyl)-5-(trifluoromethyl)phenyl)acetamide (0.03 g, 92% yield) as a white solid.

MS (ES+) m/z=444.29 (M+1).

$^1$H NMR (400 MHz, DMSO-d$_6$) δ 10.24 (s, 1H), 7.94 (s, 1H), 7.80 (s, 1H), 7.49 (s, 1H), 7.39 (s, 1H), 7.17 (s, 1H), 5.61 (s, 1H), 5.31 (s, 2H), 3.09 (s, 2H), 2.85 (t, J=7.8 Hz, 2H), 2.40 (s, 3H), 2.11 (m, 2H), 2.04 (s, 3H), 1.60 (d, J=7.0 Hz, 3H).

Step-4: (R)—N-(3-(1-((6-(3-(2-chloroethyl) ureido)-2-methyl-8,9-dihydro-7H-cyclopenta[h]quinazolin-4-yl)amino)ethyl)-5-(trifluoromethyl)phenyl)acetamide To a stirred solution of (R)—N-(3-(1-((6-amino-2-methyl-8,9-dihydro-7H-cyclopenta[h]quinazolin-4-yl) amino)ethyl)-5-(trifluoromethyl)phenyl)acetamide (0.05 g, 0.113 mmol) in THF (10 ml), was added 1-chloro-2-isocyanatoethane (0.029 g, 0.271 mmol) drop wise at room temperature under N$_2$ atm. Then the reaction mass was stirred at 50° C. for 5 h. Distilled the reaction mass under reduced pressure to get a crude compound (86 mg). The crude compound was purified by flash column chromatography using gradient elution 0-6% MeOH in DCM to get the titled compound (R)—N-(3-(1-((6-(3-(2-chloroethyl)ureido)-2-methyl-8,9-dihydro-7H-cyclopenta[h]quinazolin-4-yl) amino)ethyl)-5-(trifluoromethyl)phenyl)acetamide (0.055 g, 89% yield) as a brown solid.

MS (ES+) m/z=549.07 (M+1).

$^1$H NMR (400 MHz, DMSO-d$_6$) δ 10.26 (s, 1H), 8.45 (s, 1H), 8.23 (s, 1H), 7.96 (s, 1H), 7.80 (s, 1H), 7.53 (s, 1H), 7.39 (s, 1H), 6.95 (s, 1H), 5.63 (t, J=7.3 Hz, 1H), 3.70 (t, J=6.1 Hz, 2H), 3.52-3.46 (m, 2H), 3.18-3.11 (m, 2H), 2.96 (t, J=7.5 Hz, 2H), 2.43 (s, 3H), 2.20-2.10 (m, 2H), 2.04 (s, 3H), 1.62 (d, J=7.2 Hz, 3H).

Step-5: (R)—N-(3-(1-((6-((4,5-dihydrooxazol-2-yl) amino)-2-methyl-8,9-dihydro-7H-cyclopenta[h]quinazolin-4-yl)amino)ethyl)-5-(trifluoromethyl)phenyl)acetamide To a stirred solution of (R)—N-(3-(1-((6-(3-(2-chloroethyl)ureido)-2-methyl-8,9-dihydro-7H-cyclopenta[h]quinazolin-4-yl)amino)ethyl)-5-(trifluoromethyl)phenyl)acetamide (0.025 g, 0.046 mmol) in DMF (2.0 ml), was added potassium tert-butoxide (0.015 g, 0.137 mmol) portion wise at room temperature under N$_2$ atm. Then the reaction mass was heated at 70° C. for 7 h. After completion of the reaction, the reaction mixture was allowed to room temperature and then poured into water (5 ml) and extracted with ethyl acetate (15 ml), washed the organic layer by water (15 ml), brine (10 ml) and dried over anhydrous Na$_2$SO$_4$, filtered and concentrated under reduced pressure to get a crude compound. The crude compound was purified by flash column chromatography using gradient elution 0-6% MeOH in DCM to get the titled compound (R)—N-(3-(1-((6-((4,5-dihydrooxazol-2-yl)amino)-2-methyl-8,9-dihydro-7H-cyclopenta[h]quinazolin-4-yl)amino)ethyl)-5-(trifluoromethyl)phenyl)acetamide (0.019 g, 81% yield) as an of white solid.

MS (ES+) m/z=513.2 (M+1).

$^1$H NMR (400 MHz, DMSO-d$_6$) δ 10.24 (s, 1H), 8.07 (s, 1H), 8.00 (s, 1H), 7.74 (s, 1H), 7.49 (d, J=4.5 Hz, 1H), 7.40 (d, J=4.3 Hz, 1H), 6.83 (s, 1H), 5.66-5.56 (m, 1H), 3.96-3.82 (m, 2H), 3.47 (t, J=7.8 Hz, 2H), 3.19-3.08 (m, 2H), 3.05-2.95 (m, 2H), 2.39 (s, 3H), 2.14-2.04 (m, 2H), 2.03 (s, 3H), 1.60 (d, J=7.1 Hz, 3H).

Step-6: (R)—N$^4$-(1-(3-amino-5-(trifluoromethyl) phenyl)ethyl)-N$^6$-(4,5-dihydrooxazol-2-yl)-2-methyl-8,9-dihydro-7H-cyclopenta[h]quinazoline-4, 6-diamine To the compound of (R)—N-(3-(1-((6-((4,5-dihydrooxazol-2-yl)amino)-2-methyl-8,9-dihydro-7H-cyclopenta[h] quinazolin-4-yl)amino)ethyl)-5-(trifluoromethyl)phenyl)acetamide (0.035 g, 0.068 mmol), was added 4M HCl (0.341 ml, 1.366 mmol) in MeOH (1 ml) and the reaction mass was heated to 60° C. for 7 h. After completion of reaction, distilled the reaction mass under reduced pressure to get a crude residue. The residue was neutralized by 10% aq. NaHCO$_3$ and extracted with ethyl acetate (15 ml). Washed the organic layer with water (30 ml), brine (10 ml), dried with anhydrous Na$_2$SO$_4$, filtered and concentrated under reduced pressure to get a crude compound (0.057 g). The crude compound was purified by flash column chromatography using gradient elution of 0-7% MeOH in DCM to get the titled compound (R)—N4-(1-(3-amino-5-(trifluoromethyl)phenyl)ethyl)-N6-(4,5-dihydrooxazol-2-yl)-2-methyl-8,9-dihydro-7H-cyclopenta[h]quinazoline-4,6-diamine (0.027 g, 84% yield) as an of white solid.

MS (ES+) m/z=471.1 (M+1).

$^1$H NMR (400 MHz, DMSO-d$_6$) δ 8.07 (s, 1H), 7.42-7.35 (m, 1H), 6.89-6.87 (m, 1H), 6.85-6.83 (m, 1H), 6.82-6.80 (s, 1H), 6.71-6.68 (m, 1H), 5.60-5.50 (m, 3H), 3.96-3.82 (m, 2H), 3.46 (t, J=7.8 Hz, 2H), 3.19-3.10 (m, 2H), 3.05-2.98 (m, 2H), 2.41 (s, 3H), 2.12-2.04 (m, 2H), 1.55 (d, J=7.1 Hz, 3H).

Example-107: (R)—N-(1-(3-amino-5-(trifluoromethyl)phenyl)ethyl)-2-methyl-6-((3-methyloxetan-3-yl)methoxy)-8,9-dihydro-7H-cyclopenta[h]quinazolin-4-amine (Compound-107)

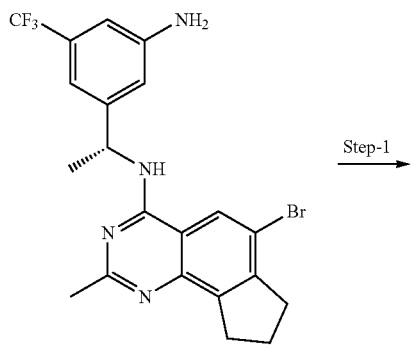

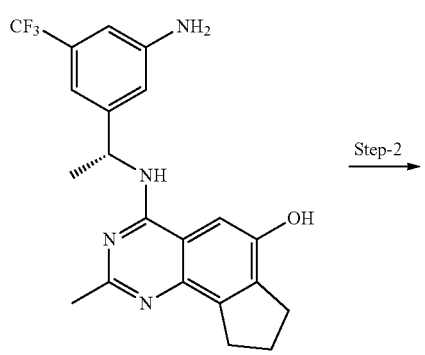

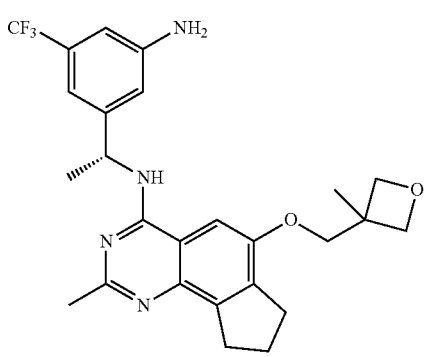

Compound-107

Step-1: (R)-4-((1-(3-amino-5-(trifluoromethyl)phenyl)ethyl)amino)-2-methyl-8,9-dihydro-7H-cyclopenta[h]quinazolin-6-ol To a solution of (R)—N-(1-(3-amino-5-(trifluoromethyl)phenyl)ethyl)-6-bromo-2-methyl-8,9-dihydro-7H-cyclopenta[h]quinazolin-4-amine (0.220 g, 0.473 mmol) (Intermediate-22) in 1,4 Dioxane (2 ml) and water (0.5 ml), was added KOH (0.080 g, 1.418 mmol). The mixture was thoroughly deoxygenated by purging nitrogen for 15 min and then $Pd_2(dba)_3$ (0.043 g, 0.047 mmol) and di-tert-butyl (2',4',6'-triisopropyl-[1,1'-biphenyl]-2-yl)phosphane (0.020 g, 0.047 mmol) were added. The resulting mixture was heated at 80° C. for 17 h in a sealed tube. After completion of reaction, the reaction mass was cooled to room temperature and concentrated under vacuum to get oily residue (0.37 g), which was dissolved in water (20 ml) and neutralized by using 2N HCl solution. The aqueous layer was extracted with ethyl acetate (30 ml). The organic layer was washed with water (20 ml), brine (10 ml), dried over anhydrous $Na_2SO_4$, filtered and concentrated under reduced pressure to get a crude compound (0.150 g). The crude compound was purified by flash column chromatography using gradient elution 0-30% ethyl acetate in hexane to get the titled compound (R)-4-((1-(3-amino-5-(trifluoromethyl)phenyl)ethyl)amino)-2-methyl-8,9-dihydro-7H-cyclopenta[h]quinazolin-6-ol (0.070 g, 36.80% yield) as a white solid.

MS (ES+) m/z=403.16 (M+1).

Step-2: (R)—N-(1-(3-amino-5-(trifluoromethyl)phenyl)ethyl)-2-methyl-6-((3-methyloxetan-3-yl)methoxy)-8,9-dihydro-7H-cyclopenta[h]quinazolin-4-amine To a stirred solution of (R)-4-((1-(3-amino-5-(trifluoromethyl)phenyl)ethyl)amino)-2-methyl-8,9-dihydro-7H-cyclopenta[h]quinazolin-6-ol (70 mg, 0.174 mmol) in DMF (2 ml), was added 3-(bromomethyl)-3-methyloxetane (37.3 mg, 0.226 mmol) followed by addition of $K_2CO_3$ (48.1 mg, 0.348 mmol). The reaction mixture was then stirred at 80° C. for 17 h. After completion of reaction, the reaction mass was cooled to room temperature and quenched with water (15 ml), the aqueous layer was extracted with ethyl acetate (20 ml), washed the combined organic layer with water (30 ml), brine (10 ml) and dried over anhydrous sodium sulphate, filtered. The organic layer was concentrated to obtain a crude compound (65 mg). The crude compound was purified by flash column chromatography using gradient elution 0-60% ethyl acetate in hexane to get the titled compound (R)—N-(1-(3-amino-5-(trifluoromethyl)phenyl)ethyl)-2-methyl-6-((3-methyloxetan-3-yl)methoxy)-8,9-dihydro-7H-cyclopenta[h]quinazolin-4-amine (0.015 g, 17.72% yield) as a white solid.

MS (ES+) m/z=487.24 (M+1).

$^1$H NMR (400 MHz, DMSO-$d_6$) δ 8.10 (s, 1H), 7.63 (s, 1H), 7.01-6.83 (m, 2H), 6.74-7.69 (m, 1H), 5.70-5.44 (m, 3H), 4.59-4.51 (m, 2H), 4.39-4.34 (m, 2H), 4.30-4.12 (m, 2H), 3.14 (t, J=7.7 Hz, 2H), 2.96 (t, J=7.5 Hz, 2H), 2.40 (s, 3H), 2.16-2.10 (m, 2H), 1.58 (d, J=7.0 Hz, 3H), 1.43 (s, 3H).

Example-108: (R)—N-(1-(3-amino-5-(trifluoromethyl)phenyl)ethyl)-6-methoxy-2-methyl-8,9-dihydro-7H-cyclopenta[h]quinazolin-4-amine (Compound-108)

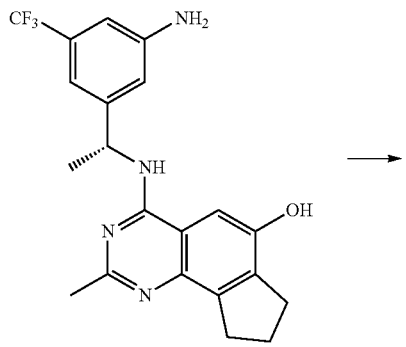

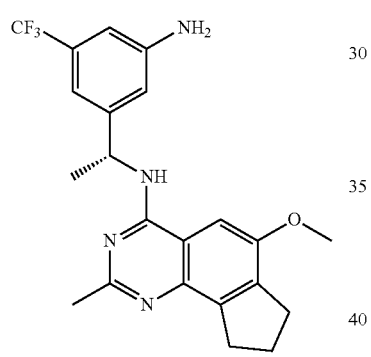

Compound-108

To a stirred solution of solution of (R)-4-((1-(3-amino-5-(trifluoromethyl)phenyl)ethyl)amino)-2-methyl-8,9-dihydro-7H-cyclopenta[h]quinazolin-6-ol (250 mg, 0.621 mmol) in DMF (10 ml) were added iodomethane (106 mg, 0.745 mmol) and $Cs_2CO_3$ (304 mg, 0.932 mmol) at room temperature. The resulting reaction mixture was stirred at 80° C. for 1 h in a sealed vial. The reaction mixture was allowed to room temperature, diluted with ethyl acetate (50 ml), washed with water (30 ml×2). The separated organic layer was dried over $Na_2SO_4$, filtered and concentrated under vacuo. The crude residue was purified by flash column chromatography using 0-90% ethyl acetate in hexane as eluent followed by purification by RP prep to afford (R)—N-(1-(3-amino-5-(trifluoromethyl)phenyl)ethyl)-6-methoxy-2-methyl-8,9-dihydro-7H-cyclopenta[h]quinazolin-4-amine (14 mg, 5.41% yield).

MS (ES+) m/z=416.41 (M+).

$^1$H NMR (400 MHz, DMSO-$d_6$) δ 8.04 (d, J=8.0 Hz, 1H), 7.55 (s, 1H), 6.90-6.84 (m, 2H), 6.70 (s, 1H), 5.66-5.45 (m, 3H), 3.92 (s, 3H), 3.12 (t, J=7.6 Hz, 2H), 2.93 (t, J=7.4 Hz, 2H), 2.38 (s, 3H), 2.16-2.04 (m, 2H), 1.57 (d, J=7.0 Hz, 3H).

Example-109: N—((R)-1-(3-amino-5-(trifluoromethyl)phenyl)ethyl)-2-methyl-6-(((S)-tetrahydrofuran-3-yl)oxy)-8,9-dihydro-7H-cyclopenta[h]quinazolin-4-amine (Compound-109)

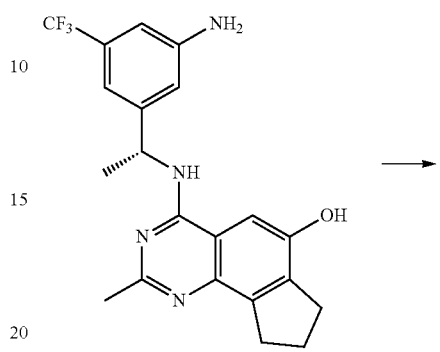

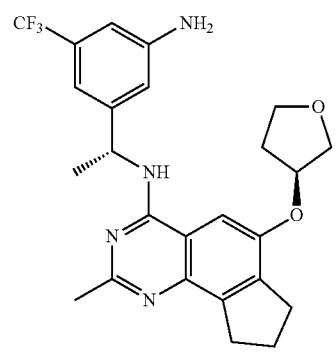

Compound-109

To a stirred solution of (R)-4-((1-(3-amino-5-(trifluoromethyl)phenyl)ethyl)amino)-2-methyl-8,9-dihydro-7H-cyclopenta[h]quinazolin-6-ol (170 mg, 0.422 mmol) in DMF (10 ml) were added (R)-tetrahydrofuran-3-yl 4-methylbenzenesulfonate (123 mg, 0.507 mmol) and $Cs_2CO_3$ (206 mg, 0.634 mmol) at room temperature and then reaction mixture heated at 80° C. for 1 h in a sealed vial. After completion of reaction, reaction mixture was allowed to room temperature and diluted with ethyl acetate (50 ml). The organic layer was washed with water (20 ml×2) and brine (20 ml). The separated organic layer was dried over $Na_2SO_4$, filtered and concentrated. The crude mass was purified by flash column chromatography by using 80-90% ethyl acetate in Hexane as eluent to get afford N—((R)-1-(3-amino-5-(trifluoromethyl)phenyl)ethyl)-2-methyl-6-(((S)-tetrahydrofuran-3-yl)oxy)-8,9-dihydro-7H-cyclopenta[h]quinazolin-4-amine (10 mg, 5.01% yield).

MS (ES+) m/z=473.23 (M+1).

$^1$H NMR (400 MHz, DMSO-$d_6$) δ 8.03-7.98 (m, 1H), 7.53 (s, 1H), 6.88 (s, 1H), 6.86-6.84 (m, 1H), 6.71-6.68 (m, 1H), 5.64-5.57 (m, 1H), 5.55 (s, 2H), 5.25-5.20 (m, 1H), 4.05-4.00 (m, 1H), 3.93-3.86 (m, 1H), 3.85-3.78 (m, 2H), 3.16-3.09 (m, 2H), 2.95-2.88 (m, 2H), 2.38 (s, 3H), 2.35-2.28 (m, 1H), 2.15-1.98 (m, 3H), 1.57 (d, J=7.0 Hz, 3H).

Example-110: (R)—N-(1-(3-amino-5-(trifluoromethyl)phenyl)ethyl)-6-methoxy-2,8-dimethylfuro[2,3-h]quinazolin-4-amine (Compound-110)

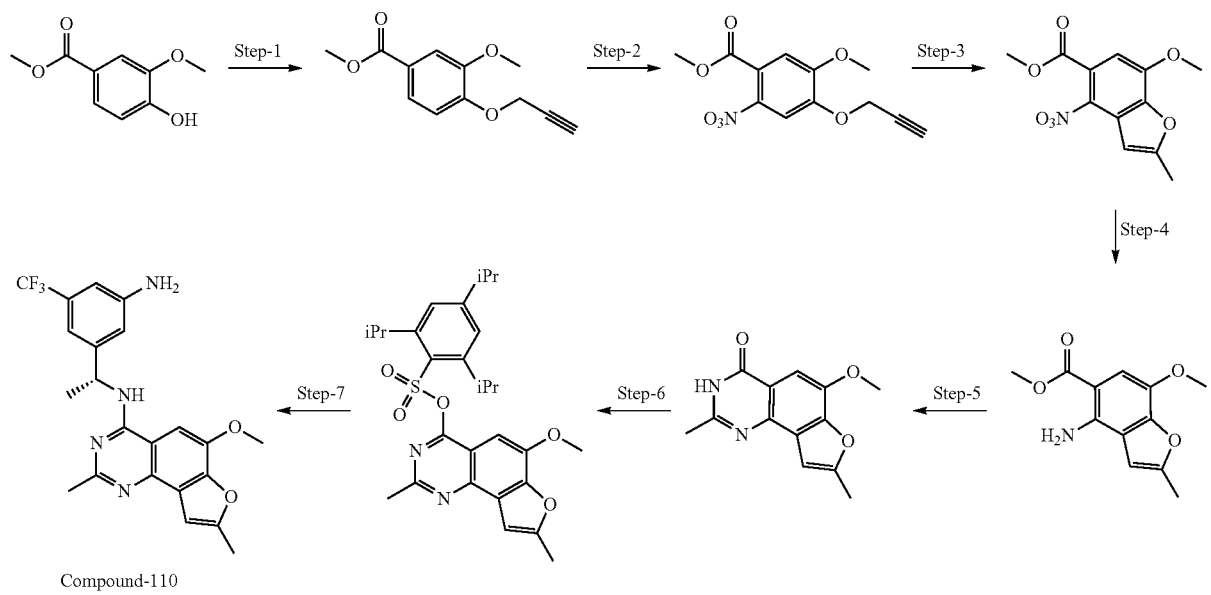

Compound-110

Step-1: Methyl 3-methoxy-4-(prop-2-yn-1-yloxy)benzoate

To a stirred solution of methyl 4-hydroxy-3-methoxybenzoate (70 g, 384 mmol) (commercially available) in DMF (500 ml) was added $K_2CO_3$ (80 g, 576 mmol) and stirred for 30 min followed by addition of 80% 3-bromoprop-1-yne in toluene (43.6 ml, 384 mmol) drop wise at ambient temperature. The resulting mixture was stirred for 2 h at 25° C. After completion of reaction, reaction mass was cooled to 0° C. and ice cold water (1000 ml) was added slowly, solid compound got precipitated was filtered, residue was washed with water (500 ml×2) and dried under vacuum to afford methyl 3-methoxy-4-(prop-2-yn-1-yloxy)benzoate (80 g, 95% yield) as an off white solid.

$^1$H NMR (400 MHz, DMSO-$d_6$) δ 7.59 (dd, J=8.4, 2.0 Hz, 1H), 7.48 (d, J=2.0 Hz, 1H), 7.14 (d, J=8.4 Hz, 1H), 4.90 (d, J=2.4 Hz, 2H), 3.83 (s, 6H), 3.62 (t, J=2.4 Hz, 1H).

Step-2: Methyl 5-methoxy-2-nitro-4-(prop-2-yn-1-yloxy)benzoate

To a stirred solution of methyl 3-methoxy-4-(prop-2-yn-1-yloxy)benzoate (79 g, 359 mmol) in DCM (1000 ml) at −15° C. were added tin(IV) chloride (63.1 ml, 538 mmol) and fuming nitric acid (16.03 ml, 359 mmol) drop wise simultaneously. After 10 min the solution was allowed to warm to room temperature, stirred for 2 h. The mixture was poured into cold water (1000 ml) slowly, diluted with dichloromethane (1000 ml). The organic phase was separated, washed with brine (300 ml×2), dried the organic phase over sodium sulfate, filtered. The solvent was removed under vacuum. The crude mass (98 g) was recrystallized from methanol (500 ml) to afford methyl 5-methoxy-2-nitro-4-(prop-2-yn-1-yloxy)benzoate (90 g, 95% yield) as pale yellow solid.

$^1$H NMR (400 MHz, DMSO-$d_6$) δ 7.76 (s, 1H), 7.36 (s, 1H), 5.02 (d, J=2.4 Hz, 2H), 3.94 (s, 3H), 3.84 (s, 3H), 3.70 (t, J=2.4 Hz, 1H).

Step-3: Methyl 7-methoxy-2-methyl-4-nitrobenzofuran-5-carboxylate

A mixture of methyl 5-methoxy-2-nitro-4-(prop-2-yn-1-yloxy)benzoate (20 g, 75 mmol), cesium fluoride (11.45 g, 75 mmol) and N,N-Diethyl Aniline (320 ml) were heated at 210° C. for 6 h. After completion, reaction mixture was allowed to room temperature, diluted with ethyl acetate (1000 ml) and filtered through celite. The filtrate was washed with 6 M HCl (5×300 ml) and brine (300 ml). The separated organic layer was dried over anhydrous $Na_2SO_4$, filtered and concentrated under reduced pressure. This residue (18 g) was purified by flash column chromatography with gradient elution (0-30%) of ethyl acetate to afford methyl 7-methoxy-2-methyl-4-nitrobenzofuran-5-carboxylate (9 g, 45.0% yield).

$^1$H NMR (400 MHz, DMSO-$d_6$) δ 7.21 (s, 1H), 7.02 (d, J=1.0 Hz, 1H), 4.08 (s, 3H), 3.87 (s, 3H), 2.54 (d, J=1.0 Hz, 3H).

Step-4: Methyl 4-amino-7-methoxy-2-methylbenzofuran-5-carboxylate

To a stirred solution of methyl 7-methoxy-2-methyl-4-nitrobenzofuran-5-carboxylate (24 g, 90 mmol) in EtOH (250 ml): Water (30 ml) were added iron (25.3 g, 452 mmol) and ammonium chloride (24.20 g, 452 mmol) at room temperature. The resulting mixture was stirred at 85° C. for 1 h. The reaction mass was concentrated and diluted with ethyl acetate (1000 ml), formed suspension filtered through celite bed and filtrate were washed with water (500 ml) and brine (500 ml). The organic layer was dried over anhydrous sodium sulphate, filtered and concentrated under reduced pressure. The crude solid (24 g) was crystallized in diethyl ether (200 ml) to afford methyl 4-amino-7-methoxy-2-methylbenzofuran-5-carboxylate (20 g, 94% yield) as an off white solid.

$^1$H NMR (400 MHz, DMSO-d$_6$) δ 7.09 (s, 1H), 6.86 (d, J=1.1 Hz, 1H), 6.81 (s, 2H, D$_2$O exchangeable), 3.81 (s, 3H), 3.79 (s, 3H), 2.42 (d, J=1.1 Hz, 3H).

Step-5: 6-methoxy-2,8-dimethylfluoro[2,3-h]quinazolin-4(3H)-one

To a stirred solution of methyl 4-amino-7-methoxy-2-methylbenzofuran-5-carboxylate (20 g, 85 mmol) in acetonitrile (200 ml) was added methane sulfonic acid (33.1 ml, 510 mmol) at 25° C. The resulting reaction mixture was stirred at 100° C. for 16 h. After completion of reaction, acetonitrile was evaporated; the residue was diluted with water (200 ml) and neutralized with saturated aqueous 20% sodium hydroxide solution. The precipitate formed was filtered off, the residue washed with water (30 ml×2) and dried under vacuum to afford 6-methoxy-2,8-dimethylfuro[2,3-h]quinazolin-4(3H)-one (15 g, 72.2% yield).

MS (ES+) m/z=245.1 (M+1).
$^1$H NMR (400 MHz, DMSO-d$_6$) δ 12.22 (s, 1H, D$_2$O exchangeable), 7.36 (s, 1H), 6.94 (d, J=1.2 Hz, 1H), 4.00 (s, 3H), 2.50 (s, 3H), 2.39 (s, 3H).

Step-6: 6-methoxy-2,8-dimethylfuro[2,3-h]quinazolin-4-yl-2,4,6-triisopropylbenzenesulfonate To a stirred suspension of 6-methoxy-2,8-dimethylfuro[2,3-h]quinazolin-4(3H)-one (2 g, 8.19 mmol) in THF (250 ml) were added potassium carbonate (3.39 g, 24.56 mmol), DMAP (1.100 g, 9.01 mmol) and 2,4,6-triisopropylbenzenesulfonyl chloride (3.72 g, 12.28 mmol) sequentially at 25° C. The resulting reaction mixture was stirred at 75° C. for 6 h. After complete consumption of starting material, reaction mixture was allowed to room temperature, diluted with ethyl acetate (500 ml). The suspended solid salt was filtered off and filtrate was concentrated under reduced pressure. This residue (6.5 g) was purified by column chromatography using gradient elution of (0-20%) of ethyl acetate in hexane to afford 6-methoxy-2,8-dimethylfuro[2,3-h]quinazolin-4-yl-2,4,6-triisopropylbenzenesulfonate (2.7 g, 64.6% yield).

MS (ES+) m/z: 511.06 (M+1).

Step-7: (R)—N-(1-(3-amino-5-(trifluoromethyl)phenyl)ethyl)-6-methoxy-2,8-dimethylfuro[2,3-h]quinazolin-4-amine To a stirred solution of 6-methoxy-2,8-dimethylfuro[2,3-h]quinazolin-4-yl 2,4,6-triisopropylbenzenesulfonate (2.7 g, 5.29 mmol) in DMSO (25 ml) were added (R)-3-(1-aminoethyl)-5-(trifluoromethyl)aniline (1.080 g, 5.29 mmol) and TEA (7.37 ml, 52.9 mmol) sequentially at room temperature. The resulting mixture was stirred at 90° C. for 16 h. After completion of reaction, reaction mixture was allowed to room temperature, diluted with ethyl acetate (200 ml) and washed with water (100 ml×2) and brine (100 ml). The separated organic layer was dried over anhydrous Na$_2$SO$_4$, filtered and concentrated under reduced pressure to get the residue (5.2 g). The residue was purified by flash column chromatography using gradient elution (0-20%) of ethyl acetate in hexane to afford (R)—N-(1-(3-amino-5-(trifluoromethyl)phenyl)ethyl)-6-methoxy-2,8-dimethylfuro[2,3-h]quinazolin-4-amine (1.2 g, 52.7% yield).

MS (ES+) m/z: 431.08 (M+1).

$^1$H NMR (400 MHz, DMSO-d$_6$) δ 8.07 (d, J=7.9 Hz, 1H, D$_2$O exchangeable), 7.62 (s, 1H), 6.98 (d, J=1.2 Hz, 1H), 6.91 (s, 1H), 6.88 (d, J=1.9 Hz, 1H), 6.71 (d, J=1.9 Hz, 1H), 5.62 (p, J=7.1 Hz, 1H), 5.55 (s, 2H, D$_2$O exchangeable), 4.05 (s, 3H), 2.55 (s, 3H), 2.44 (s, 3H), 1.58 (d, J=7.1 Hz, 3H).

Example-111: N—(R)-1-(3-amino-5-(trifluoromethyl)phenyl)ethyl)-2,8-dimethyl-6-(((S)-tetrahydrofuran-3-yl)oxy)furo[2,3-h]quinazolin-4-amine (Compound-111)

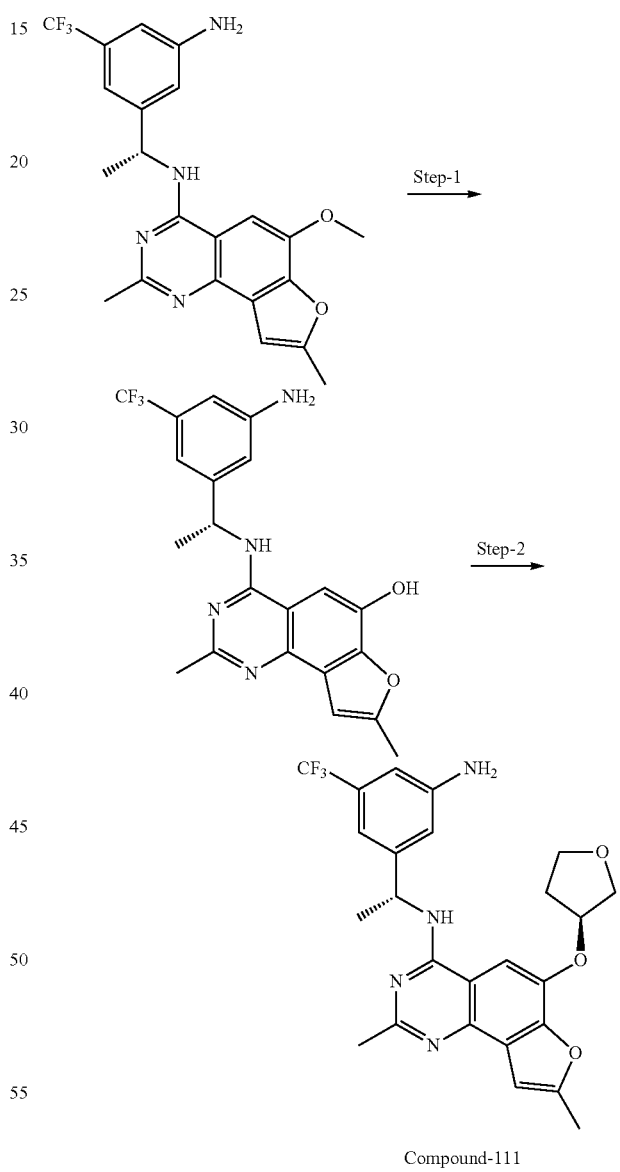

Compound-111

Step-1: (R)-4-((1-(3-amino-5-(trifluoromethyl)phenyl)ethyl)amino)-2,8-dimethylfuro[2,3-h]quinazolin-6-ol To a stirred solution of (R)—N-(1-(3-amino-5-(trifluoromethyl)phenyl)ethyl)-6-methoxy-2,8-dimethylfuro[2,3-h]quinazolin-4-amine (1.2 g, 2.79 mmol) in DMF (50 ml) was added sodium ethane thiolate (2.345 g, 27.9 mmol) at 25° C. The resulting reaction mixture was stirred at 100° C. for 16 h. After completion of reaction, reaction mixture was allowed to room temperature and diluted with water (10 ml) and neutralized with 10% HCl (PH: 7) solution at 0° C. The product was extracted with ethyl acetate (120 ml), organic layer washed with water (20 ml×2) and brine (20 ml). The separated organic layer was dried over anhydrous $Na_2SO_4$, filtered and concentrated. This residue (1.5 g) was purified by flash column chromatography using gradient elution (0-15%) of methanol in dichloromethane to afford (R)-4-((1-(3-amino-5-(trifluoromethyl)phenyl)ethyl)amino)-2,8-dimethylfuro[2,3-h]quinazolin-6-ol (1 g, 86% yield).

MS (ES+) m/z: 416.41 (M+).

$^1$H NMR (400 MHz, DMSO-$d_6$) δ 10.37 (s, 1H, $D_2O$ exchangeable), 8.20 (s, 1H, $D_2O$ exchangeable), 7.52 (s, 1H), 7.03 (s, 1H), 6.93 (s, 1H), 6.87 (s, 1H), 6.70 (s, 1H), 5.59 (p, J=7.1 Hz, 1H), 5.54 (bs, 2H, $D_2O$ exchangeable), 2.54 (d, J=1.1 Hz, 3H), 2.46 (s, 3H), 1.56 (d, J=7.1 Hz, 3H).

Step-2: N—(R)-1-(3-amino-5-(trifluoromethyl)phenyl)ethyl)-2,8-dimethyl-6-(((S)-tetrahydrofuran-3-yl)oxy)furo[2,3-h]quinazolin-4-amine To a stirred solution of (R)-4-((1-(3-amino-5-(trifluoromethyl)phenyl)ethyl)amino)-2,8-dimethylfuro[2,3-h]quinazolin-6-ol (0.2 g, 0.481 mmol) in DMF (10 ml) were added $Cs_2CO_3$ (0.173 g, 0.530 mmol) and (R)-tetrahydrofuran-3-yl 4-methylbenzenesulfonate (0.128 g, 0.530 mmol) at room temperature and heated at 90° C. for 1 h. After completion of reaction, the reaction mass was allowed to room temperature and diluted with ethyl acetate (60 ml), washed it with water (30 ml×2) and brine (30 ml). The separated organic layer was dried over $Na_2SO_4$, filtered and concentrated. This residue (200 mg) was purified by flash column chromatography using gradient elution (0-5%) of methanol in dichloromethane to afford N—((R)1-(3-amino-5-(trifluoromethyl)phenyl)ethyl)-2,8-dimethyl-6-(((S)-tetrahydrofuran-3-yl)oxy)furo[2,3-h]quinazolin-4-amine (0.15 g, 64.0% yield) as an off white solid.

MS (ES+) m/z: 487.17 (M+1).

$^1$H NMR (400 MHz, DMSO-$d_6$) δ 8.04 (s, 1H), 7.59 (s, 1H), 6.99 (d, J=1.3 Hz, 1H), 6.89 (s, 1H), 6.87 (s, 1H), 6.71 (d, J=1.9 Hz, 1H), 5.64 (p, J=7.3 Hz, 1H), 5.56 (s, 2H), 5.42-5.38 (m, 1H), 4.06-4.02 (m, 1H), 3.99-3.89 (m, 2H), 3.87-3.82 (m, 1H), 2.50 (s, 3H), 2.44 (s, 3H), 2.41-2.32 (m, 1H), 2.18-2.09 (m, 1H), 1.58 (d, J=7.1 Hz, 3H).

Example-112: N—((R)-1-(3-amino-5-(trifluoromethyl)phenyl)ethyl)-2,8,8-trimethyl-6-(((S)-tetrahydrofuran-3-yl)oxy)-8,9-dihydrofuro[2,3-h]quinazolin-4-amine (Compound-112)

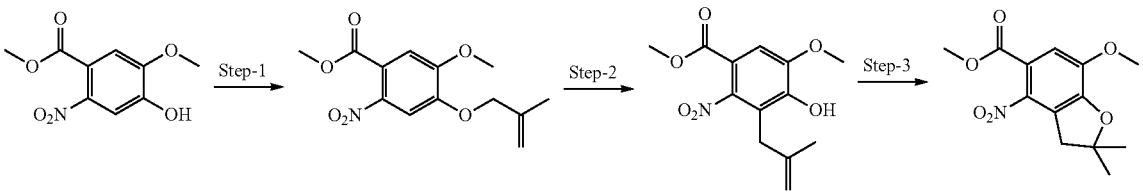

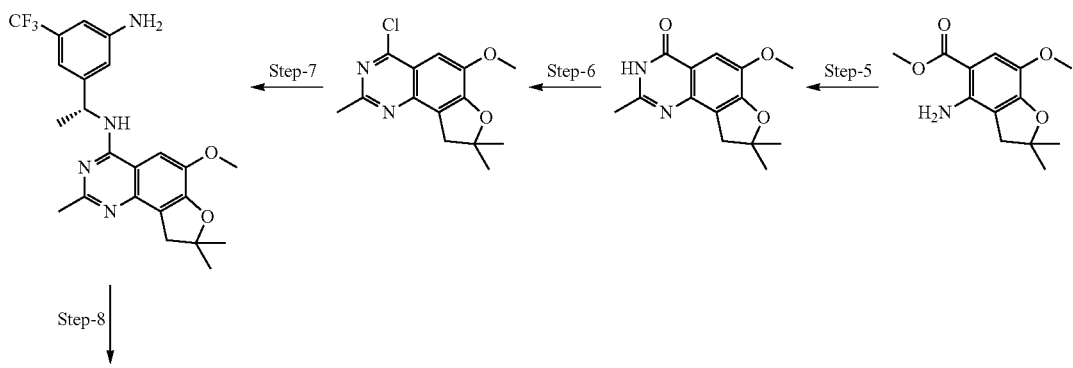

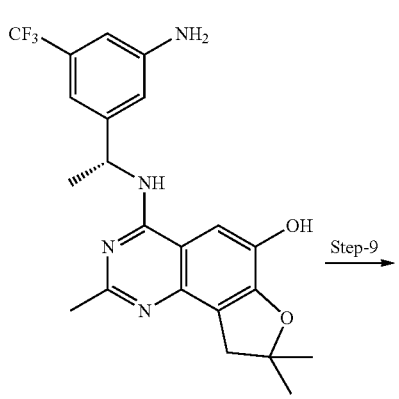 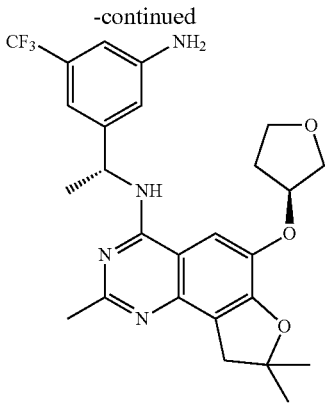

Compound-112

Step-1: Methyl 5-methoxy-4-((2-methylallyl)oxy)-2-nitrobenzoate

To a stirred solution of commercially available methyl 4-hydroxy-5-methoxy-2-nitrobenzoate (26 g, 114 mmol) in DMF (200 ml) were added $K_2CO_3$ (23.73 g, 172 mmol) and 3-chloro-2-methylprop-1-ene (13.47 g, 149 mmol) at room temperature. The resulting mixture was stirred for 3 h at 85° C. The reaction mass was allowed to room temperature and diluted with ethyl acetate (500 ml), washed with water (300 ml×3) and brine (300 ml). The separated organic layer was dried over $Na_2SO_4$, filtered and concentrated. This residue was purified by flash column chromatography with gradient elution 10 to 20% ethyl acetate in hexane to afford methyl 5-methoxy-4-((2-methylallyl)oxy)-2-nitrobenzoate (30 g, 93% yield) as brown oil on standing for longer time it turns to solid.

MS (ES+) m/z=281.59 (M+).
$^1$H NMR (400 MHz, DMSO-$d_6$) δ 7.65 (s, 1H), 7.34 (s, 1H), 5.09 (t, J=1.8 Hz, 1H), 5.01 (t, J=1.8 Hz, 1H), 4.66 (s, 2H), 3.94 (s, 3H), 3.83 (s, 3H), 1.77 (s, 3H).

Step-2: Methyl 4-hydroxy-5-methoxy-3-(2-methylallyl)-2-nitrobenzoate

A mixture of methyl 5-methoxy-4-((2-methylallyl)oxy)-2-nitrobenzoate (30 g, 107 mmol) and NMP (300 ml) was heated at 210° C. for 3 h. After completion of reaction, reaction mixture was allowed to room temperature and diluted with ethyl acetate (1000 ml), washed organics with water (500 ml×5), brine (500 ml). The separated organic layer was dried over anhydrous $Na_2SO_4$, filtered and concentrated under reduced pressure. This residue was purified by flash column chromatography with gradient elution (20 to 30%) of ethyl acetate in hexane to afford methyl 4-hydroxy-5-methoxy-3-(2-methylallyl)-2-nitrobenzoate (8.5 g, 28.3% yield).

MS (ES+) m/z=282.1 (M+1).
$^1$H NMR (400 MHz, DMSO-$d_6$) δ 10.47 (s, 1H, $D_2O$ exchangeable), 7.40 (s, 1H), 4.70-4.66 (m, 1H), 4.35-4.26 (m, 1H), 3.94 (s, 3H), 3.79 (s, 3H), 3.23 (s, 2H), 1.67 (s, 3H).

Step-3: Methyl 7-methoxy-2,2-dimethyl-4-nitro-2,3-dihydrobenzofuran-5-carboxylate The mixture of methyl 4-hydroxy-5-methoxy-3-(2-methylallyl)-2-nitrobenzoate (8.5 g, 30.2 mmol) in formic acid (100 ml) was heated to 110° C. for 2 h. After completion of reaction, reaction mass was allowed to room temperature and concentrated under reduced pressure. The crude mass was diluted with ethyl acetate (500 ml), washed with saturated solution of sodium bicarbonate (200 ml×2), water (200 ml) and brine (200 ml). The separated organic layer was dried over $Na_2SO_4$, filtered and concentrated. This residue was purified by flash column chromatography using gradient elution (0 to 30%) of ethyl acetate in hexane to afford methyl 7-methoxy-2,2-dimethyl-4-nitro-2,3-dihydrobenzofuran-5-carboxylate (6.2 g, 72.9% yield) as white solid.

MS (ES+) m/z=282.09 (M+1).
$^1$H NMR (400 MHz, DMSO-$d_6$) δ 7.26 (s, 1H), 3.90 (s, 3H), 3.80 (s, 3H), 3.31 (s, 2H), 1.47 (s, 6H).

Step-4: Methyl 4-amino-7-methoxy-2,2-dimethyl-2,3-dihydrobenzofuran-5-carboxylate The title compound was synthesized by using Methyl 7-methoxy-2,2-dimethyl-4-nitro-2,3-dihydrobenzofuran-5-carboxylate and following analogous reaction protocol as described in Step-4 of Example-110.

MS (ES+) m/z=252.21 (M+1).
$^1$H NMR (400 MHz, DMSO-$d_6$) δ 7.14 (s, 1H), 6.21 (s, 2H, $D_2O$ exchangeable), 3.75 (s, 3H), 3.65 (s, 3H), 2.84 (s, 2H), 1.43 (s, 6H).

Step-5: 6-methoxy-2,8,8-trimethyl-8,9-dihydrofuro[2,3-h]quinazolin-4-(3H)-one The title compound was synthesized by using Methyl 4-amino-7-methoxy-2,2-dimethyl-2,3-dihydrobenzofuran-5-carboxylate and following analogous reaction protocol as described in Step-5 of Example-110.

$^1$H NMR (400 MHz, DMSO-$d_6$) δ 11.95 (s, 1H, $D_2O$ exchangeable), 7.36 (s, 1H), 3.84 (s, 3H), 3.18 (s, 2H), 2.30 (s, 3H), 1.47 (s, 6H). MS (ES+) m/z=261.02 (M+1).

Step-6: 4-chloro-6-methoxy-2,8,8-trimethyl-8,9-dihydrofuro[2,3-h]quinazoline To a stirred solution of 6-methoxy-2,8,8-trimethyl-8,9-dihydrofuro[2,3-h]quinazolin-4(3H)-one (4.5 g, 17.29 mmol) in chlorobenzene (100 ml) was added DIPEA (7.85 ml, 44.9 mmol) followed by drop wise addition of $POCl_3$ (3.54 ml, 38.0 mmol) at room temperature. The resulting reaction mixture was heated at 90° C. for 16 h. After completion of reaction, the reaction mass was allowed room temperature and concentrated under vacuum. The crude mass was diluted with ethyl acetate (500 ml), washed with water (100 ml×2) and brine (100 ml). The separated organic layer was dried over $Na_2SO_4$, filtered and concentrated. The crude product was purified by flash column chromatography using gradient elution of 0 to 40% ethyl acetate in hexane to afford 4-chloro-6-methoxy-2,8,8-trimethyl-8,9-dihydrofuro[2,3-h]quinazoline (4 g, 83% yield) as brown solid.

MS (ES+) m/z=279.27 (M+1).

$^1$H NMR (400 MHz, DMSO-d$_6$) δ 7.33 (s, 1H), 3.97 (s, 3H), 3.35 (s, 2H), 2.66 (s, 3H), 1.54 (s, 6H).

Step-7: (R)—N-(1-(3-amino-5-(trifluoromethyl)phenyl)ethyl)-6-methoxy-2,8,8-trimethyl-8,9-dihydrofuro[2,3-h]quinazolin-4-amine To a stirred solution of 4-chloro-6-methoxy-2,8,8-trimethyl-8,9-dihydrofuro[2,3-h]quinazoline (3 g, 10.76 mmol) in EtOH (50 ml) were added (R)-3-(1-aminoethyl)-5-(trifluoromethyl)aniline (1.978 g, 9.69 mmol) (Intermediate-10) and TEA (15.00 ml, 108 mmol) at room temperature. The resulting reaction mixture was heated at 100° C. for 64 h. After completion of reaction, allowed it to room temperature and concentrated under vacuum. This residue was purified by flash column chromatography using gradient elution of 0 to 5% MeOH in DCM to afford (R)—N-(1-(3-amino-5-(trifluoromethyl)phenyl)ethyl)-6-methoxy-2,8,8-trimethyl-8,9-dihydrofuro[2,3-h]quinazolin-4-amine (3.5 g, 72.8% yield) as light brown solid.

MS (ES+) m/z=447.17 (M+1).

$^1$H NMR (400 MHz, DMSO-d$_6$) δ 9.19 (s, 1H), 7.94 (s, 1H), 6.91-6.89 (m, 1H), 6.88-6.85 (m, 1H), 6.75-6.71 (m, 1H), 5.68 (p, J=7.2 Hz, 1H), 5.60 (s, 2H), 3.95 (s, 3H), 3.28 (s, 2H), 2.52 (s, 3H), 1.62 (d, J=7.0 Hz, 3H), 1.52 (s, 3H), 1.50 (s, 3H).

Step-8: (R)-4-((1-(3-amino-5-(trifluoromethyl)phenyl)ethyl)amino)-2,8,8-trimethyl-8,9-dihydrofuro[2,3-h]quinazolin-6-ol The title compound was synthesized by using (R)—N-(1-(3-amino-5-(trifluoromethyl)phenyl)ethyl)-6-methoxy-2,8,8-trimethyl-8,9-dihydrofuro[2,3-h]quinazolin-4-amine and following analogous reaction protocol as described in step-1 of Example-111.

MS (ES+) m/z=433.17 (M+1).

$^1$H NMR (400 MHz, DMSO-d$_6$) δ 9.54 (s, 1H, D$_2$O exchangeable), 7.92 (s, 1H, D$_2$O exchangeable), 7.54 (s, 1H), 6.90-6.88 (m, 1H), 6.84-6.82 (m, 1H), 6.69-6.67 (m, 1H), 5.56-5.47 (m, 3H), 3.20 (s, 2H), 2.34 (s, 3H), 1.54-1.47 (m, 9H).

Step-9: N—((R)-1-(3-amino-5-(trifluoromethyl)phenyl)ethyl)-2,8,8-trimethyl-6-(((S)-tetrahydrofuran-3-yl)oxy)-8,9-dihydrofuro[2,3-h]quinazolin-4-amine The title compound was synthesized by using (R)-4-((1-(3-amino-5-(trifluoromethyl)phenyl)ethyl)amino)-2,8,8-trimethyl-8,9-dihydrofuro[2,3-h]quinazolin-6-ol and following analogous reaction protocol as described in Step-2 of Example-111.

MS (ES+) m/z=503.30 (M+1).

$^1$H NMR (400 MHz, DMSO-d$_6$) δ 7.96 (s, 1H), 7.65 (s, 1H), 6.88-6.86 (m, 1H), 6.85-6.83 (m, 1H), 6.71-6.68 (m, 1H), 5.62-5.55 (m, 1H), 5.54 (s, 2H), 5.22-5.17 (m, 1H), 3.99-3.76 (m, 4H), 3.19 (s, 2H), 2.35 (s, 3H), 2.32-2.23 (m, 1H), 2.09-1.98 (m, 1H), 1.55 (d, J=7.0 Hz, 3H), 1.50 (s, 3H), 1.47 (s, 3H).

Example-113: (R)—N-(1-(3-amino-5-(trifluoromethyl)phenyl)ethyl)-2,8,8-trimethyl-6-morpholino-8,9-dihydrofuro[2,3-h]quinazolin-4-amine (Compound-113)

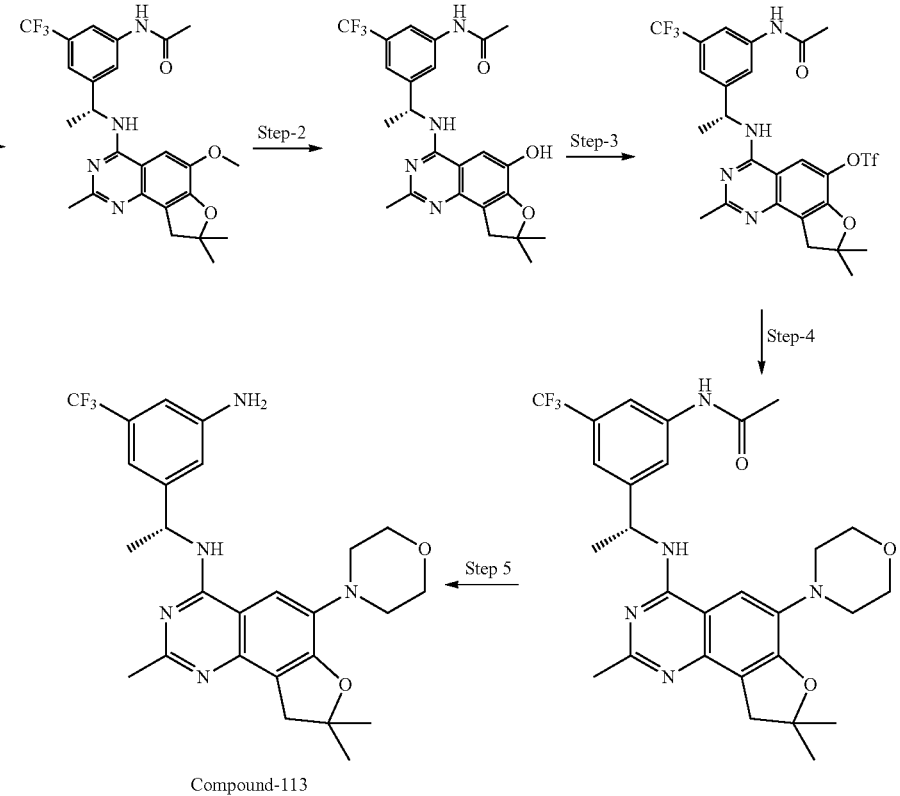

Compound-113

Step-1: (R)—N-(3-(1-((6-methoxy-2,8,8-trimethyl-8,9-dihydrofuro[2,3-h]quinazolin-4-yl)amino)ethyl)-5-(trifluoromethyl)phenyl)acetamide To a stirred solution of (R)—N-(1-(3-amino-5-(trifluoromethyl)phenyl)ethyl)-6-methoxy-2,8,8-trimethyl-8,9-dihydrofuro[2,3-h]quinazolin-4-amine (1.34 g, 3.00 mmol) in dichloromethane (20 ml) were added DIPEA (2.097 ml, 12.01 mmol) and DMAP (0.037 g, 0.300 mmol) at room temperature. The resulting mixture was cooled to 0° C. and then acetyl chloride (0.256 ml, 3.60 mmol) was added drop wise. The resulting reaction mixture was allowed to room temperature and stirred for 16 h. After completion of reaction, diluted with dichloromethane (100 ml), washed with water (50 ml) and brine (50 ml). The separated organic layer was dried over $Na_2SO_4$, filtered and concentrated under reduced pressure. This residue was purified by flash column chromatography using gradient elution of 1 to 5% of MeOH in DCM to afford (R)—N-(3-(1-((6-methoxy-2,8,8-trimethyl-8,9-dihydrofuro[2,3-h]quinazolin-4-yl)amino)ethyl)-5-(trifluoromethyl)phenyl)acetamide (1.4 g, 95% yield) as brown solid.

MS (ES+) m/z=489.17 (M+1).

Step-2: (R)—N-(3-(1-((6-hydroxy-2,8,8-trimethyl-8,9-dihydrofuro[2,3-h]quinazolin-4-yl)amino)ethyl)-5-(trifluoromethyl)phenyl)acetamide The title compound was synthesized using (R)—N-(3-(1-((6-methoxy-2,8,8-trimethyl-8,9-dihydrofuro[2,3-h]quinazolin-4-yl)amino)ethyl)-5-(trifluoromethyl)phenyl)acetamide and following analogous reaction protocol as described in Step-1 of Example-111.

MS (ES+) m/z=475.17 (M+1).

Step-3: (R)-4-((1-(3-acetamido-5-(trifluoromethyl)phenyl)ethyl)amino)-2,8,8-trimethyl-8,9-dihydrofuro[2,3-h]quinazolin-6-yl trifluoromethanesulfonate The mixture of (R)—N-(3-(1-((6-hydroxy-2,8,8-trimethyl-8,9-dihydrofuro[2,3-h]quinazolin-4-yl)amino)ethyl)-5-(trifluoromethyl)phenyl)acetamide (0.271 g, 0.571 mmol) and DIPEA (0.120 ml, 0.685 mmol) in dichloromethane (10 ml) was chilled to −15° C., to this trifluoromethanesulfonic anhydride (0.115 ml, 0.685 mmol) was added slowly under the Nitrogen atmosphere. The resulting mixture was stirred for 3 hr at same temperature. After completion of reaction, quenched the reaction mixture with methanol (1.0 ml) and stirred for 5 min at room temperature, it was diluted with dichloromethane (100 ml) and washed with saturated solution of $NaHCO_3$ (50 ml) and brine (50 ml). The organic phase was dried over $Na_2SO_4$, filtered and concentrated. This residue was purified by flash column chromatography using gradient elution (1 to 5%) of MeOH in dichloromethane to afford (R)-4-((1-(3-acetamido-5-(trifluoromethyl)phenyl)ethyl)amino)-2,8,8-trimethyl-8,9-dihydrofuro[2,3-h]quinazolin-6-yl trifluoromethanesulfonate (0.33 g, 95%) as light brown oil.

MS (ES+) m/z=606.83 (M+1).

Step-4: (R)—N-(3-(trifluoromethyl)-5-(1-((2,8,8-trimethyl-6-morpholino-8,9-dihydrofuro[2,3-h]quinazolin-4-yl)amino)ethyl)phenyl)acetamide To a sealed tube containing a solution of (R)-4-((1-(3-acetamido-5-(trifluoromethyl)phenyl)ethyl)amino)-2,8,8-trimethyl-8,9-dihydrofuro[2,3-h]quinazolin-6-yl trifluoromethanesulfonate (0.32 g, 0.528 mmol) and $Cs_2CO_3$ (0.516 g, 1.583 mmol) in toluene (14 ml) was added morpholine (0.460 g, 5.28 mmol). The mixture was thoroughly deoxygenated by purging Nitrogen for 15 min and then palladium(II) acetate (0.012 g, 0.053 mmol) and 2-(dicyclohexylphosphino)-2',4',6'-tri-i-propyl-1,1'-biphenyl (X-Phos) (0.050 g, 0.106 mmol) were added. The resulting reaction mixture was stirred at 120° C. for 8 h. After completion of reaction, reaction mass was allowed to room temperature, diluted with ethyl acetate (50 ml) and filtered through celite. The cake was washed with ethyl acetate (20 ml×2). The combined organic layer was concentrated under vacuum. This residue (0.32 g) was purified by flash column chromatography by using gradient elution (1 to 5%) of MeOH in DCM to afford (R)—N-(3-(trifluoromethyl)-5-(1-((2,8,8-trimethyl-6-morpholino-8,9-dihydrofuro[2,3-h]quinazolin-4-yl)amino)ethyl)phenyl)acetamide (0.1 g, 34.9%) as off white solid.

MS (ES+) m/z=543.87 (M+1).

Step-5: (R)—N-(1-(3-amino-5-(trifluoromethyl)phenyl)ethyl)-2,8,8-trimethyl-6-morpholino-8,9-dihydrofuro[2,3-h]quinazolin-4-amine To a stirred solution of (R)—N-(3-(trifluoromethyl)-5-(1-((2,8,8-trimethyl-6-morpholino-8,9-dihydrofuro[2,3-h]quinazolin-4-yl)amino)ethyl)phenyl)acetamide (0.1 g, 0.184 mmol) in methanol (5 ml) was added Conc. HCl (0.153 ml, 1.840 mmol) at room temperature. The resulting reaction mixture was heated at 60° C. for 6 h. After completion of reaction, reaction mass was concentrated under vacuum. The obtained solid was washed with diethyl ether (10 ml×3). The solid compound was added in saturated solution of sodium bicarbonate (10 ml), product was extracted in ethyl acetate (30 ml×3). The combined organic layer was washed with water (10 ml) and brine (20 ml). The separated organic layer was dried over $Na_2SO_4$, filtered and evaporated to afford (R)—N-(1-(3-amino-5-(trifluoromethyl)phenyl)ethyl)-2,8,8-trimethyl-6-morpholino-8,9-dihydrofuro[2,3-h]quinazolin-4-amine (0.030 g, 32.5%) as light brown solid.

$^1$H NMR (400 MHz, DMSO-$d_6$) δ 7.99 (d, J=8.0 Hz, 1H), 7.45 (s, 1H), 6.87 (s, 1H), 6.86-6.84 (m, 1H), 6.70-6.68 (m, 1H), 5.64-5.55 (m, 1H), 5.54 (s, 2H), 3.81-3.76 (m, 4H), 3.17 (s, 2H), 3.16-3.12 (m, 4H), 2.34 (s, 3H), 1.55 (d, J=7.1 Hz, 3H), 1.49 (s, 3H), 1.47 (s, 3H).

MS (ES+) m/z=502.24 (M+1).

Example-114: (R)—N-(1-(3-amino-5-(trifluoromethyl)phenyl)ethyl)-2,8,8-trimethyl-6-(2-oxa-6-azaspiro[3.3]heptan-6-yl)-8,9-dihydrofuro[2,3-h]quinazolin-4-amine (Compound-114)

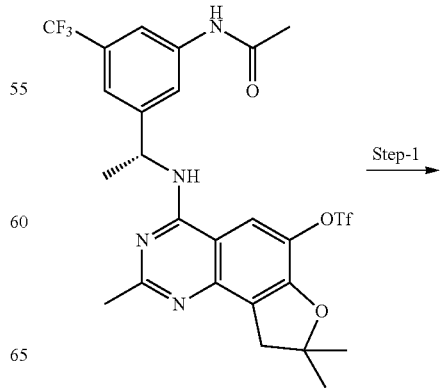

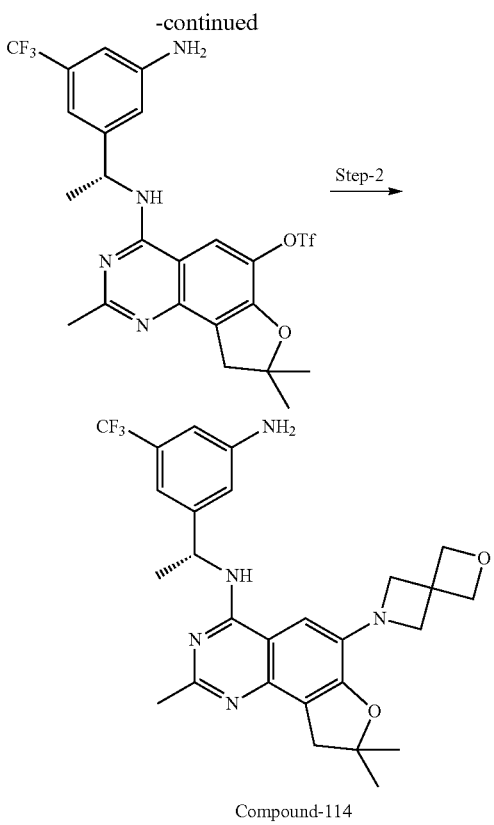

Compound-114

Step-1: (R)-4-((1-(3-amino-5-(trifluoromethyl)phenyl)ethyl)amino)-2,8,8-trimethyl-8,9-dihydrofuro[2,3-h]quinazolin-6-yl trifluoromethanesulfonate The title compound was synthesized by using (R)-4-((1-(3-acetamido-5-(trifluoromethyl)phenyl)ethyl)amino)-2,8,8-trimethyl-8,9-dihydrofuro[2,3-h]quinazolin-6-yl trifluoromethanesulfonate and following analogous reaction protocol as described in Step-5 of Example-113.

MS (ES+) m/z=565.10 (M+1).

Step-2: (R)—N-(1-(3-amino-5-(trifluoromethyl)phenyl)ethyl)-2,8,8-trimethyl-6-(2-oxa-6-azaspiro[3.3]heptan-6-yl)-8,9-dihydrofuro[2,3-h]quinazolin-4-amine The title compound was synthesized using (R)-4-((1-(3-amino-5-(trifluoromethyl)phenyl)ethyl)amino)-2,8,8-trimethyl-8,9-dihydrofuro[2,3-h]quinazolin-6-yl trifluoromethanesulfonate following analogous reaction protocol as described in Step-4 of Example-113.

MS (ES+) m/z=513.24 (M+).

$^1$H NMR (400 MHz, DMSO-$d_6$) δ 7.93 (s, 1H), 7.07 (s, 1H), 6.87 (s, 1H), 6.85-6.83 (m, 1H), 6.67-6.68 (m, 1H), 5.61-5.55 (m, 1H), 5.54 (s, 2H), 4.74 (s, 4H), 4.09 (s, 4H), 3.13 (s, 2H), 2.34 (s, 3H), 1.54 (d, J=7.0 Hz, 3H), 1.47 (s, 3H), 1.45 (s, 3H).

Example-115: (R)—N-(1-(3-amino-5-(difluoromethyl)phenyl)ethyl)-2,8,8-trimethyl-6-morpholino-8,9-dihydrofuro[2,3-h]quinazolin-4-amine (Compound-115)

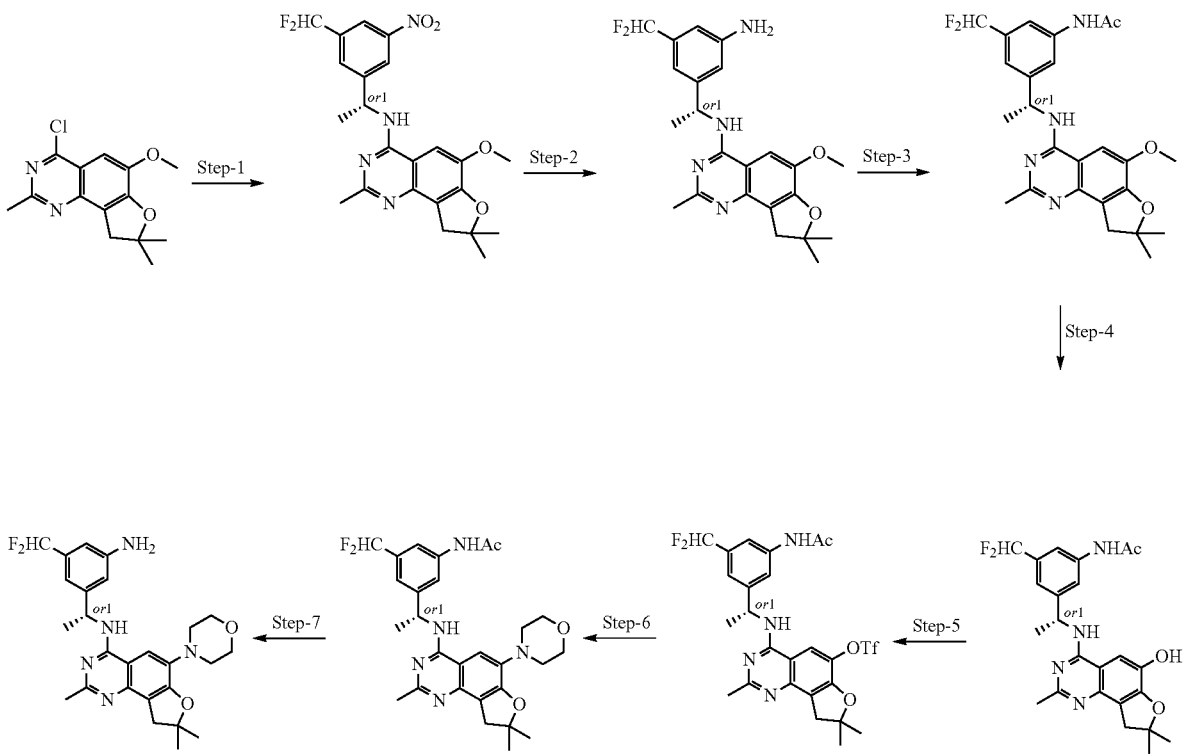

Compound-115

Step-1: (R/S)—N-(1-(3-(difluoromethyl)-5-nitrophenyl)ethyl)-6-methoxy-2,8,8-trimethyl-8,9-dihydrofuro[2,3-h]quinazolin-4-amine The title compound was synthesized by using 4-chloro-6-methoxy-2,8,8-trimethyl-8,9-dihydrofuro[2,3-h]quinazoline and following analogous reaction protocol as described Step-7 of Example-112.

MS (ES+) m/z=459.17 (M+1).

Step-2: (R/S)—N-(1-(3-amino-5-(difluoromethyl)phenyl)ethyl)-6-methoxy-2,8,8-trimethyl-8,9-dihydrofuro[2,3-h]quinazolin-4-amine The title compound was synthesized by using (R/S)—N-(1-(3-(difluoromethyl)-5-nitrophenyl)ethyl)-6-methoxy-2,8,8-trimethyl-8,9-dihydrofuro[2,3-h]quinazolin-4-amine and following analogous reaction protocol as described Step-4 of Example-110.

MS (ES+) m/z=429.17 (M+1).

Step-3: (R/S)—N-(3-(difluoromethyl)-5-(1-((6-methoxy-2,8,8-trimethyl-8,9-dihydrofuro[2,3-h]quinazolin-4-yl)amino)ethyl)phenyl)acetamide The title compound was synthesized using (R/S)—N-(1-(3-amino-5-(difluoromethyl)phenyl)ethyl)-6-methoxy-2,8,8-trimethyl-8,9-dihydrofuro[2,3-h]quinazolin-4-amine and following analogous reaction protocol as described Step-1 of Example-113.

MS (ES+) m/z=471.17 (M+1).

Step-4: (R/S)—N-(3-(difluoromethyl)-5-(1-((6-hydroxy-2,8,8-trimethyl-8,9-dihydrofuro[2,3-h]quinazolin-4-yl)amino)ethyl)phenyl)acetamide The title compound was synthesized using (R/S)—N-(3-(difluoromethyl)-5-(1-((6-methoxy-2,8,8-trimethyl-8,9-dihydrofuro[2,3-h]quinazolin-4-yl)amino)ethyl)phenyl)acetamide and following analogous reaction protocol as described Step-1 of Example-111.

MS (ES+) m/z=457.17 (M+1).

Step-5: (R/S)-4-((1-(3-acetamido-5-(difluoromethyl)phenyl)ethyl)amino)-2,8,8-trimethyl-8,9-dihydrofuro[2,3-h]quinazolin-6-yl trifluoromethanesulfonate The title compound was synthesized using (R/S)—N-(3-(difluoromethyl)-5-(1-((6-hydroxy-2,8,8-trimethyl-8,9-dihydrofuro[2,3-h]quinazolin-4-yl)amino)ethyl)phenyl)acetamide and following analogous reaction protocol as described in Step-3 of Example-113.

MS (ES+) m/z=589.13 (M+1).

Step-6: (R/S)—N-(3-(difluoromethyl)-5-(1-((2,8,8-trimethyl-6-morpholino-8,9-dihydrofuro[2,3-h]quinazolin-4-yl)amino)ethyl)phenyl)acetamide The title compound was synthesized using (R/S)-4-((1-(3-acetamido-5-(difluoromethyl)phenyl)ethyl)amino)-2,8,8-trimethyl-8,9-dihydrofuro[2,3-h]quinazolin-6-yl trifluoromethanesulfonate and following analogous reaction protocol as described in Step-4 of Example-113.

MS (ES+) m/z=526.24 (M+1).

Step-7: (R/S)—N-(1-(3-amino-5-(difluoromethyl)phenyl)ethyl)-2,8,8-trimethyl-6-morpholino-8,9-dihydrofuro[2,3-h]quinazolin-4-amine The title compound was synthesized using (R/S)—N-(3-(difluoromethyl)-5-(1-((2,8,8-trimethyl-6-morpholino-8,9-dihydrofuro[2,3-h]quinazolin-4-yl)amino)ethyl)phenyl)acetamide and following analogous reaction protocol as described in Step-5 of Example-113.

MS (ES+) m/z=483.99 (M+1).

$^1$H NMR (400 MHz, DMSO-$d_6$) δ 7.50 (d, J=8.1 Hz, 1H), 6.83 (s, 1H) 6.82 (t, J=54 Hz, 1H), 6.77-6.72 (m, 2H), 6.59 (s, 1H), 5.71-5.57 (m, 1H), 5.36 (s, 2H), 3.81-3.75 (m, 4H), 3.18 (s, 2H), 3.17-3.11 (m, 4H), 2.40 (s, 3H), 1.55 (d, J=7.1 Hz, 3H), 1.51 (s, 3H), 1.49 (s, 3H).

Example-116: (R/S)—N-(1-(3-amino-5-(difluoromethyl)phenyl)ethyl)-2,8,8-trimethyl-6-(2-oxa-6-azaspiro[3.3]heptan-6-yl)-8,9-dihydrofuro[2,3-h]quinazolin-4-amine (Compound-116)

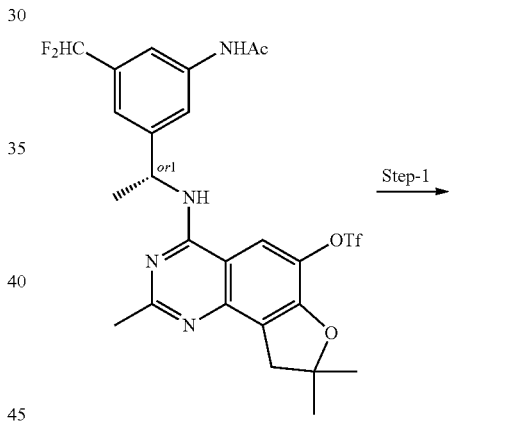

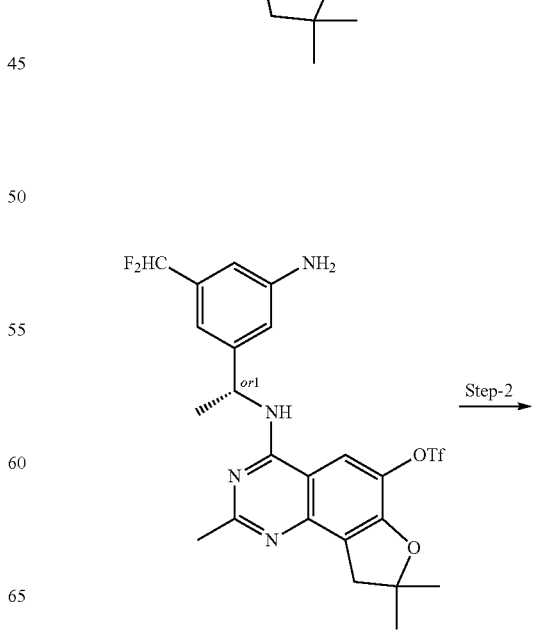

-continued

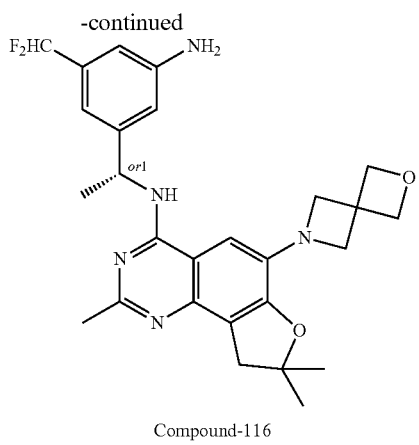

Compound-116

Step-1: (R/S)-4-((1-(3-amino-5-(difluoromethyl)phenyl)ethyl)amino)-2,8,8-trimethyl-8,9-dihydrofuro[2,3-h]quinazolin-6-yl trifluoromethanesulfonate The title compound was synthesized using (R/S)-4-((1-(3-acetamido-5-(difluoromethyl)phenyl)ethyl)amino)-2,8,8-trimethyl-8,9-dihydrofuro[2,3-h]quinazolin-6-yl trifluoromethanesulfonate and following analogous reaction protocol as described in Step-5 of Example-113.

MS (ES+) m/z=547.2 (M+1).

Step-2: (R/S)—N-(1-(3-amino-5-(difluoromethyl)phenyl)ethyl)-2,8,8-trimethyl-6-(2-oxa-6-azaspiro[3.3]heptan-6-yl)-8,9-dihydrofuro[2,3-h]quinazolin-4-amine The title compound was synthesized using (R/S)-4-((1-(3-amino-5-(difluoromethyl)phenyl)ethyl)amino)-2,8,8-trimethyl-8,9-dihydrofuro[2,3-h]quinazolin-6-yl trifluoromethanesulfonate and following analogous reaction protocol as described in Step-4 of Example-113.

MS (ES+) m/z=496.3 (M+1).

$^1$H NMR (400 MHz, DMSO-d$_6$) δ 7.85 (s, 1H), 7.08 (s, 1H), 6.82 (t, J=56 Hz, 1H), 6.74 (s, 1H), 6.73 (s, 1H), 6.57 (s, 1H), 5.58 (p, J=7.2 Hz, 1H), 5.34 (s, 2H), 4.73 (s, 4H), 4.08 (s, 4H), 3.13 (s, 2H), 2.33 (s, 3H), 1.53 (d, J=7.2 Hz, 3H), 1.47 (s, 3H), 1.45 (s, 3H).

Example-117: (R/S)—N—((R)-1-(3-amino-5-(trifluoromethyl)phenyl)ethyl)-2,8-dimethyl-6-morpholino-8,9-dihydrofuro[2,3-h]quinazolin-4-amine (Compound-117a) and (S/R)—N—((R)-1-(3-amino-5-(trifluoromethyl)phenyl)ethyl)-2,8-dimethyl-6-morpholino-8,9-dihydrofuro[2,3-h]quinazolin-4-amine (Compound-117b)

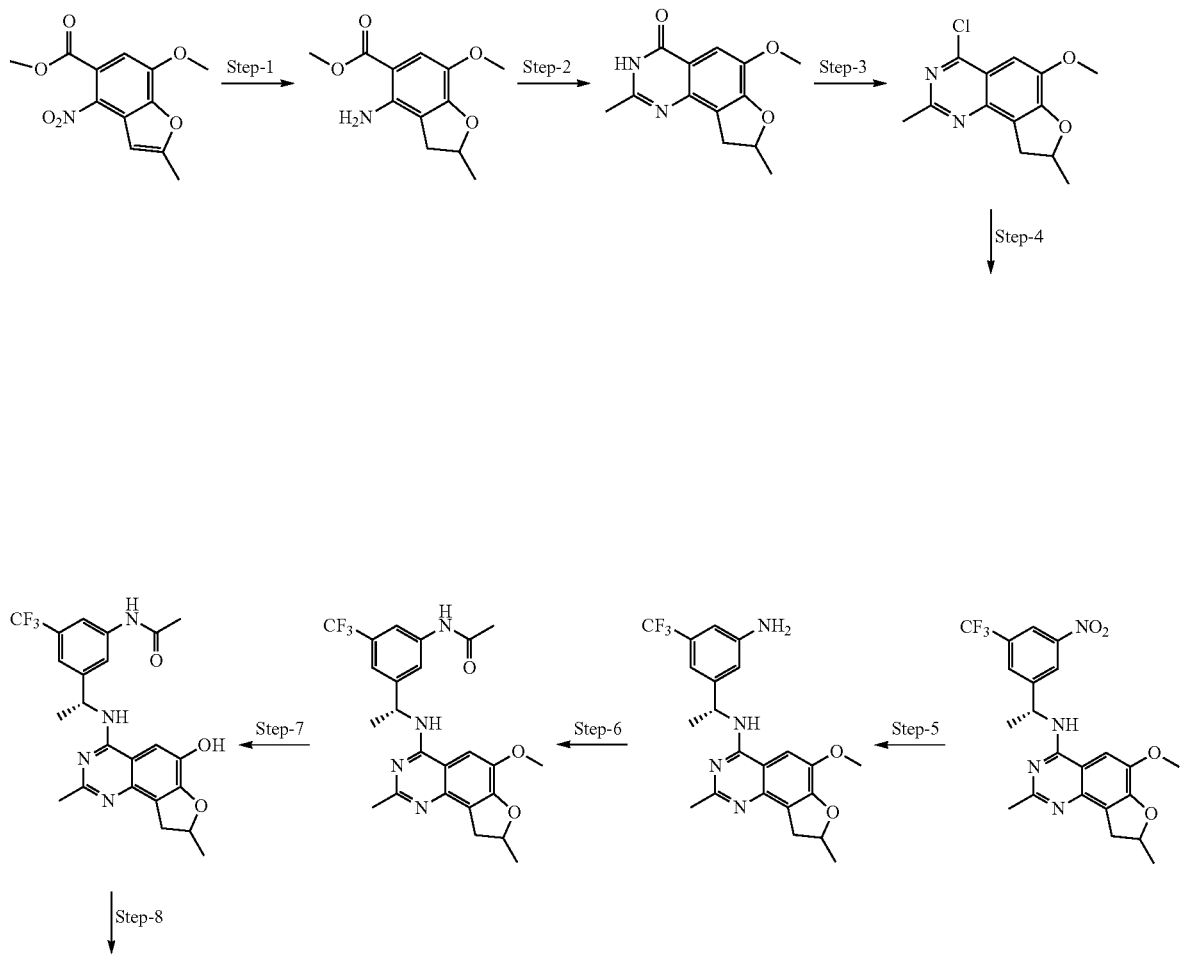

221

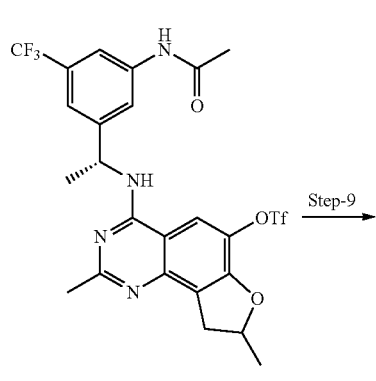

Step-9

-continued

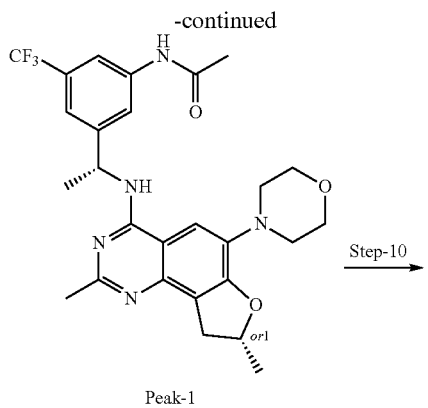

Peak-1

Step-10

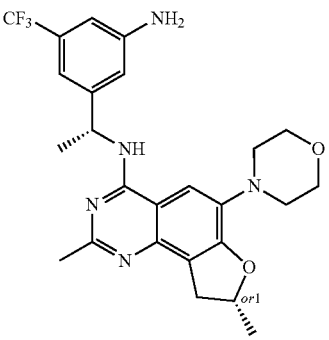

Compound-117a

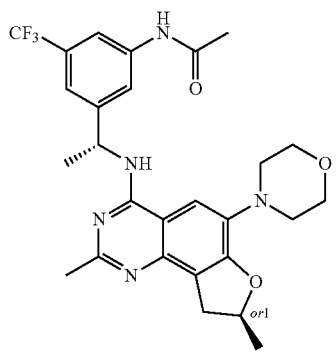

Peak-2

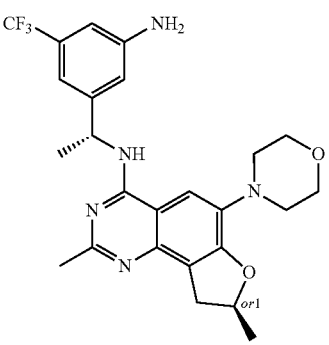

Compound-117b

Step-1: Methyl 4-amino-7-methoxy-2-methyl-2,3-dihydrobenzofuran-5-carboxylate To a stirred solution of methyl 7-methoxy-2-methyl-4-nitrobenzofuran-5-carboxylate (5 g, 18.85 mmol) in EtOH (50 ml) was added 10% wet Pd—C (2.006 g, 1.885 mmol) at room temperature. The reaction mixture was stirred for 64 h under $H_2$ atmosphere (64 psi). After completion of reaction, the reaction mixture was diluted with MeOH (100 ml) and filtered through celite pad, filtrate was concentrated under reduced pressure to get crude residue (2.3 g). The crude residue was purified by flash column chromatography with gradient elution (0 to 30%) ethyl acetate in hexane to afford methyl 4-amino-7-methoxy-2-methyl-2,3-dihydrobenzofuran-5-carboxylate (1.3 g, 29.1% yield).

$^1$H NMR (400 MHz, DMSO-$d_6$) δ 7.15 (s, 1H), 6.23 (s, 2H), 5.07-4.98 (m, 1H), 3.75 (s, 3H), 3.66 (s, 3H), 3.28-3.06 (m, 1H), 2.64-2.53 (m, 1H), 1.39 (d, J=6.3 Hz, 3H).

Step-2: 6-methoxy-2,8-dimethyl-8,9-dihydrofuro[2,3-h]quinazolin-4(3H)-one

The title compound was synthesized using Methyl 4-amino-7-methoxy-2-methyl-2,3-dihydrobenzofuran-5-carboxylate and following analogous reaction protocol as described in Step-5 of Example-110.
MS (ES+) m/z=247.33 (M+1).

Step-3: 4-chloro-6-methoxy-2,8-dimethyl-8,9-dihydrofuro[2,3-h]quinazoline

The title compound was synthesized using 6-methoxy-2,8-dimethyl-8,9-dihydrofuro[2,3-h]quinazolin-4(3H)-one and following analogous reaction protocol as described in Step-6 of Example-112.
MS (ES+) m/z=265.1 (M+1).

Step-4: 6-methoxy-2,8-dimethyl-N—((R)$_1$-(3-nitro-5-(trifluoromethyl)phenyl)ethyl)-8,9-dihydrofuro[2,3-h]quinazolin-4-amine The title compound was synthesized using 4-chloro-6-methoxy-2,8-dimethyl-8,9-dihydrofuro[2,3-h]quinazoline and following analogous reaction protocol as described in Step-7 of Example-112.
MS (ES+) m/z=463.17 (M+1).

Step-5: N—(R)-1-(3-amino-5-(trifluoromethyl)phenyl)ethyl)-6-methoxy-2,8-dimethyl-8,9-dihydrofuro[2,3-h]quinazolin-4-amine The title compound was synthesized using 6-methoxy-2,8-dimethyl-N—((R)$_1$-(3-nitro-5-(trifluoromethyl)phenyl)ethyl)-8,9-dihydrofuro[2,3-h]quinazolin-4-amine and following analogous reaction protocol as described in Step-2 of Example-115.
MS (ES+) m/z=433.2 (M+1).

Step-6: N-(3-((R)-1-((6-methoxy-2,8-dimethyl-8,9-dihydrofuro[2,3-h]quinazolin-4-yl)amino)ethyl)-5-(trifluoromethyl)phenyl)acetamide The title compound was synthesized using N—(R)-1-(3-amino-5-(trifluoromethyl)phenyl)ethyl)-6-methoxy-2,8-dimethyl-8,9-dihydrofuro[2,3-h]quinazolin-4-amine and following analogous reaction protocol as described in Step-1 of Example-113.
MS (ES+) m/z=475.17 (M+1).

Step-7: N-(3-((R)-1-(((6-hydroxy-2,8-dimethyl-8,9-dihydrofuro[2,3-h]quinazolin-4-yl)amino)ethyl)-5-(trifluoromethyl)phenyl)acetamide The title compound was synthesized using N-(3-((R)-1-((6-methoxy-2,8-dimethyl-8,9-dihydrofuro[2,3-h]quinazolin-4-yl)amino)ethyl)-5-(trifluoromethyl)phenyl)acetamide and following analogous reaction protocol as described in Step-1 of Example-111.
MS (ES+) m/z=461.17 (M+1).

Step-8: 4—(((R)1-(3-acetamido-5-(trifluoromethyl)phenyl)ethyl)amino)-2,8-dimethyl-8,9-dihydrofuro[2,3-h]quinazolin-6-yl trifluoromethanesulfonate The title compound was synthesized using N-(3-((R)-1-((6-hydroxy-2,8-dimethyl-8,9-dihydrofuro[2,3-h]quinazolin-4-yl)amino)ethyl)-5-(trifluoromethyl)phenyl)acetamide and following analogous reaction protocol as described in Step-3 of Example-113.
MS (ES+) m/z=593.83 (M+1).

Step-9: N-(3-((R)-1-(((R/S)-2,8-dimethyl-6-morpholino-8,9-dihydrofuro[2,3-h]quinazolin-4-yl)amino)ethyl)-5-(trifluoromethyl)phenyl)acetamide (Peak-1) and N-(3-((R)-1-(((S/R)-2,8-dimethyl-6-morpholino-8,9-dihydrofuro[2,3-h]quinazolin-4-yl)amino)ethyl)-5-(trifluoromethyl)phenyl)acetamide (Peak-2)

The title compound was synthesized using 4-(((R)₁-(3-acetamido-5-(trifluoromethyl)phenyl)ethyl)amino)-2,8-dimethyl-8,9-dihydrofuro[2,3-h]quinazolin-6-yl trifluoromethanesulfonate and following analogous reaction protocol as described in Step-4 of Example-113.
Peak-1: Chiral RT: 8.02 min, Purity: 100%. MS (ES+) m/z=530.2 (M+1).
Peak-2: Chiral RT: 8.89 min, Purity: 98.72%. MS (ES+) m/z=530.2 (M+1).

Step-10: (R/S)—N—((R)-1-(3-amino-5-(trifluoromethyl)phenyl)ethyl)-2,8-dimethyl-6-morpholino-8,9-dihydrofuro[2,3-h]quinazolin-4-amine (Compound-117a) and (S/R)—N—((R)-1-(3-amino-5-(trifluoromethyl)phenyl)ethyl)-2,8-dimethyl-6-morpholino-8,9-dihydrofuro[2,3-h]quinazolin-4-amine (Compound-117b)

The title compounds were synthesized using N-(3-((R)-1-(((R/S)-2,8-dimethyl-6-morpholino-8,9-dihydrofuro[2,3-h]quinazolin-4-yl)amino)ethyl)-5-(trifluoromethyl)phenyl)acetamide (Peak-1) and N-(3-((R)-1-(((S/R)-2,8-dimethyl-6-morpholino-8,9-dihydrofuro[2,3-h]quinazolin-4-yl)amino)ethyl)-5-(trifluoromethyl)phenyl)acetamide (Peak-2) and following analogous reaction protocol as described in Step-5 of Example-113.
Peak-1 (Compound-117a):
MS (ES+) m/z=488.3 (M+1).
¹H NMR (400 MHz, DMSO-d₆) δ 13.71 (s, 1H), 9.88 (d, J=7.8 Hz, 1H), 7.78 (s, 1H), 7.04 (s, 1H), 7.00 (s, 1H), 6.88 (s, 1H), 5.76 (p, J=7.2 Hz, 1H), 5.35-5.28 (m, 1H), 3.82-3.74 (m, 4H), 3.70-3.56 (m, 1H), 3.27-3.18 (m, 4H), 3.13-3.02 (m, 1H), 2.63 (s, 3H), 1.66 (d, J=7.0 Hz, 3H), 1.49 (d, J=6.2 Hz, 3H).
Peak-2 (Compound-117b):
MS (ES+) m/z=488.3 (M+1).
¹H NMR (400 MHz, DMSO-d₆) δ 13.71 (s, 1H), 9.88 (d, J=7.8 Hz, 1H), 7.78 (s, 1H), 7.04 (s, 1H), 7.00 (s, 1H), 6.88 (s, 1H), 5.76 (p, J=7.2 Hz, 1H), 5.35-5.28 (m, 1H), 3.82-3.74 (m, 4H), 3.70-3.56 (m, 1H), 3.27-3.18 (m, 4H), 3.13-3.02 (m, 1H), 2.63 (s, 3H), 1.66 (d, J=7.0 Hz, 3H), 1.49 (d, J=6.2 Hz, 3H).

Example-118: (R/S)—N—((R)-1-(3-amino-5-(trifluoromethyl)phenyl)ethyl)-2,8-dimethyl-6-(((S)-tetrahydrofuran-3-yl)oxy)-8,9-dihydrofuro[2,3-h]quinazolin-4-amine (Compound-118a) and (S/R)—N—((R)-1-(3-amino-5-(trifluoromethyl)phenyl)ethyl)-2,8-dimethyl-6-(((S)-tetrahydrofuran-3-yl)oxy)-8,9-dihydrofuro[2,3-h]quinazolin-4-amine (Compound-118b)

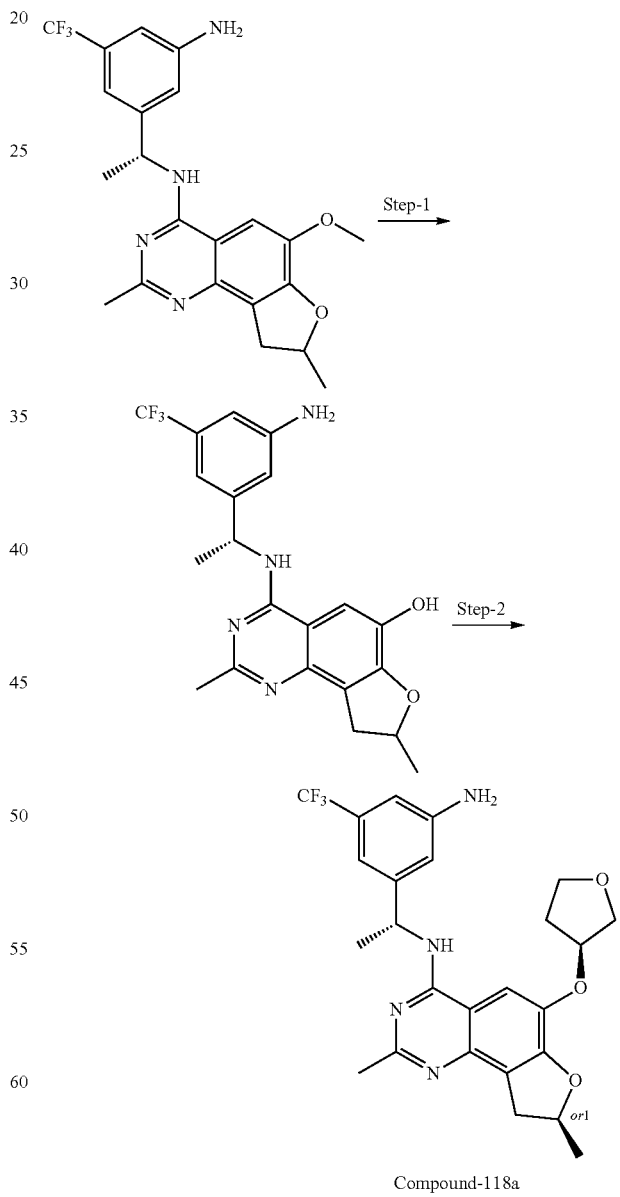

Compound-118a

225

-continued

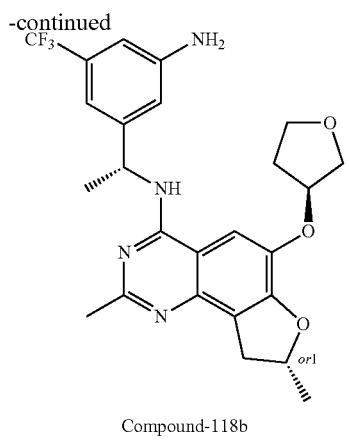

Compound-118b

Step-1: (((R)-1-(3-amino-5-(trifluoromethyl)phenyl) ethyl)amino)-2,8-dimethyl-8,9-dihydrofuro[2,3-h] quinazolin-6-ol The title compound was synthesized using N—(R)-1-(3-amino-5-(trifluoromethyl)phenyl)ethyl)-6-methoxy-2,8-dimethyl-8,9-dihydrofuro[2,3-h]quinazolin-4-amine and following analogous reaction protocol as described in Step-1 of Example-111.

MS (ES+) m/z=418.35 (M+1).

Step-2: (R/S)—N—((R)-1-(3-amino-5-(trifluoromethyl)phenyl)ethyl)-2,8-dimethyl-6-(((S)-tetrahydrofuran-3-yl)oxy)-8,9-dihydrofuro[2,3-h]quinazolin-4-amine (Peak-1) (Compound-118a) and (S/R)—N—((R)-1-(3-amino-5-(trifluoromethyl)phenyl)ethyl)-2,8-dimethyl-6-(((S)-tetrahydrofuran-3-yl)oxy)-8,9-dihydrofuro[2,3-h]quinazolin-4-amine (Peak-2) (Compound-118b)

The title compound was synthesized using (((R)-1-(3-amino-5-(trifluoromethyl)phenyl)ethyl)amino)-2,8-dimethyl-8,9-dihydrofuro[2,3-h]quinazolin-6-ol and following analogous reaction protocol as described in Step-2 of Example-111.

Peak-1: (Compound 118a): Chiral RT: 3.86 min, purity: 99.56%

MS (ES+) m/z=489.24 (M+1).

$^1$H NMR (400 MHz, DMSO-$d_6$) δ 8.00 (s, 1H), 7.68 (s, 1H), 6.88 (s, 1H), 6.84 (s, 1H), 6.70 (s, 1H), 5.62-5.57 (m, 1H), 5.56 (s, 2H), 5.24-5.17 (m, 1H), 5.18-5.08 (m, 1H), 3.99-3.76 (m, 4H), 3.55-3.48 (m, 1H), 3.03-2.89 (m, 1H), 2.38 (s, 3H), 2.25-2.70 (m, 1H), 2.06-1.96 (m, 1H), 1.56 (d, J=7.1 Hz, 3H), 1.45 (d, J=6.3 Hz, 3H).

Peak-2: (Compound-118b): Chiral RT: 4.98 min, purity: 97.63%.

MS (ES+) m/z=489.24 (M+1).

$^1$H NMR (400 MHz, DMSO-$d_6$) δ 8.00 (s, 1H), 7.68 (s, 1H), 6.88 (s, 1H), 6.84 (s, 1H), 6.70 (s, 1H), 5.62-5.57 (m, 1H), 5.56 (s, 2H), 5.24-5.17 (m, 1H), 5.18-5.08 (m, 1H), 3.99-3.76 (m, 4H), 3.55-3.48 (m, 1H), 3.03-2.89 (m, 1H), 2.38 (s, 3H), 2.25-2.70 (m, 1H), 2.06-1.96 (m, 1H), 1.56 (d, J=7.1 Hz, 3H), 1.45 (d, J=6.3 Hz, 3H).

226

Example-119: (R)-4-(4-((1-(3-(1,1-difluoro-2-hydroxy-2-methylpropyl)-2-fluorophenyl)ethyl)amino)-2-methyl-8,9-dihydro-7H-cyclopenta[h]quinazolin-6-yl)tetrahydro-2H-pyran-4-ol (Compound-119)

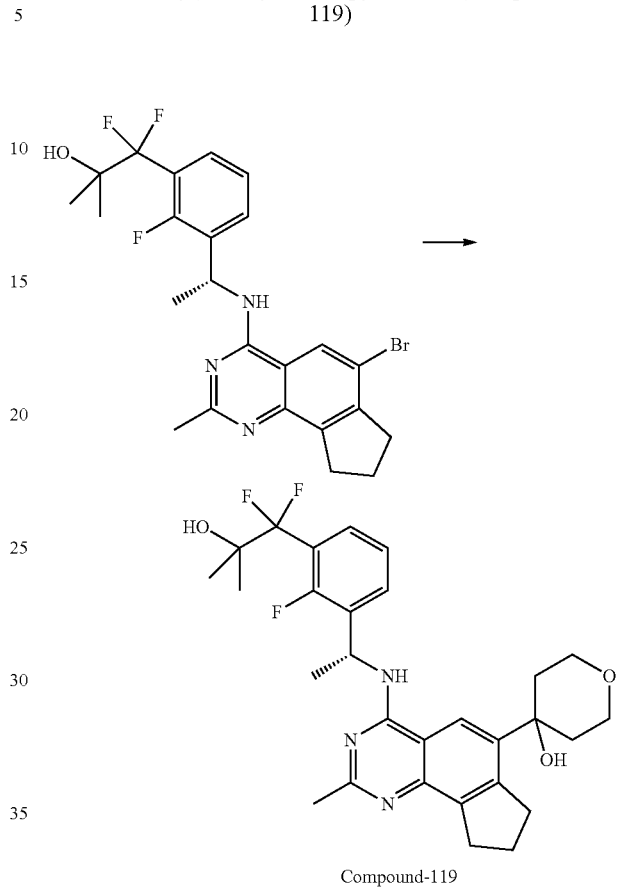

Compound-119

To a solution of (R)-1-(3-(1-(((6-bromo-2-methyl-8,9-dihydro-7H-cyclopenta[h]quinazolin-4-yl)amino)ethyl)-2-fluorophenyl)-1,1-difluoro-2-methylpropan-2-ol (Intermediate-30) (200 mg, 0.393 mmol) in THF (2 ml) was added n-butyl lithium (0.787 ml, 1.967 mmol) at −78° C. The resulting solution was stirred for 30 minutes at −78° C. Then a solution of tetrahydro-4H-pyran-4-one (commercially available) (47.3 mg, 0.472 mmol) in THF (0.5 mL) was added at −78° C. and resulting solution was allowed to stirred for 3 hrs at room temperature. The reaction was then quenched with aq. ammonium chloride solution (3 ml) and extracted with ethyl acetate (2×10 mL). The organic layers were combined, dried over anhydrous sodium sulfate, filtered and concentrated under vacuum. The obtained residue was purified by column chromatography using eluent 0-50% ethyl acetate in hexane followed by purification with Prep-HPLC to afford (R)-4-(4-((1-(3-(1,1-difluoro-2-hydroxy-2-methylpropyl)-2-fluorophenyl)ethyl)amino)-2-methyl-8,9-dihydro-7H-cyclopenta[h]quinazolin-6-yl)tetrahydro-2H-pyran-4-ol (20 mg, 9.60% yield) as an off white solid.

MS (ES+) m/z=530.19 (M+1).

$^1$H NMR (400 MHz, DMSO-$d_6$) δ 8.47 (d, J=7.5 Hz, 1H), 8.14 (s, 1H), 7.68-7.56 (m, 1H), 7.36-7.24 (m, 1H), 7.24-7.08 (m, 1H), 5.89-5.77 (m, 1H), 5.12 (bs, 1H), 3.93-3.82 (m, 2H), 3.81-3.72 (m, 2H), 3.34-3.24 (m, 2H), 3.11-2.99 (m, 2H), 2.32 (s, 3H), 2.26-2.13 (m, 2H), 2.07-1.97 (m, 2H), 1.80-1.70 (m, 2H), 1.60 (d, J=7.0 Hz, 3H), 1.24 (s, 3H), 1.21 (s, 3H).

Example-120: (R/S)-2,2,2-trifluoro-1-(3-(1-((2-methyl-6-morpholino-8,9-dihydro-7H-cyclopenta[h]quinazolin-4-yl)amino)ethyl)phenyl)ethan-1-one (Compound-120)

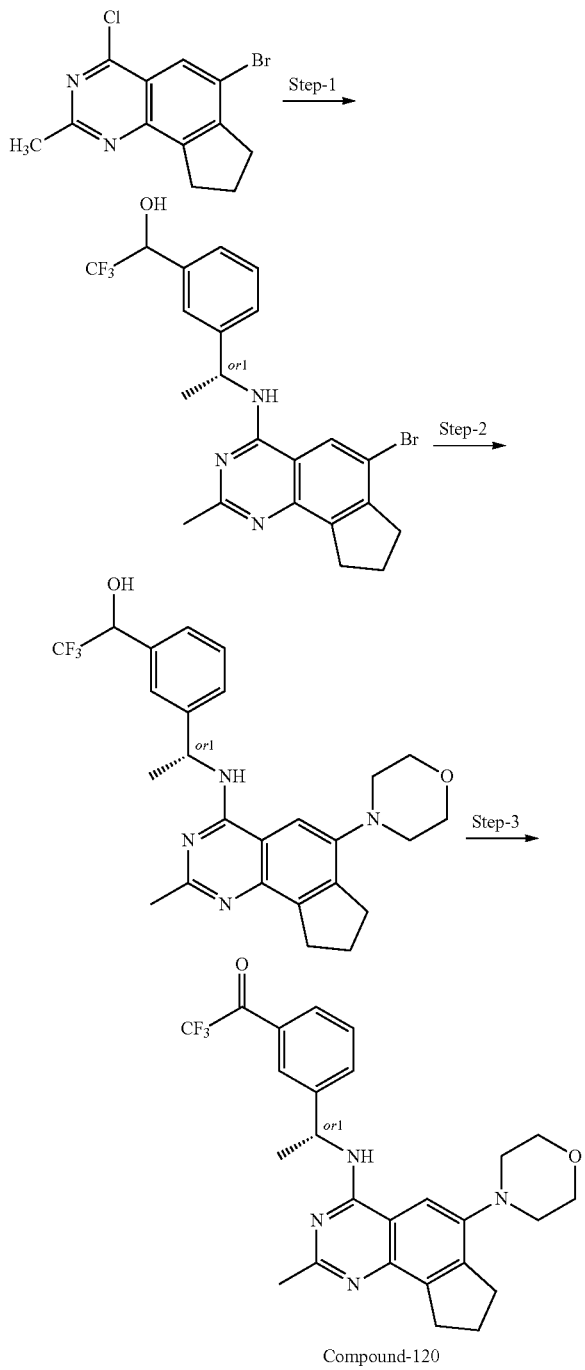

Compound-120

Step-1: 1-(3-((R/S)-1-((6-bromo-2-methyl-8,9-dihydro-7H-cyclopenta[h]quinazolin-4-yl)amino)ethyl)phenyl)-2,2,2-trifluoroethan-1-ol The title compound was synthesized by using Intermediate-19 and Intermediate-44 and following analogous reaction protocol as described in Intermediate-21.

MS (ES+) m/z=481.24 (M+1).
$^1$H NMR (400 MHz, DMSO-$d_6$) δ 8.53 (s, 1H), 8.42-8.35 (m, 1H), 7.59 (d, J=11.9 Hz, 1H), 7.50-7.41 (m, 1H), 7.39-7.25 (m, 2H), 6.85-6.73 (m, 1H), 5.66-5.49 (m, 1H), 5.22-5.02 (m, 1H), 3.27-3.19 (m, 2H), 3.11-2.93 (m, 2H), 2.38 (s, 3H), 2.20-2.07 (m, 2H), 1.57 (d, J=7.0 Hz, 3H).

Step-2: 2,2,2-trifluoro-1-(3-((R/S)-1-((2-methyl-6-morpholino-8,9-dihydro-7H-cyclopenta[h]quinazolin-4-yl)amino)ethyl)phenyl)ethan-1-ol The title compound was synthesized by using 1-(3-((R/S)-1-((6-bromo-2-methyl-8,9-dihydro-7H-cyclopenta[h]quinazolin-4-yl)amino)ethyl)phenyl)-2,2,2-trifluoroethan-1-ol and Morpholine and following analogous reaction protocol as described in Example-1.
MS (ES+) m/z=487.36 (M+1).
$^1$H NMR (400 MHz, DMSO-$d_6$) δ 8.18-8.10 (m, 1H), 7.60 (d, J=11.7 Hz, 1H), 7.53 (s, 1H), 7.50-7.44 (m, 1H), 7.38-7.30 (m, 2H), 6.80 (d, J=5.5 Hz, 1H), 5.72-5.62 (m, 1H), 5.18-5.03 (m, 1H), 3.87-3.72 (m, 4H), 3.13-3.06 (m, 2H), 3.06-3.00 (m, 4H), 2.99-2.93 (m, 2H), 2.36 (s, 3H), 2.13-2.03 (m, 2H), 1.60 (d, J=7.1 Hz, 3H).

Step-3: (R/S)-2,2,2-trifluoro-1-(3-(1-((2-methyl-6-morpholino-8,9-dihydro-7H-cyclopenta[h]quinazolin-4-yl)amino)ethyl)phenyl)ethan-1-one To a stirred solution of 2,2,2-trifluoro-1-(3-((R/S)-1-((2-methyl-6-morpholino-8,9-dihydro-7H-cyclopenta[h]quinazolin-4-yl)amino)ethyl)phenyl)ethan-1-ol (350 mg, 0.719 mmol) in DCM (5 ml) was added Dess-Martin Periodinane (610 mg, 1.439 mmol) at 0° C. and stirred at 25° C. for 3 hrs. After completion, reaction mixture was filtered through celite bed, filtrate was diluted with DCM (70 ml) washed with water (50 ml) and brine (50 ml). The organic layer was dried over sodium sulphate, filtered and concentrated. Obtained crude product was purified by reverse phase prep-HPLC to afford (R/S)-2,2,2-trifluoro-1-(3-(1-((2-methyl-6-morpholino-8,9-dihydro-7H-cyclopenta[h]quinazolin-4-yl)amino)ethyl)phenyl)ethan-1-one (14 mg, 4.02% yield) as a light brown solid.
MS (ES+) m/z=485.36 (M+1).
$^1$H NMR (400 MHz, DMSO-$d_6$) δ 8.25 (s, 1H), 8.17 (s, 1H), 8.03-7.93 (m, 1H), 7.93-7.87 (m, 1H), 7.71-7.58 (m, 1H), 7.57-7.51 (m, 1H), 5.71-5.68 (m, 1H), 3.83-3.75 (m, 4H), 3.18-3.07 (m, 2H), 3.06-3.00 (m, 4H), 3.00-2.91 (m, 2H), 2.36 (s, 3H), 2.17-1.98 (m, 2H), 1.65 (d, J=7.1 Hz, 3H).

Example-121: (R)-2,2-difluoro-2-(2-fluoro-3-(1-((6-methoxy-2,7-dimethyl-8,9-dihydro-7H-[1,4]oxazino[3,2-h]quinazolin-4-yl)amino)ethyl)phenyl)ethan-1-ol (Compound-121)

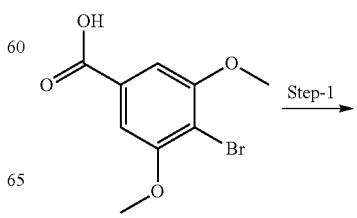

229

-continued

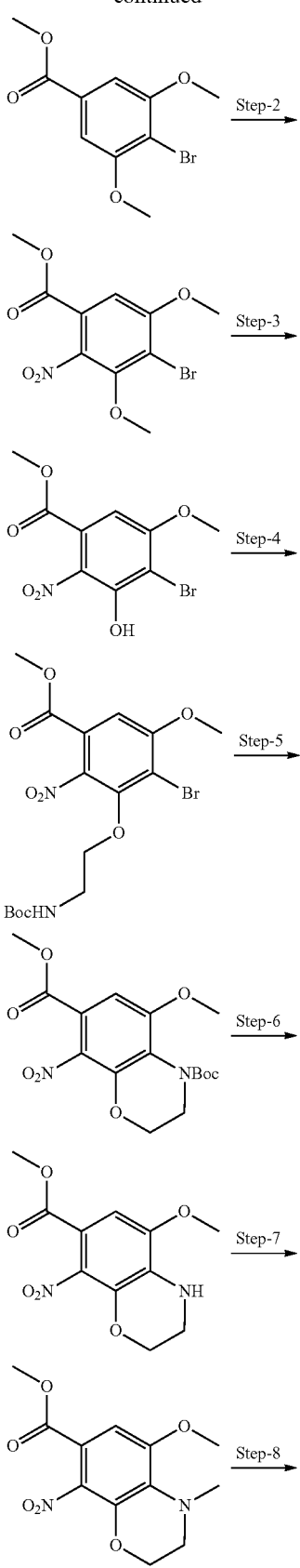

230

-continued

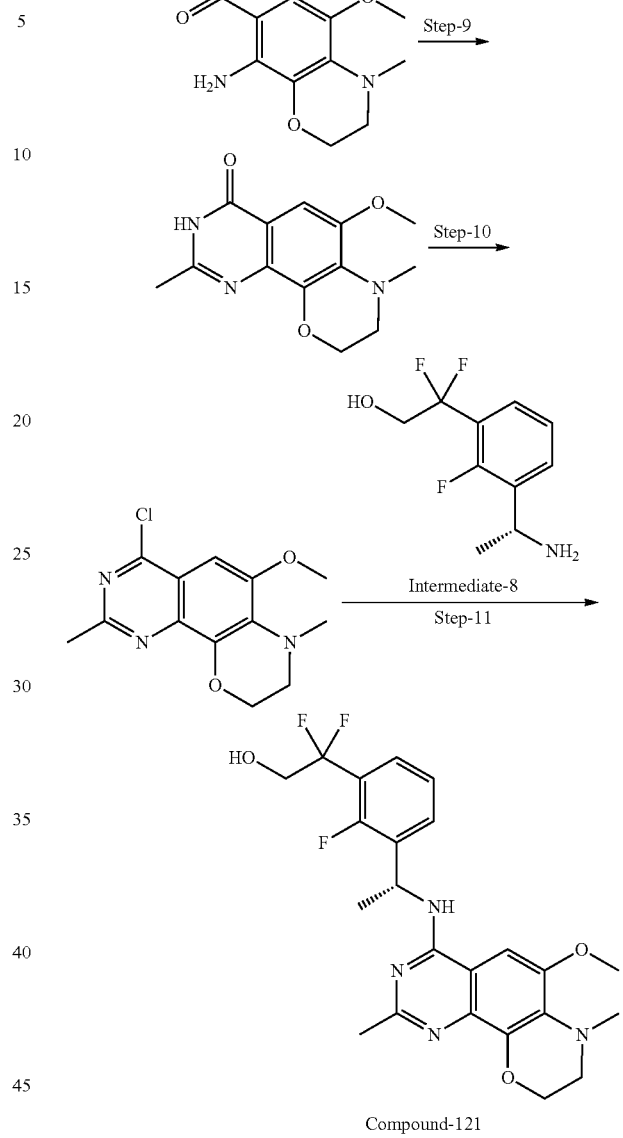

Compound-121

Step-1: methyl 4-bromo-3,5-dimethoxybenzoate

To a stirred solution of 4-bromo-3,5-dimethoxybenzoic acid (125 g, 479 mmol) in methanol (600 ml) was added thionyl chloride (41.9 ml, 575 mmol) dropwise at 0-5° C. The mixture was then heated to 65° C. for 6 h. After completion of reaction, reaction mixture was evaporated under reduced pressure. The residue was diluted with ethyl acetate (1000 ml) and the organic layer was washed with bicarbonate solution (300 ml×2). The separated organic layer was washed with brine (300 ml), dried over anhydrous sodium sulfate, filtered and concentrated under reduced pressure to afford methyl 4-bromo-3,5-dimethoxybenzoate (130 g, 99% yield) as a colorless oil.

$^1$H NMR (400 MHz, DMSO-$d_6$) δ 7.23 (s, 2H), 3.91 (s, 6H), 3.88 (s, 3H).

Step-2: methyl 4-bromo-3,5-dimethoxy-2-nitrobenzoate

A solution of methyl 4-bromo-3,5-dimethoxybenzoate (130 g, 473 mmol) in acetic anhydride (2000 ml) was cooled to 0° C. The 70% nitric acid (45.3 ml, 709 mmol) was introduced dropwise and the subsequent mixture was warmed to room temperature. The resulting reaction mixture was allowed to room temperature and stirred for 16 h. After completion of reaction, reaction mixture was concentrated and diluted with ethyl acetate (2 lit), washed it with water (500 ml×2) and brine (500 ml). The separated organic layer was dried over $Na_2SO_4$, filtered and concentrated to afford methyl 4-bromo-3,5-dimethoxy-2-nitrobenzoate (151 g, 100% yield) as yellow solid.

$^1$H NMR (400 MHz, Chloroform-d) δ 7.29 (s, 1H), 4.02 (s, 3H), 4.00 (s, 3H), 3.93 (s, 3H).

Step-3: Methyl 4-bromo-3-hydroxy-5-methoxy-2-nitrobenzoate

To a stirred solution of methyl 4-bromo-3,5-dimethoxy-2-nitrobenzoate (25.00 g, 78 mmol) in dichloromethane (200 ml), was added portion wise aluminum chloride (41.7 g, 312 mmol) at 0° C. in 20 minutes. The resulting blood red solution was warmed to room temperature and stirred at 25° C. for 1 h. Reaction mixture was poured into a slurry of 1N HCl (1000 ml) and ice (1000 g) and the aqueous phase extracted with DCM (3×300 ml). The organic layers were combined, washed with brine (200 ml) and dried over sodium sulfate, filtered and concentrated under vacuo. The crude mass was purified by flash column chromatography by using 0 to 20% of ethyl acetate in petroleum ether as eluent to afford Methyl 4-bromo-3-hydroxy-5-methoxy-2-nitrobenzoate (14.2 g, 59% yield) as a brown solid.

$^1$H NMR (400 MHz, Chloroform-d) δ 11.13 (s, 1H), 6.68 (s, 1H), 4.05 (s, 3H), 3.97 (s, 3H).

Step-4: methyl 4-bromo-3-(2-((tert-butoxycarbonyl)amino)ethoxy)-5-methoxy-2-nitrobenzoate To a stirred solution of methyl 4-bromo-3-hydroxy-5-methoxy-2-nitrobenzoate (14 g, 45.7 mmol) in THF (140 ml) were added tert-butyl (2-hydroxyethyl)carbamate (14.75 g, 91 mmol) and triphenylphosphine (18.00 g, 68.6 mmol) followed by addition of DIAD (13.34 ml, 68.6 mmol) at RT. The resulting mass was stirred for 1 h at room temperature. After completion, reaction mixture was concentrated and obtained crude product was purified by column chromatography using eluent 0 to 40% of ethyl acetate in hexane to afford methyl 4-bromo-3-(2-((tert-butoxycarbonyl)amino)ethoxy)-5-methoxy-2-nitrobenzoate (14.3 g, 69.6% yield) as white solid.

$^1$H NMR (400 MHz, Chloroform-d) δ 7.29 (s, 1H), 4.28-4.11 (m, 2H), 4.02 (s, 3H), 3.92 (s, 3H), 3.56-3.46 (m, 2H), 1.48 (s, 9H).

Step-5: 4-(tert-butyl)7-methyl-5-methoxy-8-nitro-2,3-dihydro-4H-benzo[b][1,4]oxazine-4,7-dicarboxylate To a sealed tube containing a solution of methyl 4-bromo-3-(2-((tert-butoxycarbonyl)amino)ethoxy)-5-methoxy-2-nitrobenzoate (14 g, 31.2 mmol) and $Cs_2CO_3$ (20.31 g, 62.3 mmol) in toluene (160 ml) was added xantphos (3.61 g, 6.23 mmol). The mixture was thoroughly deoxygenated by purging nitrogen for 15 min and then Palladium (II) acetate (0.700 g, 3.12 mmol) was added. The resulting mixture was stirred at 120° C. for 1 h. The reaction mass was cooled to room temperature, diluted with ethyl acetate (200 ml) and filtered through celite. The filtrate was concentrated under vacuum to give the crude product. This residue was purified by flash column chromatography with gradient elution of 0 to 40% of ethyl acetate in petroleum ether to afford the 4-(tert-butyl)7-methyl-5-methoxy-8-nitro-2,3-dihydro-4H-benzo[b][1,4]oxazine-4,7-dicarboxylate (5.6 g, 48.8% yield) as pale yellow solid.

$^1$H NMR (400 MHz, Chloroform-d) δ 7.06 (s, 1H), 4.39-4.35 (m, 2H), 3.95 (s, 3H), 3.90 (s, 3H), 3.86-3.73 (m, 2H), 1.46 (s, 9H).

Step-6: methyl 5-methoxy-8-nitro-3,4-dihydro-2H-benzo[b][1,4]oxazine-7-carboxylate To a stirred solution of 4-(tert-butyl)7-methyl 5-methoxy-8-nitro-2,3-dihydro-4H-benzo[b][1,4]oxazine-4,7-dicarboxylate (5.0 g, 13.57 mmol) in DCM (100 ml) was added TFA (10.46 ml, 136 mmol) at room temperature and stirred for 5 h. After completion of reaction, reaction mixture was concentrated under vacuum. The crude residue was washed with pentane (30 ml×2), then with diethyl ether (30 ml×2) and decanted. The solid was filtered and dried to afford methyl 5-methoxy-8-nitro-3,4-dihydro-2H-benzo[b][1,4]oxazine-7-carboxylate (3.1 g, 85% yield) as light yellow solid.

MS (ES+) m/z=269.2 (M+1).

$^1$H NMR (400 MHz, DMSO-$d_6$) δ 7.02 (s, 1H), 4.26-4.12 (m, 2H), 3.88 (s, 3H), 3.75 (s, 3H), 3.45-3.35 (m, 2H).

Step-7: methyl 5-methoxy-4-methyl-8-nitro-3,4-dihydro-2H-benzo[b][1,4]oxazine-7-carboxylate To a stirred suspension of methyl 5-methoxy-8-nitro-3,4-dihydro-2H-benzo[b][1,4]oxazine-7-carboxylate (2.9 g, 10.81 mmol) in acetic acid (90 ml) was added paraformaldehyde (3.25 g, 108 mmol) at 25° C. under $N_2$ atmosphere. After being stirred for 1 h at 25° C., sodium cyanoborohydride (3.26 g, 51.9 mmol) was added portion wise over 10 mins and stirred the resulting mixture at 25° C. for 14 h. The reaction mixture was quenched with ice water, neutralized to pH-7 using 6N NaOH solution and extracted with ethyl acetate (100 ml×2). The layers were separated, the combined organic layer was washed with brine (50 ml), dried over anhydrous $Na_2SO_4$, filtered and concentrated in vacuo to get 3.5 g of a crude compound. This residue was purified by flash column chromatography with gradient elution 50 to 60% of ethyl acetate in petroleum ether to afford methyl 5-methoxy-4-methyl-8-nitro-3,4-dihydro-2H-benzo[b][1,4]oxazine-7-carboxylate (2.7 g, 88% yield).

MS (ES+) m/z=283.34 (M+1).

$^1$H NMR (400 MHz, DMSO-$d_6$) δ 7.06 (s, 1H), 4.23-4.15 (m, 2H), 3.90 (s, 3H), 3.79 (s, 3H), 3.26-3.19 (m, 2H), 2.96 (s, 3H).

Step-8: methyl 8-amino-5-methoxy-4-methyl-3,4-dihydro-2H-benzo[b][1,4]oxazine-7-carboxylate The title compound was synthesized by following analogous reaction protocol as described in Step-7 of Intermediate-12 using appropriate reagents.

$^1$H NMR (400 MHz, DMSO-$d_6$) δ 6.81 (s, 1H), 5.93 (s, 2H), 4.15-4.07 (m, 2H), 3.76 (s, 3H), 3.69 (s, 3H), 3.13-3.06 (m, 2H), 2.85 (s, 3H).

Step-9: 6-methoxy-2,7-dimethyl-8,9-dihydro-3H-[1,4]oxazino[3,2-h]quinazolin-4(7H)-one The title compound was synthesized by following analogous reaction protocol as described in Step-5 of Example-110 using appropriate reagents.

MS (ES+) m/z=262.15 (M+1).

$^1$H NMR (400 MHz, DMSO-d$_6$) δ 11.98 (s, 1H), 7.03 (s, 1H), 4.19-4.10 (m, 2H), 3.87 (s, 3H), 3.14-3.06 (m, 2H), 2.84 (s, 3H), 2.30 (s, 3H).

Step-10: 4-chloro-6-methoxy-2,7-dimethyl-8,9-dihydro-7H-[1,4]oxazino[3,2-h]quinazoline The title compound was synthesized by following analogous reaction protocol as described in Intermediate-19 using appropriate reagents.

MS (ES+) m/z=280.27 (M+).

$^1$H NMR (400 MHz, DMSO-d$_6$) δ 6.97 (s, 1H), 4.28-4.20 (m, 2H), 3.98 (s, 3H), 3.23-3.16 (m, 2H), 2.94 (s, 3H), 2.65 (s, 3H).

Step-11: (R)-2,2-difluoro-2-(2-fluoro-3-(1-((6-methoxy-2,7-dimethyl-8,9-dihydro-7H-[1,4]oxazino[3,2-h]quinazolin-4-yl)amino)ethyl)phenyl)ethan-1-ol The title compound was synthesized by using 4-chloro-6-methoxy-2,7-dimethyl-8,9-dihydro-7H-[1,4]oxazino[3,2-h]quinazoline and Intermediate-8 and following analogous reaction protocol as described in Intermediate-21.

MS (ES+) m/z=463.18 (M+1).

$^1$H NMR (400 MHz, DMSO-d$_6$) δ 7.98 (d, J=7.5 Hz, 1H), 7.65-7.58 (m, 1H), 7.44-7.36 (m, 1H), 7.30 (s, 1H), 7.27-7.20 (m, 1H), 5.81 (p, J=7.1 Hz, 1H), 5.75-5.68 (m, 1H), 4.23-4.08 (m, 2H), 3.96 (s, 3H), 3.93-3.90 (m, 2H), 3.12-3.01 (m, 2H), 2.82 (s, 3H), 2.30 (s, 3H), 1.59 (d, J=7.1 Hz, 3H).

Example-122: (R)-4-((1-(3-(1,1-difluoro-2-hydroxy-2-methylpropyl)-2-fluorophenyl)ethyl)amino)-2,8,8,10-tetramethyl-6-(1-methyl-6-oxo-1,6-dihydropyridin-3-yl)-8H-[1,4]oxazino[2,3-h]quinazolin-9(10H)-one (Compound-122)

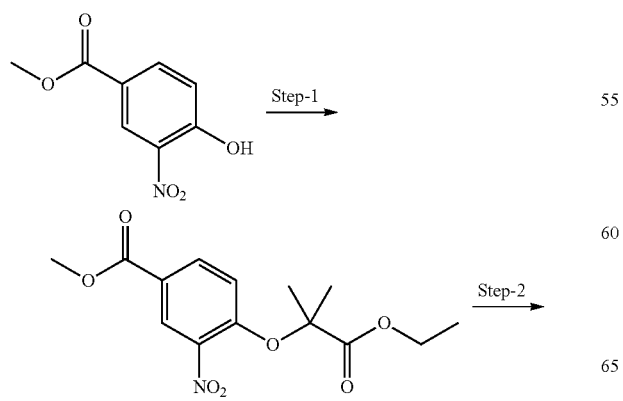

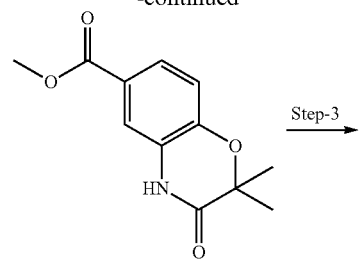
Step-3

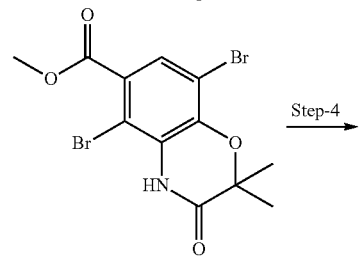
Step-4

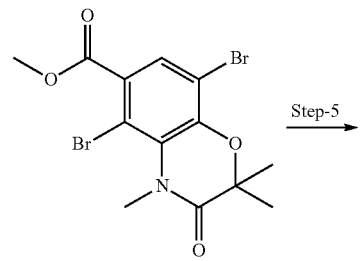
Step-5

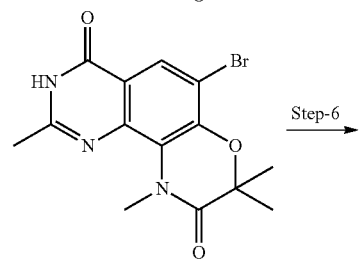
Step-6

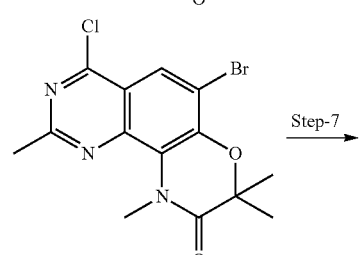
Step-7

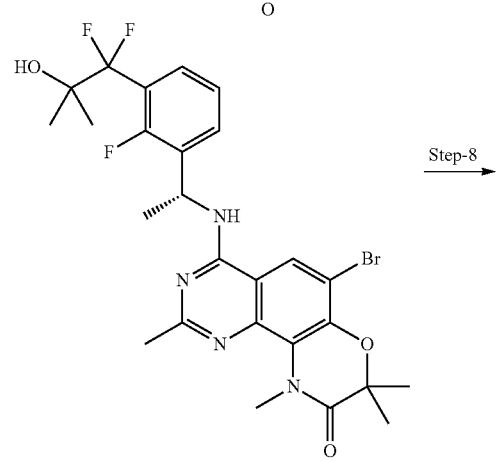
Step-8

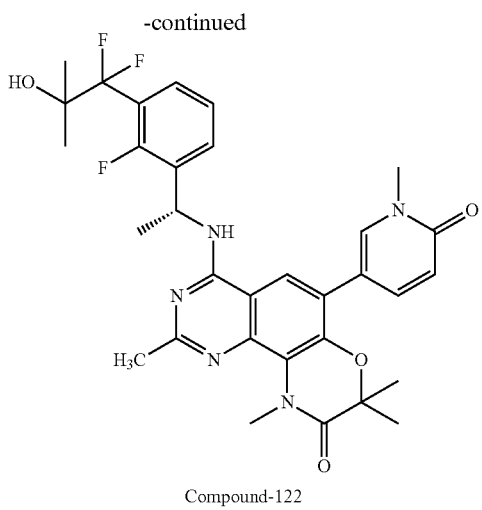

Compound-122

Step-1: methyl 4-((1-ethoxy-2-methyl-1-oxopropan-2-yl)oxy)-3-nitrobenzoate

To a solution of methyl 4-hydroxy-3-nitrobenzoate (20 g, 101 mmol) in DMF was added $K_2CO_3$ (29.4 g, 213 mmol), KI (0.337 g, 2.029 mmol) followed by addition of ethyl 2-bromo-2-methylpropanoate (commercially available) (21.77 g, 112 mmol) under inert atmosphere and continued the heating at 80° C. for 16 hrs. After completion, reaction mixture was diluted with water (500 ml) and extracted with ethyl acetate (500 ml). Organic layer was dried over sodium sulphate and concentrated. Obtained residue was purified by column chromatography using eluent 0-30% ethyl acetate in hexane to afford methyl 4-((1-ethoxy-2-methyl-1-oxopropan-2-yl)oxy)-3-nitrobenzoate (22 g, 70.7 mmol, 69.7% yield) as a white solid.
NH NMR (400 MHz, DMSO-$d_6$) δ 8.36 (d, J=2.2 Hz, 1H), 8.16-8.10 (m, 1H), 7.12 (d, J=8.9 Hz, 1H), 4.23-4.16 (m, 2H), 3.87 (s, 3H), 1.63 (s, 6H), 1.15 (t, J=7.1 Hz, 3H).

Step-2: methyl 2,2-dimethyl-3-oxo-3,4-dihydro-2H-benzo[b][1,4]oxazine-6-carboxylate To a stirred solution of methyl 4-((1-ethoxy-2-methyl-1-oxopropan-2-yl)oxy)-3-nitrobenzoate (14 g, 45.0 mmol) in acetic acid was added iron (12.56 g, 225 mmol) and heated the reaction mass at 90° C. for 1 h. After completion, reaction mixture was cooled to room temperature and filtered through celite bed and filtrate was concentrated under reduced pressure. Obtained residue was diluted with water (200 ml) and basified with saturated aq. $NaHCO_3$. The aqueous layer was extracted with ethyl acetate (500 ml), washed with brine and dried over anhydrous $Na_2SO_4$. Obtained compound was purified by column chromatography by using eluent 0-70% ethyl acetate in hexane to afford methyl 2,2-dimethyl-3-oxo-3,4-dihydro-2H-benzo[b][1,4]oxazine-6-carboxylate (9 g, 85% yield) as an off white solid.
MS (ES+) m/z=236.14 (M+1).
$^1$H NMR (400 MHz, DMSO-$d_6$) δ 10.83 (s, 1H), 7.61-7.44 (m, 2H), 7.04 (d, J=8.4 Hz, 1H), 3.82 (s, 3H), 1.43 (s, 6H).

Step-3: methyl 5,8-dibromo-2,2-dimethyl-3-oxo-3,4-dihydro-2H-benzo[b][1,4]oxazine-6-carboxylate To a stirred solution of methyl 2,2-dimethyl-3-oxo-3,4-dihydro-2H-benzo[b][1,4]oxazine-6-carboxylate (6.5 g, 27.6 mmol) in $H_2SO_4$ was added NBS (10.82 g, 60.8 mmol) portion wise at room temperature over the period of 15 min. and continued the stirring for 24 hrs. Reaction mixture was poured slowly into ice cold water and precipitated solid was filtered and dried under vacuum. Obtained residue was stirred in ethyl acetate (60 ml) for 15 min. Separated solid was filtered and dried under vacuum to afford methyl 5,8-dibromo-2,2-dimethyl-3-oxo-3,4-dihydro-2H-benzo[b][1,4]oxazine-6-carboxylate (3.7 g, 9.41 mmol, 34.1% yield).
MS (ES+) m/z=393.97 (M+1).
$^1$H NMR (400 MHz, DMSO-$d_6$) δ 11.05 (s, 1H), 7.30 (s, 1H), 3.85 (s, 3H), 1.47 (s, 6H).

Step-4: methyl 5,8-dibromo-2,2,4-trimethyl-3-oxo-3,4-dihydro-2H-benzo[b][1,4]oxazine-6-carboxylate To a stirred solution of methyl 5,8-dibromo-2,2-dimethyl-3-oxo-3,4-dihydro-2H-benzo[b][1,4]oxazine-6-carboxylate (2.0 g, 5.09 mmol), KI (0.084 g, 0.509 mmol) and $K_2CO_3$ (1.407 g, 10.18 mmol) in DMF was added MeI (0.477 ml, 7.63 mmol) drop wise at room temperature and continued the stirring for 16 hrs. After completion, Reaction mixture was poured slowly into ice cold water and precipitated solid was filtered and dried under vacuum to afford methyl 5,8-dibromo-2,2,4-trimethyl-3-oxo-3,4-dihydro-2H-benzo[b][1,4]oxazine-6-carboxylate (2 g, 4.91 mmol, 97% yield).
$^1$H NMR (400 MHz, DMSO-$d_6$) δ 7.51 (s, 1H), 3.88 (s, 3H), 3.31 (s, 3H), 1.47 (s, 6H).

Step-5: 6-bromo-2,8,8,10-tetramethyl-3,10-dihydro-4H-[1,4]oxazino[2,3-h]quinazoline-4,9(8H)-dione A mixture of methyl 5,8-dibromo-2,2,4-trimethyl-3-oxo-3,4-dihydro-2H-benzo[b][1,4]oxazine-6-carboxylate (700 mg, 1.720 mmol), acetimidamide hydrochloride (244 mg, 2.58 mmol), copper (I) iodide (65.5 mg, 0.344 mmol) and cesium carbonate (1121 mg, 3.44 mmol) in DMF was heated at 120° C. for 12 hrs. After completion, reaction mixture was poured into water and extracted with ethyl acetate (200 ml). Organic layer was washed with brine, dried over anhydrous $Na_2SO_4$ and concentrated under reduced pressure. Obtained residue was purified by Column chromatography using eluent 0-70% ethyl acetate in hexane to afford 6-bromo-2,8,8,10-tetramethyl-3,10-dihydro-4H-[1,4]oxazino[2,3-h]quinazoline-4,9 (8H)-dione (270 mg, 0.767 mmol, 44.6% yield) as a yellow solid.
MS (ES+) m/z=354.22 (M+2).

Step-6: 6-bromo-4-chloro-2,8,8,10-tetramethyl-8H-[1,4]oxazino[2,3-h]quinazolin-9(10H)-one The title compound was synthesized by using 6-bromo-2,8,8,10-tetramethyl-3,10-dihydro-4H-[1,4]oxazino[2,3-h]quinazoline-4,9(8H)-dione and appropriate reagents, following analogous reaction protocol as described in Intermediate-19.
MS (ES+) m/z=372.16 (M+2).

Step-7: (R)-6-bromo-4-((1-(3-(1,1-difluoro-2-hydroxy-2-methylpropyl)-2-fluorophenyl)ethyl) amino)-2,8,8,10-tetramethyl-8H-[1,4]oxazino[2,3-h]quinazolin-9(10H)-one The title compound was synthesized by using 6-bromo-4-chloro-2,8,8,10-tetramethyl-8H-[1,4]oxazino[2,3-h]quinazolin-9(10H)-one and Intermediate-6, following analogous reaction protocol as described in Intermediate-21.
MS (ES+) m/z=583.08 (M+2).

Step-8: (R)-4-((1-(3-(1,1-difluoro-2-hydroxy-2-methylpropyl)-2-fluorophenyl)ethyl)amino)-2,8,8,10-tetramethyl-6-(1-methyl-6-oxo-1,6-dihydropyridin-3-yl)-8H-[1,4]oxazino[2,3-h]quinazolin-9(10H)-one The title compound was synthesized by using (R)-6-bromo-4-((1-(3-(1,1-difluoro-2-hydroxy-2-methylpropyl)-2-fluorophenyl)ethyl)amino)-2,8,8,10-tetramethyl-8H-[1,4]oxazino[2,3-h]quinazolin-9(10H)-one and 1-methyl-5-(4,4,5,5-tetramethyl-1,3,2-dioxaborolan-2-yl)pyridin-2(1H)-one (commercially available), following analogous reaction protocol as described in Step-1 of Example-87.

MS (ES+) m/z=610.34 (M+1).

¹H NMR (400 MHz, DMSO-d₆) δ 8.48-8.37 (m, 1H), 8.00 (s, 1H), 7.73-7.65 (m, 1H), 7.65-7.54 (m, 1H), 7.49-7.40 (m, 1H), 7.35-7.27 (m, 1H), 7.27-7.12 (m, 1H), 6.49-6.35 (m, 1H), 5.90-5.74 (m, 1H), 3.51-3.47 (m, 6H), 2.25 (s, 3H), 1.61 (d, J=7.0 Hz, 3H), 1.45 (s, 3H), 1.42 (s, 3H), 1.24 (s, 3H), 1.20 (s, 3H).

Example-123: (R)-4-(4-((1-(3-(1,1-difluoro-2-hydroxy-2-methylpropyl)-2-fluorophenyl)ethyl)amino)-2-methyl-8,9-dihydro-7H-cyclopenta[h]quinazolin-6-yl)morpholin-3-one (Compound-123)

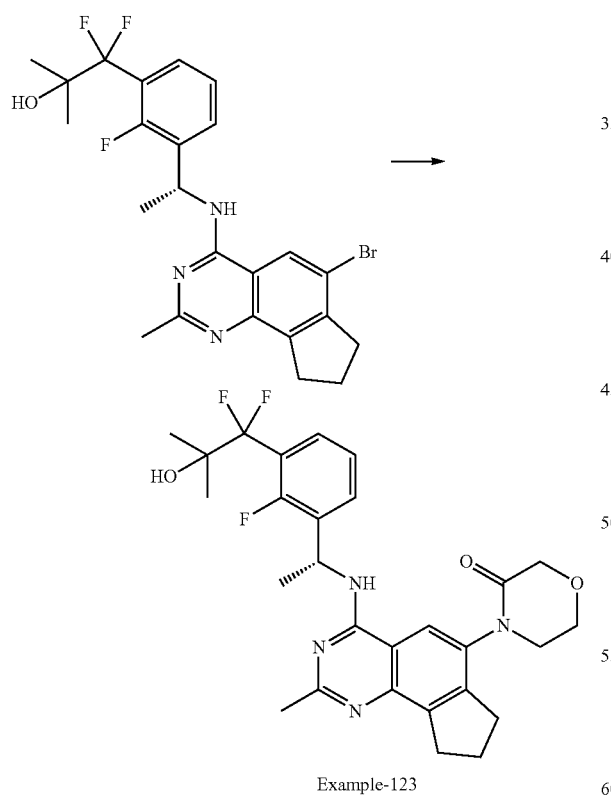

Example-123

The title compound was synthesized by using Intermediate-30 and morpholin-3-one (commercially available) following analogous reaction protocol as described in Intermediate-25.

MS (ES+) m/z=529.44 (M+1).

¹H NMR (400 MHz, DMSO-d₆) δ 8.30 (d, J=7.4 Hz, 1H), 8.22 (s, 1H), 7.65-7.53 (m, 1H), 7.37-7.26 (m, 1H), 7.25-7.13 (m, 1H), 5.89-5.71 (m, 1H), 5.33 (s, 1H), 4.26 (s, 2H), 4.09-3.97 (m, 2H), 3.86-3.53 (m, 2H), 2.35 (s, 3H), 3.20-3.03 (m, 2H), 2.97-2.79 (m, 2H), 2.17-1.98 (m, 2H), 1.57 (d, J=7.0 Hz, 3H), 1.24 (s, 3H), 1.21 (s, 3H).

Example-124: (R)-4-(4-((1-(3-amino-5-(trifluoromethyl)phenyl)ethyl)amino)-2-methyl-8,9-dihydro-7H-cyclopenta[h]quinazolin-6-yl)cyclohexan-1-one (Compound-124)

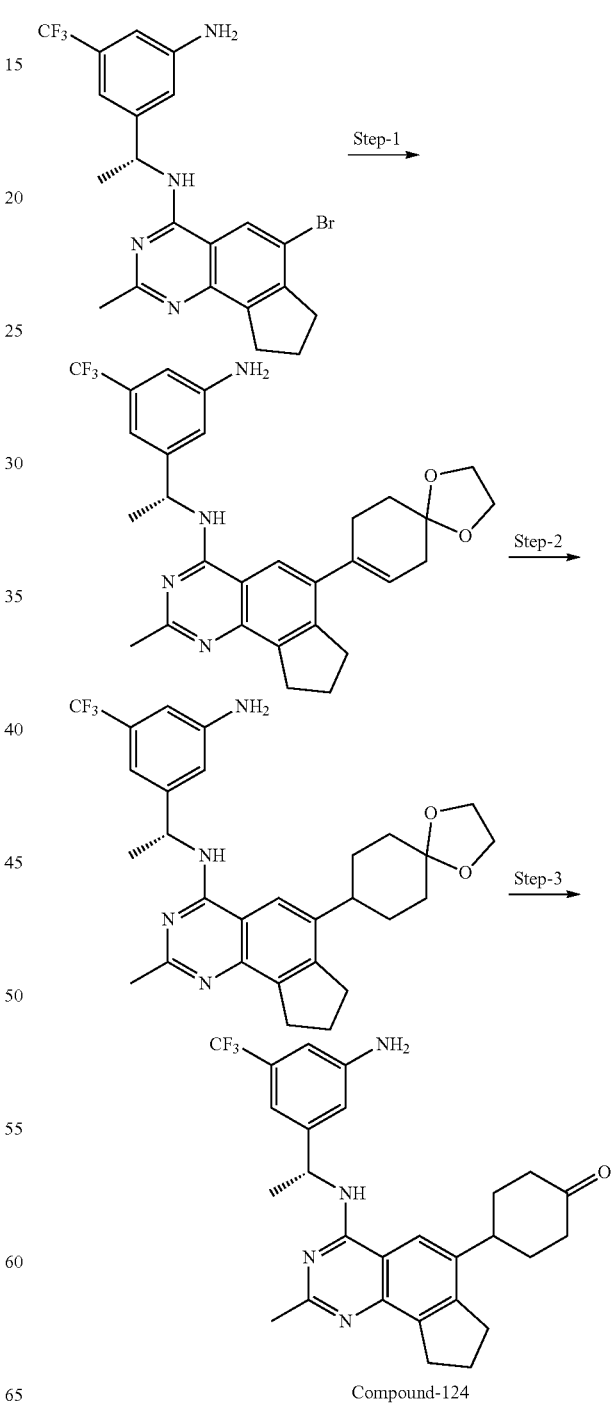

Compound-124

Step-1: (R)—N-(1-(3-amino-5-(trifluoromethyl)phenyl)ethyl)-2-methyl-6-(1,4-dioxaspiro[4.5]dec-7-en-8-yl)-8,9-dihydro-7H-cyclopenta[h]quinazolin-4-amine The title compound was synthesized by using Intermediate-22 and 4,4,5,5-tetramethyl-2-(1,4-dioxaspiro[4.5]dec-7-en-8-yl)-1,3,2-dioxaborolane (commercially available), following analogous reaction protocol as described in Step-1 of Example-87.

MS (ES+) m/z=525.1 (M+).

Step-2: (R)—N-(1-(3-amino-5-(trifluoromethyl)phenyl)ethyl)-2-methyl-6-(1,4-dioxaspiro[4.5]decan-8-yl)-8,9-dihydro-7H-cyclopenta[h]quinazolin-4-amine The title compound was synthesized by following analogous reaction protocol as described in Step-4 of Intermediate-14.

MS (ES+) m/z=527.2 (M+1).

Step-3: (R)-4-(4-((1-(3-amino-5-(trifluoromethyl)phenyl)ethyl)amino)-2-methyl-8,9-dihydro-7H-cyclopenta[h]quinazolin-6-yl)cyclohexan-1-one To a solution of (R)—N-(1-(3-amino-5-(trifluoromethyl)phenyl)ethyl)-2-methyl-6-(1,4-dioxaspiro[4.5]decan-8-yl)-8,9-dihydro-7H-cyclopenta[h]quinazolin-4-amine (2 g, 3.80 mmol) in Dichloromethane (30 ml) was added TFA (0.585 ml, 7.60 mmol) and reaction mixture was stirred at 25° C. for 15 hrs. Reaction mixture was then concentrated and obtained residue was purified by column chromatography using eluent 0-50% ethyl acetate in Hexane and further with prep-HPLC to afford (R)-4-(4-((1-(3-amino-5-(trifluoromethyl)phenyl)ethyl)amino)-2-methyl-8,9-dihydro-7H-cyclopenta[h]quinazolin-6-yl)cyclohexan-1-one (500 mg, 27.3% yield) as a yellow solid.

MS (ES+) m/z=482.86 (M+).
$^1$H NMR (400 MHz, DMSO-$d_6$) δ 8.15-8.09 (m, 1H), 8.03 (s, 1H), 6.87 (s, 1H), 6.84 (s, 1H), 6.71-6.68 (m, 1H), 5.62-5.52 (m, 3H), 3.29-3.21 (m, 1H), 3.18-3.09 (m, 4H), 2.74-2.63 (m, 2H), 2.39 (s, 3H), 2.36-2.27 (m, 2H), 2.13-2.08 (m, 4H), 2.07-1.94 (m, 2H), 1.55 (d, J=7.0 Hz, 3H).

Example-125: (R)-4-(4-((1-(3-amino-5-(trifluoromethyl)phenyl)ethyl)amino)-2-methyl-8,9-dihydro-7H-cyclopenta[h]quinazolin-6-yl)cyclohexan-1-ol (Compound-125)

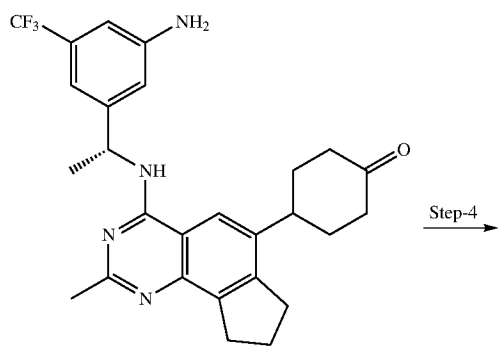

Step-4

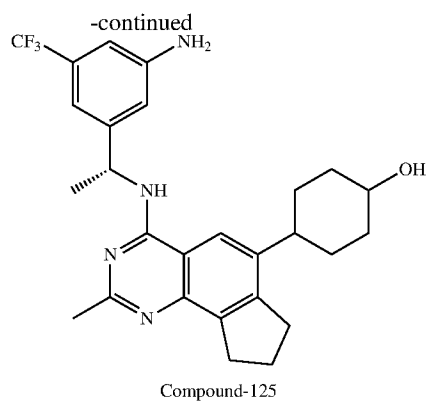

Compound-125

The title compound was synthesized by using (R)-4-(4-((1-(3-amino-5-(trifluoromethyl)phenyl)ethyl)amino)-2-methyl-8,9-dihydro-7H-cyclopenta[h]quinazolin-6-yl)cyclohexan-1-one (Compound-124), following analogous reaction protocol as described in Step-4 of Intermediate-2.

MS (ES+) m/z=485.24 (M+1).
$^1$H NMR (400 MHz, DMSO-$d_6$) δ 8.19 (bs, 1H), 7.96 (s, 1H), 6.91-6.87 (m, 1H), 6.87-6.81 (m, 1H), 6.73-6.65 (m, 1H), 5.60 (p, J=7.4 Hz, 1H), 5.54 (s, 2H), 4.62 (bs, 1H), 3.58-3.48 (m, 1H), 3.12 (t, J=7.7 Hz, 2H), 3.03 (t, J=7.5 Hz, 2H), 2.72-2.54 (m, 1H), 2.39 (s, 3H), 2.15-2.03 (m, 2H), 2.05-1.92 (m, 2H), 1.86-1.77 (m, 2H), 1.72-1.60 (m, 2H), 1.57 (d, J=7.1 Hz, 3H), 1.42-1.26 (m, 2H).

Example-126: KRAS-SOS1 Interaction Assay

Interaction assay was conducted to evaluate the ability of the compounds to disrupt the protein-protein interactions between hSOS1 and hKRASG12C. Inhibitory effect of compounds on GST-hSOS1, 564-1049aa expressed and purified in-house and HIS-hKRASG12C (R06-32DH, SignalChem) interaction was assessed using HTRF detection technology in biochemical assay. Compounds were pre-incubated with 10-50 nM working solution of hSOS1 per well of a 384 well plate (Perkin Elmer, Cat #6007290) for 10 min at 20° C. in the assay buffer containing 5 mM HEPES, pH 7.4, 150 mM NaCl, 10 mM EDTA, 1 mM DTT, 0.05% BSA fraction V and 0.0025% Igepal. Reaction was initiated by adding 100-300 nM working solution of hKRASG12C in assay buffer. Total assay volume was 15 µL. Reaction was continued for 30-60 min at 20° C. Then detection solution containing MAb Anti-GST-d2 (#61GSTDLA, Cisbio BioAssays) and MAb Anti-HIS-Tb (#61HISTLA, Cisbio BioAssays), all prepared in HTRF detection buffer (#61DB10RDF, Cisbio BioAssays) was added and further incubated for 30-60 min at 20° C. HTRF signal was recorded in PHERAStar microplate reader. Ratio of signal obtained at 665 nm and 620 nm was used to compute the percent inhibition of compound utilizing the following formula:

$$\% \text{ Inhibition} = 100 - \left[\frac{(\text{Test Ratio} - \text{Negative Control Ratio})}{(\text{Positive Control Ratio} - \text{Negative Control Ratio})}\right] \times 100$$

Where.

Positive control=*hSOS1+hKRASG12C+MAb* Anti-*GST-d2+Mab* Anti-*HIS-Tb*

Negative control=*hKRASG*12C+*MAb* Anti-*GST-d*2+
*MAb* Anti-*HIS-Tb*

KRAS-SOS1 Interaction inhibition $IC_{50}$ values of the compounds in accordance with embodiments of the invention are provided in Table 1 below: Compounds with $IC_{50}$ 1 nM to 10 nM are grouped under group A, compounds with $IC_{50}$ between 11 nM and 20 nM are grouped under group B.

TABLE 1

| Group | Compound Nos. |
|---|---|
| A | 2, 10, 19, 20, 22, 23, 24, 26, 27, 28, 30, 33, 35, 42, 46, 47, 48, 49, 50, 51, 52, 53, 56, 57, 58, 59, 60, 61a, 62, 63, 64, 65, 68, 69, 71, 72a, 72b, 73a, 73b, 75, 77, 78, 80, 82a, 82b, 84, 85, 87, 101, 108, 113, 114, 115, 117a, 121 |
| B | 1, 17, 21, 44, 54, 55a, 55b, 83, 109, 111, 112, 117b, 119 |

Example-127: Guanine Nucleotide Exchange Assay (GNEA)

GNEA assay was conducted to evaluate the effects of compounds on the nucleotide exchange on hKRASG12C mediated by hSOS1. Inhibitory effect of compounds on HIS-hSOS1, 564-1049aa mediated GTP loading onto GST-hKRASG12C, 1-169aa both expressed and purified in-house was assessed using HTRF detection technology in biochemical assay. Compounds were pre-incubated with hSOS1 working solution containing 10-50 nM hSOS1 and 200 nM EDA-GTP-DY-647P1 (Custom manufactured, Jena Biosciences) per well of a 384 well plate (Perkin Elmer, Cat #6007290) for 10 min at 20° C. in the assay buffer containing 10 mM HEPES, pH 7.4, 150 mM NaCl, 5 mM MgCl2, 1 mM DTT, 0.05% BSA fraction V and 0.0025% Igepal. Reaction was initiated by adding working solution of hKRASG12C containing 25-125 nM hKRASG12C and MAb Anti-GST-Tb (#61GSTTLA, Cisbio BioAssays) in assay buffer. Total assay volume was 15 µL. Reaction was continued for 30-60 min at 20° C. HTRF signal was recorded in PHERAStar microplate reader. Ratio of signal obtained at 665 nm and 620 nm was used to compute the percent inhibition of compound as follows.

% Inhibition =

$$100 - \left[\frac{(\text{Test Ratio} - \text{Negative Control Ratio})}{(\text{Positive Control Ratio} - \text{Negative Control Ratio})}\right] \times 100$$

Where,

Positive control=*hSOS*1+*EDA-GTP-DY*-647*P*1+
*hKRASG*12C+*MAb* Anti-*GST-Tb*

Negative control=*EDA-GTP-DY*-647*P*1+
*hKRASG*12C+*MAb* Anti-*GST-Tb*

Guanine nucleotide exchange inhibition $IC_{50}$ values of the compounds of invention are provided in Table 2 below: Compounds with $IC_{50}$ 1 nM to 30 nM are grouped under group A, compounds with $IC_{50}$ between 31 nM and 70 nM are grouped under group B, and compounds with $IC_{50}$ between 71 nM and 130 nM are grouped under group C.

TABLE 2

| Group | Compound Nos. |
|---|---|
| A | 2, 10, 22, 23, 30, 33, 35, 47, 48, 49, 50, 51, 52, 53, 56, 57, 58, 59, 60, 61a, 62, 63, 64, 65, 68, 69, 71, 72a, 72b, 73a, 73b, 75, 78, 82a, 82b, 84, 85, 113, 121 |
| B | 24, 26, 28, 42, 54, 55a, 87, 114, 115, 117a, 119 |
| C | 55b, 83 |

Example-128: ERK Phosphorylation Assay Protocol

Compounds were tested for their ability to inhibit pERK after EGF stimulation in DLD1 cells. Cells were seeded at 0.2 million cells per well in 96 well cell binding tissue culture plate in 100 µL complete media and were allowed to settle overnight (16 to 20 h). On the following day, cells were treated with various concentrations of test compounds for 2 h followed by stimulation with 200 ng/ml hEGF (diluted in PBS) for 5 minutes. Cells were then washed once with PBS and lysed in freshly prepared lysis buffer (provided with alphascreen surefire ERK1/2 p-T202/Y204 assay kit, cat no: TGRESB10K, Perkin Elmer). Lysis was carried out in plate shaker for 10-15 mins. Lysate was transferred to 386 white opti-plate (Perkin Elmer) and alphascreen for pERK was carried out as per manufacturer's instructions. Plate was read after 2 h incubation in plate shaker at h at 300 RPM, 25-28° C. The difference between the unstimulated and stimulated Vehicle control is considered as 100% ERK phosphorylation, and % inhibition of compounds are calculated accordingly.

$$\% \text{ Inhibition} = \left[\frac{\begin{array}{c}(\text{Average Stimulated} - \text{Average Unstimulated}) - \\ (\text{Average Test} - \text{Average Unstimulated})\end{array}}{(\text{Average Stimulated} - \text{Average Unstimulated}}\right] \times 100$$

ERK phosphorylation inhibition $IC_{50}$ values of the compounds of the invention are provided in Table 3 below: Compounds with $IC_{50}$ 1 nM to 200 nM are grouped under group A, compounds with $IC_{50}$ between 201 nM and 500 nM are grouped under group B.

TABLE 3

| Group | Compound Nos. |
|---|---|
| A | 1, 2, 10, 13, 19, 22, 23, 24, 26, 27, 30, 33, 34, 35, 41, 42, 44, 47, 48, 49, 50, 51, 52, 53, 54, 55a, 55b, 56, 57, 58, 59, 60, 61a, 62, 63, 64, 65, 66, 67a, 68, 69, 70, 71, 72a, 72b, 73a, 73b, 75, 77, 78, 82a, 82b, 83, 84, 85, 86, 87, 90, 101, 102, 105, 112, 113, 114, 115, 116, 117a, 117b, 118a, 118b, 119, 121, 125 |
| B | 6, 9, 20, 21, 32, 61b, 80, 100, 104, 109, 111, 120, 122, 123, 124 |

Example-129: Colony Formation Assay Protocol (Single Agent Activity)

DLD-1/MIA PaCa-2 cells were seeded at a density of 300/500 cells per well respectively in 48 well tissue culture plate and cells were allowed to settle overnight (16 to 20 h). On the following day, cells were treated with different concentrations of test or reference compound and the assay plates were incubated under standard cell culture conditions (37° C. with 5% $CO_2$). After 7 days of drug treatment, media was removed from each well and plates were washed with PBS. Colonies were stained with crystal violet solution for 2-5 min. Plate was then washed carefully under tap water and air dried. For quantitation, 200 μL destaining solution containing 10% Glacial acetic acid was added to each well and crystal violet from the colonies was allowed to solubilize for 20-30 min on plate shaker. After solubilization, absorbance of the extracted stain was recorded in BioTek Synergy Neo II plate reader at 590 nm. Absorbance values were directly proportional to colony growth.

$$\% \text{ Inhibition} = \left[ \frac{\begin{array}{c}(\text{Average Vehicle } abs - \text{Average Blank } abs) - \\ (\text{Average Test } abs - \text{Average Blank } abs)\end{array}}{(\text{Average Vehicle } abs - \text{Average Blank } abs)} \right] \times 100$$

Note: Blank contains only destaining solution
Compound 87 & 82a showed $IC_{50}$ values in the range of 0.5-6 μM in DLD-1 cell line.

Example-130: Colony Formation Assay Protocol (Combination Study)

Colony formation assay was carried out to investigate the combinatorial effects of SOS1 inhibitors with $KRAS^{G12C}$ inhibitor, EGFR inhibitor or ERK inhibitor in reducing clonogenic activity of MIA PaCa-2 cells in vitro. MIA PaCa-2 cells were seeded at 500 cell per well in 48 well tissue culture plate and cells were allowed to settle overnight (16 to 20 h). On the following day, cells were treated with various concentrations of targeted agents to generate $IC_{50}$ with or without increasing concentrations of SOS1i, and the assay plates were incubated under normal cell culture conditions. After 7 days of drug treatment, media was removed from each well and plates were washed with PBS. Cell colonies were stained with crystal violet solution for 2-5 min. Plate was then washed carefully under tap water and air dried. For quantitation, 200 μL destaining solution containing 10% Glacial acetic acid was added to each well and stained colonies were allowed to solubilize for 20-30 min on plate shaker. After solubilization, absorbance of the extracted stain was recorded in BioTek Synergy Neo II plate reader at 590 nm. Absorbance values were directly proportional to colony growth.

Combination potential was investigated by determining single agent $IC_{50}$ of targeted agents vs. $IC_{50}$ of targeted agents when used in combination with SOS1i. Reduction in $IC_{50}$ values of targeted agents in presence of SOS1i suggests potentiation of antiproliferative activity of targeted agents by SOS1i.

$$\% \text{ Inhibition} = \left[ \frac{\begin{array}{c}(\text{Average Vehicle } abs - \text{Average Blank } abs) - \\ (\text{Average Test } abs - \text{Average Blank } abs)\end{array}}{(\text{Average Vehicle } abs - \text{Average Blank } abs)} \right] \times 100$$

Note: Blank contains only destaining solution

Example-131: Anticancer Activity Assay in 3D Spheroids

MIA PaCa-2 cells were seeded at 2000 cell per well in 96 well ultralow binding tissue culture plate in 100 μL complete media and cells were allowed to settle overnight (16 to 20 h). On the following day, cells were treated with various concentrations of test or reference compound and the assay plate was incubated under standard cell culture conditions as mentioned above. On $5^{th}$ day of treatment, plate was centrifuged at 1000 rpm for 5 min, and media was replenished with fresh treatments. Plate was incubated under standard cell culture conditions for 5 more days. After 10 days of drug treatment, 100 μL media was removed from each well followed by addition of 100 μL/well of Cell Titer Glo (CTG) reagent per well. Plate was wrapped in aluminium foil and kept on a shaker (700 RPM) for 3 minutes followed by additional incubation for 10 minutes in the dark. 100 μL of solution from each well was transferred to white opaque 96 well tissue culture plate and read on BioTek Synergy Neo II plate reader. RLUs (Relative Light Units) were directly proportional to the actively proliferating cell number.

$$\% \text{ Inhibition} = \left[ \frac{\begin{array}{c}(\text{Average Vehicle } RLU - \text{Average Blank } ALU) - \\ (\text{Average Vehicle } RLU - \text{Average Blank } RLU)\end{array}}{(\text{Average Vehicle } RLU - \text{Average Blank } RLU)} \right] \times 100$$

Note: Blank contains only CTG and media (no cells)
In Vivo Experiments:

In vivo efficacy of compound 87 was evaluated in MIA PaCa-2 human pancreatic cancer xenograft model in nude mice.

$20 \times 10^6$ MIA PaCa-2 cells were injected subcutaneously in the presence of PBS and matrigel in 1:1 ratio in nude mice. The tumor-bearing mice were randomized once the tumors reached an average volume of approximately 154-159 $mm^3$ (Tumor volume range 107-248 $mm^3$). The mice were divided into the following groups (n=7-8/group): Vehicle control and compound 87 (50 mg/kg; b.i.d.).

Compound 87 was tested for tumor growth inhibition in subchronic MIA PaCa-2 human pancreatic cancer xenograft model in nude mice using assay procedure given above; the % tumor growth inhibition at 50 mg/kg dose was found to be more than 70%.

The invention claimed is:
1. A compound of the general formula (I), its tautomeric form, its stereoisomer, its pharmaceutically acceptable salt, its polymorph, or solvate thereof,

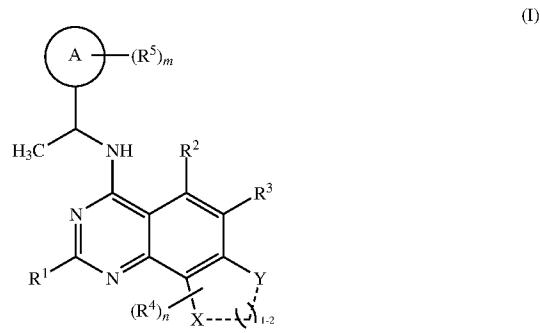

(I)

wherein
Ring A is selected from aryl, heteroaryl, and heterocyclyl;
'- - -' is either a single bond or double bond;
X and Y are independently selected from CH, $CH_2$, O, and $NR^c$, provided that both X and Y cannot be O at the same time;
$R^1$ is selected from hydrogen and substituted or unsubstituted alkyl;

$R^2$ is selected from hydrogen, halogen, alkyl, and cycloalkyl;

$R^3$ is selected from —$OR^6$, —$NR^aR^b$, substituted or unsubstituted alkyl, substituted or unsubstituted cycloalkyl, alkyl substituted with substituted or unsubstituted heterocyclyl, substituted or unsubstituted heteroaryl, and substituted or unsubstituted heterocyclyl;

$R^4$ is selected from oxo and substituted or unsubstituted alkyl;

$R^5$ is selected from halogen, cyano, —$NR^cR^d$, substituted or unsubstituted alkyl, —C(=O) substituted or unsubstituted alkyl, substituted or unsubstituted cycloalkyl, substituted or unsubstituted aryl, and substituted or unsubstituted heteroaryl; optionally two $R^5$ groups attached to the adjacent carbon atoms forming substituted or unsubstituted heterocycle;

$R^6$ is selected from substituted or unsubstituted alkyl, substituted or unsubstituted heterocyclyl, and alkyl substituted with substituted heterocyclyl;

$R^a$ and $R^b$ are independently selected from hydrogen, substituted or unsubstituted alkyl, and substituted or unsubstituted heterocyclyl;

$R^c$ and $R^d$ are independently selected from hydrogen and alkyl;

m is an integer selected from 0, 1, 2, and 3;

n is an integer selected from 0, 1, 2, 3, and 4;

when an alkyl group is substituted, it is substituted with 1 to 5 substituents independently selected from OXO (=O), halogen, cyano, cycloalkyl, aryl, heteroaryl, heterocyclyl, —$OR^7$, —C(=O) OH, —C(=O) O (alkyl), —$NR^8R^{8a}$, —$NR^8C$(=O) $R^9$, and —C(=O) $NR^8R^{8a}$;

when a cycloalkyl group is substituted, it is substituted with 1 to 4 substituents independently selected from oxo (=O), halogen, alkyl, hydroxyalkyl, cyano, aryl, heteroaryl, heterocyclyl, —$OR^7$, —C(=O) OH, —C(=O) O (alkyl), —$NR^8R^{8a}$, —$NR^8C$(=O) $R^9$, and —C(=O) $NR^8R^{8a}$;

when the aryl group is substituted, it is substituted with 1 to 4 substituents independently selected from halogen, nitro, cyano, alkyl, haloalkyl, perhaloalkyl, cycloalkyl, heterocyclyl, heteroaryl, —$OR^7$, —$NR^8R^{8a}$, —$NR^8C$(=O) $R^9$, —C(=O) $R^9$, —C(=O) $NR^8R^{8a}$, —$SO_2$-alkyl, —C(=O) OH, and —C(=O)O-alkyl;

when the heteroaryl group is substituted, it is substituted with 1 to 4 substituents independently selected from halogen, nitro, cyano, alkyl, haloalkyl, perhaloalkyl, cycloalkyl, heterocyclyl, aryl, heteroaryl, —$OR^7$, —$NR^8R^{8a}$, —$NR^7C$(=O) $R^9$, —C(=O) $R^9$, —C(=O) $NR^8R^{8a}$, —$SO_2$-alkyl, —C(=O) OH, and —C(=O)O-alkyl;

when the heterocycle group is substituted, it is substituted either on a ring carbon atom or on a ring hetero atom, and when it is substituted on a ring carbon atom, it is substituted with 1 to 4 substituents independently selected from oxo (=O), halogen, cyano, alkyl, haloalkyl, alkoxyalkyl, hydroxyalkyl, cycloalkyl, perhaloalkyl, —$OR^7$, —C(=O) $NR^8R^{8a}$, —C(=O) OH, —C(=O)O-alkyl, —N(H) C(=O) (alkyl), —N(H) $R^8$, and —N(alkyl)$_2$; and when the heterocycle group is substituted on a ring nitrogen, it is substituted with substituents independently selected from alkyl, haloalkyl, cycloalkyl, aryl, heteroaryl, —$SO_2$ (alkyl), —C(=O) $R^9$, and —C(=O)O(alkyl); when the heterocycle group is substituted on a ring sulfur, it is substituted with 1 or 2 oxo (=O) group(s);

$R^7$ is selected from hydrogen, alkyl, perhaloalkyl, and cycloalkyl;

$R^8$ and $R^{8a}$ are each independently selected from hydrogen, alkyl, and cycloalkyl; and $R^9$ is selected from alkyl and cycloalkyl.

2. The compound of the general formula (I), its tautomeric form, its stereoisomer, its pharmaceutically acceptable salt, its polymorph, or solvate thereof, as claimed in claim 1, wherein A is selected from aryl and heteroaryl.

3. The compound of the general formula (I), its tautomeric form, its stereoisomer, its pharmaceutically acceptable salt, its polymorph, or solvate thereof, as claimed in claim 1, wherein A is selected from phenyl and pyridyl.

4. The compound of the general formula (I), its tautomeric form, its stereoisomer, its pharmaceutically acceptable salt, its polymorph, or solvate thereof, as claimed in claim 1, wherein $R^1$ is substituted or unsubstituted alkyl.

5. The compound of the general formula (I), its tautomeric form, its stereoisomer, its pharmaceutically acceptable salt, its polymorph, or solvate thereof, as claimed in claim 1, wherein $R^1$ is methyl.

6. The compound of the general formula (I), its tautomeric form, its stereoisomer, its pharmaceutically acceptable salt, its polymorph, or solvate thereof, as claimed in claim 1, wherein $R^2$ is hydrogen.

7. The compound of the general formula (I), its tautomeric form, its stereoisomer, its pharmaceutically acceptable salt, its polymorph, or solvate thereof, as claimed in claim 1, wherein $R^3$ is selected from —$OR^6$, —$NR^aR^b$, substituted or unsubstituted cycloalkyl, alkyl substituted with substituted or unsubstituted heterocyclyl, substituted or unsubstituted heteroaryl, and substituted or unsubstituted heterocyclyl.

8. The compound of the general formula (I), its tautomeric form, its stereoisomer, its pharmaceutically acceptable salt, its polymorph, or solvate thereof, as claimed in claim 1, wherein $R^3$ is selected from —$OCH_3$,

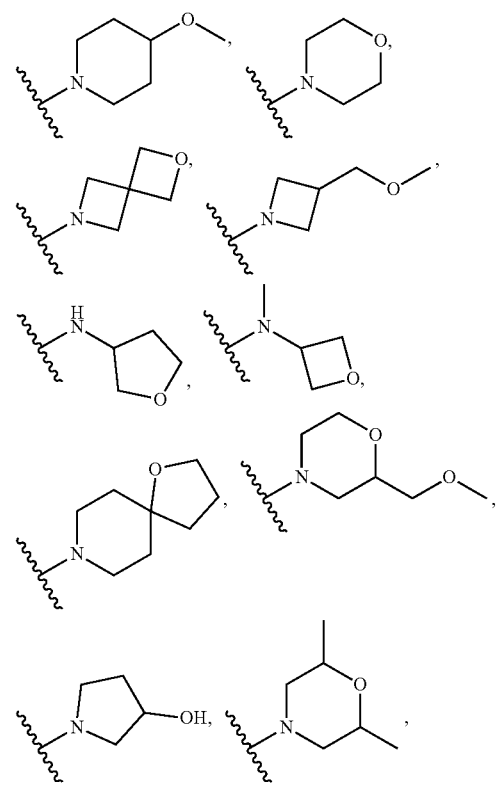

247
-continued
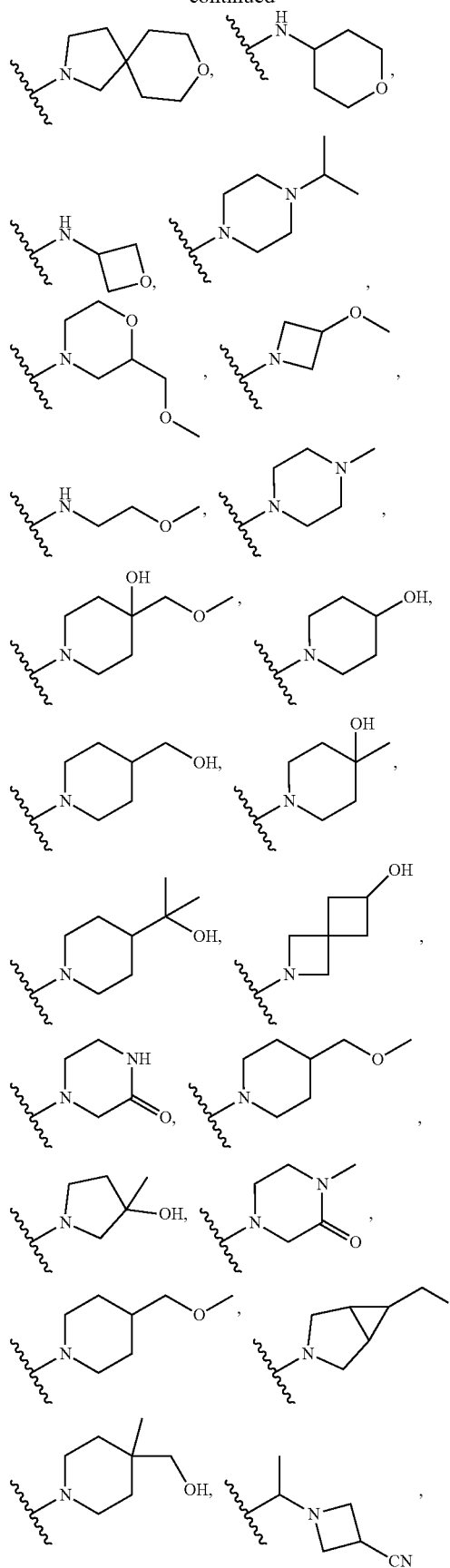
248
-continued
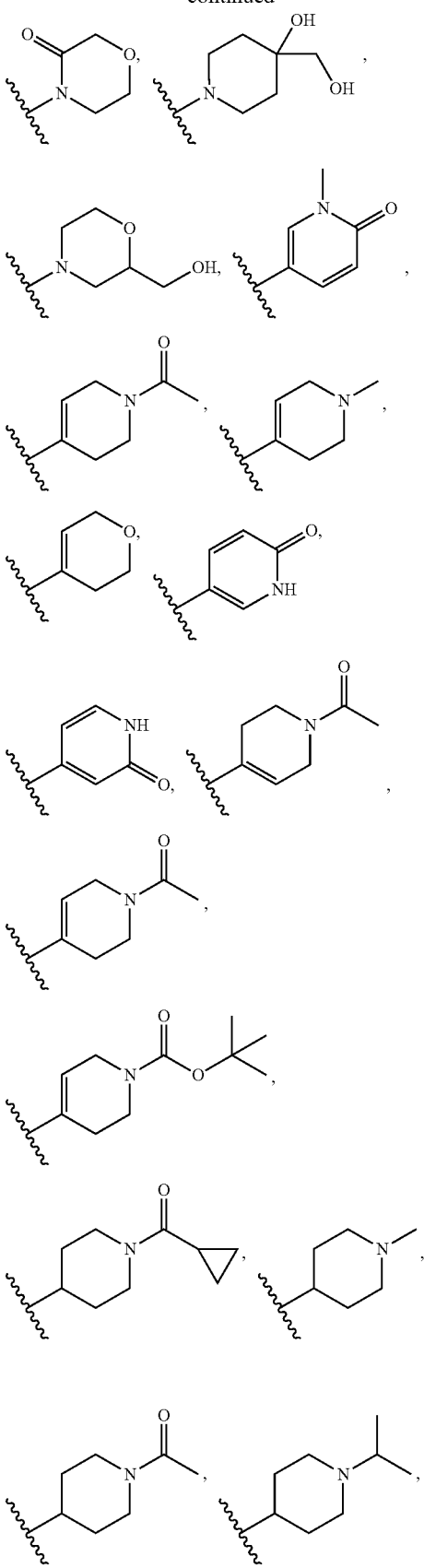

-continued

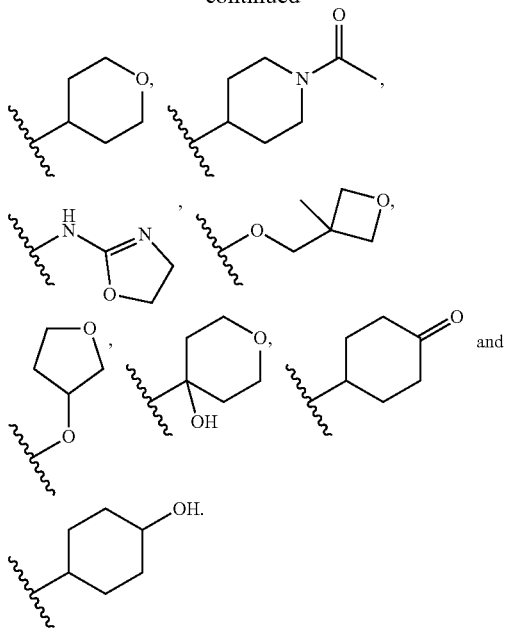

9. The compound of the general formula (I), its tautomeric form, its stereoisomer, its pharmaceutically acceptable salt, its polymorph, or solvate thereof, as claimed in claim 1, wherein $R^4$ is selected from oxo and methyl.

10. The compound of the general formula (I), its tautomeric form, its stereoisomer, its pharmaceutically acceptable salt, its polymorph, or solvate thereof, as claimed in claim 1, wherein $R^5$ is selected from the group consisting of halogen, cyano, —$NR^cR^d$, substituted or unsubstituted alkyl, and —C(=O) substituted or unsubstituted alkyl; optionally two $R^5$ groups attached to the adjacent carbon atoms forming substituted or unsubstituted heterocycle.

11. The compound of the general formula (I), its tautomeric form, its stereoisomer, its pharmaceutically acceptable salt, its polymorph, or solvate thereof, as claimed in claim 1, wherein $R^5$ is selected from fluorine, —$CH_3$, —$CF_3$, —$NH_2$, —$CHF_2$, —CN, —$COCF_3$,

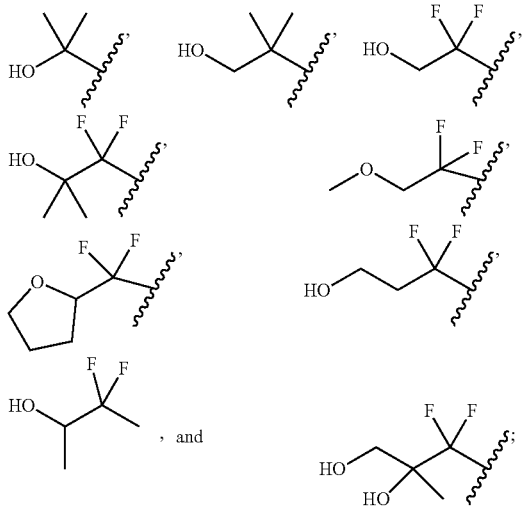

optionally two $R^5$ groups attached to the adjacent carbon atoms forming

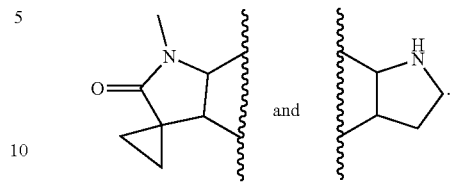

12. The compound of the general formula (I), its tautomeric form, its stereoisomer, its pharmaceutically acceptable salt, its polymorph, or solvate thereof, as claimed in claim 1, wherein $R^6$ is selected from methyl, tetrahydrofuran-3-yl, and

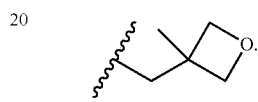

13. The compound of the general formula (I), its tautomeric form, its stereoisomer, its pharmaceutically acceptable salt, its polymorph, or solvate thereof, as claimed in claim 1, wherein $R^a$ and $R^b$ are independently selected from hydrogen, methyl,

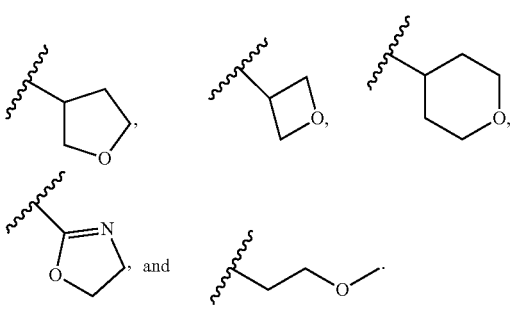

14. The compound of the general formula (I), its tautomeric form, its stereoisomer, its pharmaceutically acceptable salt, its polymorph, or solvate thereof, as claimed in claim 1, wherein Re and $R^d$ are independently selected from hydrogen and methyl.

15. The compound of the general formula (I), its tautomeric form, its stereoisomer, its pharmaceutically acceptable salt, its polymorph, or solvate thereof, as claimed in claim 1, wherein A is selected from aryl and heteroaryl; '- - -' is either a single bond or double bond; X and Y are independently selected from CH, $CH_2$, O, and $NR^c$, provided that both X and Y cannot be O at the same time; $R^1$ is substituted or unsubstituted alkyl; $R^2$ is hydrogen; $R^3$ is selected from —$OR^6$, —$NR^aR^b$, substituted or unsubstituted cycloalkyl, alkyl substituted with substituted or unsubstituted heterocyclyl, substituted or unsubstituted heteroaryl, and substituted or unsubstituted heterocyclyl; $R^4$ is selected from oxo and substituted or unsubstituted alkyl; $R^5$ is selected from halogen, cyano, —$NR^cR^d$, substituted or unsubstituted alkyl, and —C(=O) substituted or unsubstituted alkyl; optionally two $R^5$ groups attached to the adjacent carbon atoms forming substituted or unsubstituted heterocycle; $R^6$ is selected from substituted or unsubstituted alkyl, substituted or unsubstituted heterocyclyl, and alkyl substituted with substituted heterocyclyl; $R^a$ and $R^b$ are independently selected from hydrogen, substituted or unsubstituted alkyl, and substituted or unsubstituted heterocyclyl; $R^c$ and $R^d$ are independently selected from hydrogen and alkyl; m is an integer selected from 0, 1, 2, and 3; n is an integer selected from 0, 1, 2, 3, and 4.

16. The compound of the general formula (I), its tautomeric form, its stereoisomer, its pharmaceutically acceptable salt, its polymorph, or solvate thereof, as claimed in claim 1, wherein A is selected from phenyl and pyridyl; '- - -' is either a single bond or double bond; X and Y are independently selected from CH, $CH_2$, O, and $NR^c$, provided that both X and Y cannot be O at the same time; $R^1$ is methyl; $R^2$ is hydrogen; $R^3$ is selected from —$OCH_3$,

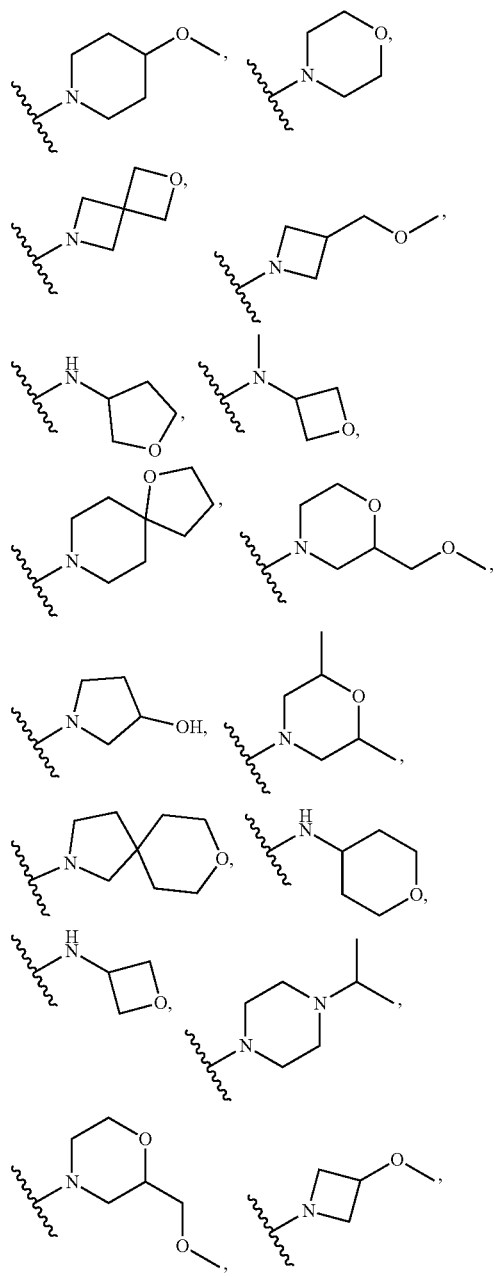

-continued

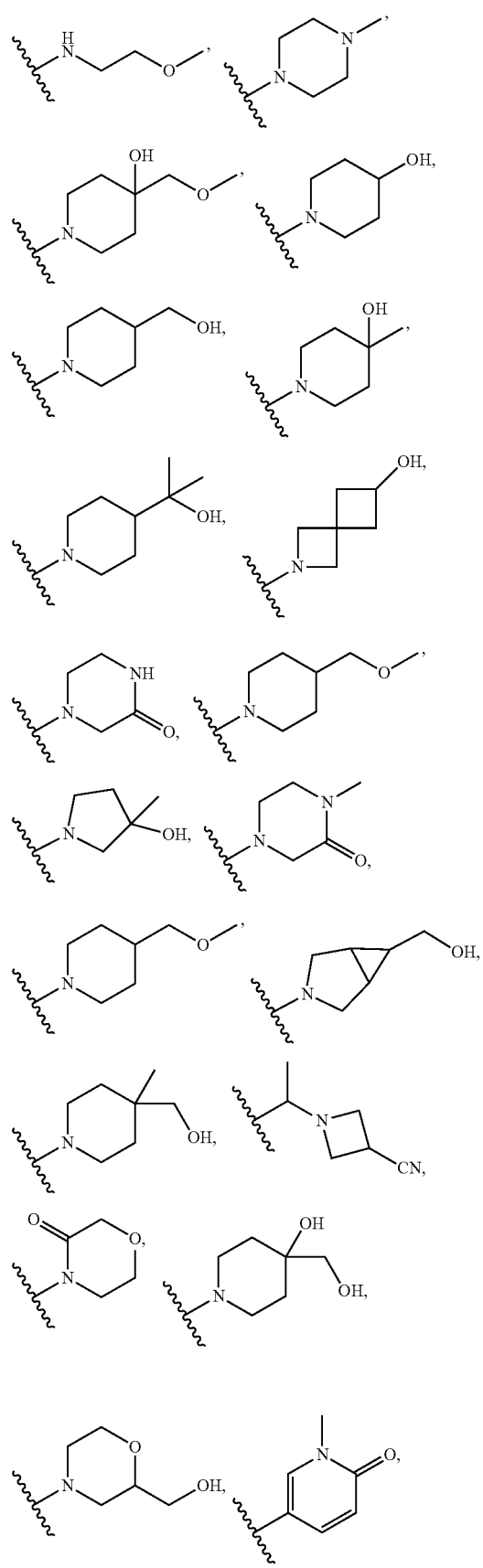

$R^4$ is selected from oxo and methyl; $R^5$ is selected from the group consisting of fluorine, —CH$_3$, —CF$_3$, —NH$_2$, —CHF$_2$, —CN, —COCF$_3$, optionally two $R^5$ groups attached to the adjacent carbon atoms forming $R^6$ is selected from methyl, tetrahydrofuran-3-yl, and $R^a$ and $R^b$ are independently selected from hydrogen, methyl, -continued

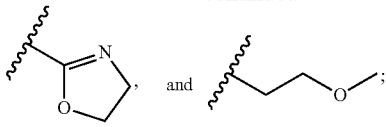

$R^c$ and $R^d$ are independently selected from hydrogen and methyl; m is an integer selected from 0, 1, 2, and 3; n is an integer selected from 0, 1, 2, 3, and 4.

17. The compound of the general formula (I), its tautomeric form, its stereoisomer, its pharmaceutically acceptable salt, its polymorph, or solvate thereof, as claimed in claim 1, wherein the compound is selected from:
  (R)—N-(1-(3-amino-5-(trifluoromethyl) phenyl) ethyl)-6-(4-methoxypiperidin-1-yl)-2-methyl-8,9-dihydro-7H-cyclopenta[h]quinazolin-4-amine (Compound-1);
  (R)—N-(1-(3-amino-5-(trifluoromethyl) phenyl) ethyl)-2-methyl-6-morpholino-8,9-dihydro-7H-cyclopenta[h]quinazolin-4-amine (Compound-2);
  2-(2-fluoro-3-(1-((2-methyl-6-(2-oxa-6-azaspiro[3.3]heptan-6-yl)-8,9-dihydro-7H-cyclopenta[h]quinazolin-4-yl) amino) ethyl) phenyl) propan-2-ol (Compound-3);
  2-(2-fluoro-3-(1-((2-methyl-6-morpholino-8,9-dihydro-7H-cyclopenta[h]quinazolin-4-yl) amino) ethyl) phenyl) propan-2-ol (Compound-4);
  N-(1-(5-amino-2-fluoro-3-methylphenyl) ethyl)-2-methyl-6-morpholino-8,9-dihydro-7H-cyclopenta[h]quinazolin-4-amine (Compound-5);
  2-methyl-2-(3-(1-((2-methyl-6-(2-oxa-6-azaspiro[3.3]heptan-6-yl)-8,9-dihydro-7H-cyclopenta[h]quinazolin-4-yl) amino) ethyl) phenyl) propan-1-ol (Compound-6);
  1,1-difluoro-2-methyl-1-(3-(1-((2-methyl-6-morpholino-8,9-dihydro-7H-cyclopenta[h]quinazolin-4-yl) amino) ethyl) phenyl) propan-2-ol-(Compound-7);
  N-(1-(2-amino-6-(trifluoromethyl) pyridin-4-yl) ethyl)-2-methyl-6-(2-oxa-6-azaspiro[3.3]heptan-6-yl)-8,9-dihydro-7H-cyclopenta[h]quinazolin-4-amine (Compound-8);
  (R)-2,2-difluoro-2-(2-fluoro-3-(1-((6-(3-(methoxymethyl) azetidin-1-yl)-2-methyl-8,9-dihydro-7H-cyclopenta[h]quinazolin-4-yl) amino) ethyl) phenyl) ethan-1-ol (Compound-9);
  (R)-1,1-difluoro-1-(2-fluoro-3-(1-((2-methyl-6-(2-oxa-6-azaspiro[3.3]heptan-6-yl)-8,9-dihydro-7H-cyclopenta[h]quinazolin-4-yl) amino) ethyl) phenyl)-2-methyl-propan-2-ol (Compound 10);
  2,2-difluoro-2-(2-fluoro-3-((R)-1-((2-methyl-6-(((S)-tetrahydrofuran-3-yl) amino)-8,9-dihydro-7H-cyclopenta[h]quinazolin-4-yl) amino) ethyl) phenyl) ethan-1-ol (Compound-11);
  (R)—$N^4$-(1-(3-amino-5-(trifluoromethyl) phenyl) ethyl)-$N^6$,2-dimethyl-$N^6$-(oxetan-3-yl)-8,9-dihydro-7H-cyclopenta[h]quinazoline-4,6-diamine (Compound-12);
  (R)—N-(1-(3-amino-5-(trifluoromethyl) phenyl) ethyl)-2-methyl-6-(1-oxa-8-azaspiro[4.5]decan-8-yl)-8,9-dihydro-7H-cyclopenta[h]quinazolin-4-amine (Compound-13);
  N-(1-(2-fluoro-3-(trifluoromethyl) phenyl) ethyl)-6-((R)-2-(methoxymethyl) morpholino)-2-methyl-8,9-dihydro-7H-cyclopenta[h]quinazolin-4-amine (Compound-14);
  (S)-1-(4-((1-(2-fluoro-3-(trifluoromethyl) phenyl) ethyl) amino)-2-methyl-8,9-dihydro-7H-cyclopenta[h]quinazolin-6-yl) pyrrolidin-3-ol (Compound-15);
  (R)-1-(4-((1-(2-fluoro-3-(trifluoromethyl) phenyl) ethyl) amino)-2-methyl-8,9-dihydro-7H-cyclopenta[h]quinazolin-6-yl) pyrrolidin-3-ol (Compound-16);
  N—((R)-1-(3-amino-5-(trifluoromethyl) phenyl) ethyl)-6-((2S,6R)-2,6-dimethylmorpholino)-2-methyl-8,9-dihydro-7H-cyclopenta[h]quinazolin-4-amine (Compound-17);
  (R)—N-(1-(3-amino-5-(trifluoromethyl) phenyl) ethyl)-2-methyl-6-(8-oxa-2-azaspiro[4.5]decan-2-yl)-8,9-dihydro-7H-cyclopenta[h]quinazolin-4-amine (Compound-18);
  N4-((R)-1-(3-amino-5-(trifluoromethyl) phenyl) ethyl)-2-methyl-N6-((S)-tetrahydrofuran-3-y1)-8,9-dihydro-7H-cyclopenta[h]quinazoline-4,6-diamine (Compound-19);
  N-(1-(3-amino-5-methylphenyl) ethyl)-2-methyl-6-(2-oxa-6-azaspiro[3.3]heptan-6-yl)-8,9-dihydro-7H-cyclopenta[h]quinazolin-4-amine (Compound-20);
  (R)—$N^4$-(1-(3-amino-5-(trifluoromethyl) phenyl) ethyl)-2-methyl-$N^6$-(tetrahydro-2H-pyran-4-yl)-8,9-dihydro-7H-cyclopenta[h]quinazoline-4,6-diamine (Compound-21);
  (S)-1-(4-(((R)-1-(3-(1,1-difluoro-2-hydroxyethyl)-2-fluorophenyl) ethyl) amino)-2-methyl-8,9-dihydro-7H-cyclopenta[h]quinazolin-6-yl) pyrrolidin-3-ol (Compound-22);
  (R)-2,2-difluoro-2-(2-fluoro-3-(1-((2-methyl-6-(2-oxa-6-azaspiro[3.3]heptan-6-yl)-8,9-dihydro-7H-cyclopenta[h]quinazolin-4-yl) amino) ethyl) phenyl) ethan-1-ol (Compound-23);
  (R)—N-(1-(3-(1,1-difluoro-2-methoxyethyl)-2-fluorophenyl) ethyl)-2-methyl-6-(2-oxa-6-azaspiro[3.3]heptan-6-yl)-8,9-dihydro-7H-cyclopenta[h]quinazolin-4-amine (Compound-24);
  (S)-1-(4-(((R)-1-(3-(1,1-difluoro-2-methoxyethyl)-2-fluorophenyl) ethyl) amino)-2-methyl-8,9-dihydro-7H-cyclopenta[h]quinazolin-6-yl) pyrrolidin-3-ol (Compound-25);
  (R)—N-(1-(3-amino-5-(trifluoromethyl) phenyl) ethyl)-6-(3-(methoxymethyl) azetidin-1-yl)-2-methyl-8,9-dihydro-7H-cyclopenta[h]quinazolin-4-amine (Compound-26);
  N—((R)-1-(3-amino-5-(trifluoromethyl) phenyl) ethyl)-6-((R)-2-(methoxymethyl) morpholino)-2-methyl-8,9-dihydro-7H-cyclopenta[h]quinazolin-4-amine (Compound-27);
  (R)—$N^4$-(1-(3-amino-5-(trifluoromethyl) phenyl) ethyl)-2-methyl-$N^6$-(oxetan-3-yl)-8,9-dihydro-7H-cyclopenta[h]quinazoline-4,6-diamine (Compound-28);
  (R)-2,2-difluoro-2-(2-fluoro-3-(1-((2-methyl-6-(oxetan-3-ylamino)-8,9-dihydro-7H-cyclopenta[h]quinazolin-4-yl) amino) ethyl) phenyl) ethan-1-ol (Compound-29);
  (R)-1-(4-(((R)-1-(3-(1,1-difluoro-2-hydroxyethyl)-2-fluorophenyl) ethyl) amino)-2-methyl-8,9-dihydro-7H-cyclopenta[h]quinazolin-6-yl) pyrrolidin-3-ol (Compound-30);
  (R)—N-(1-(3-amino-5-(trifluoromethyl) phenyl) ethyl)-6-(4-isopropylpiperazin-1-yl)-2-methyl-8,9-dihydro-7H-cyclopenta[h]quinazolin-4-amine (Compound-31);
  N—((R)-1-(3-amino-5-(trifluoromethyl) phenyl) ethyl)-6-((S)-2-(methoxymethyl) morpholino)-2-methyl-8,9-dihydro-7H-cyclopenta[h]quinazolin-4-amine (Compound-32);

(R)—N-(1-(3-amino-5-(trifluoromethyl) phenyl) ethyl)-2-methyl-6-(2-oxa-6-azaspiro[3.3]heptan-6-yl)-8,9-dihydro-7H-cyclopenta[h]quinazolin-4-amine (Compound-33);

N-(1-(2-fluoro-3-(trifluoromethyl) phenyl) ethyl)-2-methyl-6-(2-oxa-6-azaspiro[3.3]heptan-6-yl)-8,9-dihydro-7H-cyclopenta[h]quinazolin-4-amine (Compound-34);

2,2-difluoro-2-(2-fluoro-3-((R)-1-((6-((R)-2-(methoxymethyl) morpholino)-2-methyl-8,9-dihydro-7H-cyclopenta[h]quinazolin-4-yl) amino) ethyl) phenyl) ethan-1-ol (Compound-35);

(R)—N-(1-(3-amino-5-(trifluoromethyl) phenyl) ethyl)-6-(3-methoxyazetidin-1-yl)-2-methyl-8,9-dihydro-7H-cyclopenta[h]quinazolin-4-amine (Compound-36);

1'-methyl-4'-(1-((2-methyl-6-(2-oxa-6-azaspiro[3.3]heptan-6-yl)-8,9-dihydro-7H-cyclopenta[h]quinazolin-4-yl) amino) ethyl) spiro[cyclopropane-1,3'-indolin]-2'-one (Compound-37);

N-(1-(3-(difluoro (tetrahydrofuran-2-yl) methyl) phenyl) ethyl)-2-methyl-6-(2-oxa-6-azaspiro[3.3]heptan-6-yl)-8,9-dihydro-7H-cyclopenta[h]quinazolin-4-amine (Compound-38);

N-((S/R) 1-(3-(difluoro ((S/R)-tetrahydrofuran-2-yl) methyl) phenyl) ethyl)-2-methyl-6-(2-oxa-6-azaspiro[3.3]heptan-6-yl)-8,9-dihydro-7H-cyclopenta[h]quinazolin-4-amine (Compound-39);

2,2-difluoro-2-(2-fluoro-5-(1-((2-methyl-6-(2-oxa-6-azaspiro[3.3]heptan-6-yl)-8,9-dihydro-7H-cyclopenta[h]quinazolin-4-yl) amino) ethyl) phenyl) ethan-1-ol (Compound-40);

2,2-difluoro-2-(2-methyl-3-(1-((2-methyl-6-(2-oxa-6-azaspiro[3.3]heptan-6-yl)-8,9-dihydro-7H-cyclopenta[h]quinazolin-4-yl) amino) ethyl) phenyl) ethan-1-ol (Compound-41);

2,2-difluoro-2-(3-(1-((6-((R)-2-(methoxymethyl) morpholino)-2-methyl-8,9-dihydro-7H-cyclopenta[h]quinazolin-4-yl) amino) ethyl)-2-methylphenyl) ethan-1-ol (Compound-42);

(R)—N$^4$-(1-(3-amino-5-(trifluoromethyl) phenyl) ethyl)-N$^6$-(2-methoxyethyl)-2-methyl-8,9-dihydro-7H-cyclopenta[h]quinazoline-4,6-diamine (Compound-43);

(R)-1-(4-(((R)-1-(3-amino-5-(trifluoromethyl) phenyl) ethyl) amino)-2-methyl-8,9-dihydro-7H-cyclopenta[h]quinazolin-6-yl) pyrrolidin-3-ol (Compound-44);

2,2-difluoro-2-(2-methyl-3-(1-((2-methyl-6-morpholino-8,9-dihydro-7H-cyclopenta[h]quinazolin-4-yl) amino) ethyl) phenyl) ethan-1-ol (Compound-45);

(R)—N-(1-(3-amino-5-(trifluoromethyl) phenyl) ethyl)-2-methyl-6-(4-methylpiperazin-1-yl)-8,9-dihydro-7H-cyclopenta[h]quinazolin-4-amine (Compound-46);

(R)-1-(4-((1-(3-amino-5-(trifluoromethyl) phenyl) ethyl) amino)-2-methyl-8,9-dihydro-7H-cyclopenta[h]quinazolin-6-yl)-4-(methoxymethyl) piperidin-4-ol (Compound-47);

(R)-1-(4-((1-(3-amino-5-(trifluoromethyl) phenyl) ethyl) amino)-2-methyl-8,9-dihydro-7H-cyclopenta[h]quinazolin-6-yl) piperidin-4-ol (Compound-48);

(R)-(1-(4-((1-(3-amino-5-(trifluoromethyl) phenyl) ethyl) amino)-2-methyl-8,9-dihydro-7H-cyclopenta[h]quinazolin-6-yl) piperidin-4-yl) methanol (Compound-49);

(R)-1-(4-((1-(3-amino-5-(trifluoromethyl) phenyl) ethyl) amino)-2-methyl-8,9-dihydro-7H-cyclopenta[h]quinazolin-6-yl)-4-methylpiperidin-4-ol (Compound-50);

(R)-2-(1-(4-((1-(3-amino-5-(trifluoromethyl) phenyl) ethyl) amino)-2-methyl-8,9-dihydro-7H-cyclopenta[h]quinazolin-6-yl) piperidin-4-yl) propan-2-ol (Compound-51);

(R)-2-(4-((1-(3-amino-5-(trifluoromethyl) phenyl) ethyl) amino)-2-methyl-8,9-dihydro-7H-cyclopenta[h]quinazolin-6-yl)-2-azaspiro[3.3]heptan-6-ol (Compound-52);

(R)-4-(4-((1-(3-amino-5-(trifluoromethyl) phenyl) ethyl) amino)-2-methyl-8,9-dihydro-7H-cyclopenta[h]quinazolin-6-yl) piperazin-2-one (Compound-53);

(R)—N-(1-(3-amino-5-(trifluoromethyl) phenyl) ethyl)-6-(4-(methoxymethyl) piperidin-1-yl)-2-methyl-8,9-dihydro-7H-cyclopenta[h]quinazolin-4-amine (Compound-54);

1-(4-(((R)-1-(3-amino-5-(trifluoromethyl) phenyl) ethyl) amino)-2-methyl-8,9-dihydro-7H-cyclopenta[h]quinazolin-6-yl)-3-methylpyrrolidin-3-ol (Compound-55);

(R)-4-(4-((1-(3-amino-5-(trifluoromethyl) phenyl) ethyl) amino)-2-methyl-8,9-dihydro-7H-cyclopenta[h]quinazolin-6-yl)-1-methylpiperazin-2-one (Compound-56);

(R)-1,1-difluoro-1-(2-fluoro-3-(1-((6-(4-(methoxymethyl) piperidin-1-yl)-2-methyl-8,9-dihydro-7H-cyclopenta[h]quinazolin-4-yl) amino) ethyl) phenyl)-2-methylpropan-2-ol (Compound 57);

1,1-difluoro-1-(2-fluoro-3-((R)-1-((6-((1R,5S,6R)-6-(hydroxymethyl)-3-azabicyclo[3.1.0]hexan-3-yl)-2-methyl-8,9-dihydro-7H-cyclopenta[h]quinazolin-4-yl) amino) ethyl) phenyl)-2-methylpropan-2-ol (Compound-58);

(R)-1,1-difluoro-1-(2-fluoro-3-(1-((2-methyl-6-morpholino-8,9-dihydro-7H-cyclopenta[h]quinazolin-4-yl) amino) ethyl) phenyl)-2-methylpropan-2-ol (Compound-59);

(R)-1,1-difluoro-1-(2-fluoro-3-(1-((6-(4-(hydroxymethyl)-4-methylpiperidin-1-yl)-2-methyl-8,9-dihydro-7H-cyclopenta[h]quinazolin-4-yl) amino) ethyl) phenyl)-2-methylpropan-2-ol (Compound-60);

1-(4-(((R)-1-(3-(1,1-difluoro-2-hydroxy-2-methylpropyl)-2-fluorophenyl) ethyl) amino)-2-methyl-8,9-dihydro-7H-cyclopenta[h]quinazolin-6-yl)-3-methylpyrrolidin-3-ol (Compound-61);

1,1-difluoro-1-(2-fluoro-3-((R)-1-((6-((R)-2-(methoxymethyl) morpholino)-2-methyl-8,9-dihydro-7H-cyclopenta[h]quinazolin-4-yl) amino) ethyl) phenyl)-2-methylpropan-2-ol (Compound 62);

(R)-1-(4-((1-(3-(1,1-difluoro-2-hydroxy-2-methylpropyl)-2-fluorophenyl) ethyl) amino)-2-methyl-8,9-dihydro-7H-cyclopenta[h]quinazolin-6-yl)-4-(methoxymethyl) piperidin-4-ol (Compound-63);

(R)-1,1-difluoro-1-(2-fluoro-3-(1-((6-(4-(hydroxymethyl) piperidin-1-yl)-2-methyl-8,9-dihydro-7H-cyclopenta[h]quinazolin-4-yl) amino) ethyl) phenyl)-2-methylpropan-2-ol (Compound 64);

(R)-1-(4-((1-(3-(1,1-difluoro-2-hydroxy-2-methylpropyl)-2-fluorophenyl) ethyl) amino)-2-methyl-8,9-dihydro-7H-cyclopenta[h]quinazolin-6-yl) piperidin-4-ol (Compound-65);

(R)-4-(4-((1-(3-(1,1-difluoro-2-hydroxy-2-methylpropyl)-2-fluorophenyl) ethyl) amino)-2-methyl-8,9-dihydro-7H-cyclopenta[h]quinazolin-6-yl) piperazin-2-one (Compound-66);

1-(4-(((R)-1-(3-(1,1-difluoro-2-hydroxyethyl)-2-fluorophenyl) ethyl) amino)-2-methyl-8,9-dihydro-7H-cyclopenta[h]quinazoline-6-yl)-3-methylpyrrolidin-3-ol (Compound-67);

(R)-1-(4-((1-(3-(1,1-difluoro-2-hydroxyethyl)-2-fluorophenyl) ethyl) amino)-2-methyl-8,9-dihydro-7H-cyclopenta[h]quinazolin-6-yl)-4-(methoxymethyl) piperidin-4-ol (Compound-68);

(R)-1-(4-((1-(3-(1,1-difluoro-2-methoxyethyl)-2-fluorophenyl) ethyl) amino)-2-methyl-8,9-dihydro-7H-cyclopenta[h]quinazolin-6-yl)-4-(methoxy methyl) piperidin-4-ol (Compound-69);

(R)-3,3-difluoro-3-(2-fluoro-3-(1-((2-methyl-6-(2-oxa-6-azaspiro[3.3]heptan-6-yl)-8,9-dihydro-7H-cyclopenta[h]quinazolin-4-yl) amino) ethyl) phenyl) propan-1-ol (Compound-70);

(R)-1-(4-((1-(3-(1,1-difluoro-3-hydroxypropyl)-2-fluorophenyl) ethyl) amino)-2-methyl-8,9-dihydro-7H-cyclopenta[h]quinazolin-6-yl)-4-(methoxymethyl) piperidin-4-ol (Compound-71);

1-(4-(((R)-1-(3-(1,1-difluoro-2-hydroxypropyl)-2-fluorophenyl) ethyl) amino)-2-methyl-8,9-dihydro-7H-cyclopenta[h]quinazolin-6-yl)-4-(methoxymethyl) piperidin-4-ol (Compound-72);

1,1-difluoro-1-(2-fluoro-3-((R)-1-((2-methyl-6-(2-oxa-6-azaspiro[3.3]heptan-6-yl)-8,9-dihydro-7H-cyclopenta[h]quinazolin-4-yl) amino) ethyl) phenyl) propan-2-ol (Compound-73);

1-(1-(4-(((R)-1-(3-amino-5-(trifluoromethyl) phenyl) ethyl) amino)-2-methyl-8,9-dihydro-7H-cyclopenta[h]quinazolin-6-yl) ethyl) azetidine-3-carbonitrile (Compound-74);

(R)-2,2-difluoro-2-(2-fluoro-3-(1-((2-methyl-6-morpholino-8,9-dihydro-7H-cyclopenta[h]quinazolin-4-yl) amino) ethyl) phenyl) ethan-1-ol (Compound-75);

N-(1-(3-amino-5-fluorophenyl) ethyl)-2-methyl-6-morpholino-8,9-dihydro-7H-cyclopenta[h]quinazolin-4-amine (Compound-76);

N-(1-(3-amino-5-(difluoromethyl) phenyl) ethyl)-2-methyl-6-morpholino-8,9-dihydro-7H-cyclopenta[h]quinazolin-4-amine (Compound-77);

N-(1-(3-amino-5-(difluoromethyl) phenyl) ethyl)-2-methyl-6-(2-oxa-6-azaspiro[3.3]heptan-6-yl)-8,9-dihydro-7H-cyclopenta[h]quinazolin-4-amine (Compound-78);

3-(1-((2-methyl-6-morpholino-8,9-dihydro-7H-cyclopenta[h]quinazolin-4-yl) amino) ethyl) benzonitrile (Compound-79);

N-(1-(3-amino-5-methylphenyl) ethyl)-2-methyl-6-morpholino-8,9-dihydro-7H-cyclopenta[h]quinazolin-4-amine (Compound-80);

N-(1-(indolin-4-yl) ethyl)-2-methyl-6-morpholino-8,9-dihydro-7H-cyclopenta[h]quinazolin-4-amine (Compound-81);

3,3-difluoro-3-(2-fluoro-3-(1-((2-methyl-6-morpholino-8,9-dihydro-7H-cyclopenta[h]quinazolin-4-yl) amino) ethyl) phenyl)-2-methylpropane-1,2-diol (Compound-82);

(R)-4-(4-((1-(3-amino-5-(trifluoromethyl) phenyl) ethyl) amino)-2-methyl-8,9-dihydro-7H-cyclopenta[h]quinazolin-6-yl) morpholin-3-one (Compound-83);

(R)-1-(4-((1-(3-amino-5-(trifluoromethyl) phenyl) ethyl) amino)-2-methyl-8,9-dihydro-7H-cyclopenta[h]quinazolin-6-yl)-4-(hydroxymethyl) piperidin-4-ol (Compound-84);

(R)-1-(4-((1-(3-(1,1-difluoro-2-hydroxy-2-methylpropyl)-2-fluorophenyl) ethyl) amino)-2-methyl-8,9-dihydro-7H-cyclopenta[h]quinazolin-6-yl)-4-(hydroxymethyl) piperidin-4-ol (Compound-85);

2,2-difluoro-2-(2-fluoro-3-((R)-1-((6-((R)-2-(hydroxymethyl) morpholino)-2-methyl-8,9-dihydro-7H-cyclopenta[h]quinazolin-4-yl) amino) ethyl) phenyl) ethan-1-ol (Compound-86);

(R)-5-(4-((1-(3-amino-5-(trifluoromethyl) phenyl) ethyl) amino)-2-methyl-8,9-dihydro-7H-cyclopenta[h]quinazolin-6-yl)-1-methylpyridin-2 (1H)-one (Compound-87);

(R)-5-(4-((1-(3-(1,1-difluoro-2-hydroxyethyl)-2-fluorophenyl) ethyl) amino)-2-methyl-8,9-dihydro-7H-cyclopenta[h]quinazolin-6-yl)-1-methylpyridin-2 (1H)-one (Compound-88);

1-methyl-5-(2-methyl-4-((1-(3-(trifluoromethyl) phenyl) ethyl) amino)-8,9-dihydro-7H-cyclopenta[h]quinazolin-6-yl) pyridin-2 (1H)-one (Compound-89);

(R)-1-(4-(4-((1-(3-amino-5-(trifluoromethyl) phenyl) ethyl) amino)-2-methyl-8,9-dihydro-7H-cyclopenta[h]quinazolin-6-yl)-3,6-dihydropyridin-1 (2H)-yl) ethan-1-one (Compound-90);

(R)—N-(1-(3-amino-5-(trifluoromethyl) phenyl) ethyl)-2-methyl-6-(1-methyl-1,2,3,6-tetrahydropyridin-4-yl)-8,9-dihydro-7H-cyclopenta[h]quinazolin-4-amine (Compound-91);

1-(4-(2-methyl-4-((1-(3-(trifluoromethyl) phenyl) ethyl) amino)-8,9-dihydro-7H-cyclopenta[h]quinazolin-6-yl)-3,6-dihydropyridin-1 (2H)-yl) ethan-1-one (Compound-92);

(R)—N-(1-(3-amino-5-(trifluoromethyl) phenyl) ethyl)-6-(3,6-dihydro-2H-pyran-4-yl)-2-methyl-8,9-dihydro-7H-cyclopenta[h]quinazolin-4-amine (Compound-93);

(R)-5-(4-((1-(3-amino-5-(trifluoromethyl) phenyl) ethyl) amino)-2-methyl-8,9-dihydro-7H-cyclopenta[h]quinazolin-6-yl) pyridin-2 (1H)-one (Compound-94);

(R)-4-(4-((1-(3-amino-5-(trifluoromethyl) phenyl) ethyl) amino)-2-methyl-8,9-dihydro-7H-cyclopenta[h]quinazolin-6-yl) pyridin-2 (1H)-one (Compound-95);

(R)-1-(4-(4-((1-(3-amino-5-(trifluoromethyl) phenyl) ethyl) amino)-2-methyl-7,8,9,10-tetrahydrobenzo[h]quinazolin-6-yl)-3,6-dihydropyridin-1 (2H)-yl) ethan-1-one (Compound-96);

(R)-5-(4-((1-(3-amino-5-(trifluoromethyl) phenyl) ethyl) amino)-2-methyl-7,8,9,10-tetrahydrobenzo[h]quinazolin-6-yl)-1-methylpyridin-2 (1H)-one (Compound-97);

(R)—N-(1-(3-amino-5-(trifluoromethyl) phenyl) ethyl)-6-(1-isopropyl-1,2,3,6-tetrahydropyridin-4-yl)-2-methyl-8,9-dihydro-7H-cyclopenta[h]quinazolin-4-amine (Compound 98);

tert-butyl-(R)-4-(4-((1-(3-amino-5-(trifluoromethyl) phenyl) ethyl) amino)-2-methyl-8,9-dihydro-7H-cyclopenta[h]quinazolin-6-yl)-3,6-dihydropyridine-1 (2H)-carboxylate (Compound-99);

(R)-(4-(4-((1-(3-amino-5-(trifluoromethyl) phenyl) ethyl) amino)-2-methyl-8,9-dihydro-7H-cyclopenta[h]quinazolin-6-yl) piperidin-1-yl) (cyclopropyl) methanone (Compound-100);

(R)—N-(1-(3-amino-5-(trifluoromethyl) phenyl) ethyl)-2-methyl-6-(1-methylpiperidin-4-yl)-8,9-dihydro-7H-cyclopenta[h]quinazolin-4-amine (Compound-101);

(R)-1-(4-(4-((1-(3-amino-5-(trifluoromethyl) phenyl) ethyl) amino)-2-methyl-8,9-dihydro-7H-cyclopenta[h]quinazolin-6-yl) piperidin-1-yl) ethan-1-one (Compound-102);

(R)—N-(1-(3-amino-5-(trifluoromethyl) phenyl) ethyl)-6-(1-isopropylpiperidin-4-yl)-2-methyl-8,9-dihydro-7H-cyclopenta[h]quinazolin-4-amine (Compound-103);

(R)—N-(1-(3-amino-5-(trifluoromethyl) phenyl) ethyl)-2-methyl-6-(tetrahydro-2H-pyran-4-yl)-8,9-dihydro-7H-cyclopenta[h]quinazolin-4-amine (Compound-104);

(R)-1-(4-(4-((1-(3-amino-5-(trifluoromethyl) phenyl) ethyl) amino)-2-methyl-7,8,9,10-tetrahydrobenzo[h] quinazolin-6-yl) piperidin-1-yl) ethan-1-one (Compound-105);

(R)—N⁴-(1-(3-amino-5-(trifluoromethyl) phenyl) ethyl)-N⁶-(4,5-dihydrooxazol-2-yl)-2-methyl-8,9-dihydro-7H-cyclopenta[h]quinazoline-4,6-diamine (Compound-106);

(R)—N-(1-(3-amino-5-(trifluoromethyl) phenyl) ethyl)-2-methyl-6-((3-methyloxetan-3-yl) methoxy)-8,9-dihydro-7H-cyclopenta[h]quinazolin-4-amine (Compound-107);

(R)—N-(1-(3-amino-5-(trifluoromethyl) phenyl) ethyl)-6-methoxy-2-methyl-8,9-dihydro-7H-cyclopenta[h]quinazolin-4-amine (Compound-108);

N—((R)-1-(3-amino-5-(trifluoromethyl) phenyl) ethyl)-2-methyl-6-(((S)-tetrahydrofuran-3-yl) oxy)-8,9-dihydro-7H-cyclopenta[h]quinazolin-4-amine (Compound-109);

(R)—N-(1-(3-amino-5-(trifluoromethyl) phenyl) ethyl)-6-methoxy-2,8-dimethylfuro[2,3-h]quinazolin-4-amine (Compound-110);

N—((R)-1-(3-amino-5-(trifluoromethyl) phenyl) ethyl)-2,8-dimethyl-6-(((S)-tetrahydrofuran-3-yl) oxy) furo[2,3-h]quinazolin-4-amine (Compound-111);

N—((R)-1-(3-amino-5-(trifluoromethyl) phenyl) ethyl)-2,8,8-trimethyl-6-(((S)-tetrahydrofuran-3-yl) oxy)-8,9-dihydrofuro[2,3-h]quinazolin-4-amine (Compound-112);

(R)—N-(1-(3-amino-5-(trifluoromethyl) phenyl) ethyl)-2,8,8-trimethyl-6-morpholino-8,9-dihydrofuro[2,3-h]quinazolin-4-amine (Compound-113);

(R)—N-(1-(3-amino-5-(trifluoromethyl) phenyl) ethyl)-2,8,8-trimethyl-6-(2-oxa-6-azaspiro[3.3]heptan-6-yl)-8,9-dihydrofuro[2,3-h]quinazolin-4-amine (Compound-114);

(R)—N-(1-(3-amino-5-(difluoromethyl) phenyl) ethyl)-2,8,8-trimethyl-6-morpholino-8,9-dihydrofuro[2,3-h]quinazolin-4-amine (Compound-115);

N-(1-(3-amino-5-(difluoromethyl) phenyl) ethyl)-2,8,8-trimethyl-6-(2-oxa-6-azaspiro[3.3]heptan-6-yl)-8,9-dihydrofuro[2,3-h]quinazolin-4-amine (Compound-116);

N—((R)-1-(3-amino-5-(trifluoromethyl) phenyl) ethyl)-2,8-dimethyl-6-morpholino-8,9-dihydrofuro[2,3-h]quinazolin-4-amine (Compound-117);

N—((R)-1-(3-amino-5-(trifluoromethyl) phenyl) ethyl)-2,8-dimethyl-6-(((S)-tetrahydrofuran-3-yl) oxy)-8,9-dihydrofuro[2,3-h]quinazolin-4-amine (Compound-118);

(R)-4-(4-((1-(3-(1,1-difluoro-2-hydroxy-2-methylpropyl)-2-fluorophenyl) ethyl) amino)-2-methyl-8,9-dihydro-7H-cyclopenta[h]quinazolin-6-yl) tetrahydro-2H-pyran-4-ol (Compound-119);

2,2,2-trifluoro-1-(3-(1-((2-methyl-6-morpholino-8,9-dihydro-7H-cyclopenta[h]quinazolin-4-yl) amino) ethyl) phenyl) ethan-1-one (Compound-120);

(R)-2,2-difluoro-2-(2-fluoro-3-(1-((6-methoxy-2,7-dimethyl-8,9-dihydro-7H-[1,4]oxazino[3,2-h]quinazolin-4-yl) amino) ethyl) phenyl) ethan-1-ol (Compound-121);

(R)-4-((1-(3-(1,1-difluoro-2-hydroxy-2-methylpropyl)-2-fluorophenyl) ethyl) amino)-2,8,8,10-tetramethyl-6-(1-methyl-6-oxo-1,6-dihydropyridin-3-yl)-8H-[1,4]oxazino[2,3-h]quinazolin-9 (10H)-one (Compound-122);

(R)-4-(4-((1-(3-(1,1-difluoro-2-hydroxy-2-methylpropyl)-2-fluorophenyl) ethyl) amino)-2-methyl-8,9-dihydro-7H-cyclopenta[h]quinazolin-6-yl) morpholin-3-one (Compound-123);

(R)-4-(4-((1-(3-amino-5-(trifluoromethyl) phenyl) ethyl) amino)-2-methyl-8,9-dihydro-7H-cyclopenta[h]quinazolin-6-yl) cyclohexan-1-one (Compound-124); and (R)-4-(4-((1-(3-amino-5-(trifluoromethyl) phenyl) ethyl) amino)-2-methyl-8,9-dihydro-7H-cyclopenta[h]quinazolin-6-yl) cyclohexan-1-ol (Compound-125).

18. A pharmaceutical composition comprising a compound of the general formula (I), its tautomeric form, its stereoisomer, its pharmaceutically acceptable salt, its polymorph, or solvate thereof, as claimed in claim 1 and a pharmaceutically acceptable carrier.

19. A method for the treatment of cancer, comprising administering to a subject a therapeutically effective amount of a compound of the general formula (I), its tautomeric form, its stereoisomer, its pharmaceutically acceptable salt, its polymorph, or solvate thereof as claimed in claim 1.

20. The method of claim 19, wherein the cancer is selected from the group consisting of pancreatic cancer, lung cancer, colorectal cancer, class 3 BRAF-mutant cancers, hematological cancer, cholangiocarcinoma, multiple myeloma, melanoma, uterine cancer, endometrial cancer, thyroid cancer, acute myeloid leukaemia, bladder cancer, urothelial cancer, gastric cancer, cervical cancer, head and neck squamous cell carcinoma, diffuse large B cell lymphoma, esophageal cancer, chronic lymphocytic leukaemia, hepatocellular cancer, breast cancer, ovarian cancer, prostate cancer, glioblastoma, renal cancer, Pure mucosal neuroma syndrome, Fibrous Epulis, and sarcomas.

21. A method for the treatment of Acute *Staphylococcus aureus* infection, Acute Respiratory Distress syndrome, Acute Lung injury, or Sepsis, comprising administering to a subject a therapeutically effective amount of a compound of the general formula (I), its tautomeric form, its stereoisomer, its pharmaceutically acceptable salt, its polymorph, or solvate thereof as claimed in claim 1.

22. A method for the treatment of a RASopathy, comprising administering to a subject a therapeutically effective amount of a compound of the general formula (I), its tautomeric form, its stereoisomer, its pharmaceutically acceptable salt, its polymorph, or solvate thereof as claimed in claim 1.

23. The method of claim 22, wherein the RASopathy is selected from the group consisting of Neurofibromatosis type 1 (NF1), Noonan Syndrome (NS), Noonan Syndrome with Multiple Lentigines (NSML), Capillary Malformation-Arteriovenous Malformation Syndrome (CM-AVM), Costello Syndrome (CS), Cardio-Facio-Cutaneous Syndrome (CFC), Legius Syndrome, Noonan-like/multiple giant cell lesion syndrome and Hereditary Gingival Fibromatosis (HGF).

24. A combination comprising the compound of the general formula (I), its tautomeric form, its stereoisomer, its pharmaceutically acceptable salt, its polymorph, or solvate thereof, and at least one pharmacologically active substance.

25. A method for the treatment of cancer in a subject, comprising administering to the subject a therapeutically effective amount of a compound of the general formula (I), its tautomeric form, its stereoisomer, its pharmaceutically acceptable salt, its polymorph, or solvate thereof, as claimed in claim 1, in combination with at least one other pharmacologically active substance.

26. The method of claim 25, wherein the compound of the general formula (I), its tautomeric form, its stereoisomer, its pharmaceutically acceptable salt, its polymorph, or solvate thereof is administered to the subject before or after the at least one other pharmacologically active substance.

27. The method of claim 25, wherein the compound of the general formula (I), its tautomeric form, its stereoisomer, its pharmaceutically acceptable salt, its polymorph, or solvate thereof is administered to the subject together with the at least one other pharmacologically active substance.

* * * * *